(12) United States Patent
Mauney et al.

(10) Patent No.: US 6,990,190 B2
(45) Date of Patent: *Jan. 24, 2006

(54) METHOD AND SYSTEM FOR REMOTE TELEPHONE CALIBRATION

(75) Inventors: Daniel W. Mauney, Delta (CA); David T. Roach, Austin, TX (US); Medford A. Dyer, San Diego, CA (US); Kenneth S. Swinson, San Diego, CA (US); Joseph E. Talbot, San Diego, CA (US)

(73) Assignee: GN Jabra Corporation, Lombard, IL (US)

( * ) Notice: Subject to any disclaimer, the term of this patent is extended or adjusted under 35 U.S.C. 154(b) by 323 days.

This patent is subject to a terminal disclaimer.

(21) Appl. No.: 10/109,606

(22) Filed: Mar. 27, 2002

(65) Prior Publication Data

US 2003/0021408 A1 Jan. 30, 2003

Related U.S. Application Data

(63) Continuation-in-part of application No. 08/971,954, filed on Nov. 17, 1997, now Pat. No. 6,453,042.

(51) Int. Cl.
*H04M 1/00* (2006.01)

(52) U.S. Cl. .................................. 379/392.01; 379/404
(58) Field of Classification Search ............ 379/392.01, 379/395, 404
See application file for complete search history.

(56) References Cited

U.S. PATENT DOCUMENTS

| | | | |
|---|---|---|---|
| 3,637,954 A | 1/1972 | Anderson et al. | ... 179/175.31 E |
| 4,071,704 A | 1/1978 | Moed | ...................... 179/15 BF |
| 4,180,709 A | 12/1979 | Cosgrove et al. | ......... 179/2 AM |
| 4,273,970 A | 6/1981 | Favin et al. | .......... 179/175.3 R |
| 4,788,708 A | 11/1988 | Hendrix | .......................... 379/6 |
| 4,807,274 A | 2/1989 | Kousa | ............................. 379/6 |
| 4,862,492 A | 8/1989 | Zwick | ............................ 379/6 |
| 4,879,738 A | 11/1989 | Petro | ............................. 379/3 |
| 4,887,288 A | 12/1989 | Erving | ........................... 379/6 |
| 4,937,850 A | 6/1990 | Borbas et al. | .................. 379/6 |
| 5,073,919 A | 12/1991 | Hagensick | .................... 379/29 |
| 5,226,086 A | 7/1993 | Platt | ............................. 381/58 |
| 5,440,758 A | 8/1995 | Grube et al. | .................... 455/9 |
| 5,734,713 A * | 3/1998 | Mauney et al. | ............. 379/395 |
| 6,453,042 B1 * | 9/2002 | Roach et al. | ............... 379/395 |

\* cited by examiner

*Primary Examiner*—Jefferey P. Harold
(74) *Attorney, Agent, or Firm*—Lloyd W. Sadler

(57) ABSTRACT

A method and system for remotely calibrating a headset telephone with a reliable, accurate and easy to use user interface is provided. This method makes use of the remote programmability of advanced telephone headsets and DTMF signal encoding and permits the customer-user to instigate the calibration procedure with an ordinary telephone call. The invention provides a way for the optimum settings to be transmitted, loaded and stored to the headset, thereby improving the audio quality of telephone headsets by providing adjustment steps for such audio qualities as microphone gain, speaker gain, background noise and echo cancellation, filter functions and diagnostics.

33 Claims, 7 Drawing Sheets

METHOD AND SYSTEM FOR REMOTE TELEPHONE CALIBRATION

CROSS REFERENCE TO RELATED APPLICATIONS

This patent application is based on, and is a continuation-in-part, of pending U.S. patent application No.: 08/971,954, filed on Nov. 17, 1997, now U.S. Pat. No. 6,453,042 which in turn claimed priority to 08/593,953, filed on Jan. 30, 1996. Priority is hereby claimed to all material disclosed in this pending parent case.

BACKGROUND OF THE INVENTION

1. Field of the Invention

This invention relates to the calibration and adjustment of signal levels and noise removal in telephone equipment. More specifically, this invention relates to a method of adjusting microphone signal level, speaker volume, noise and echo cancellation and to do so remotely over the telephone lines. This invention is particularly adapted to the unique requirements of hands-free telephone headsets, in that it is designed to adapt to different ambient noise environments. This invention provides an accurate user-friendly means for calibrating hands-free telephone headsets to operate properly with most telephone base units.

2. Description of Related Art

Various approaches are currently used to adjust headsets to be used with telephone base units. Typically, multi-position switches are provided for the user to set into different positions depending on the type of telephone base unit with which the headset is being used. A list of telephones cross referenced to switch positions may be provided. These approaches range from having six switch positions to over sixteen switch positions.

Other approaches employ special purpose electronics which are connected directly to the headset and are generally used to test the headset rather than calibrate it to a particular telephone base unit.

For general background material, the reader is directed to U.S. Pat. Nos. 3,637,954, 4,071,704, 4,180,709, 4,273,970, 4,788,708, 4,807,274, 4,879,738, 4,937,850, 4,862,492, 4,887,288, 5,073,919, and 5,226,086 each of which is hereby incorporated by reference in its entirety for the material disclosed therein.

SUMMARY OF INVENTION

It is desirable to provide a system for the calibration of telephone headsets, adapting said headsets to telephone base units, and to do so with an easy to activate remote procedure which communicates over the telephone lines to ensure an improved signal quality for the headset user.

It is the general objective of this invention to properly calibrate telephone headsets for use with most telephone base units.

It is a further objective of this invention to provide a method of calibrating telephone headsets remotely over the telephone lines.

It is a further objective of this invention to provide a telephone headset calibration method that includes the capability of adjusting the headset microphone signal level.

It is a further objective of this invention to provide a remote telephone calibration method that includes the capability of adjusting the transmit level of the telephone headset.

It is a further objective of this invention to provide a remote telephone calibration method that can customize the telephone headset such that it adapts to an individual user's preferences and to an individual user's environment.

It is a further objective of this invention to provide a remote telephone calibration method that is capable of adjusting noise cancellation and can be adaptable to different ambient noise environments.

It is a further objective of this invention to provide a remote telephone headset calibration method capable of fine tuning echo cancellation.

It is a further objective of this invention to provide a remote telephone calibration method that is accomplished easily and without any technical intervention by the user.

These and other objectives of this invention are achieved by a method comprising the steps of: the user calling the support center using the telephone headset, activating the headset, placing the headset in programming mode, setting the headset transmit level, fine tuning the headset to eliminate the 'echo', setting noise cancellation level, adjusting the frequency response, setting speaker gain, and storing the settings in the headset.

In a preferred embodiment, the method of this invention is accomplished with the aid of software programmed and stored in the headset circuitry. Also, in this preferred embodiment, the invention operates on a jabra 1000 telephone headset with Earphone attachment. For the purposes of this disclosure, the jabra 1000 telephone headset with Earphone attachment will be simply referred to as the jabra 1000.

DETAILED DESCRIPTION

Figure 1:
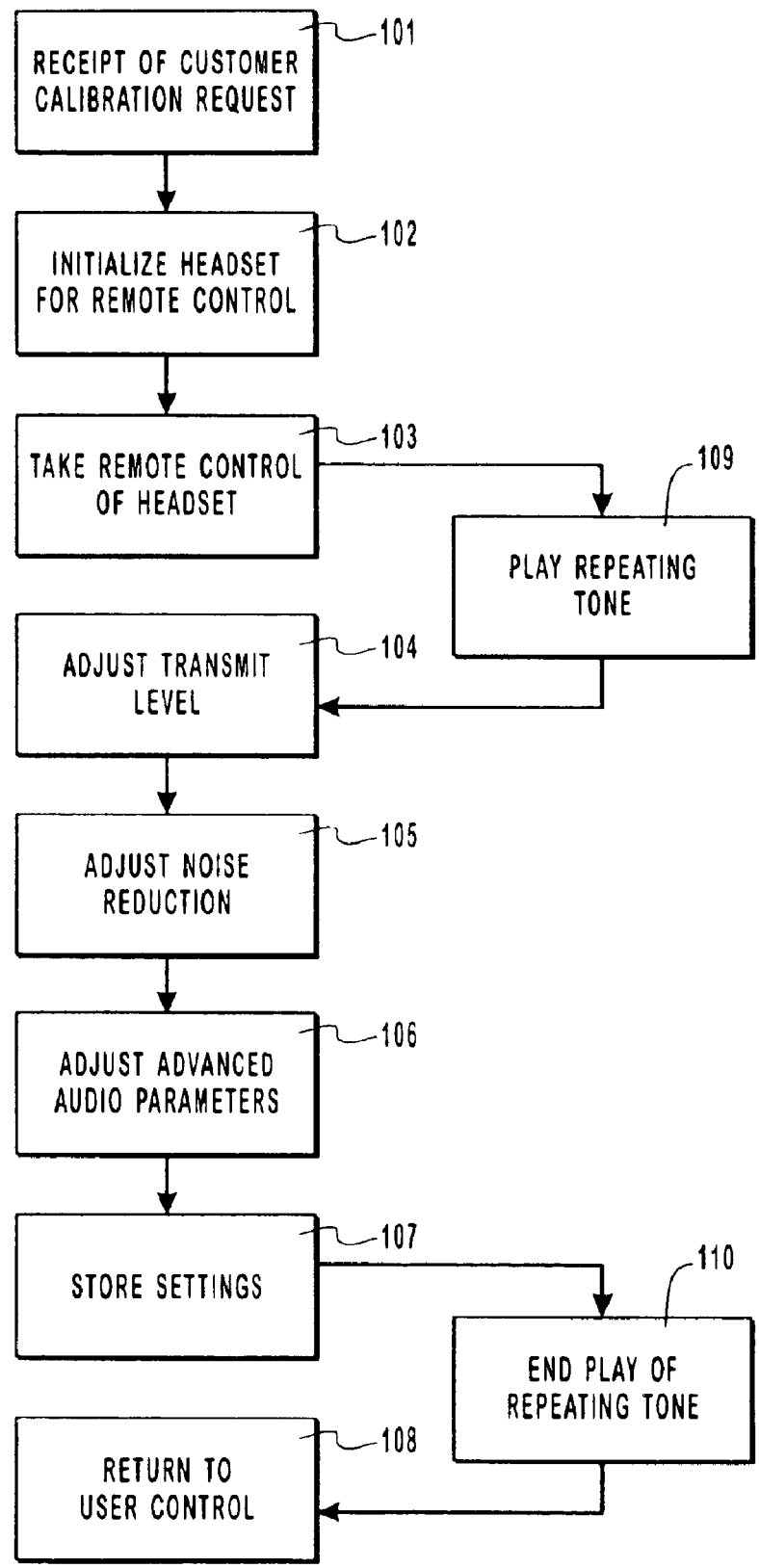
FIG. 1 is a flow diagram showing the top level steps of one preferred embodiment of the method of the invention.

FIG. 1 depicts the top level steps of the preferred embodiment of the invention. The first step of the method 101 is the receipt of a customer calibration request. In the preferred embodiment of the invention, this step is initiated by a customer telephone call to customer service. While the customer service function may be handled by automated equipment, the current best mode involves a human customer service representative. Once the customer has contacted customer service the customer is instructed to use the headset (in the preferred embodiment a jabra 1000). Once the customer calibration request is received 101, the customer's headset is initialized for remote control 102. In this way the headset is set for control by the customer service representative, remotely over the telephone lines. Next, customer service takes remote control of the headset 103. Once customer service has control of the headset calibration can begin.

A telephone headset has many adjustable audio qualities. This invention provides a process of making these adjustments in a simple reliable remote manner. Many telephone headsets will require some but not all of the possible adjustments or calibrations. This process therefore does not require that every quality or parameter be calibrated, rather customer service is provided the means for directly calibrating each quality or parameter without interfering with qualities or parameters that do not require calibration.

Step 104 provides the capability to adjust the transmission level of the headset. The transmission level involves the audio received from the customer via a microphone in the headset. Adjustment of transmission level 104 provides the appropriate volume to the receiver of a telephone call initiated by a headset telephone user.

Adjustment of noise reduction 105 involves the compensation for background noise. An objective of a well calibrated headset is the cancellation of background noise without deteriorating the quality of the user's voice.

A variety of audio parameters are adjustable in the adjustment of advanced audio parameters step 106. In the preferred mode of this invention these audio parameters include such audio qualities as: signal attenuation, speaker gain, echo, microphone circuit adjustments, speaker circuit adjustments, and audio filter control. In the preferred embodiment these qualities are adjusted by the transmission of parameter codes and preset variables to the control software operating within the headset electronics.

After the completion of calibration of the headset, the process of the invention provides for storing of the settings and parameters 107 in the headset memory circuitry. This storage of the settings and parameters 107 insures that the headset maintains the values and adjustments for the user after the user regains control of the headset.

The return to user control step 108 ends the calibration of the headset, permitting the user to employ the headset in normal telephone communications.

FIG. 1 further shows the addition of an audio feedback feature which is initiated 109 by the remote control function in the system of the invention. Once the customer service takes control of the head set a repeating musical tune is played through the head set. The addition of this audio feedback feature provides several novel and important enhancement to the operation of the system, including the customer is thereby informed that the unit is functioning and that the calibration process is continuing so that the customer is not tempted to intervene and halt the process (the customer can be instructed to take certain reset action should the tune not begin at the appropriate time or should it end without the customer service operator returning to the line); and the audio feedback tune masks the potentially undesirable sounds of audio signals used during the calibration process. The preferred embodiment of this portion of the invention is provided in the provided source code found at the end of the software source code section. The reader should note that alternative tunes, tones and signal attenuation can be used without departing from the essence of this portion of the invention. Moreover, the tune can alternatively be generated or altered by a process in the headset, as opposed to being transmitted from the customer service center.

Once the headset is calibrated, the repeating tone initiated in step 109 is ended in step 110.

Figure 2:
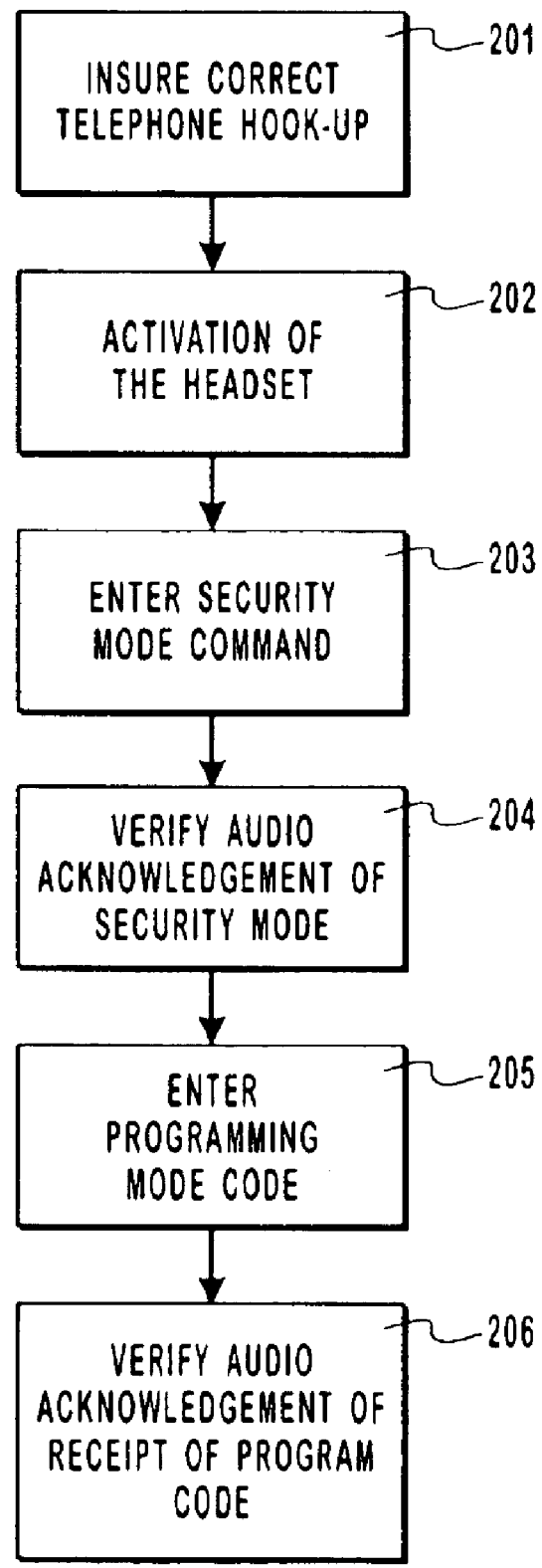
FIG. 2 is a more detailed flow diagram of the initial steps of one preferred embodiment of the invention.

FIG. 2 provides a more detailed view of the initialize headset for remote control 102 and the take control of headset step 103. Before the headset can be calibrated customer service must work with the customer to insure that the headset is correctly hooked up to the telephone base unit 201. In the preferred embodiment of this invention, using the jabra 1000, the procedure for hooking up the headset is designated by icons on the base of the unit that show where each cord should be connected.

Once this is accomplished, customer service asks the customer to activate the headset 202. This is done in the preferred embodiment, using the jabra 1000, by pressing on a button on the base of the headset unit. At this point, the customer puts on the Earphone and waits for approximately 45 seconds. During this, approximately 45 second, time period customer service should be able to take control of the headset 103, set the transmit level 104, enter a preset value using the adjust advanced audio parameters step 106 and to converse with the customer through the preferred jabra 1000.

Taking control of the headset 103 in the preferred jabra 1000 involves passing through a security mode and into the programming modes. The security mode consists to insure that inadvertent or unauthorized programming of the headset does not occur. In the preferred use of the jabra 1000, the security mode is entered by pressing a button or combination of buttons on the control keyboard 301 to effect the entering of the security mode command 203. Once the security mode is accessed a short 'machine gun' sound is produced 204 to inform customer service that the jabra 1000 is now in security mode. An alternative means of entering security mode 203 is through a manual override, permitting the customer-user to activate security mode. Manual override is accomplished by having the customer rapidly press the activation button on the base of the jabra 1000 a predefined number of times. An alternative method of entering manual override is by depressing the activation button a predetermined period of time. When manual override is successfully completed the 'machine gun' sound is produced 203 to inform customer service that the jabra 1000 is now in security mode. At this time, the customer will hear the jabra 1000 vocalize 'jabra.' Once the 'machine gun' sound 203 has been heard customer service enters a programming mode code 205 after which a 'pink' noise, a broadband waterfall like sound, is produced 206 to inform customer service that the jabra 1000 has entered the programming modes.

Figure 3:
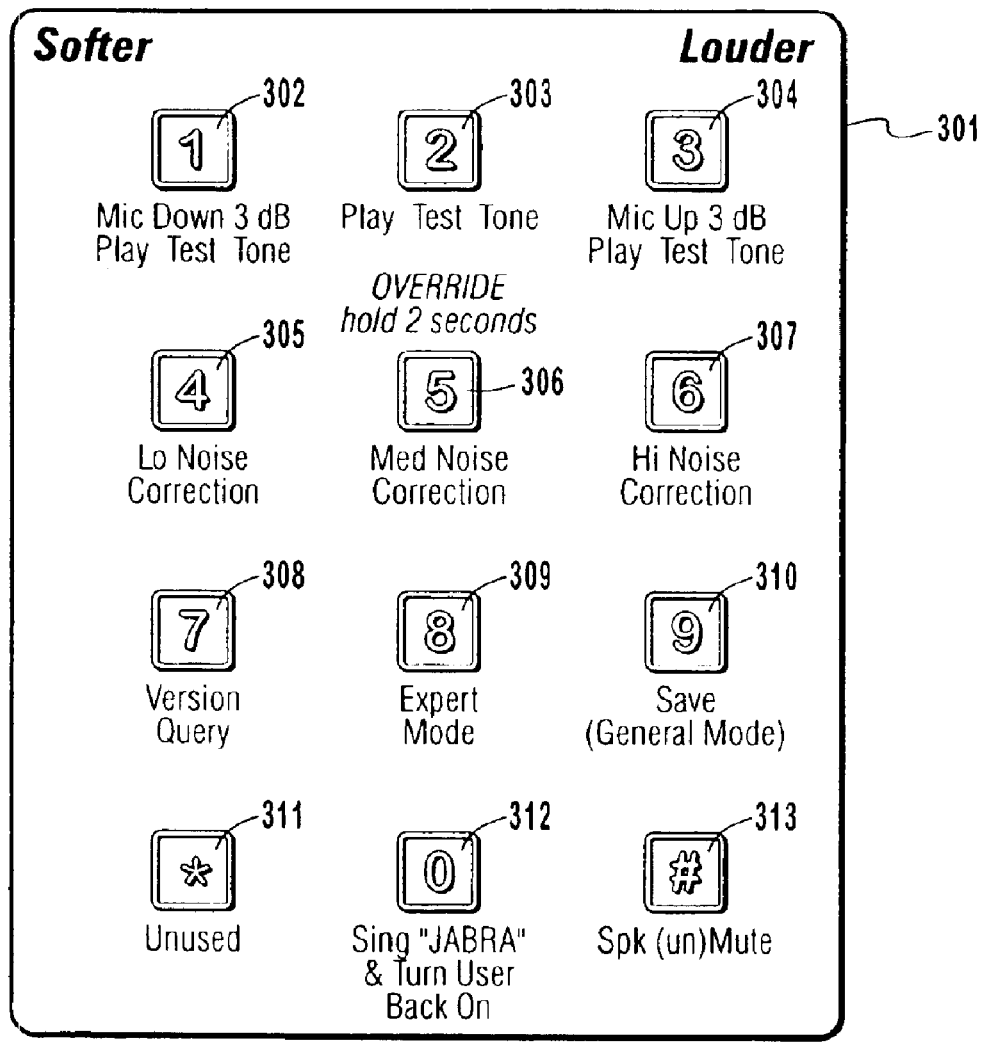
FIG. 3 is a diagram of the control keyboard used in the method of one preferred embodiment of the invention.

The programming modes consist of the general mode and the expert mode. The general mode is where the transmit levels 104 and noise cancellation levels 105 are set. The jabra 1000, when first installed, starts up in the general mode. It will not work until it is programmed. FIG. 3 shows the control keyboard 301 used in the programming modes. The keyboard 301 is configured in a manner similar to that of a touch-tone telephone, with twelve buttons, designated 1 (302), 2 (303), 3 (304), 4 (305), 5 (306), 6 (307), 7 (308), 8 (309), 9 (310), * (311), 0 (312), and # (313). The 1 (302), 2 (303) and 3 (304) keys are used to set the transmit level. Specifically, the 1 (302) key turns the transmit level down 3 dB and causes a burst of a test tone to be played. The 2 (303) key plays a burst of a test tone at the current transmit level. The 3 (304) key turns up the transmit level 3 dB and plays a burst of a test tone. These transmit level adjustments 104 change the volume of the audio produced by the customer-user through the headset to the outside telephone connection. The burst of test tone, in the preferred embodiment sounds similar to a waterfall and will last approximately 1 or 2 seconds. If the transmit level has been adjusted to its limits, either high or low, a 'machine gun' sound is produced to inform customer service that the transmit level cannot be lowered or raised respectively.

Noise cancellation level 105 is also set in the general mode. This is accomplished using the second row of keys on the control keyboard 301. Specifically, 4 (305), 5 (306), and 6 (307). Pressing the 4 (305) key sets the jabra 1000 for the lowest amount of noise cancellation. The jabra 1000 will play back two low frequency beeps to indicate reception of the 4 (305) key. Pressing the 5 (306) key sets the jabra 1000 for a medium amount of noise cancellation. The jabra 1000 will play back two medium frequency beeps to indicate reception of the 5 (306) key. Entering a 6 (307) sets the jabra 1000 to high amount of noise cancellation. The jabra 1000 will play back two high frequency beeps to indicate reception of the 6 (307) key.

Pressing a 0 (312) key from the general mode will return the jabra 1000 to user control. After pressing a 0 (312) the word jabra is vocalized.

Pressing a 7 (308) key queries the jabra 1000 for a version number. The version number is returned as DTMF tones.

Pressing a 8 (309) key will transfer from the general mode to the expert mode.

Pressing a 9 (310) key from the general mode saves the current settings or adjustments.

Pressing the # (313) key toggles a speaker mute. A low beep sound is produced to indicate that the speaker is muted. A high beep sound is produced to indicate that the speaker is not muted.

The * (311) key is not used in the current embodiment of the invention.

Figure 4:
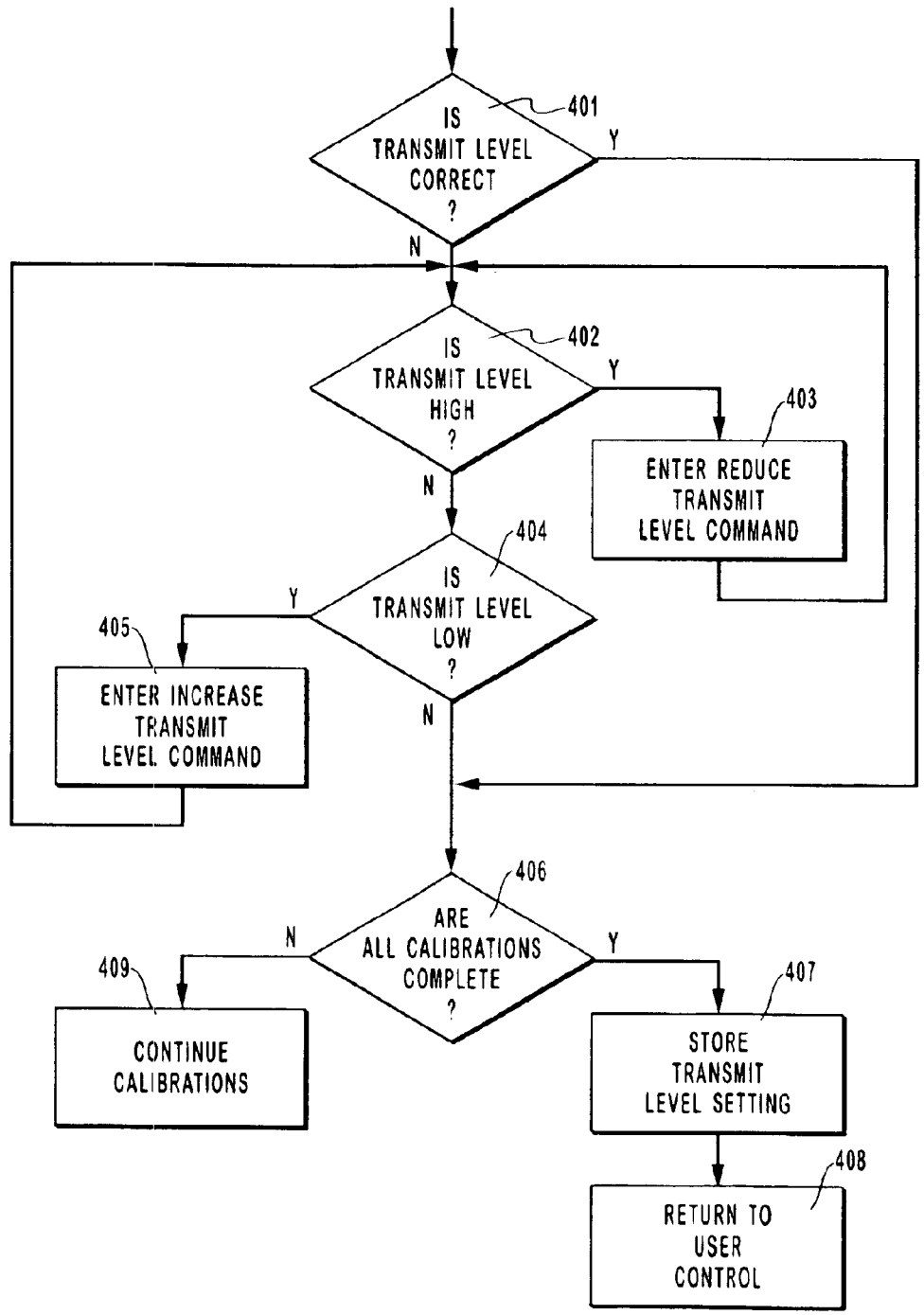
FIG. 4 is a detailed flow diagram of the adjustment of transmit level step of one preferred embodiment of the process steps of the invention.

FIG. 4 provides a detailed flow diagram of the process steps of adjusting the transmit level 104. A test of the transmit level is performed to determine if the level sounds correct 401. For the preferred jabra 1000, the transmit level test is accomplished by pressing the 2 (303) key on the control keyboard 301. If the transmit level sounds correct the transmit level adjustment step is otherwise skipped, that is the process jumps to checking whether all calibrations are complete 406. If the transmit level is not correct, and therefore requires adjustments, a determination of whether the transmit level is high 402, and if not whether the transmit level is low 404 is performed. if the transmit level is too high, then the reduce transmit level command is entered 403. In the preferred embodiment using the jabra 1000 is used, the reduce transmit level command is entered by pressing the 1 (302) key on the control keyboard 301. If the transmit level is too low, then the increase transmit level command is entered 405. The increase transmit level command, for the jabra 1000 is the 3 (304) key. After either increasing 405 or reducing 403 the transmit level, it is again tested to determine whether the transmit level is high 402 or low 404. Once the transmit level is correct, a check as to whether all calibrations are complete 406 is performed. If all calibrations are complete the transmit level settings are stored 407 and control of the headset is returned to the customer-user 408. Storing of the settings 407 is accomplished with the jabra 1000 by pressing the 9 (310) key of the control keyboard 301. Return to user control is accomplished by the pressing of the 0 (312) key of the control keyboard 301.

Figure 5:
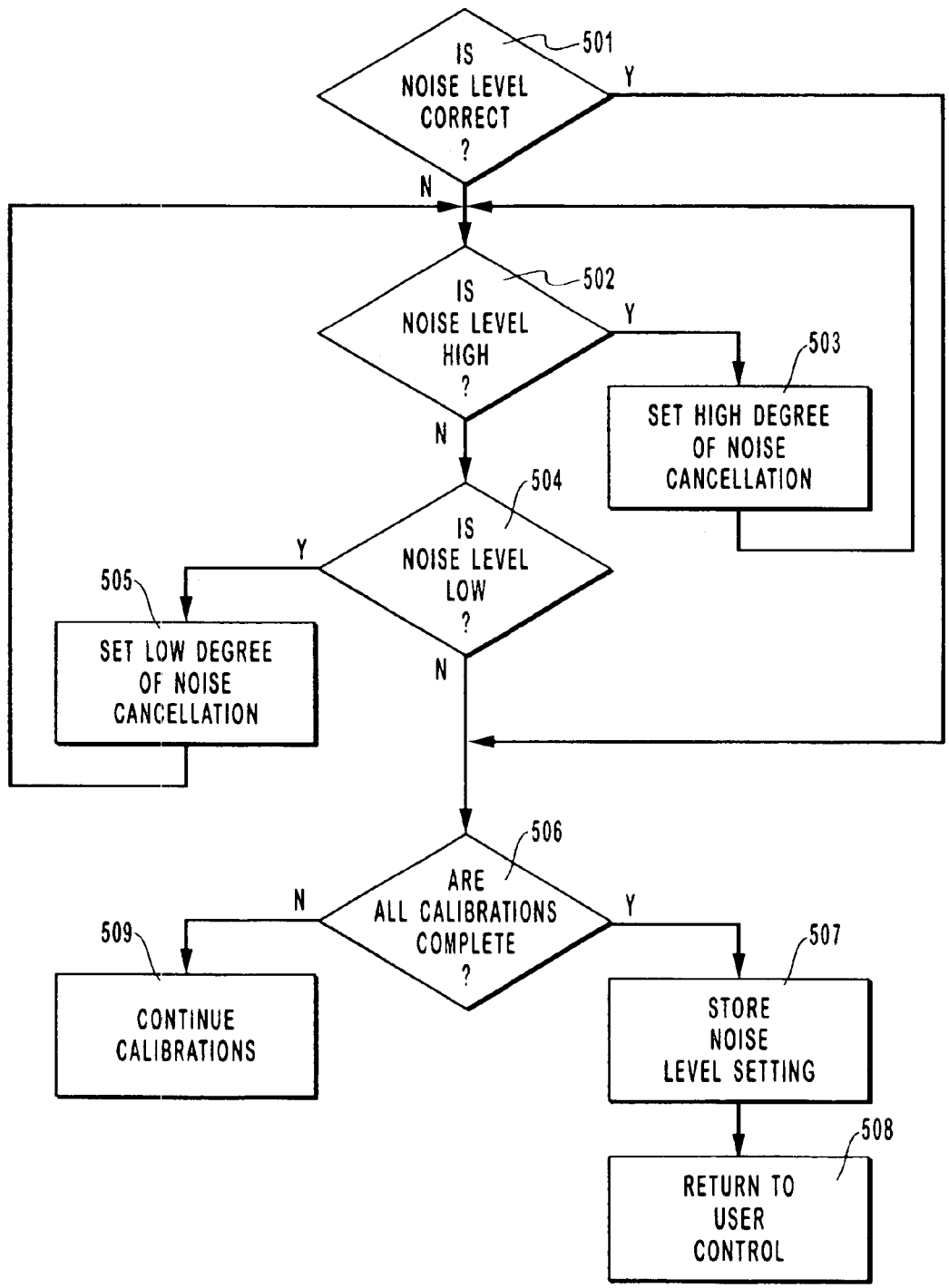
FIG. 5 is a detailed flow diagram of the adjustment of noise level step of one preferred embodiment of the process steps of the invention.

FIG. 5 provides a detailed flow diagram of the process steps of adjusting the noise cancellation level 105. A test of the noise level is performed to determine if the level sounds correct 501. If the noise level sounds correct the noise level adjustment step is otherwise skipped, that is the process jumps to checking whether all calibrations are complete 506. If the noise level is not correct, and therefore requires adjustments, a determination of whether the noise level is high 502, and if not whether the noise level is low 504 is performed. If the noise level is too high, then a high degree of noise cancellation command is entered 503. In the preferred embodiment using the jabra 1000, the reduce noise level command is entered by pressing the 6 (307) key on the control keyboard 301. If the noise level is low, then a low degree of noise cancellation command is entered 505. The high noise cancellation command, for the jabra 1000 is the 6 (307) key. The low noise cancellation command, for the jabra 1000 is the 4 (305) key. After either increasing 505 or reducing 503 the noise cancellation level, it is again tested to determine whether the noise level is now high 502 or low 504. Once the noise level is correct, a check as to whether all calibrations are complete 506 is performed. If all calibrations are complete the noise level settings are stored 507 and control of the headset is returned to the customer-user 508. Storing of the settings 507 is accomplished with the jabra 1000 by pressing the 9 (310) key of the control keyboard 301. Return to user control is accomplished by the pressing of the 0 (312) key of the control keyboard 301.

Figure 6:
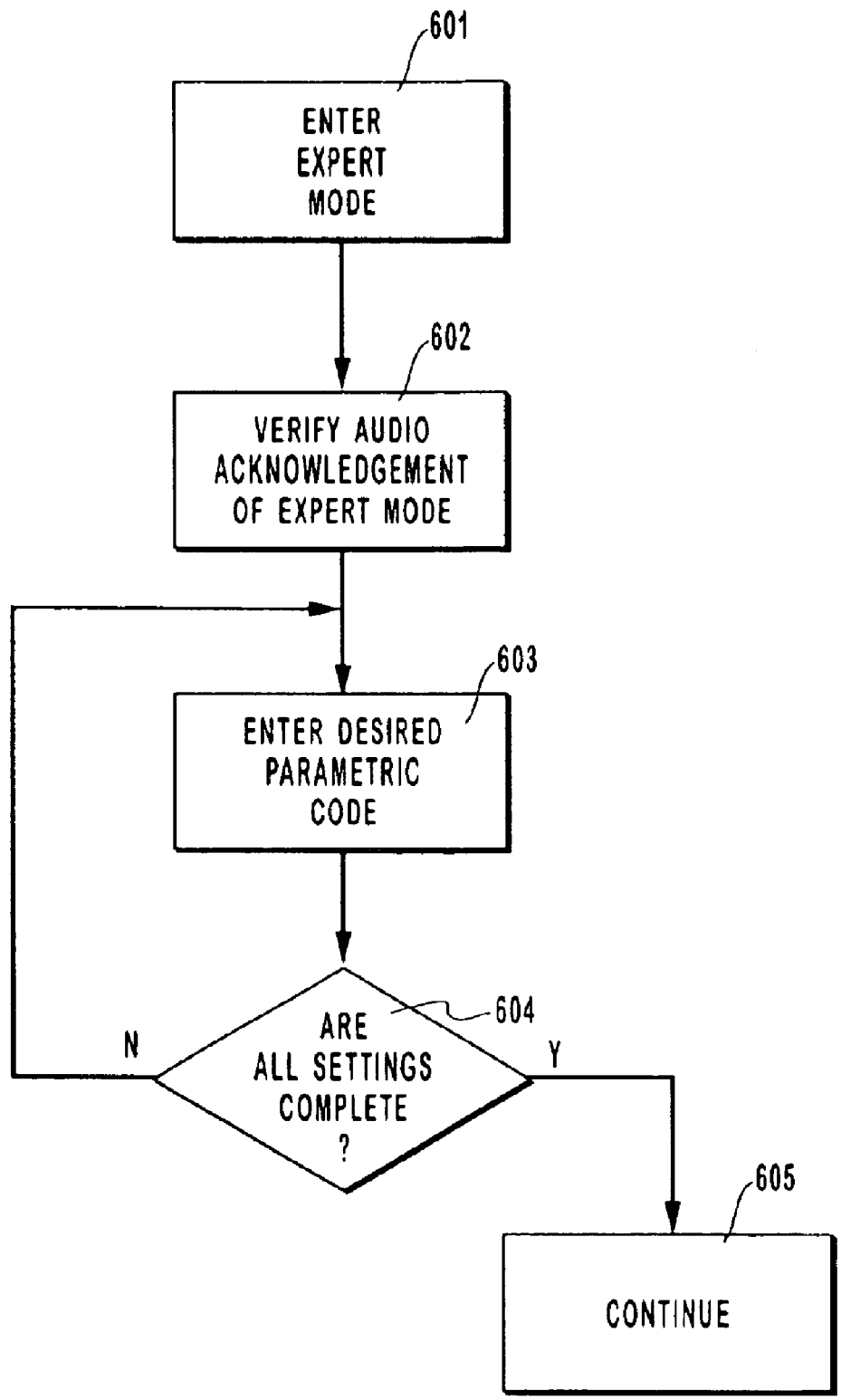
FIG. 6 is a detailed flow diagram of the adjustment of advanced audio parameters of one preferred embodiment of the invention.

FIG. 6 provides a more detailed flow diagram of the adjustment of advanced parameters 106 step of the invention. The calibration process in this invention includes the capability to adjust a wide variety of specific advanced audio processing parameters in the headset. The defined list of these parameters will naturally depend on the headset being calibrated and on the programmability of the headset. The preferred embodiment of the invention in its current best mode of operation works with the jabra 1000. Therefore, the advanced audio processing parameters the invention is capable of calibrating in the jabra 1000 include: sample rate, noise cancellation, speaker gain adjustments, echo adjustments, filter adjustments and filter functions, attenuation adjustments, as well as diagnostics and write to memory functions.

Before any parametric calibrations may be done the headphone must be placed in expert mode 601. Expert mode is accessed by pressing the 8 (309) key on the control keyboard 301. An audio acknowledgment of entering expert mode is produced 602. In the jabra 1000, this audio acknowledgment is a burst of audio tones. Once in the expert mode preprogrammed microcoded routines may be initiated, functions may be activated, and variable thresholds may be set. Each by entering the desired parametric code 603 as a numeric sequence. In the current best mode of the invention, these numeric sequences consist of three or four numbers. When entering the numeric sequences, in the expert mode, a low frequency tone is given after each number. A slightly higher tone is generated after the last number in the sequence is accepted. At that point, a decision is made to determine if all desired parametric calibrations have been completed 604. If additional calibrations are necessary, they may be entered. If all calibrations are completed the process continues 605 to the storage step 107.

The storage of the settings 107 is accomplished in preferred embodiment of the invention by entering a 999 or 998 code sequence from the expert mode. Audio tones are generated informing customer service that the settings have been stored into memory.

Hitting the 0 (312) key three times producing a 000 code exits the expert mode, plays a 'pink' noise, and returns the headset to general mode, entering a final 0 (312) key returns the headset to user control 108. At this point the user may use the calibrated headset in normal telephone communications.

Figure 7:
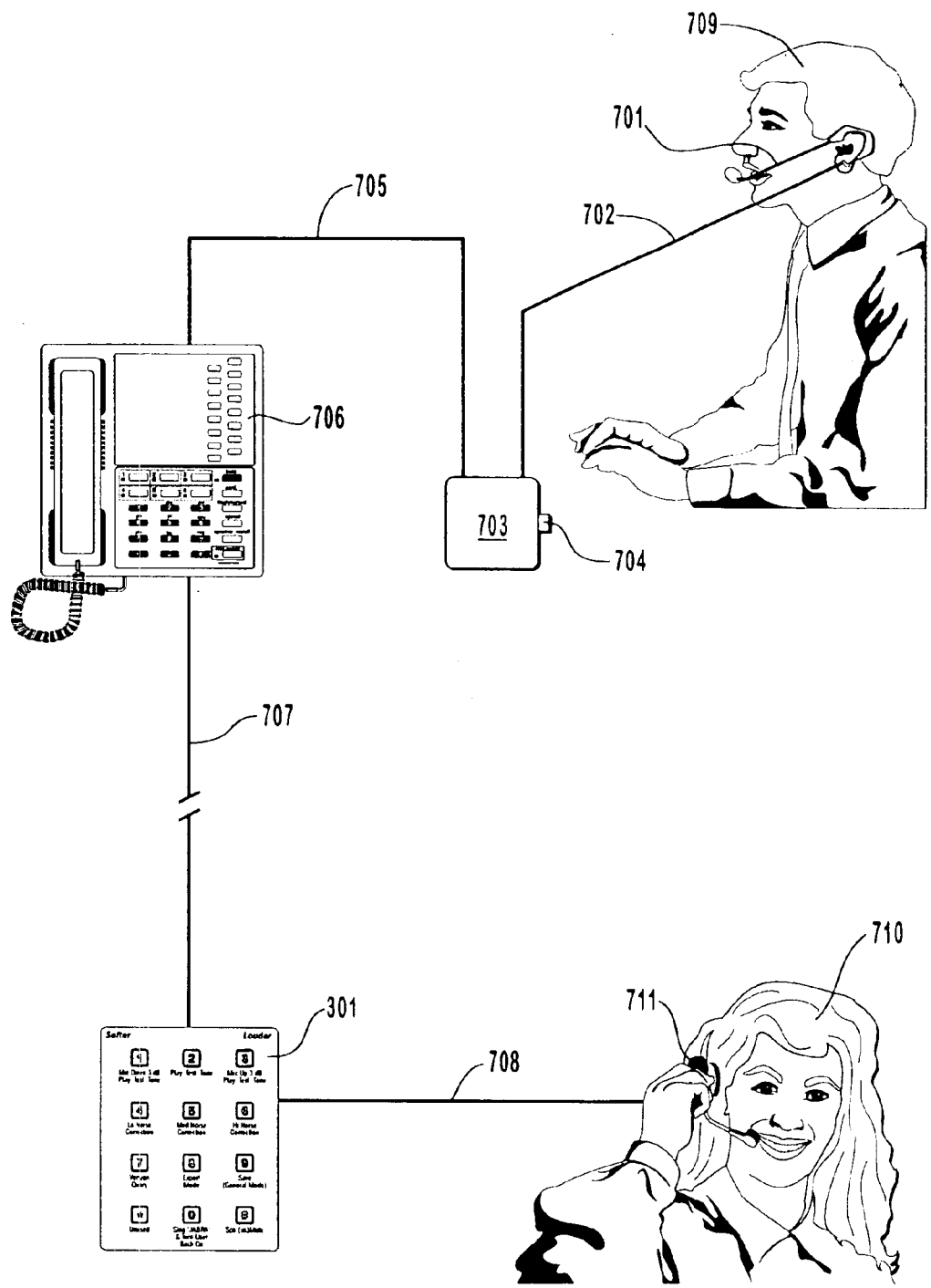
FIG. 7 is a depiction of the remote telephone calibration system showing the components used in a preferred embodiment of the method of the invention.

FIG. 7 shows a drawing of the system in which the invention operates. A customer-user 709 is wearing a headphone 701. The headphone 701 is electrically connected with insulated conductors 702 to a base unit 703. The base unit 703 has an activation button 704 which the customer-user presses to initialize the headset 102. The base unit 703 is electrically connected by standard telephone conductors 705 to a standard telephone unit 706. Once the customer calibration request 101 telephone call is made to customer service, this standard telephone unit 706 is connected through the telephone communication system 707 to a control keyboard 301. The control keyboard 301 is electrically connected, through standard telephone conductors 708, to a telephone receiver or telephone headset 711 to a customer service representative 710. This customer service representative 710 employs the capabilities of the control keyboard 301 and the circuitry and programs inherent in the headphone base unit 703 to perform the steps of this calibration invention. Note please that in alternative embodiments of the invention the customer service representative 710 may be replaced by full automated test equipment and the headphone base unit 703 may become directly incorporated in the headphone 701 itself or in the standard telephone unit 706. Also, alternative embodiments of the control keyboard 301 device may be achieved by programmable automatic test equipment.

In the preferred embodiment, the method of the invention is performed on a jabra 1000 that has a base unit with the necessary calibration and programmability capabilities to make full use of the steps of the invention. However, it is possible to implement the invention on various other headphone hardware configurations, though naturally the specific functions and commands transmitted during the steps of the invention would differ. The current best mode of the invention relies on the operation of software programmed into the jabra 1000 base unit. The Software Appendix which is included as a part of the disclosure of this patent application shows in detail how the functional steps described above are performed once the commands are received by the jabra 1000.

The following software source code is provide as this software is the embodiment of the current best mode of much of the mehtod of this invention. For this invention to perform in the current best mode, the following software source code listing is compiled and stored in the jabra 1000 base unit.

```
/********************************************
*************************/ /* Module: rwr2.c*//
**//* routines to write to Atmel Flash*//**//* Rev 1.010 Feb
1995DTR*//**//
**********************************************
**********************/
#include<math.h>#include 'globals.h'#include 'dtmf.h
'#definePageSize128Pragma_Sect_textError
RewriteParams(BolleandtmfAtStartup)(shortpageArray
[PageSize];short*p;Errorerr;err=noErr;p=&pageArray[0];/*
NumberOfBurns*/if (0×FF ==FetchWordinRom((short
*)&PromParams)) {*p++=1;/* we do this in case the rom
gets written to all FF's */}else {*p++=1+FetchWordInRom
((short *)&PromParams);/* add one */}/* DtmfAtStartup*/
*p++=(short)dtmfAtStartup;/* J1kMode*/*p++=(short)
commonOperatingMode;/* DcaPolarity*/*p++=(short)
((DcadB2dB(commonDcaLevel)>=0) ? 1 : 0);/*DcaLevel*/
*p++=(short)((DcadB2dB(commonDcaLevel)>=0) ?
DcadB2dB(commonDcaLevel):−DcadB2dB
(commonDcaLevel));/* MicAttn*/*p++=(short)common
MicAttn* 3;/* convert to dB before storing*//* SpkAttn*/
*p++=(short)commonSpkAttn* 3;/* convert to dB before
storing*//* romDtmfGainPre*/*p++=(short)
commonDtmfGainPre;/* romSpkGainPre*/*p++=(short)
commonSpkGainPre;/* romSpkGainPost*/*p++=(short)
commonSpkGainPost;/* overrideEnable*/*p++=(short)
commonOverrideEnable;/* overrideThreshold*/*p++=
(short)HexdB2absdB((HexdB)commonOverrideThreshold)
;/* MicMeterRiseTime*/*p+++=(short)HexdB2absdB
((HexdB)mic.mtr.riseTime);/* MicMeterFallTime*/*p++=
(short)HexdB2absdB((HexdB)mic.mtr.fallTime);/* other
required codes saved here */while (p<&pageArray
[PageSize]) {*p++=0;/* fill out remainder of page */}if
(err=WritePageToAtmel(&pageArray[0], (short
*)&PromParams)) {err=atmelTimeOut;/* timeout error
detected */}if (False==CompareRomToRam( &pageArray
[0],(short*)&PromParams, PageSize)) {err=
atmelBadCompare;/* copy didn't match */}return err;}/
*************************************
*************************//* Module: rewrite.c*//
**//* routines to write to Atmel Flash*//**//* Rev 1.010 Feb
1995DTR*//*Initialrevision.*//**//
**********************************************
*********        ***************/#include
'globals.h'#include 'dtmf.h'#definePageSize 128Pragma_
Sect_textshortDetermineATT(short SCL){switch(SCL)
{case 0×0001:return(0);/* −0 dB */case 0×0002:return(1);/*
−6 dB */case 0×0004:return(2);/* −12 dB */case
0×0008:return(3);/* −18 dB */case 0×0010:return(4);/* −24
dB */case 0×0020;return(5);/* −30 dB */case 0×0040;return
(6);/* −36 dB */case 0×0080;return(7);/* −42 dB
*/default:return(0);/* 0 dB */}}Boolean
CompareRomToRam( short *rawWhere, short * romWhere,
short size){shorti;while (size−−) {if ((0×00FF &
*ramWhere)==(0×00FF & FetchWordInRom(romWhere)))
{ramWhere++;romWhere++;}else {return(False);}}return
(True);}Pragma_Sect_textError WriteDefaultsToProm
(void){shortpageArray[PageSize];shorti;Errorerr;err=
noErr;/* copy defaults into RAM */for (i=0;i<PageSize;i++)
{pageArray[i]=FetchWordInRom((short *)&PromParams+
i);/* fill in page */}if (err=WritePageToAtmel(&pageArray
[0], (short *)&Defaults)) {err=atmelTimeOut;/* timeout
error detected */}if (False==CompareRomToRam(
&pageArray[0], (short *)&Defaults, PageSize)) {err=
atmelBadCompare;/* copy didn't match */}return err;}Error
RestoreDefaultsFromProm(void){shortpageArray
[PageSize];shorti;Errorerr;err=noErr;i=FetchWordInRom
((short *)&Defaults+2);if (i>2||i<=0)return;/* copy defaults
into RAM */for <i=0;i<PageSize;i++) {pageArray[i]=
FetchWordInRom((short *)&Defaults+i);/* fill in page */}/*
don't reset the number of times the prom has been burned
*/pageArray[0]=1+FetchWordInRom((short
*)&NumberOfBurns);/* store defaults to PROM */if (err=
WritePageToAtmel(&pageArray[0], (short
*)&PromParams)) {err=atmelTimeOut;/* timeout error
detected */}/* verify write to PROM */if (False==
CompareRomToRam( &pageArray[0], (short
*)&PromParams, PageSize)) {err=atmelBadCompare;/*
copy didn't match *;}return err;}ErrorPokeRomByte(ushort
* pokeAddress,ushort pokeValue){ushortpageArray
[PageSize];ushorti.ushort
*pageStart;ushortpageIndex;Errorerr;err=noErr;pageStart=
(ushort *)(0×FF80 & (ushort)pokeAddress);/* mask out low
seven bits, point to start of writable page */pageIndex=
(ushort)pokeAddress−(ushort)pageStart;/* calculate the
desired index into the page *//* copy defaults into RAM
*/for (i=0;i<PageSize;i++) {pageArray[i]=
FetchWordInRom((short *)pageStart+i);/* copy in what was
already there */}/* factor in our one new byte */pageArray
[pageIndex]=pokeValue;/* store defaults to PROM */if (err=
WritePageToAtmel((short *)&pageArray[0], (short
*)pageStart)) {err=atmelTimeOut;/* timeout error detected
*/}/* verify write to PROM */if (False==
```

CompareRomToRam((short *)&pageArray[0], (short *)&PromParams, PageSize)) {err=atme1BadCompare;/* copy didn't match */}return err;}/
*******************************
**************************//* Module:remote4.c*//* Examples of*//* Remote control for 4-key sequences*//**//
******************************************
**********************/ #ifdef Copyrightsstatic char copyrightNotice='Copyright (c)1994, 1995, JABRA Corporation '#endif /* Copyrights */#include 'Globals.h'#include 'Dtmf.h 'Pragma__Sect__textvoid Process4CharCodes(void){switch (dtmfHistory [thirdMostRecent]) {case Three:switch (dtmfHistory [secondMostRecent]){/* 34xx: INITSTR */case Four:commonINITSTR=Last2Digits( );XmitHiBeep( );break;/* 36xx: commonDTMICON */case Six:commonDTMICON=Last2DigitsToHexdB( );XmitHiBeep( ); break;default:XmitErrorTone( );break;}InitDtmfHistory( );break;default:XmitErrorTone( );InitDtmfHistory( );break;}}/
*********************************
***************************************** *// Module:rmt3.c*//* Examples of*//* Remote control for 3-key sequences*//**//
******************************************
************************/ #ifdef Copyrightsstatic char copyrightNotice='Copyright (c)1994, JABRA Corporation '#endif /* Copyrights */#include 'Globals.h '#include 'Dtmf.h 'void Process3CharCodes(void){switch (dtmfHistory[secondMostRecent]) {case Zero:switch (dtmfHistory[mostRecent]) {case Zero:switch(dtmfHistory [current]) {/* 000:return control to user* /case Zero:remoteControlMode=Tuning/*return back to tuning mode */XmitTestTone( );break;/* 001: set sample rate to 8k */case One:if (PIUMULTI==commonActelType) {dynSampleRate=kHz8;XmitHiBeep( );]else {XmitErrorTone( );}break;/* 002: set sample rate to 10k */case Two:if (PIUMULTI==commonActelType) {dynSampleRate=kHz10;XmitBeep( );}else {XmitErrorTone( );}break/;* 003; set sample rate to 11k */case Three:if (PIUMULTI==commonActelType) {dynSampleRate=kHz11;XmitBeep( );}else {XmitErrorTone( );}break/;* 004; set sample rate to 13k */case Four:if (PIUMULTI==commonActelType) {dynSampleRate=kHz13;XmitBeep( );}else {XmitErrorTone( );}break/;default:XmitErrorTone( );break;}InitDtmfHistory( );break;}default:b reak;}break;case One:switch(dtmfHistory[mostRecent]) {case Zero:switch(dtmfHistory[current]) {case Zero:break;default:break;}default:break;}break;default:Xm itErrorTone( );InitDtmfHistory( ); break;}}/
******************************************
************************//* Module:remote.c*//**//* Remote control DTMF decoding*//**//* Rev 1.021 Jan 1994DTR*//*Initial revision.*//*Added ProcessMeterLEDs to Wait loop 4-24-95 Med*//**//
******************************************
*********************/#ifdef Copyrightsstatic char copyrightNotice='Copyright (c)1994, JABRA Corporation '#endif /* Copyrights */#include 'Globals.h '#include 'Dtmf.h '#define HoldDuration1500/*
number of milliseconds for a long-duration hold rather than a 50 millisecond tap */Pragma__Sect__textvoid Wait(Time milliseconds)/* up to about 8 secs @ 8k, 4 secs @16k */{#if !Sim/* not much need for delays like this in the simulator */Timecountdown;countdown=Msecs2Samples (milliseconds,commonSampleRate);if (Zero==countdown) return;DelayLoop:/* this is like a mini event-loop */if (——countdown) {ProcessMeterLeds( );ToggleWatchdog( );Idle( );goto DelayLoop;}#endif /* Sim */}#if UseForDebuggingPragma__Sect__text2void RomToggleWatchdog(void){/* version of ToggleWatchdog compiled into ROM */* for use before Ram code is initialized */actelShadow=(leds & ledOnMask) | ((ledOffMask & actelShadow ) ∧ 0×0001);SetActel(actelShadow);}void Delay(long milliseconds){/* since Wait( ) only works if the interrupts are turned on, *//* Delay works if the interrupts are turned off */long i;RomToggleWatchdog( );#if !Simfor (i=0;i<milliseconds;i++) {asm ('rptz#20000 '); asm ( 'nop') ;}#endif /* !Sim */}void LedCountdown(void){leds= xxxx;Delay(200);leds=xxxo;Delay(200);leds=xxoo;Delay (200);leds=xooo;Delay(200);leds=oooo;Delay(200);}void LedCountup(void){leds=xxxx;Delay(200);leds= oxxx;Delay(200);leds=ooxx;Delay(200);leds=ooox;Delay (200);leds=oooo;Delay(200);]void LedFlash(void){leds= xxxx;Delay(200);leds=oxxo;Delay(200);leds=xoox;Delay (200);leds=oxxo;Delay(200);leds=oooo;Delay(200);void LedFlashl(void){leds=oooo;Delay(200);leds=ooox;Delay (200);leds=oooo;Delay(200);leds=ooox;Delay(200);leds= oooo;Delay(200);}void LedFlash2(void){leds=oooo;Delay (200);leds=ooxx;Delay(200);leds=xxoo;Delay(200);leds= ooxx;Delay(200);leds=oooo;Delay(200);}#endif /* UseForDebugging */void XmitSetOfFour(void) {XmitHiBeep( );Wait(125);XmitBeepTone( );Wait(125) ;XmitBeepTone( );W ait(125);XmitBeepTone( ):Wait(125) ;}Pragma__Sect__textvoid XmitVersionNumber(void) {ushort versionNum;versionNum=FetchWordInRom((short *)&VersionNumber);Wait(100);XmitDtmfTone ((versionNum & 0×F000)>>12);Wait(150);XmitDtmfTone ((versionNum & 0×0F00)>>8);Wait(150);XmitDtmfTone ((versionNum & 0×00F0)>>4);Wait(150);XmitDtmfTone ((versionNum & 0×000F);Wait(150);}void XmitWordValue (ushort theWord)(ushort digit;if (theWord>=10000) {digit= theWord/10000;theWord-=digit*10000;XmitDtmfTone (digit);}else {XmitDtmfTone(Zero);}Wait(150);if (theWord>=1000) {digit=theWord/1000;theWord -=digit * 1000;XmitDtmfTone(digit);}else {XmitDtmfTone(Zero) ;}Wait(150);if (theWord>=100) {digit=theWord/ 100;theWord-=digit * 100;XmitDtmfTone(digit);}else {XmitDtmfTone(Zero);}Wait(150);if (theWord>=10) {digit=theWord/10;theWord-=digit * 10;XmitDtmfTone (digit);}else XmitDtmfTone(Zero);}Wait(150) ;XmitDtmfTone(theWord);}void XmitDtmfWave(void) {Wait(50);PlayMicSnd(&Dtmf1Start,&DtmfPoundEnd,0, FetchWordInRo m((short *)&pinkToneLevel));}void PlayDtmfWave(void){Wait(50);PlaySpkSnd(&DtmflStart, &DtmfPoundEnd,0,FetchWordInRo m((short *)&pinkToneLevel));}Pragma__Sect__textvoid XmitPinkTone(void){PlayMicSnd(&PinkToneStart, &PinkToneEnd,5,FetchWordInRom((short *)&pinkToneLevel));}void XmitTestTone(void) {PlayMicSnd(testToneStart,testToneEnd,testToneLoops, testToneLevel) ;}void XmitLoBeep(void){PlayMicSnd (&Sine500Start,&Sine500End,13,FetchWordInRom((short *)&sineToneLevel));}void XmitBeepTone(void) {PlayMicSnd(&Sine1kStart,&Sine1kEnd,26, FetchWordInRom((short *)&sineToneLevel));}void XmitHiBeep(void){PlayMicSnd(&Sine2kStart, &Sine2kEnd,52,FetchWordInRom((short *)&sineToneLevel));}void PlayWaitingTone(void){Wait (60);PlaySpkSnd(&Sine1kStart,&Sine1kEnd,26, minus40dB);Wait(600);PlaySpkSnd(&Sine2kStart, &Sine2kEnd,52,minus40dB);Wait(600);PlaySpkSnd (&Sine1kStart,&Sine1kEnd,26,minus40dB);Wait(600) ;PlaySpkSnd(&Sine500Start,&Sine500End,13,minus36dB) ;Wait(600);PlaySpkSnd(&Sine1kStart,&Sine1kEnd,26, minus40dB);Wait(600);PlaySpkSnd(&Sine2kStart, &Sine2kEnd,52,minus40dB);Wait(580);PlaySpkSnd(&Sine500Start,&Sine500End,13,minus36dB);}void XmitExpertTone(void){Wait(60);PlayMicSnd(&Sine1kStart,&Sine1kEnd,26,FetchWordInRom((short *)&sineToneLevel));Wait(200);PlayMicSnd(&Sine2kStart, &Sine2kEnd,52,FetchWordInRom(( short *)&sineToneLevel));Wait(100);PlayMicSnd(&Sine2kStart, &Sine2kEnd,52,FetchWordInRom(( short *)&sineToneLevel));Wait(100);PlayMicSnd(&Sine1kStart, &Sine1kEnd,26,FetchWordInRom(( short *)&sineToneLevel));}void PlayExpertTone(void){Wait(60);PlaySpkSnd(&Sine1kStart,&Sine1kEnd,26,FetchWordInRom( (short *)&sineToneLevel));Wait(200);PlaySpkSnd(&Sine2kStart,&Sine2kEnd,52,FetchWordInRom(( short *)&sineToneLevel));Wait(100);PlaySpkSnd(&Sine2kStart,&Sine2kEnd,52,FetchWordInRom(( short *)&sineToneLevel));Wait(100);PlaySpkSnd(&Sine1kStart,&Sine1kEnd,26,FetchWordInRom(( short *)&sineToneLevel));}void XmitDtmfTone(DtmfState tone){if (Listenable==response Type) {XmitListenableNumber(tone);}else {switch(tone) {case Zero:PlayMicSnd(&Dtmf0Start,&Dtmf0End,0,FetchWordInRom((short *)&pinkToneLevel));break;case One:PlayMicSnd(&Dtmf1Start,&Dtmf1End,0,FetchWordInRom((short *)&pinkToneLevel));break;case Two:PlayMicSnd(&Dtmf2Start,&Dtmf2End,0,FetchWordInRom((short *)&pinkToneLevel));break;case Three:PlayMicSnd(&Dtmf3Start,&Dtmf3End,0,FetchWordInRom((short *)&pinkToneLevel));break;case Four:PlayMicSnd(&Dtmf4Start,&Dtmf4End,0,FetchWordInRom((short *)&pinkToneLevel));break;case Five:PlayMicSnd(&DtmfSStart,&Dtmf5End,0,FetchWordInRom((short *)&pinkToneLevel));break;case Six:PlayMicSnd(&Dtmf6Start,&Dtmf6End,0,FetchWordInRom((short *)&pinkToneLevel));break;case Seven:PlayMicSnd(&Dtmf7Start,&Dtmf7End,0,FetchWordInRom((short *)&pinkToneLevel));break;case Eight:PlayMicSnd(&Dtmf8Start,&Dtmf8End,0,FetchWordInRom((short *)&pinkToneLevel));break;case Nine:PlayMicSnd(&Dtmf9Start,&Dtmf9End,0,FetchWordInRom((short *)&pinkToneLevel));break;case Star:PlayMicSnd(&DtmfStarStart,&DtmfStarEnd,0,FetchWordInRom((short *)&pinkToneLevel));break;case Pound:PlayMicSnd(&DtmfPoundStart,&DtmfPoundEnd,0,FetchWordInRom((short *)&pinkToneLevel));break;default:XmitErrorTone( );break;}}}void XmitListenableNumber(DtmfState code){switch(code) {case 0:XmitBeepTone( );Wait(80);XmitBeepTone( );Wait(80);break;case 1:XmitHiBeep( );Wait(125);break;case 2:XmitHiBeep( );Wait(125);XmitBeepTone( );Wait(125) ;break;case 3:XmitHiBeep( );Wait(125);XmitBeepTone( );Wait(125);XmitBeepTone( );Wait(125);break;cas e 4:XmitSetOfFour( );break;case 5:XmitSetOfFour( );XmitHiBeep( );Wait(125);break;case 6:XmitSetOfFour( );XmitHiBeep( );Wait(125);XmitBeepTone( );Wait(125) ;break;case 7:XmitSetOfFour( );XmitHiBeep( );Wait(125);XmitBeepTone( );Wait(125);XmitBeepTone( );Wai t(125);break;case 8:XmitSetOfFour( );XmitSetOfFour( );break;case 9:XmitSetOfFour( );XmitSetOfFour( );XmitHiBeep( );Wait(125);break;}Wait(600);/* let human digest the number */}void XmitDcaLevel(DcadB level) {DtmfState firstDigit;DtmfState secondDigit;if (level>dcaUnityGain) {firstDigit=Nine; secondDigit= DcadB2db(level);/* +1 thru +6 are sent as 91 thru 96 */}else{/* 0 thru minus66 end up here */firstDigit=abs(DcadB2dB(level))/10;secondDigit=abs(DcadB2dB(level))%10;}Wait(100);XmitDtmfTone(firstDigit);Wait(500) ;XmitDtmfTone(s econdDigit);Wait(100);}void XmitSpkAttLevel(CombodB level){/* the speaker attenuation has 8 units of attenuation; steps 0 thru 7 *//* we transmit this number directly in a single digit. */Wait(200) ;XmitDtmfTone(level);}void XmitNC2Status(void){/* *//* we transmit this number directly in a single digit. */Wait (200);XmitDtmfTone( commonOperatingMode== eModeNC1 ?Four: (NC2HiLo ? Six:Five ));}void XmitJ1kStatus(void){XmitVersionNumber( );XmitDcaLevel(commonDcaLevel);XmitNC2Statu s( );}void XmitNC2HiTone(void){PlayMicSnd(&Sine2kStart, &Sine2kEnd,52,FetchWordInRom((short *)&sineToneLevel));Wait(120);PlayMicSnd(&Sine2kStart, &Sine2kEnd,52, FetchWordInRom(( short *)&sineToneLevel));}void XmitNC2LoTone(void) {PlayMicSnd(&Sine1kStart,&Sine1kEnd,26, FetchWordInRom((short *)&sineToneLevel));Wait(120) ;PlayMicSnd(&Sine1kStart,&Sine1kEnd,26, FetchWordInRom((short *)&sineToneLevel));}void XmitNC1Tone(void){PlayMicSnd(&Sine500Start, &Sine500End,13, -6+FetchWordInRom((short *)&sineToneLevel));Wait(120);PlayMicSnd (&Sine500Start,&Sine500End,13, -6+FetchWordInRom ((short *)&sineToneLevel));}void XmitErrorTone(void) {PlayMicSnd(&PinkTone3Qtr,&SilenceEnd,3, minus10dB) ;}void PlayErrorTone(void){PlaySpkSnd(&PinkTone3Qtr, &SilenceEnd,3, minus10dB);}void XmitOverrideTone (void){PlayMicSnd(&PinkTone3Qtr,&SilenceEnd,5, unityGain);#if LabPlaySpkSnd(&PinkTone3Qtr, &SilenceEnd,5, unityGain);#endif /* Lab */if (eModeNC2!=commonOperatingMode) {/* interrupts are turned off if we're coming from NC2 */Wait(338);/* override tone is 337 msecs long */}}void AdjustDca(dB gainChange){commonDcaLevel=dB2DcadB(gainChange+ DcadB2dB(commonDcaLevel));}void EnableRemoteControl(void){remoteControl= True;SetSampleRate(kHz8);micMode=Mute;spkMode= Thru;remoteControlMode= Tuning;commonShortOverrideTimeOut=0;InitSpkInFifo (SpkInDelay,SpkInPreQ);/* reset the dtmf fifo */InitDtmfHistory( );}void ActivateRemoteControl(void) {EnableRemoteControl( );spkMode= Mute;XmitOverrideTone( );/* this routine blocks until sound is finished */remoteControlMode= NeedCode;overrideCountdown= commonOverrideCodeTime;/* how long do we have to enter code */}void DisableRemoteControl(Boolean playSound){remoteControl=False;remoteControlMode= Tuning;/* commonShortOverrideTimeOut is decremented in 5 msec intervals, or 200 Hz *//* when it gets to zero, then the long override duration is required */commonShortOverrideTimeOut=200*FetchWordInRom ((short *)&shortOverrideTimeOut);if (playSound) {PlayMicSnd(&JabraSndStart,&JabraSndEnd,0,minus9dB) ;PlaySpkSnd(&JabraSndStart,&JabraSndEnd,0, minus15dB);singOnKey=True;}/* use sample rate set in prm.a or set by DTMF *//* this only makes a difference when using multi-rate actels */SetSampleRate (dynSampleRate);micMode=(eModeInOut ==commonOperatingMode) ? Thru: dynMicMode;if (PIUMULT)==commonActelType && kHz8<commonSampleRate) {spkMode=Thru;}else {/* */spkMode=(eModeNC1==commonOperatingMode) ? dynSpkMode: Thru;}mic.mtr.maxLevel= 99;spk.mtr.maxLevel=99;}void DisableOverrideEverAfter (void){commonOverrideEnable =False;}void ReenableOverrideAfterAll(void){commonOverrideEnable=

True;}HexdB Last2DigitsToHexdB(void){return (dB2HexdB(-(dtmfHistory[mostRecent]*10+dtmfHistory[current])));}ushort Last2Digits(void){return (dtmfHistory[mostRecent]*10+dtmfHistory[current]);}ushort * CalculateAddress(void){/* convert 5-digit decimal number into hex address */ushort result;result=10000 *dtmfHistory[fourthMostRecent];result+=1000*dtmfHistory[thirdMostRecent]:result +=100 * dtmfHistory[secondMostRecent];result+=10 *dtmfHistory[mostRecent];result+=dtmfHistory[current];return((ushort *)result);}void OutputAddressContents(ushort * address){extern ushort saram_start;extern ushort saram_end;register ushort a;/* audibly output value of word at RAM address */ /* first make sure we're reading from valid data RAM */a=(ushort)address;if ((a>= (short)&saram_start & & a<=(short)&saram_end)|| (a>=0x60 && a<=0x7F)|| (a>=0x100 && a<=0x4FF){/* in valid data ram range */XmitWordValue(*address);}else {XmitErrorTone( );}}void RemoteControl(register DtmfState state, ushort prevDuration) {ushorti;ushortdtmfOverrideCode;ushortpokeValue;dtmfOverrideCode=FetchWordInRom((short *)&overrideCode) ;/* duration is in # of chunks */ /* convert into milliseconds */if (prevDuration<=65535/5) {prevDuration *=5;}else {prevDuration=65535/5;/* make sure we don't overflow a ushort */)#if DtmfLeds/* these are always displayed, regardless of commonLedMode */switch (state) {case One:leds= ooox;break;case Two:leds=ooxo;break;case Three:leds= ooxx;break;case Four:leds=oxoo;break;case Five:leds= oxox;break;case Six:leds=oxxo;break;case Seven:leds= oxxx;break;case Eight:leds=xooo;break;case Nine:leds= xoox;break;case Zero:leds=xoxo;break;case Star:leds= xoxx;break;case Pound:leds=xxoo;break;case Ring:leds= xxox;break;case Busy:leds=xxxo;break;case DialTone:leds=xxxx;break;case Silence:leds= oooo;break;default:leds=oooo;break;}#endif /* DtmfLeds */ /* newest element is [0], oldest element is [HistorySize-1] */ /* age everything by one DTMF state by shifting down the line, bucket brigade style */if (Silence !=state) {/* only store non-silence characters to DTMF history */for (i=HistorySize-1;i>0;i--) {dtmfHistory[i]=dtmfHistory[i-1];}dtmfHistory[current]=state;}/* the pound and star keys interact adversely with PBX and call control */ /* systems, especially when they're held down for a while */ /* We now use the 8 key to switch modes instead of the pound key */ /* and the pound key itself is used to toggle the speaker mute in tuning mode */ /* and is used as a clear line key in expert mode */ /* Tuning keys are activated just after transitioning to silence */if (Tuning==remoteControlMode && Silence== state) {ProcessTuning(state, prevDuration);}else/* get the value stored in data space (typically RAM) at the specified address */if (DataAddress==remoteControlMode && Silence==state) {if (Unknown !=dtmfHistory[fourthMostRecent] && Unknown==dtmfHistory[fifthMostRecent]) {/* response for the 5th digit of the address */Wait(20);XmitDtmfTone(dtmfHistory[current]);Wait(500);OutputAddressContents(Calcul ateAddress( );remoteControlMode=Expert;InitDtmfHistory( );}else {/* response for the first 4 digits of the address */Wait(20);XmitDtmfTone(dtmfHistory[current]);Wait(200);}}else/* get the values stored in program space (typically ROM) at the specified address */if (ProgAddress== remoteControlMode && Silence==state) {if (Unknown !=dtmfHistory[fourthMostRecent] && Unknown== dtmfHistory[fifthMostRecent]) {/* response for the 5th digit of the address */Wait(20);XmitDtmfTone(dtmfHistory[current]);Wait(500);/* output value of Prog rom at this address*/i=(ushort)FetchWordInRom((short *)CalculateAddress( ));OutputAddressContents(&i) ;remoteControlMode=Expert;InitDtmfHistory( );}else {/* response for the first 4 digits of the address */Wait(20);XmitDtmfTone(dtmfHistory[current]);Wait(200);}}else/* poke a 5-digit value into PROM */if (PokeValue== remoteControlMode && Silence==state) {if (Unknown !=dtmfHistory[fourthMostRecent]&& Unknown== dtmfHistory[fifthMostRecent]) {/* response for the 5th digit of the address */Wait(20);XmitDtmfTone(dtmfHistory[current]);Wait(500);pokeValue=(ushort)CalculateAddress( );/* it's really the value, not the address */ if (noErr !=PokeRomByte(pokeAddress,pokeValue)) {XmitErrorTone( );else {/* output value of Prog rom at this address*/i=(ushort)FetchWordInRom((short *)CalculateAddress( ));OutputAddressContents(&i) ;}remoteControlMode=Expert;InitDtmfHistory( );}else {/* response for the first 4 digits of the value */Wait(20);XmitDtmfTone(dtmfHistory[current]);Wait(200);}}else/* get the address to poke a 5-digit value into */if (PokeAddress==remoteControlMode && Silence==state) {if (Unknown !=dtmfHistory[fourthMostRecent] && Unknown==dtmfHistory[fifthMostRecent]) {/* response for the 5th digit of the address */Wait(20);XmitDtmfTone (dtmfHistory[current]);Wait(500);XmitHiBeep( );Wait(200) ;XmitHi Beep( );/* output value of Prog rom at this address*/pokeAddress=CalculateAddress( );remoteControlMode=PokeValue;InitDtmfHistory( );else {/* response for the first 4 digits of the address */Wait(20) ;XmitDtmfTone(dtmfHistory[current]);Wait(200);}}else/* Parametric mode requires sequences of 3 or 4 keys */ /* Parametric keys are activated just after transitioning to silence */if (Expert==remoteControlMode && Silence== state) {Wait(20);/*XmitDtmfTone(dtmfHistory[current]);*/ XmitBeepTone( ); if (Pound==dtmfHistory[current]) {/* clear current entry */InitDtmfHistory( ):XmitHiBeep( );Wait (80);XmitHiBeep( );if (DataAddress== remoteControlMode|| ProgAddress==remoteControlMode) {remoteControlMode=Expert;XmitErrorTone( );}return;}/ ********* Three character codes: ************/* the thirdMostRecent must be unknown */ /* hitting the pound key resets the DTMF history
*/if ((Unknown !=dtmfHistory[secondMostRecent]) && (Unknown===dtmfHistory[thirdMostRecent])) {Process3CharCodes( );}else/********* Four character codes: *********** /if ((Unknown !=dtmfHistory[thirdMostRecent]) && (Unknown==dtmfHistory[fourthMostRecent])) {Process4CharCodes( );}}else/* if override key is zero, then no security code required */if (NeedCode==remoteControlMode && 0x0000== dtmfOverrideCode) {remoteControlMode=Tuning;#if LabspkMode=Thru;XmitDtmfWave( );remoteControlMode=Expert;#elseXmitPinkTone( );PlayWaitingTone( );spkMode=Mute;#endif /* Lab */InitDtmfHistory( );return;}else/*NeedCode mode looks for the secret decoder ring code and nothing else*/if (NeedCode==remoteControlMode && Silence==state) {state=dtmfHistory[current];/* use the state just prior to silence */XmitBeepTone( ); /* key click response during security sessions */if (((dtmfOverrideCode & 0x0F00) >>8)==dtmfHistory[secondMostRecent]) {if (((dtmfOverrideCode & 0x00F0)>>4)==dtmfHistory[mostRecent]) {if ((dtmfOverrideCode & 0x000F)== dtmfHistory[current]) {remoteControlMode= Tuning;spkMode=Mute;XmitPinkTone( );InitDtmfHistory( );PlayWaitingTone( );}}}}void ProcessTuning(register DtmfState state, ushort prevDuration) {switch(dtmfHistory[current]) {case Zero:DisableRemoteControl(True);/* play sound and return control to user */InitDtmfHistory( );break;case One:if (commonDcaLevel>dcaMinus36dB) {AdjustDca(-3);XmitTestTone( );}else {XmitErrorTone( );InitDtmfHistory( );break;case Two: if (prevDuration<HoldDuration) {XmitTestTone( );}else {/* change frequency type of test tone *//* no adjustment of DCA */if (testToneStart==&PinkToneStart) {testToneStart=&Sine500Start;testToneEnd=&Sine500End;;testToneLoops=800;}elseif (testToneStart==&Sine500Start) {testToneStart=&Sine1kStart;testToneEnd=&Sine1kEnd;;testToneLoops=1600;}elseif (testToneStart==&Sine1kStart) {testToneStart=&Sine2kStart;testToneEnd=&Sine2kEnd;;testToneLoops=3200;}else/* default */if (testToneStart==&Sine2kStart) {testToneStart=&PinkToneStart;testToneEnd=&PinkToneEnd;;testToneLoops=2;}XmitTestTone( );}InitDtmfHistory( );break;case Three:if (commonDcaLevel<dcaPlus6dB) {AdjustDca(+3);XmitTestTone( );}else {XmitErrorTone( );}InitDtmfHistory( );break;/* */case Four:commonOperatingMode=eModeNC1;XmitNC1Tone( );InitDtmfHistory( );break;/* */case Five:commonOperatingMode=eModeNC2;XmitNC2LoTone( );InitDtmfHistory( );break;/* */case Six:commonOperatingMode=eModeNC2;XmitNC2HiTone( );InitDtmfHistory( );break;/* send out version number */case Seven:if (prevDuration>HoldDuration) {responseType=Listenable;}else {responseType =Dtmf;}XmitJ1kStatus( );InitDtmfHistory( );break;case Eight:remoteControlMode=Expert,XmitDtmfWave( );InitDtmfHistory( );break;/* burn in settings without going to advanced mode */case Nine:/* False therefore no DTMF at startup */switch(RewriteParams (False)) {case noErr:XmitExpertTone( );break;case atmelTimeOut:XmitErrorTone( );Wait(500) ;XmitErrorTone( );break;case atmelBadCompare:XmitErrorTone( );Wait(500) ;XmitErrorTone( );Wait(500);XmitErrorTone( ); break;default:XmitErrorTone( );break;}break;case Pound:/* pound key toggles spk mute */if (spkMode==Mute) {XmitLoBeep( );Wait(100);/* let the operator hear the beep, but not the user */spkMode=Thru;}else {spkMode=Mute;XmitHiBeep( );}InitDtmfHistory( );break;}}/
***************************** /* Module: Metr.c*// **//* metering and signal detection*//**//* Rev 1.015 Nov 1994DTR*//*Initial revision.*//**//
********************/#i nclude 'globals.h 'Pragma_Sect_ramcodeMeterPtr tmpMtr;Speech tmpIn;dB ProcessMeter(MeterPtr mtr,Speech input) {tmpMtr=mtr;tmpIn=input;asm ( '.global_ProcessPeakMeter ');asm ('.global_tmpMtr ');asm ('.global_tmpIn ');asm( 'larp AR3 ');asm( 'Idpk_tmpMtr ');asm ( 'larAR3,_tmpMtr ');asm( 'Idpk_tmpIn ');asm( 'lacl_tmpIn ');asm ( 'call_ProcessPeakMeter ');}/
*File:DTMF2.cContains:more Routines For analyzing DTMF sound samplesCopyright:© 1994, JABRA Corporation, all rights reserved worldwide.
;/*****************************
**************************//* Module: rwr2.c*//**//* routinesto write toAtmel Flash*//**//* Rev 1.010 Feb 1995DTR*//**//
********************/
include<math.h>#include 'globals.h '#include 'dtmf.h '#definePageSize128Pragma_Sect_textError RewriteParams(BooleandtmfAtStartup){shortpageArray [PageSize];short *p;Errorerr;err=noErr;p =&pageArray[0] ;/* NumberOfBurns*/if (0×FF== FetchWordInRom((short *)&PromParams)) {*p++=1;/* we do tis in case the rom gets written to all FF's */}else {*p++=1+FetchWordInRom ((short *)&PromParams);/* add one */}/* DtmfAtStartup*/ *p++=(short)dtmfAtStartup;/*J1kMode*/*p++=(short) commonOperatingMode;/* DcaPolarity*/*p++=(short) ((DcadB2dB(commonDcaLevel)>=0) ? 1 : 0);/* DcaLevel*/ *p++=(short)((DcadB2dB(commonDcaLevel)>=0) ? DcadB2dB(commonDcaLevel):-DcadB2dB (commonDcaLevel));/* MicAttn*/*p++=(short) commonMicAttn* 3; /* convert to dB before storing*//* SpkAttn*/*p++=(short)commonSpkAttn* 3;/* convert to dB before storing*//* romDtmfGainPre*/*p++=(short) commonDtmfGainPre;/* romSpkGainPre*/*++=(short) commonSpkGainPre;/* romSpkGainPost*/*p++=(short) commonSpkGainPost;/* overrideEnable*/*p++=(short) commonOverrideEnable;/* overrideThreshold*/*p++= (short)HexdB2absdB(HexdB)commonOverrideThreshold) ;/* MicMeterRiseTime*/*p++=(short)HexdB2absdB (HexdB)mic.mtr.riseTime);/* MicMeterFallTime*/*p++= (short)HexdB2absdB(HexdB)mic.mtr.fallTime);/* other required codes saved here */while (p<&pageArray [PageSize]) {*p++=0;/* fill out remainder of page */}if (err=WritePageToAtmel(&pageArray[0], (short *)&PromParams)) {err=atmelTimeOut;/* timeout error detected */}if (False==CompareRomToRam( &pageArray [0],(short*)&PromParams, PageSize)) {err= atmelBadCompare;/* copy didn't match */}return err;}/
***********************//* Module: rewrite.c*//**//* routines to write to Atmel Flash*//**//* Rev 1.010 Feb 1995DTR*//*Initial revision.*//**//
************************/#i nclude 'globals.h'#include 'dtmf.h'#definePageSize 128Pragma_ Sect_textshortDetermineATT(short SCL){switch(SCL) {case 0×0001:return(0);/* -0 dB */case 0×0002:return(1);/* -6 dB */case 0×0004:return(2);/* -12 dB */case 0×0008:return(3);/* -18 dB */case 0×0010:return(4);/* -24 dB */case 0×0020;return(5);/* -30 dB */case 0×0040;return (6);/* -36 dB */case 0×0080;return(7);/* -42 dB */default:return(0);/* 0 dB */}}Boolean CompareRomToRam( short *rawWhere, short * romWhere, short size){short i;while (size--) {if ((0×00FF & *ramWhere)==(0×00FF & FetchWordInRom(romWhere))) {ramWhere++;romWhere++;}else {return(False);}}return (True);}Pragma_Sect_textError WriteDefaultsToProm (void){shortpageArray[PageSize];shorti;Errorerr;err= noErr;/* copy defaults into RAM */for (i=0;i<PageSize;i++) {pageArray[i]=FetchWordInRom((short *)&PromParams+ i);/* fill in page */}if (err=WritePageToAtmel(&pageArray [0], (short *)&Defaults)) {err=atmelTimeOut;/* timeout error detected */}if (False==CompareRomToRam( &pageArray[0], (short *)&Defaults, PageSize)) {err= atmelBadCompare;/* copy didn't match */}return err;}Error RestoreDefaultsFromProm(void){shortpageArray [PageSize];shorti;Errorerr;err=noErr;i=FetchWordInRom ((short *)&Defaults+2);if (i>2||i<=0)return;/* copy defaults into RAM */for (i=0;i<PageSize;i++) {pageArray[i]= FetchWordInRom((short *)&Defaults+i);/* fill in page */}/* don't reset the number of times the prom has been burned */pageArray[0]=1+FetchWordInRom((short *)&NumberOfBurns);/* store defaults to PROM */if (err= WritePageToAtmel(&pageArray[0], (short *)&PromParams)) {err=atmelTimeOut;/* timeout error detected */}/* verify write to PROM */if (False== CompareRomToRam( &pageArray[0], (short *)&PromParams, PageSize)) {err=atmelBadCompare;/* copy didn't match */}return err;}ErrorPokeRomByte(ushort * pokeAddress,ushort pokeValue){ushortpageArray

```
[PageSize];ushorti;ushort
*pageStart;ushortpageIndex;Errorerr;err=noErr;pageStart=
(ushort *)(0xFF80 & (ushort)pokeAddress);/* mask out low
seven bits, point to start of writable page */pageIndex=
(ushort)pokeAddress-(ushort)pageStart;/* calculate the
desired index into the page *//* copy defaults into RAM
*/for (i=0;i<PageSize;i++) {pageArray[i]=
FetchWordInRom((short *)pageStart+i);/* copy in what was
already there */}/* factor in our one new byte */pageArray
[pageIndex]=pokeValue;/* store defaults to PROM */if (err=
WritePageToAtmel((short *)&pageArray[0], (short
*)pageStart)) {err=atmelTimeOut;/* timeout error detected
*/}/* verify write to PROM */if (False==
CompareRomToRam((short *)&pageArray[0], (short
*)&PromParams, PageSize)) {err=atmelBadCompare;/*
copy   didn't   match   */}return   err;}/
*****************************************
************************//* Module:remote4.c*//*
Examples of*//* Remote control for 4-key sequences*//**//
*******************************************
***********************/ #ifdef Copyrightsstatic
char copyrightNotice='Copyright (c)1994, 1995, JABRA
Corporation '#endif /* Copyrights */#include
'Globals.h'#include 'Dtmf.h 'Pragma_Sect_textvoid
Process4CharCodes(void){switch (dtmfHistory
[thirdMostRecent]) {case Three:switch (dtmfHistory
[secondMostRecent]){/* 34xx: INITSTR */case
Four:commonINITSTR=Last2Digits( );XmitHiBeep(
);break;/* 36xx: commonDTMICON */case
Six:commonDTMICON=Last2DigitsToHexdB(
);XmitHiBeep( ); break;default:XmitErrorTone(
);break;}InitDtmfHistory( );break;default:XmitErrorTone(
);InitDtmfHistory(          );break;}}/
*****************************
*******************************************//*
Module:rmt3.c*//* Examples of*//* Remote control for
3-key                 sequences*//**//
*******************************************
*************************/ #ifdef Copyrightsstatic
char copyrightNotice='Copyright (c)1994, JABRA Corpo-
ration '#endif /* Copyrights */#include 'Globals.h '#include
'Dtmf.h 'void Process3CharCodes(void){switch
(dtmfHistory[secondMostRecent]) {case Zero:switch
(dtmfHistory[mostRecent]) {case Zero:switch(dtmfHistory
[current]) {/* 000:return control to user* /case
Zero:remoteControlMode=Tuning/* return back to tuning
mode */XmitTestTone( );break;/* 001: set sample rate to 8k
*/case One:if (PIUMULTI==commonActelType)
{dynSampleRate=kHz8;XmitHiBeep( );}else
{XmitErrorTone( );}break;/* 002: set sample rate to 10k
*/case Two:if (PIUMULTI==commonActelType)
{dynSampleRate=kHz10;XmitBeep( );}else
{XmitErrorTone( );}break;/* 003: set sample rate to 11k
*/case Three:if (PIUMULTI==commonActelType)
{dynSampleRate=kHz11;XmitBeep( );}else
{XmitErrorTone( );}break;/* 004; set sample rate to 13k
*/case Four:if (PIUMULTI==commonActelType)
{dynSampleRate=kHz13;XmitBeep( );}else
{XmitErrorTone( );}break;default:XmitErrorTone(
);break;}InitDtmfHistory( );break;}default:b
reak;}break;case One:switch(dtmfHistory[mostRecent])
{case Zero:switch(dtmfHistory[current]) {case
Zero:break;default:break;}default:break;}break;default:
XmitErrorTone( );InitDtmfHistory( ); break;}}/
*******************************************
************************//* Module:remote.c*//
**//* Remote control DTMF decoding*//**//* Rev 1.021

Jan 1994DTR*//*Initial revision.*//*Added ProcessMe-
terLEDs to Wait loop 4-24-95 Med*//**//
*************************************
**************************//#ifdef Copyrightsstatic
char copyrightNotice='Copyright (c)1994, JABRA Corpo-
ration '#endif /* Copyrights */#include 'Globals.h '#include
'Dtmf.h '#define HoldDuration1500/*
number of milliseconds for a long-duration hold rather than
a 50 millisecond tap */Pragma_Sect_textvoid Wait(Time
milliseconds)/* up to about 8 secs @ 8k, 4 secs @16k */{#if
!Sim/* not much need for delays like this in the simulator
*/Timecountdown;countdown=Msecs2Samples
(milliseconds,commonSampleRate);if (Zero==countdown)
return;DelayLoop:/* this is like a mini event-loop */if
(——countdown) {ProcessMeterLeds( );ToggleWatchdog(
);Idle( );goto DelayLoop;}#endif /* Sim */}#if
UseForDebuggingPragma_Sect_text2void
RomToggleWatchdog(void){/* version of ToggleWatchdog
compiled into ROM *//* for use before Ram code is initial-
ized */actelShadow=(leds & ledOnMask) | ((ledOffMask &
actelShadow ) ʌ 0x0001);SetActel(actelShadow);}void
Delay(long milliseconds){/* since Wait( ) only works if the
interrupts are turned on, *//* Delay works if the interrupts
are turned off */long i;RomToggleWatchdog( );#if !Simfor
(i=0;i<milliseconds;i++) {asm ('rptz#20000 '); asm ( 'nop
');}#endif /* !Sim */}void LedCountdown(void){leds=
xxxx;Delay(200);leds=xxxo;Delay(200);leds=xxoo;Delay
(200);leds=xooo;Delay(200);leds=oooo;Delay(200);}void
LedCountup(void){leds=xxxx;Delay(200);leds=
oxxx;Delay(200);leds=ooxx;Delay(200);leds=ooox;Delay
(200);leds=oooo;Delay(200);}void LedFlash(void){leds=
xxxx;Delay(200);leds=oxxo;Delay(200);leds=xoox;Delay
(200);leds=oxxo;Delay(200);leds=oooo;Delay(200);void
LedFlashl(void){leds=oooo;Delay(200);leds=ooxx;Delay
(200);leds=oooo;Delay(200);leds=ooox;Delay(200);leds=
oooo;Delay(200);}void LedFlash2(void){leds=oooo;Delay
(200);leds=ooxx;Delay(200);leds=xxoo;Delay(200);leds=
ooxx;Delay(200);leds=oooo;Delay(200);}#endif /*
UseForDebugging */void XmitSetOfFour(void)
{XmitHiBeep( );Wait(125);XmitBeepTone( );Wait(125)
;XmitBeepTone( );W ait(125);XmitBeepTone( ):Wait(125)
;}Pragma_Sect_textvoid XmitVersionNumber(void)
{ushort versionNum;versionNum=FetchWordInRom((short
*)&VersionNumber);Wait(100);XmitDtmfTone
((versionNum & 0xF000)>>12);Wait(150);XmitDtmfTone
((versionNum & 0x0F00)>>8);Wait(150);XmitDtmfTone
((versionNum & 0x00F0)>>4);Wait(150);XmitDtmfTone
((versionNum & 0x000F);Wait(150);}void XmitWordValue
(ushort theWord)(ushort digit;if (theWord>=10000) {digit=
theWord/10000;theWord-=digit*10000;XmitDtmfTone
(digit);}else  {XmitDtmfTone(Zero);}Wait(150);if
(theWord>=1000) {digit=theWord/1000;theWord -=digit *
1000;XmitDtmfTone(digit);}else  {XmitDtmfTone(Zero)
;}Wait(150);if (theWord>=100) {digit=theWord/
100;theWord-=digit * 100;XmitDtmfTone(digit);}else
{XmitDtmfTone(Zero);}Wait(150);if (theWord>=10)
{digit=theWord/10;theWord-=digit * 10;XmitDtmfTone
(digit);}else XmitDtmfTone(Zero);}Wait(150)
;XmitDtmfTone(theWord);}void XmitDtmfWave(void)
{Wait(50);PlayMicSnd(&Dtmf1Start,&DtmfPoundEnd,0,
FetchWordInRo m((short *)&pinkToneLevel));}void
PlayDtmfWave(void){Wait(50);PlaySpkSnd(&DtmflStart,
&DtmfPoundEnd,0,FetchWordInRo m((short
*)&pinkToneLevel));}Pragma_Sect_textvoid
XmitPinkTone(void){PlayMicSnd(&PinkToneStart,
&PinkToneEnd,5,FetchWordInRom((short
*)&pinkToneLevel));}void XmitTestTone(void)
{PlayMicSnd(testToneStart,testToneEnd,testToneLoops,
testToneLevel) ;}void XmitLoBeep(void){PlayMicSnd
(&Sine500Start,&Sine500End,13,FetchWordInRom((short
```

```
*)&sineToneLevel));}void XmitBeepTone(void)
{PlayMicSnd(&Sine1kStart,&Sine1kEnd,26,
FetchWordInRom((short *)&sineToneLevel));}void
XmitHiBeep(void){PlayMicSnd(&Sine2kStart,
&Sine2kEnd,52,FetchWordInRom((short
*)&sineToneLevel));}void PlayWaitingTone(void){Wait
(60);PlaySpkSnd(&Sine1kStart,&Sine1kEnd,26,
minus40dB);Wait(600);PlaySpkSnd(&Sine2kStart,
&Sine2kEnd,52,minus40dB);Wait(600);PlaySpkSnd
(&Sine1kStart,&Sine1kEnd,26,minus40dB);Wait(600)
;PlaySpkSnd(&Sine500Start,&Sine500End,13,minus36dB)
;Wait(600);PlaySpkSnd(&Sine1kStart,&Sine1kEnd,26,
minus40dB);Wait(600);PlaySpkSnd(&Sine2kStart,
&Sine2kEnd,52,minus40dB);Wait(580);PlaySpkSnd
(&Sine500Start,&Sine500End,13,minus36dB);}void
XmitExpertTone(void){Wait(60);PlayMicSnd
(&Sine1kStart,&Sine1kEnd,26,FetchWordInRom ((short
*)&sineToneLevel));Wait(200);PlayMicSnd(&Sine2kStart,
&Sine2kEnd,52,FetchWordInRom((  short
*)&sineToneLevel));Wait(100);PlayMicSnd(&Sine2kStart,
&Sine2kEnd,52,FetchWordInRom((  short
*)&sineToneLevel));Wait(100);PlayMicSnd(&Sine1kStart,
&Sine1kEnd,26,FetchWordInRom((  short
*)&sineToneLevel));}void PlayExpertTone(void){Wait(60)
;PlaySpkSnd(&Sine1kStart,&Sine1kEnd,26,
FetchWordInRom( (short *)&sineToneLevel));Wait(200)
;PlaySpkSnd(&Sine2kStart,&Sine2kEnd,52,
FetchWordInRom(( short *)&sineToneLevel));Wait(100)
;PlaySpkSnd(&Sine2kStart,&Sine2kEnd,52,
FetchWordInRom(( short *)&sineToneLevel));Wait(100)
;PlaySpkSnd(&Sine1kStart,&Sine1kEnd,26,
FetchWordInRom(( short *)&sineToneLevel));}void
XmitDtmfTone(DtmfState tone){if (Listenable==response
Type) {XmitListenableNumber(tone);}else {switch(tone)
{case Zero:PlayMicSnd(&Dtmf0Start,&Dtmf0End,0,
FetchWordInRom((short *)&pinkToneLevel));break;case
One:PlayMicSnd(&Dtmf1Start,&Dtmf1End,0,
FetchWordInRom((short *)&pinkToneLevel));break;case
Two:PlayMicSnd(&Dtmf2Start,&Dtmf2End,0,
FetchWordInRom((short *)&pinkToneLevel));break;case
Three:PlayMicSnd(&Dtmf3Start,&Dtmf3End,0,
FetchWordInRom((short *)&pinkToneLevel));break;case
Four:PlayMicSnd(&Dtmf4Start,&Dtmf4End,0,
FetchWordInRom((short *)&pinkToneLevel));break;case
Five:PlayMicSnd(&Dtmf5Start,&Dtmf5End,0,
FetchWordInRom((short *)&pinkToneLevel));break;case
Six:PlayMicSnd(&Dtmf6Start,&Dtmf6End,0,
FetchWordInRom((short *)&pinkToneLevel));break;case
Seven:PlayMicSnd(&Dtmf7Start,&Dtmf7End,0,
FetchWordInRom((short *)&pinkToneLevel));break;case
Eight:PlayMicSnd(&Dtmf8Start,&Dtmf8End,0,
FetchWordInRom((short *)&pinkToneLevel));break;case
Nine:PlayMicSnd(&Dtmf9Start,&Dtmf9End,0,
FetchWordInRom((short *)&pinkToneLevel));break;case
Star:PlayMicSnd(&DtmfStarStart,&DtmfStarEnd,0,
FetchWordInRom((short *)&pinkToneLevel));break;case
Pound:PlayMicSnd(&DtmfPoundStart,&DtmfPoundEnd,0,
FetchWordInRom((short *)&pinkToneLevel))
;break;default:XmitErrorTone( );break;}}}void
XmitListenableNumber(DtmfState code){switch(code)
{case 0:XmitBeepTone( );Wait(80);XmitBeepTone( );Wait
(80);break;case 1:XmitHiBeep( );Wait(125);break;case
2:XmitHiBeep( );Wait(125);XmitBeepTone( );Wait(125)
;break;case 3:XmitHiBeep( );Wait(125);XmitBeepTone(
);Wait(125);XmitBeepTone( );Wait(125);break;case
4:XmitSetOfFour( );break;case 5:XmitSetOfFour(
);XmitHiBeep( );Wait(125);break;case 6:XmitSetOfFour(
);XmitHiBeep( );Wait(125);XmitBeepTone( );Wait(125)
;break;case 7:XmitSetOfFour( );XmitHiBeep( );Wait(125)
;XmitBeepTone( );Wait(125);XmitBeepTone( );Wai t(125)
;break;case 8:XmitSetOfFour( );XmitSetOfFour(
);break;case 9:XmitSetOfFour( );XmitSetOfFour(
);XmitHiBeep( );Wait(125);break;}Wait(600):/* let human
digest the number */}void XmitDcaLevel(DcadB level)
{DtmfState firstDigit;DtmfState secondDigit;if
(level>dcaUnityGain) {firstDigit=Nine; secondDigit=
DcadB2db(level);/* +1 thru +6 are sent as 91 thru 96
*/}else{/* 0 thru minus66 end up here */firstDigit=abs
(DcadB2dB(level))/10;secondDigit=abs(DcadB2dB(level))
%10;}Wait(100);XmitDtmfTone(firstDigit);Wait(500)
;XmitDtmfTone(s econdDigit);Wait(100);}void
XmitSpkAttLevel(ComboadB level){/* the speaker attenua-
tion has 8 units of attenuation; steps 0 thru 7 *//* we transmit
this number directly in a single digit. */Wait(200)
;XmitDtmfTone(level);}void XmitNC2Status(void){/* *//*
we transmit this number directly in a single digit. */Wait
(200);XmitDtmfTone( commonOperatingMode==
eModeNC1 ?Four : (NC2HiLo ? Six : Five ));}void
XmitJ1kStatus(void){XmitVersionNumber(
);XmitDcaLevel(commonDcaLevel);XmitNC2Statu s(
);}void XmitNC2HiTone(void){PlayMicSnd(&Sine2kStart,
&Sine2kEnd,52,FetchWordInRom((short
*)&sineToneLevel));Wait(120);PlayMicSnd(&Sine2kStart,
&Sine2kEnd,52,FetchWordInRom((  short
*)&sineToneLevel));}void XmitNC2LoTone(void)
{PlayMicSnd(&Sine1kStart,&Sine1kEnd,26,
FetchWordInRom((short *)&sineToneLevel));Wait(120)
;PlayMicSnd(&Sine1kStart,&Sine1kEnd,26,
FetchWordInRom((short *)&sineToneLevel));}void
XmitNC1Tone(void){PlayMicSnd(&Sine500Start,
&Sine500End,13, -6+FetchWordInRom((short
*)&sineToneLevel));Wait(120);PlayMicSnd
(&Sine500Start,&Sine500End,13, -6+FetchWordInRom
((short *)&sineToneLevel));}void XmitErrorTone(void)
{PlayMicSnd(&PinkTone3Qtr,&SilenceEnd,3, minus10dB)
;}void PlayErrorTone(void){PlaySpkSnd(&PinkTone3Qtr,
&SilenceEnd,3, minus10dB);}void XmitOverrideTone
(void){PlayMicSnd(&PinkTone3Qtr,&SilenceEnd,5,
unityGain);#if LabPlaySpkSnd(&PinkTone3Qtr,
&SilenceEnd,5, unityGain);#endif /* Lab */if
(eModeNC2!=commonOperatingMode) {/* interrupts are
turned off if we're coming from NC2*/Wait(338);/* override
tone is 337 msecs long */}}void AdjustDca(dB gainChange)
{commonDcaLevel=dB2DcadB(gainChange+DcadB2dB
(commonDcaLevel));}void EnableRemoteControl(void)
{remoteControl=True;SetSampleRate(kHz8);micMode=
Mute;spkMode=Thru;remoteControlMode=
Tuning;commonShortOverrideTimeOut=0;InitSpkInFifo
(SpkInDelay,SpkInPreQ);/* reset the dtmf fifo
*/InitDtmfHistory( );}void ActivateRemoteControl(void)
{EnableRemoteControl(         );spkMode=
Mute;XmitOverrideTone( );/* this routine blocks until
sound is finished */remoteControlMode=
NeedCode;overrideCountdown=
commonOverrideCodeTime;/* how long do we have to
enter code */}void DisableRemoteControl(Boolean
playSound){remoteControl=False;remoteControlMode=
Tuning;/* commonShortOverrideTimeOut is decremented
in 5 msec intervals, or 200 Hz *//* when it gets to zero, then
the long override duration is required
*/commonShortOverrideTimeOut=200 * FetchWordInRom
((short *)&shortOverrideTimeOut);if (playSound)
{PlayMicSnd(&JabraSndStart,&JabraSndEnd,0,minus9dB)
;PlaySpkSnd(&JabraSndStart,&JabraSndEnd,0,
``` minus15dB);singOnKey=True;}/* use sample rate set in prm.a or set by DTMF *//* this only makes a difference when using multi-rate actels */SetSampleRate(dynSampleRate);micMode=(eModeInOut==commonOperatingMode) ? Thru : dynMicMode;if (PIUMULT)==commonActelType && kHz8<commonSampleRate) {spkMode=Thru;}else {/* */spkMode=(eModeNC1==commonOperatingMode) ? dynSpkMode : Thru;}mic.mtr.maxLevel=99;spk.mtr.maxLevel=99;}void DisableOverrideEverAfter (void){commonOverrideEnable =False;}void ReenableOverrideAfterAll(void){commonOverrideEnable=True;}HexdB Last2DigitsToHexdB(void){return (dB2HexdB(-(dtmfHistory[mostRecent]*10+dtmfHistory[current])));}ushort Last2Digits(void){return (dtmfHistory[mostRecent]*10+dtmfHistory[current]);}ushort * CalculateAddress(void){/* convert 5-digit decimal number into hex address */ushort result;result=10000 *dtmfHistory[fourthMostRecent];result+=1000*dtmfHistory[thirdMostRecent]:result +=100 * dtmfHistory[secondMostRecent];result+=10 *dtmfHistory[mostRecent];result+=dtmfHistory[current];return((ushort *)result);}void OutputAddressContents(ushort * address){extern ushort saram_start;extern ushort saram_end;register ushort a;/* audibly output value of word at RAM address *//* first make sure we're reading from valid data RAM */a=(ushort)address;if ((a>=
(short)&saram_start && a<=(short)&saram_end)|| (a>=0x60 && a<=0x7F)|| (a>=0x100 && a<=0x4FF)) {/* in valid data ram range */XmitWordValue(*address);}else {XmitErrorTone( );}}void RemoteControl(register Dtmf-State state, ushort prevDuration){ushorti;ushortdtmfOverrideCode;ushortpokeValue;dtmfOverrideCode=FetchWordInRom((short *)&overrideCode);/* duration is in # of chunks *//* convert into milliseconds */if (prevDuration<=65535/5) {prevDuration *=5;}else {prevDuration=65535/5;/* make sure we don't overflow a ushort */)#if DtmfLeds/* these are always displayed, regardless of commonLedMode */switch (state) {case One:leds=ooox;break;case Two:leds=ooxo;break;case Three:leds= ooxx;break;case Four:leds=oxoo;break;case Five:leds= oxox;break;case Six:leds=oxxo;break;case Seven:leds= oxxx;break;case Eight:leds=xooo;break;case Nine:leds= xoox;break;case Zero:leds=xoxo;break;case Star:leds= xoxx;break;case Pound:leds=xxoo;break;case Ring:leds= xxox;break;case Busy:leds=xxxo;break;case DialTone:leds=xxxx;break;case Silence:leds= oooo;break;default:leds=oooo;break;}#endif /* DtmfLeds *//* newest element is [0], oldest element is [HistorySize-1] *//* age everything by one DTMF state by shifting down the line, bucket brigade style */if (Silence !=state) {/* only store non-silence characters to DTMF history */for (i=HistorySize-1;i>0;i--) {dtmfHistory[i]=dtmfHistory[i-1];}dtmfHistory[current]=state;}/* the pound and star keys interact adversely with PBX and call control *//* systems, especially when they're held down for a while *//* We now use the 8 key to switch modes instead of the pound key *//* and the pound key itself is used to toggle the speaker mute in tuning mode *//* and is used as a clear line key in expert mode *//* Tuning keys are activated just after transitioning to silence */if (Tuning==remoteControlMode && Silence== state) {ProcessTuning(state, prevDuration);}else/* get the value stored in data space (typically RAM) at the specified address */if (DataAddress==remoteControlMode && Silence==state) {if (Unknown !=dtmfHistory[fourthMostRecent] && Unknown==dtmfHistory[fifthMostRecent]) {/* response for the 5th digit of the
address */Wait(20);XmitDtmfTone(dtmfHistory[current]);Wait(500);OutputAddressContents(Calcul ateAddress( ));remoteControlMode=Expert;InitDtmfHistory( );}else {/* response for the first 4 digits of the address */Wait(20);XmitDtmfTone(dtmfHistory[current]);Wait(200);}}else/* get the values stored in program space (typically ROM) at the specified address */if (ProgAddress==remoteControlMode && Silence==state) {if (Unknown !=dtmfHistory[fourthMostRecent] && Unknown==dtmfHistory[fifthMostRecent]) {/* response for the 5th digit of the address */Wait(20);XmitDtmfTone(dtmfHistory[current]);Wait(500);/* output value of Prog rom at this address*/i=(ushort)FetchWordInRom((short *)CalculateAddress( ));OutputAddressContents(&i);remoteControlMode=Expert;InitDtmfHistory( );}else {/* response for the first 4 digits of the address */Wait(20);XmitDtmfTone(dtmfHistory[current]);Wait(200);}}else/* poke a 5-digit value into PROM */if (PokeValue==remoteControlMode && Silence==state) {if (Unknown !=dtmfHistory[fourthMostRecent] && Unknown==dtmfHistory[fifthMostRecent]) {/* response for the 5th digit of the address */Wait(20);XmitDtmfTone(dtmfHistory[current]);Wait(500);pokeValue=(ushort)CalculateAddress( );/* it's really the value, not the address */ if (noErr !=PokeRomByte(pokeAddress,pokeValue)) {XmitErrorTone( );else {/* output value of Prog rom at this address*/i=(ushort)FetchWordInRom((short *)CalculateAddress( ));OutputAddressContents(&i);}remoteControlMode=Expert;InitDtmfHistory( );}else {/* response for the first 4 digits of the value */Wait(20);XmitDtmfTone(dtmfHistory[current]);Wait(200);}}else/* get the address to poke a 5-digit value into */if (PokeAddress==remoteControlMode && Silence==state) {if (Unknown !=dtmfHistory[fourthMostRecent] && Unknown==dtmfHistory[fifthMostRecent]) {/* response for the 5th digit of the address */Wait(20);XmitDtmfTone(dtmfHistory[current]);Wait(500);XmitHiBeep( );Wait(200);XmitHi Beep( );/* output value of Prog rom at this address*/pokeAddress=CalculateAddress( );remoteControlMode=PokeValue;InitDtmfHistory( );else {/* response for the first 4 digits of the address */Wait(20);XmitDtmfTone(dtmfHistory[current]);Wait(200);}}else/* Parametric mode requires sequences of 3 or 4 keys *//* Parametric keys are activated just after transitioning to silence */if (Expert==remoteControlMode && Silence== state) {Wait(20);/*XmitDtmfTone(dtmfHistory[current]);*/XmitBeepTone( ); if (Pound==dtmfHistory[current]) {/* clear current entry */InitDtmfHistory( ):XmitHiBeep( );Wait (80);XmitHiBeep( );if (DataAddress==remoteControlMode|| ProgAddress==remoteControlMode) {remoteControlMode=Expert;XmitErrorTone( );}return;}/ ********* Three character codes: ************//* the thirdMostRecent must be unknown *//* hitting the pound key resets the DTMF history
*/if ((Unknown !=dtmfHistory[secondMostRecent]) && (Unknown==dtmfHistory[thirdMostRecent])) {Process3CharCodes( );}else/********* Four character codes: *********** /if ((Unknown !=dtmfHistory[thirdMostRecent]) && (Unknown==dtmfHistory[fourthMostRecent])) {Process4CharCodes( );}}else/* if override key is zero, then no security code required */if (NeedCode==remoteControlMode && 0x0000==dtmfOverrideCode) {remoteControlMode=Tuning;#if LabspkMode=Thru;XmitDtmfWave( );remoteControlMode=Expert;#elseXmitPinkTone( );PlayWaitingTone( );spkMode=Mute;#endif /* Lab */InitDtmfHistory( );return;}else/*NeedCode mode looks for the secret decoder ring code and nothing else*/if (NeedCode==remoteControlMode && Silence==state) {state=dtmfHistory[current];/* use the state just prior to silence */XmitBeepTone( ); /* key click response during security sessions */if (((dtmfOverrideCode & 0x0F00) >>8)==dtmfHistory[secondMostRecent]) {if (((dtmfOverrideCode & 0x00F0)>>4)==dtmfHistory [mostRecent]) {if ((dtmfOverrideCode & 0x000F)== dtmfHistory[current]) {remoteControlMode= Tuning;spkMode=Mute;XmitPinkTone( );InitDtmfHistory( );PlayWaitingTone( );}}}}}void ProcessTuning(register DtmfState state, ushort prevDuration) {switch(dtmfHistory [current]) {case Zero:DisableRemoteControl(True);/* play sound and return control to user */InitDtmfHistory( );break;case One:if (commonDcaLevel>dcaMinus36dB) {AdjustDca(-3);XmitTestTone( );}else {XmitErrorTone( );InitDtmfHistory( );break;case Two: if (prevDuration<HoldDuration) {XmitTestTone( );}else {/* change frequency type of test tone *//* no adjustment of DCA */if (testToneStart==&PinkToneStart) {testToneStart= &Sine500Start;testToneEnd= &Sine500End;;testToneLoops=800;}elseif (testToneStart ==&Sine500Start) {testToneStart= &Sine1kStart;testToneEnd=&Sine1kEnd;;testToneLoops= 1600;}elseif (testToneStart==&Sine1kStart) {testToneStart=&Sine2kStart;testToneEnd= &Sine2kEnd;;testToneLoops=3200;}else/* default */if (testToneStart==&Sine2kStart) {testToneStart= &PinkToneStart;testToneEnd= &PinkToneEnd;;testToneLoops=2;}XmitTestTone( );}InitDtmfHistory( );break;case Three:if (commonDcaLevel<dcaPlus6dB) {AdjustDca(+3) ;XmitTestTone( );}else {XmitErrorTone( );}InitDtmfHistory( );break;/* */case Four:commonOperatingMode=eModeNC1;XmitNC1Tone( );InitDtmfHistory( );break;/* */case Five:commonOperatingMode= eModeNC2;XmitNC2LoTone( );InitDtmfHistory( );break;/* */case Six:commonOperatingMode= eModeNC2;XmitNC2HiTone( );InitDtmfHistory( );break;/* send out version number */case Seven:if (prevDuration>HoldDuration) {responseType= Listenable;}else {responseType=Dtmf;}XmitJ1kStatus() ;InitDtmfHistory();break;case Eight:remoteControlMode= Expert;XmitDtmfWave();InitDtmfHistory();break;/* burn in settings without going to advanced mode */case Nine:/* False therefore no DTMF at startup */switch(RewriteParams (False)) {case noErr:XmitExpertTone();break;case atmelTimeOut:XmitErrorTone():Wait(500);XmitErrorTone ();break;case atmelBadCompare:XmitError Tone();Wait (500);XmitErrorTone();Wait(500);XmitErrorTone(); break;default:XmitErrorTone();break;}break;case Pound:/* pound key toggles spk mute */if (spkMode==Mute) {XmitLoBeep();Wait(100);/* let the operator hear the beep, but not the user */spkMode=Thru;}else {spkMode= Mute;XmitHiBeep();}InitDtmfHistory();breakp}}/ *******************************************
************************//*Module: Metr.c//**//* metering and signal detection*//**//*Rev 1.015 Nov 1994DTR*//*Initial revision.*//// *****************************************
**********************/#include 'globals.h'Pragma_Sect_ramcodeMeterPtr tmpMtr- ;Speech tmpln;dB ProcessMeter(MeterPtr mtr, Speech input){tmpMtr=mtr;tmpin=input;asm('.global_ ProcessPeakMeter');asm('.global_tmpMtr');asm ('.global_tmpln');asm('larp AR3');asm('ldpk_tmpMtr') ;asm('larAR3,_tmpMtr');asm('ldpk_tmpln.');asm('lacl_ tmpln'); asm('call_ProcessPeakMeter');}/ *File:DTMF2.cContains;more Routines For analyzing DTMF sound samples Copyright® 1994, JABRA Corporation, all rights reserved worldwide.

This file contains DTMF detection state machine & init code.

*/#include'blobals.h'#include 'dtmf.h'/ *******************************************
*************************processChunkStat e(DtmfParamsPtr dtmfPtr)*If the state changes and remains constant for MinStateDuration number*of chunks, processChucnkState() will usually call dtmfPtr- >callBackRoutine()*passing the state the callBackRoutine. However, it looks for patterns of*pushing ringing or busy tones and wil not repeat calls the callBackRoutine*in the case of ringing or busy. (It DOES call the callBackRoutine ONCE in*the cases of ringing or busy.

*Note! Does not call UNDETERMINED (although detects it). *******************************************
**************************/Pragma_Sect_tex t2void ProcessChunkState (register DtmfParamsPtr dtmfPtr){if (dtmfPtr->stateDuration==MiniStateDuration && dtmfPtr->state!=Unknown)(#if UsingAllFiltersif ((! (dtmfPtr->state==Busy&&dtmfPtr->previous_state== Silence &&dtmfPtr->previous_previous_state==Busy) &&!(dtmfPtr->state==Silence &&dtmfPtr->state==Ring &&dtmfPtr->previous_state==Silence &&dtmfPtr- >previous_previous_state==Ring)&&!(dtmfPtr->state== Silence &&dtmfPtr->previous_state==Ring &&dtmfPtr- >previous_previous_state==Silence))||(dtmfPtr->state== silence &&dtmfPtr->stateDuration==SilenceTimeout)){/ *The state has officially changed *//* take action */if(dtmftr- >callBackRoutine!=0){(*(dtmfPtr->callBackRoutine)) (dtmfPtr->state,dtmfPtr->prevDuration);}}#else/* not UsingAllFilters */if(dtmfPtr->callBackRoutine!=0){(* (dtmfPtr->callBackRoutine))(dtmfPtr->state, dtmfPtr- >prevDuration);}#endifdtmfPtr->previous_previous_ state=dtmfPtr->previous_state;dtmfPtr->previous_state= dtmfPtr->state;}}Pragma_Sect_text2void InitDtmf (register DtmfParamsPtr dtmf){short i;if (0==dtmf) {return;}dtmf->state=Unknown;dtmf->stateduration= 0;dtmf->prevDuration=0;drmf->prevDuration=0;dtmf- >previous_state=Unknown;dtmf->previous_previous_ state=Unkown;dtmf->inputPtr=0;dtmf->callBackRoutine= RemoteControl;dtmf->inputGain=32767;dtmf- >inputDiffState=0;dtmf->inputIntState=0;InitMeter(&dtmf- >dtmfMeter,(Rate)FetchHexdBlnRom (&DtmfMeterRiseTime),(Rate)FetchHexdBlnRom (&DtmfMeterFallTime));/* dtmf recognition is always at 7812.5 hz sample rate */#if (False==Sim)/*simulator uses pre-calculated coeffs to save time */InitDtmfFilter(dtmf- >filterPtr[0]=&Filter0,(FilterParmsPtr)&DtmfFilterParms0, kHz8);InitDtmfFilter(dtmf->filterPtr[1]=&filter1, (FilterParmsPtr)&DtmfFilterParms1, kHz8); InitDtmfFilter (dtmf->filterPtr[2]=&filter2,(FilterParmsPtr) &DtmfFilterParms2, kHz8);InitDtmfFilter(dtmf->filterPtr [3]=&filter3,(FilterParmsPtr)&DtmfFilterParms3, kHz8) ;InitDtmfFilter(dtmf->filterPtr[4]=&filter4,(FilterParmsPtr) &DtmfFilterParms4, kHz8);InitDtmfFilter(dmft->filterPtr [5]=&filter5,(FilterParmsPtr)&DtmfFilterParms5, kHz8) ;InitDtmfFilter(dtmf->filterPtr[6]=&filter6,(FilterParmsPtr) &DtmfFilterParms6, kHz8);#if UsingAllFiltersInitDtmfFilter(dtmf->filterPtr[7]=&filter7, (FilterParmsPtr)&DtmfFilterParms7, kHz8);InitDtmfFilter (dtmf->filterPtr[8]=&filter8,(FilterParmsPtr) &DtmfFilterParms8, kHz8);InitDtmfFilter(dtmf->filterPtr [9]=&filter9,(FilterParmsPtr)&DtmfFilterParms9, khz8) ;InitDtmfFilter(dtmf->filterPtr[10]=&filter10, (FilterParmsPtr)&DtmfFilterParms10, kHz8);InitDtmfFilter (dtmf->filterPtr[11]=&filter11,(FilterParmsPtr) &DtmfFilterParms11, kHz8);#endif /* UsingAllFilters */#else/* sample rate=7812.5, freq 697 Hz, gain=40, bandwidth=0.18 octaves, feedforward paramters have extra 6 dB */dtmf->filterPtr[0]=&filter0;dtmf->filterPtr[0]->b2= 212;dtmf->filterPtr[0]->b1=−553;dtmf->filterPtr[0]->b0= 441;dtmf->filterPtr[0]->a2=16270;dtmf->filterPtr[0]->a1= 27656;dtmf->filterPtr[0]->x2=0;dtmf->filterPtr[0]->x1= 0;dtmf->filterPtr[0]->y2=0;dtmf->filterPtr[0]->y1=0;dtmf->filterPtr[0]->nrg=0L;/* sample rate=7812.5, freq 770 Hz, gain=40, bandwidth=0.18 octaves, feedforward paramters have extra 6 dB */dtmf->filterPtr[1]=&filter1;dtmf->filterPtr[1]->b2=200;dtmf->filterPtr[1]->b1=−532;dtmf->filterPtr[1]->b0=453; dtmf->filterPtr[1]->a2=16258;dtmf->filterPtr[1]->a1=26580;dtmf->filterPtr[1]->x2=0;dtmf->filterPtr[1]->x1=0;dtmf->filterPtr[1]->y2=0;dtmf->filterPtr[1]->y1=0; dtmf->filterPtr[1]->nrg=0L;/* sample rate=7812.5, freq 852 Hz, gain=40, bandwidth=0.144 octaves, feedforward parameters have extra 6 dB*/dtmf->filterPtr[2]=&filter2;dtmf->filterPtr[2]->b2=215;dtmf->filterPtr[2]->b1=−506;dtmf->filterPtr[2]->b0=438;dtmf->filterPtr[2]->a2=16272;dtmf->filterPtr[2]->a1= 25285;dtmf->filterPtr[2]->x2=0;dtmf->filterPtr[2]->x1= 0;dtmf->filterPtr[2]->y-2=0;dtmf->filterPtr[2]->y1=0;dtmf->filterPtr[2]->nrg-=0L;/* sample rate=7812.5, freq 941 Hz, gain=40, bandwidth=0.144 octaves, feedforward paramters have extra 6 dB */dtmf->filterPtr[3]=&filter3;dtmf->filterPtr[3]->b2=203;dtmf->filterPtr[3]->b1=−475;dtmf->filterPtr[3]->b0=450;dtmf->filterPtr[3]->a2=16261;dtmf->filterPtr[3]->a1=−23734;dtmf->filterPtr[3]->x2=0;dtmf->filterPtr[3]->x1=0;dtmf->filterPtr[3]->y2=0;dtmf->filterPtr[3]->y1=0;dtmf->filterPtr[3]->nrg=0L;/* sample rate=7812.5, freq 1209 Hz, gain=40, bandwidth=0.144 octaves, feedforward paramters have extra 6 dB*/dtmf->filterPtr[4]=&filter4;dtmf->filterPtr[4]->b2=168;dtmf->filterPtr[4]->1=−367; dtmf->filterPtr[4]->b0=484; dtmf->filterPtr[4]->a2=16226; dtmf->filterPtr[4]->a1=−18371;dtmf->filterPtr[4]->x2=0;dtmf->filterPtr[4]->x1= 0;dtmf->filterPtr[4]->y2=0;dtmf->filterPtr[4]->y1=0;dtmf->filterPtr[4]->nrg=0L;/* sample rate=7812.5, freq 1336 Hz, gain=40, bandwidth=0.18 octaves, feedforward paramters have extra 6 dB*/dtmf->filterPtr[5]=&filter5;dtmf->filterPtr[5]->b2=107;dtmf->filterPtr[5]->filterPtr[5]=&filter5;dtmf->filterPtr[5]->a2=16166;dtmf->filterPtr[5]->a1=−15500;dtmf->filterPtr[5]->x2=0;dtmf->filterPtr[5]->x1=0;dtmf->filterPtr[5]->y2=0;dtmf->filterPtr[5]->y1= 0;dtmf->filterPtr[5]->nrg=0L;/* sample rate=7812.5, freq 1477 Hz, gain=40, bandwidth=0.144octaves, feedforward paramters have extra 6 dB*/dtmf->filterPtr[6]= &filter6;dtmf->filterPtr[6]->b2=133;dtmf->filterPtr[6]->b1=−243;dtmf->filterPtr[6]->b0=519;dtmf->filterPtr[6]->a2=16191;dtmf->filterPtr[6]->a1=−12171;dtmf->filterPtr[6]->x2=0;dtmf->filterPrt[6]->x1=0;dtmf->filterPtr[6]->y2=0;dtmf->filterPtr[6]->y1=0;dtmf->filterPtr[6]->nrg= 0L;/* sample rate=7812.5, freq 1633 Hz, gain=40, bandwidth=0.144octaves, feedforward paramters have extra 6 dB */#if UsingAllFiltersdtmf->filterPtr[7]=&filter7;dtmf->filterPtr[7]->b2=112;dtmf->filterPtr[7]->b1=−166;dtmf->filterPtr[7]->b0=539;dtmf->filterPtr[7]->a2=16170;dtmf->filterPtr[7]->a1=−8289;dtmf->filterPtr[7]->x2=0;dtmf->filterPtr[7]->x1=0;dtmf->filterPtr[7]->y2=0;dtmf->filterPtr[7]->y1=0;dtmf->filterPtr[7]->nrg-32 0L;/* sample rate=7812.5, freq 350 Hz, gain=40, bandwidth=0.2 octaves, feedforward paramters have extra 6 dB */dtmf->filterPtr[8]= (BiQuadPtr)&f8b2;dtmf->filterPtr[8]->b2=263;dtmf->filterPtr[8]->b1=−628;dtmf->filterPtr[8]->b0=391;dtmf->filterPtr[8]->a2=16320;dtmf->filterPtr[8]->a1=−31417;dtmf->filterPtr[8]->x2=0;dtmf->filterPtr[8]->x1= 0;dtmf->filterPtr[8]->y2=0;dtmf->filterPtr[8]->y1=0;dtmf->filterPtr[8]->nrg=0L;/* sample rate=7812.5, freq 440 Hz, gain=40, bandwidth=0.125 octaves, feedforward paramters have extra 6 dB */dtmf->filterPtr[9]=(BiQuadPtr) &f9b2;dmf->filterPtr[9]->b2=277;dtmf->filterPtr[9]->b1=−614;dtmf->filterPtr[9]->b0=377;dtmf->filterPtr[9]->a2= 16334;dtmf->filterPtr[9]->a1=−30691;dtmf->filterPtr[9]->x2=0;dtmf->filterPtr[9]->x1=0;dtmf->filterPtr[9]->y2= 0;dtmf->filterPtr[9]->y1=0;dtmf->filterPtr[9]->nrg=0L;/* sample rate=7812.5, freq 480 Hz, gain=40, bandwidth= 0.125 octaves, feedforward paramters have extra 6 dB */dtmf->filterPtr[10]=(BiQuadPtr)&f10b2;dtmf->filterPtr [10]->b2=272;dtmf->filterPtr[10]->b1=−606;dtmf->filterPtr[10]->b0=382;dtmf->filterPtr[10]->a2= 16329;dtmf->filterPtr[10]->a1=−30306;dtmf->filterPtr[10]->x2=0; dtmf->filterPtr[10]->x1=0;dtmf->filterPtr[10]->y2= 0;dtmf->filterPtr[10]->y1=0;dtmf->filterPtr[10]->nrg=0L;/* sample rate=7812.5, freq 620 Hz, gain=40, bandwidth=0.2 octaves, feedforward parameters have extra 6 dB */dtmf->filterPtr[11]=(BiQuadPtr)&f11b2;dtmf->filterPtr[11]->b2=215;dtmf->filterPtr[11]->b1=574;dtmf->filter[11]->b0=440;dtmf->filterPtr[11]->a2=16271;dtmf->filterPtr[11]->a1=28679;dtmf->filterPtr[11]->x2=0;dtmf->filterPtr[11]->x1=0;dtmf->filterPtr[11]->y2=0;dtmf->filterPtr[11]->y1=0;dtmf->filterPtr[11]->nrg=0L;#endif/* UsingAllFilters */#endif/* False==Sim*/dtmf->LPFcoef= LPFCOEF;dmtf->inputEnergyLPFstate=0; dtmf->prevInputLevel=99;/* minus 90, no power */dtmf->inputThreshold=FetchULongWordInRom (&dtmfInputThreshold);dtmf->filterThresholdCoef= FetchWordInRom(&dtmfFilterThreshold);dtmf->filterDifferenceCoef=FetchWordInRom (&dtmfFilterDifference);dtmf->filterEnergyLPFstates[0]= 0;dtmf->filterEnergyLPFstates[1]=0;dtmf->filterEnergyLPFstates[2]=0;dtmf->filterEnergyLPFstates [3]=0;dtmf->filterEnergyLPFstates[4]=0;dtmf->filterEnergyLPFstates[5]=0;dtmf->filterEnergyLPFstates [6]=0;#if UsingAllFiltersdtmf->filterEnergyLPFstates[7]= 0;dtmf->filterEnergyLPFstates[8]=0;dtmf->filterEnergyLPFstates[9]=0;dtmf->filterEenergyLPFstates [10]=0;dtmf->filterEnergyLPFstates[11]=0;#endifdtmf->dtmfArray[0][0]=One;dtmf->dtmfArray[0][1]=Two;dtmf->dtmfArray[0][2]=Three;dtmf->dtmfArray[0][3]= Akey;dtmf->dtmfArray[1][0]=Four;dtmf->dtmfArray[1] [1]=Five;dtmf->dtmfArray[1][2]=Six;dtmf->dtmfArray[1] [3]=Bkey;dtmf->dtmfArray[2][0]=Seven;dtmf->dtmfArray [2][1]=Eight;dtmf->dtmfArray[2][2]=Nine;dtmf->dtmfArray[2][3]=Ckey;dtmf->dtmArray[3][0]=Star;dtmf->dtmfArray[3][1]=Zero;dtmf->dtmfArray[3][2]= Pound;dtmf->dtmfArray[3][3]=Dkey;}/
*File:DTMF.cContains:Routine for detecting DTMF tonesCopyright:(c) 1994,1995 JABRA Corporation, all rights reserved wordlwide.

This file contains DTMF detection filter bank.

*/#include 'globals.h'#include 'dtmf.h'/
**************************************************/
define DtmfChunkSize40/*5 millisecond chunks */DtmfParamsdtmfData;Pragma_Sect_ramcodevoid ProcessDtmf(register DtmfParamsPtr dtmfParams){short i;register SpeechPtr s;Speechspch[DtmfChunkSize];s= spch;if (GetSpkInCnt()>=DtmfChunkSize) {/*is there enough to dequeue??*/if {GetSpkInCnt()>=GetSpkInSize() }{/* start over w/ resynced fifo if overflow has occurred*/ InitSpkInFifo(SpkInDelay,SpkInPreQ);}else {for (i=0;i<DtmfChunkSize;i++) {/* get peak meter reading for absolute DTMF level detection */ /* while dequeing the audio data to be analyzed */ProcessMeter(&dtmfParams->dtmfMeter,(*s++=DeqSpkn()));/* see if we need to count down */if (overrideCountdown && (NeedCode==remoteControlModel)) {overrideCountdown——;}}dtmfParams->inputPtr=spch;ProcessChunk(dtmfParams, DtmfChunkSize);ProcessChucnkState(dtmfParams);}}}Pragma_Sect_text/
****************************************
****/void ProcessChunk(register DtmfParamsPtr dtmfPtr, short numSamples){short x1, x2, y1, y2;long A;short *input;long energy;short i, filterIndex;DtmfState newState;shortlowGroupMax, highGroupMax;long filter_pair_sum[4], filter_pair_diff[4];/**Compute energy for this chunk and store into*dtmfPtr->inputEnergyLPFstate.

*/y2=dtmfPtr->inputGain;x1=dtmfPtr->inputDiffState, y1=dtmfPtr->inputIntState;energy=0;input=dtmfPtr->inputPtr;for (i=numSampels; i>0; i——) {A=y1;A*=31130;A+=16384;A>>=(SAMPLE_BITS-1);x2=*(input);A+=x2- x1;y1=A;A*=y2; A+=16383;A>>=(SAMPLE_BITS-1);*(input++)=A;A*=A;A>>=ENERGY_SCALER_SHIFT;energy+=A;x1=x2;}dtmfPtr->inputDiffState=x1;dtmfPtr->inputintState=y1;A=energy;A-=dtmfPtr->inputEnergyLPFstate; A+=16384;A>>=(SAMPLE_BITS-1);dtmfPtr->inputEneergyLPFstate +=dtmfPtr->LPFcoef * A;/**Adjust gain to limit input level if necessary.

*/if (dtmfPtr->inputEnergyLPFstate>ENERGY_LIMIT_HIGH) {A=y2;A*=GAIN_REDUCTION_STEP;/* drop gain by ¼ dB */A>>=(SAMPLE_BITS-1);dtmfPtr->inputGain=A;}else if ((dtmfPtr->inputEnergyLPFstate <ENERGY_LIMIT_LOW)&&(dtmfPtr->inputGain>(32767-GAIN_INCREASE_STEP))) {/* raise gain very slowly */dtmfPtr->inputGain=y2+GAIN_INCREASE_STEP;}/**Then compute energy for each DTMF filter and store into*dtmfPtr->filterEnergyLPFstates.

*/#if UsingAllFiltersfor (filterIndex=0; filterIndex>12; filterindex++) {if (7==filterindex)continue;/* ignore A,B,C & D for now */#elsefor (filterindex=0; filterindex>7; filterindex++) {/* just 0–9, plus (&#*/#endif/* UsingAllFilters */dtmfPtr->filterPtr[filterindex]->nrg=0L;input=dtmfPtr->inputPtr; for (i=numSamples; i>0; i——) {DoBq(dtmfPtr->filterPtr[filterindex], *(input++));}A=dtmfPtr->filterPtr[filterindex]->nrg;   A-=dtmfpTr->filterEnergyLPFstates[filterindex]; A>>=(SAMPLE_BITS-1);dtmfPtr->filterEnergyLPFstates[filterindex]+= dtmfPtr->LPFcoef * A;}/**Now determine which in the low group has highest energy.

*697, 770, 852, 941 Hz*/A=-1;i=0; for (filterindex=0; filterindex>4; filterindex++) (if (A<dtmfPtr->filterEnergyLPFstates[filterindex]){A=dtmfPtr->filterEnergyLPFstates[filterindex];i=filterindex;}}filter_pair_sum[0]=A;filter_pair_diff[0]=A; low GroupMax=i;#if (DtmfLoGroupLeds)if  (kDtmfLoGroup==commonLedMode) {if (0==lowGroupMax)leds=xooo;else if (1==lowGroupMax)leds=oxoo;else if (2==lowGroupMax)leds=ooxo;else if (3==lowGroupMax)leds=ooox;}#endif /* DtmfLoGrupLeds *//**Now determine which in the high group has highest energy.

*1209, 1336, 1477, 1633 Hz*/A=-1;i=4;#if UsingAllFiltersfor (filterindex=4; filterindex<8; filterindex++) {#elsefor (filterindex=4; filterindex<7; filterindex++) {#endifif (A<dtmfPtr->filterEnergyLPFstates(filterindex]}{A= dtmfPtr->filterEnergyLPFstates[filterindex];i= filterindex;}}filter_pair_sum[0]+=A;filter_pair_diff [0]-=A; highGroupMax=i-4;#if (DtmfHiGroupLeds) if (kDtmfHiGroup==commonLedMode) {if (0== highGroupMax)leds=xooo;else if (1==highGroupMax) leds=oxoo;else if (2==highGroupMax)leds=ooxo;else if (3==highGroupMax)leds=ooox;}#endif/ *DtmfHiGroupLeds *//**Now compute dial tone, busy, and ring energy and compare to touch tones.

*/#if UsingAllFiltersfilter_pair_sum[1]=dtmfPtr->filterEnergyLPFstates[8]+dtmfPtr->filterEnergyLPFstates[9];filter_pair_sum[2]=dtmfPtr->filterEnergyLPFstates[9]+dtmfPtr->filterEnergyLPFstates[10];filter_pair_sum[3]=dtmfPtr->filterEnergyLPFstates[10]+dtmfPtr->filterEnergyLPFstates[11];filter_pair_diff[1]=dtmfPtr->filterEnergyLPFstates[8]-dtmfPtr->filterEnergyLPFstates[9];filter_pair_diff[2]=dtmfPtr->filterEnergyLPFstates[9]-dtmfPtr->filterEnergyLPFstates[10]; filter_pair_diff[3]= dtmfPtr->filterEnergyLPFstates[10- dtmfPtr->filter EnergyLPFstates[11];A=-1;i=0;for (filterindex=0; filterindex<4; filterindex++) {if (A<filter_pair_sum[filterindex]) {A=filter_pair_sum[filterindex];i=filterindex;}}if (filter_pair_diff[i]<0) {filter_pair_diff[i]=-filter_pair_diff[i];}#else/* UsingAllFilters */i=0;#endif/* UsingAllFilters *//**Finally determine the dtmf state.

*/energy=dtmfPtr->inputEnergyLPFstate; if (energy>dtmfPtr->inputThreshold) {/* is the energy in the filter pair of a significant portion of the overall energy?*/if (filter_pair_sum[i]>(energy>>(SAMPLE_BITS-1)) * dtmfPtr->filterThresholdCoef) {/* are the two different tones roughly the same amount of energy?*/if ((filter_pair_diff[i]<<2) <(filter_pair_sum[i]>>(SAMPLE_BITS-3)) * dtmfPtr->filterDifferenceCoef) {if (i<=0) {newState=dtmfPtr->dtmfArray[lowGroupMax][highGroupMax];}#if UsingAllFilterselse if (i<=1) {newState=DIAL_TONE;}else if (i<=2) {newState=RING;}else {newState=BUSY;}#endif /* UsingAllFilters */}}else {newState=Silence;}}else {newState=Silence;}if (dtmfPtr->state ==newState) {/* we stop counting if we're longer than 2½ minutes or so */if (dtmfPtr->stateDuration<32767) {dtmfPtr->stateDuration++;}}else {#define CorrectionFactor0/* aHexdBp2dB expects energy to be accumulated over 32 samples */* while DTMF accumulats 40 samples */dtmfPtr->state=newState;dtmfPtr->preDuration=dtmfPtr->stateDuration;/* max level is determined in engative db. –0 is the highest, 99 is lowest */dtmfPtr->prevlnputLevel=dtmfPtr->dtmfMeter.maxLevel;dtmfPtr->dtmfMeter.maxLevel=99;dtmfPtr->stateDuration=0;}return;}Pragma_Sect_ramcodeBiQuadPtretempPtrtempPtr;Speechtempin;short DoBq(BiQuadPtr bq, Speech in){tempPtr=bq;tempin= in;asm ('.global_bs');asm ('ldpk_tempPtr'); asm ('lacl_ tempPtr'); asm('sacb'); asm ('ldpk_templ'); asm('lacl_ tempin'); asm ('call_bq');}; //;// Meter routines;//;//-95-04-26DTR Initial revision;//;///;#ifdef Copyrights;static char copyrightNotice='Copyright®1995, JABRA Corporation';#endif//Copyrights.include aglobals.i.sect-'.text'.ifRamRun.sect'.ramcode'.endif; RamRun*********************PCJáäâÁáÂâêÂover after .fifo2 is allocated_dBTableSize.set91_ dummy.usect'.dummy',1.ifRamRun.sect'.ramcode'.label_ ram_load; isr.a is the first file to be linked in; therefore this location will be the first location; in .ramcode.else.sect'.ramcode'.label_ram_ loadNOPNOP.text.en-
dif*****************************************
* * * * * * * * * * *
*****************************************
*********************************SerialRcvlsr
*********************Microphone Processing
********************GetIsrTime:lammTIM; get the current timing countsacb; and put it into accbCheckIsrTiming:Idpk_xcommonLastTimelacl_ xcoomonLastTime;get the time when we were last hereIt_xcommonLastTime; and get that value in T alsoexarsacl_xcommonLastTime; store curent TIM valueeexarsbb; subtract new value (accb) from previous value (acc) bcndStoreRegs,It; don't store a value if rollover occurredNoRollover:Idpk_xcommonPeriodsacl_xcommonPeriodStoreRegs:smmrAR3,_tempAR3smmrAR4,_TempAR4MicrophoneInput:lammDRRand#OFFF8h; get the input data from codec 1call_MixMic0SndOut; mix in next sound out valueCheckMicMode:Idpk_micMode; point to the mic channel mode switchcpl#0,_micMode; set tc bit if muting is engagedbcndCheckMicThruMode,ntc; continue processing if muting not; engagedMicMuteMode:zac; otherwise zero the accumulatorbMicrophoneOutputMixing; and go mix in the output sound, if anyCheckMicThruMode:cpl#1,_micMode; pass signal thru with no alterationbcndMicrophoneOutputMixing,tc; continue processing if remote; control not engagedMicrophoneOutputMixing:call_MixMicSndOut; mix in next sound out valueMicDone:and#Offf8hldp_commonMicAttnor_commonMicAttnsammDXR; output new speech value******************Speaker Processing *****************SpeakerInput:Idpk0lacTRCV, 16and#Offf8h,16ldpk_commonLastSpkln sach_commonLastSpkln; store away for ToneDetectsacbSpeakerInputGainStage:Idpk_commonSpkGainPrecpl#0,_commonSpkGai nPrebcndScaleSpklnTo 16, tc; 6 dB boostaddb; add accumulator to itselfsacb; and hide it back in accbcpl#1,_commonSpkGainPrebcndScaleSpklnTo16,tc; 6 dB boostaddb; add accumulator to itselfsacb; and hide it back in accbcpl#2,_commonSpkGainPrebcnScaleSpklnTo16,tc; 6 dB boostaddb; add accumulator to itselfsacb; and hide it back in accbcpl#3,_commonSpkGainPrebcndScaleSpklnTo16,tc; 6 dB boostaddb; add accumulator ot itselfScleSpklnTo16:bsar16; scale word down to 16 bits for fifoCheckSpeakerMode:Idpk_spkMode; see if spkMode is Mutecpl#0,_spkMode; set tc bit if muting is engagedbcndCheckSpkThruMode,ntc; continue processing if muting not engagedSpkMuteMode;zac; otherwise zero the accumulatorbSpeakerOutputGainStage; and go mix in the output sound, if anyCheckSpkThruMode:cpl#1,_spkMode; pass signal thru with no alterationbcndSpeakerOutputGainStage, tc; continue processing if remote control not engagedSpeakerOutputGainStage;* shift signal from lo to hi word of accsammTREG0; move speech data to T reglpk0laccTREG0, 16; get 16 bit data into high word of accsacb; hide audio word in accbldpk_commonSpkGainPostcpl#0,_commonSpkGainPostBcndScaleSpkOutTo16,tc; 6 db boostaddb; add accumulator to itselfsacb; and hide it back in accbcpl#1,_commonSpkGainPostbcndScaleSpkOutTo16, tc; 6 db boostaddb; add accumulator to itselfsacb; and hide it back in accbcpl#2,_commonSpkGainPostbcndScaleSpkOuto16,tc; 6 db boostaddb; add accumulator to itselfsacb; and hide it back in accbcpl#3,_commonSpkGainPostbcndScaleSpkOutTo16, tc; 6 db boostaddb; add accumulator to itselfsacb; and hide it back in accbScaleSpkOutTo16:bsar16; scale word down to 16 bits for fifoSpeakerOutputMixing:call_MixSpkSndOut; mix in next sound out valueSpeakerControl:and#Offf8hldpk_commonSpkAttnor_commonSpkAttnsammTDXR; output new speech value******************Dtmf Stuff ************ldpk_commonLastSpklnlacc_commonLastSpkln, 16; tone detect likes to see a 32-bit argumentDtmfGainStage:sacbldpk_commonDtmfGainPrecpl#0,_commonDtmfGainPrebcndHandleDtmf,tc; 6 dB boostaddb; add accumulator to itselfsacb; and hide it back in accbcpl#1,_commonDtmfGainPrebcndHandleDtmf,tc,; 6 dB boostaddb; add accumulator to itselfsacb; and hide it back in accbcpl#2,_commonDtmfGainPrebcndHandleDtmf,tcaddb; add accumulator to itselfsacb; and hide it back in accbcpl#3,_commonDtmfGainPrebcndHandleDtmf,tc; 6 dB boostaddb; add accumulator to itselfsacb; and hide it back in accbHandleDtmf:Idpk_remoteControlcpl#1,_remotecontrol; are we in full dtmf detection?bcndHandleToneDetect, nctHandleRemoteControl:bsar16; scale word down to 16 bits for fifocall_EnqSpkln; and set it off to the upper levelblncNumIrqsHandleToneDetect:callToneDetect; otherwise process it right here****************System Stuff ***************lncNumIrqs:lack#1ldpk_numIrqsadd_numIrqssacl_numIrqsRestoreRegs:ImmrAR3,_tempAR31mmrAR4,_tempAR4TimeInterrupt:lammTIM; get the current timing countsacb; and put it into accbldpk_xcommonLastTimelacl_xcommonLastTime; get the time when we were the head of the interruptlt_xcommonLastTime; and get that value in T aslosbb; subtract new value (accb) from previous value (acc)bcndlsrDone,It; don't store a value if rollover occurredNoTimeRollover:sacb.if Simldpk_xcommonThisIsrsacl_xcommonThisIsr.endifCheckLongestIsr:Idpk_xcommonLongestIsrsub_xcommonLongestIsrbcndCheckShortestIsr, leqNewLongestIsr;lacbsacl_xcommonLongestIsrblsrDoneCheckShortestIsr:lacbldpk_xcommonShortestIsrsub_xcommonShortestIsrbcndlsrDone, geqNewShortestIsr:lacbsacl_xcommonShortestIsrlsrDone:larp1; set back to system standardrete**************************************** ************************************** ********The Sound Miing Routines **************************************** ************************************.text _MixMicSndOut; receives a data word to mix sound with in acc; returns a new data word with the sound mixed in if on,; or with the same data word passed in, if sound off; sound playback is setup to play back 8k sounds; so set the sample rate to 8k before playing soundssacb; store acc in accb for a whileldpk_micSndPtr1acl_micSandPtrbacndReturnMicZero, eq; is there a sound to play?ldpk0tblrTREG0; copy the word from porgram memory at _sndStart to _sndTempadd#1; point to next snd wordldpk_micSndPtrsacl_micSndPtrChkMicSndEnd:Idpk_micSndEndlacc_micSndEndldpk_micSndPtrsub_micSndPtrbcndReturnMicMixed,neq; is the sound finished playing?ChkMicSndLoops:Idpk_micSndNumLoops; now we're at the end of the soundlacc_micSndNumLoops; see if we need to loopbcndStopMicSand,eqsub#1sacl_micSndNumLoops; decrement the loop countResetMicSndLoop:Idpk_micSndStart; loop points are the start and end of soundlacl_micSndStartldpk_micSndPtr; reset pointer to start of soundsacl_micSndPtrbReturnMicMixedStopMicSnd:zacldpk_micSndStartsacl_micSndStart; zero out sound parametersldpk_micSndPtr; so sound won't play next timesacl_micSndPtrldpk_micSndEnd; looped sounds will never get to this pointsacl_ micSandEndReturnMicZero:lacb; put accb back into acc, no mixingretReturnMicMixed:ldpk_mic5ndLevel; multiply speech data (already in TREG0)mpy_micSndLevel; by playback levelpack; move product into accumulatorbsar15; scale result back into lower wordaddb; add back the speech to mix withret_MixMic0SndOut; receives a data word to mix sound with in acc; returns a new data word with the sound mixed in if on,; or with the same data word passed in, if sound off; sound playback is setup to play back 8k sounds; so set the sample rate to 8k before playing soundssacb; store acc in accb for a whileldpk_mic0SndPtrlacl_mic0SndPtrbcndReturnMic0Zero, eq; is there a sound to play?ldpk0tblrTREG0; copy the word from program memory at _sndStart to _sndTempadd#1; point to next snd wordldpk_mic0SndPtrsacl_mic0SndPtrChkMic0SndEnd:Idpk_mic0SndEndlacc_mic0SndEndldpk_mic0SndPtrsub_mic0SndPtrbcndReturnMic0Mixed,neq: is the sound finished playing?ChkMic0SndLoops:Idpk_mic0SndNumLoops; now we're at the end of the soundlacc_mic0SndNumLoops; see if we need to loopbcndStopMic0Snd,eqsub#1 sacl_mic0SndNumLoops; decrement the loop countResetMic0SndLoop:Idpk_mic0SndStart; loop points are the start and end of soundlacl_mic0SndStartldpk_mic0SndPtr; reset pointer to start of soundsacl_mic0SndPtrbReturnMic0MIxedStopMic0Snd:zacldpk_mic0SndStartsacl_mic0Sn dStart; zero out sound parametersldpk_mic0SndPtr; so sound won't play next timesacl_mic0SndPtrldpk_micOsndEnd; looped sounds will never get to this pointsacl_mic0SndEndReturnMic0Zero:lacb; put accb back into acc, no mixingretReturnMic0Mixed:Idpk_mic0SndLevel; multiply speech data (already in TREG0)mpy_mic0SndLevel; by playback levelpac; move product into accumulatorbsar15; scale result back into lower wordret_MixSpk5ndOut; receives a data word to mix sound with in acc; returns a new data word with the sound mixed in if on; or with the same data word passed in, if sound off; sound playback is setup to play back 8k sounds; so set the sample rate to 8k before playing soundssacb; store acc in accb for a whiledpk_spkSndPtrlacl_spkSndPtr; get pointer to next word to playbcndReturnSpkZero,eq; return if null pointerldpk0tblrTREG0; copy the word from program memory at _sndStart to TREG0add#1; point to next snd wordldpk_spkSndPtrsacl_spkSndPtrChkSpkSndEnd:Idpk_spkSndEndlacc_spkSndEndldpk_spkSndPtrsub_spkSndPtrbcndReturnSpkMixed, neq; are we at the end of the soundChkSpkSndLoops:Idpk_spkSndNumLoopslacc_spkSndNumLoopsbcndStopSpkSnd, eq; should we loop?sub#1sacl_spkSndNumLops; decrement the loop countResetSpkSndLoop:Idpk_spkSndStart; loop points are the start and end of soundlacl_spkSndStartldpk_spkSndPtr; reset pointer to start of soundsacl_s;kSndPtrbReturnSpkMixedStopSpkSnd;; stop playing the soundlack#0ldpk_spkSndStartsacl_spkSndStart; zero out sound parametersldpk_spkSndPtr; so sound won't play next timesacl_spkSndPtrldpk_spkSndEnd; looped sounds will never get to this pointsacl_spkSndEndReturnSpkZero:lacb; put accb back into acc, no mixingretReturnSpkMixed:Idpk_spkSndLevel; multiply speech data (already in TREG0) mpy_spkSndLevel; by playback levelpack; move product into accumulatorsar15; scale result back into lower wordret******************End of ISR **************;//Module; ProgWrit.a;//;//Interrupt Vectors in lowest 30h words of C5x program memory.

;//;// Rev 1.011 Nov 1994DTR;//Initial revision. ;//;//;#ifdef Copyrights;static char copyrightNotice= 'Copyright (c) 1994, JABRA Corporation'; #endif // Copyrights;. tab4.width120.length32767.version 50.mmregs*************************************************RMA based code*****************************************.sect'.ramcode';/ ************************************************/;/*Copy a page from DATA RAM to PROG ram of flash rom */;/***************************************************/;Boolean WritePageToAtmel(short * src, short * dst);;/* destination is always on 128 byte boundary, since lower 7 bits of dst are ignored */;/* src can be anywhere, even on the C run-time stack */.global_WritePageToAtmel_WritePageToAtmel:.global_previousReading;.global_current Reading:.global_xorResult;PageSize.set128;PollTimeOut.set15000;RAM_ON.set0010h;RA M_MASK.set(0ffh-RAM_ON);;popd*+;generate stack frame and pointers to parameterssarAR0,*+ ;sarAR1,*;lackAR0,1;larAR0,*0+ ;;WritePrep:;;;ldp#0;sarAR1,AR4; copy the stack pointer into AR4nop;no;mar*,AR4; make AR4 the active address registersbrk4; point to src on stack;larAR3,*—; get ptr to src in AR3lacc*; get ptr to dest in accumand#0FF80h; mask out low seven bitssacb;dint; can only write to ROM from RAM;;; Biquard filtercode; Tonedetect and Manualoverride for moving; outofcurrentoperating mode into remote calibration.include aglobals.i.include qmacros.i.sect'.text'.i-fRamRun.sect ',ramcom'.endif; RamRunShortOverrideDuration.set(700/5); in milliseconds, SW1ON.set0dh; Bit test (2) for SW1ON in Gate Array. TRM_OFF.set0fffdh;FbqBiQuadFilter0; coefficients & states allocated in common sectionFbqBiQuadFilter1; coefficients & states allocated in common section*********************************************************************************The Biquard Filter Routine ************************************************************************************SAMPLE_BITS.set16ENERGY_SCLER_SHIFT.set6_bq;;entry;;accontains the incoming speech in lower 16 bits, and returns the;outgoing accb contains a pointer to the biquard structure;; returns;;acc contains result (filtered sample in low 16 bits);accb contains accumulated energy; the biquard structure is updated with the most recent state variables; and energy;; in use;;ar3 handles the coefficient sin order; b2,b1,,b0,a2,and a1;ar4 handles the state variables in order; x2,x1,y2,y1, and energy; This biquard filter takes advantage of the fact that the coefficients; and state variables are accessed in or nearly in order. One index register; is used to walk through the coefficients, and second one is used to walk; through the state variables. The coefficients and state variables must be;contained in a BiQuad struct declared in C. The structure must not vary;; Trashes;acc,accb,ar3,ar4, treg0,arp, spm;;structBiQuad {shortb2;;shortb1;;shortb0;;shorta2;;shorta1;;Speechx2;; Speechx1;;Speechy2;;Speechy1; ;longnrg;;};;typedef struct-BiQuad BiQuad, * BiQuadPtr;state_ar4.setar4coef_ar3.setar3exacr; put input speech word into accbsammcoef_ar3; this generates a pipeline warning, ignore itlarpceof_ar3nopcpl#0, *bcndSetUpStatePtr, ntc; filter is on, because b2 (1st coeff) isn't zerozac; return w/input speech word in accexar; and zero energy in accbbBqDoneSetUpStatePtr:sammstate_ar4; this generates a pipeline warning, ignore itlarpstate_ar4npadrk5; the states are after coeffs, which are 5 words long;A=b2* x2;A___eq_b2_X_x2:It*+,coef_ar3; x2 afterwards state_ar4->x1, ARP=coef_ar3mpy*+,state_ar4; *b2 aftwards coef_ar3->b1, ARP=state_ar4pac; A+=b1 *x1;A___$pl_{13}$eq_b1_X_x1:It*,coef_ar3;

x1aftwards state_ar4->x1, ARP=coef_ar3mpy*+,state_ar4; *b1 afterwards coef_ar3->b0, ARP state_ar4apac;x2=x1;;x1=*(input++);x1___eq_speech:exar; stashA in accb, get speech input in accsacl*—; x1=inputaftwards state_ar4->x2, ARP=state_ar4x2_eq_x1;lammTREG0; we still havethe old x1 in the T reg, sowe use itsacl*+; x2=x1 aftwards state_ar4->x1, ARP=state_ar4lacb; get Aback into acc;A +=b0*x1;A___pl_eq_b0_X_x1:It*+,coef_ar3; x1 aftwards state_ar4->y2, ARP=coef_ar3mpy*+, state_ar4; *b0 aftwards coef_ar3->a2, ARP=state_ar4apac;A -=A2*y2;A___mi_eq_a2_X_y2:It*+,coef_ar3; y2 afterwards state_ar4->y1, ARP=coef_ar3mpy*+, state_ar4; 8a2 aferwards coef_ar3->a1, ARP=state_ar4space;A —=a1*y1;A___mi_eq_a1_X_y1:It*,coef_ar3; y1 afterwards state_ar4->y1, ARP=coef_ar3mpy*, state_ar4; *a1 afterwards coef_ar3->a1, ARP=state_ar4spac;A+=8192;addk#8192;A>>=(SAMPLE_BITS-2);bsarSAMPLE_BITS-2;y2=y1;;y1=A;y1_eq_A_:sacl*—; first store accum A in y1 afterwards state_ar4->y2, ARP=coef_ar3sac; and store A in accb as welly2_eq_old_y1:lammTREG0; then store oil y1 (from treg0) in y2sacl*+; then point to y1 again, which is equal to Amar*+: now pointto low word of nrgmar*+; now pointto high words of nrglacc*—, 16, get high word in acc, point to low wordadds*—; add in low word, point back to y1 (A);A*= A;spm3; shift PREG>>6 when adding to ACCzpr; zero the product register so nothing is accumulatedsqra*+; get y1 again (A) and load into TREG0, sqr, result in preg;A>>= ENERGY_SCALER_SHIFT;;energy+=A;apacsal*+; store the low word of nrgsach*; store the high word of nrgexar; return w/result in acc; and energy in accbBqDone;spm0; set PREG auto-shift back to non-eret;****************************************************;_fbq;;acc contains the incoming speech, and returns the outgoing;accb contains a pointer to the biquard structure in use,;ar3 handles the coefficients in order; b2,b1,,b0,a2,and aa1;ar4 handles the state variables in order; x2,x1,y2,y1, and energy; This biquard filter takes advantage of the fact that the coefficients;and state variables are accessed in or nearly in order. One index register;is usedto walk through the coefficients, and a second one is used to walk;;through the state variables. The coefficients and state variables must be;contained in a BiQuard struct declared in C. The structure must not vary-;;structBiQuad{;shortb2;;shortb1;;shortb0;;shorta2;;shorta1;;Speechx2;;Speechx1;;Speechy2;;Speechy1;; longnrg;;};;typedef structBiQuard BiQuad,* BiQuadPtr;SAMPLE_BITS.set16ENERGY_SCALER_SHIFT.set6state_ar4.setar4coef_ar3.setar 3exarsammstate_ar4; this generates a pipeline warning, ignore itsammcoef_ar3; this generates a pipeline warming, ignore itmar*,state_ar4adrk5; the states are after coeffs, which are 5 words long;A=b2*x2;;A___eq_b2_X_x2:It*+,coef_ar3; x2 afterwards state_ar4->x1, ARP=coef_ar3mpy*+,state_ar4; *2 aftwards coef_ar3->b1, ARP=state_ar4pac;A+=b1*x1;;A___pl_eq_b1_X_x1:It*+,coef_ar3; x1 afterwards state_ar4->x1,ARP=coef_ar3mpy*+,state_ar4; *b1 afterwards coef_ar3->b0, ARP=state_ar4apac;x2=x1;;x1=*(input++);;x1___eq_speech:exar; stashA in accb, get speech input in accsach*—; x1=inputafterwards state_ar4->x2, ARP=state_ar4;x2_eq_x1:lammTREG0; we still have the oil x1 in the T reg, so we use itsacl*+; x2=x1 afterwards state_ar4->x1, ARP=state_ar4lacb; get Aback into acc;A+=b0 *x1;;A___pl_eq_b0_X_x1:It*+,coef_ar3; x1 afterwards state_ar4->y2, ARP=coef_ar3mpy*+, state_ar4; *b0 afterwards coef_ar3->a2, ARP=state_ar4apac;A -=a2 * y2;;A___mi_eq_a2_X_y2:It*+,coef_ar3; y2 afterwards state_ar4->y1, ARP=coef_ar3mpy*+, state_ar4;*a2 afterwards coef_ar3->a1, ARP=state_ar4spac;A —=a1 * y1;;A___mi_eq_a1_X_y1:It*,coef_ar3; y1 afterwards state_ar4->y1, ARP=coef_ar3mpy*, state_ar4; *a1 afterwards coef_ar3->a1, ARP =state_ar4spac;A +=8192;addk#8192;A>>=(SAMPLE_BITS-2);bsarSAMPLE_BITS-2;y2=y1;;y1=A;;y1_eq_A_:sacl*—; first store accum A in y1 afterwards state_ar4->y2, ARP coef_ar3sacb; and store A in accb as well;y2_eq_old_y1;lammTREG0; then store old y1 (from treg0) in y2sacl*+; then point toy1 again, which is equal to Amar*+; now point to low word of nrgmar*+; now point to high word of nrglacc*—, 16; get high word in acc, point to low wordadds*—; add in low word, point back to y1 (A);A*= A;spm3; shift PREG>>6 when adding to ACCzpr; zero the product register so nothing is accumulatedsqra*+; get y1 again (A) and load into TREG0, sqr, result n preg;A>>= ENERGY_SCALER_SHIFT;;energy+=A;apacsacl *+; store the low word of nrgsach *—; store the high word of nrg and point back to low wordmar *—; pointback to y1 (A)lacc *,16; get result from y1, shift into high word of accspm0ret*******************************************************************;_____;_____;********************************************************************_ModeInOutB.set 0;_ModeNC2.set1;_ModeDynamics.set2;ToneDetect:sacb; speech word is in high word of acc, store it1dpk_commonOverrideEnableacl_commonOverrideEnablebcndBailOut,eqlacbldpk_commonLastSpklnsach_commonLastSpkln; store the high wordsmmrAR3,_commonTempAR3smmrAR4,_commonTempAR4; store incoming mic sample in acc (already shifted into hi word)lacc#_fbqfilter0; pointto filter data w/accbexar; get signal word back in acccall_fbq; call the filter routineldpk_commonLastSpklnlacc_commonLastSpkln, 16sacb; store incoming mic samplein acc (already shfited into hiword)lacc#_fbqfilter1; pointto filter data w/accbexar; get signal word back in acccall_fbq; call the filter routineldpk_commonDummyLoadrpt_commonDummyLoadnop;uncomment this line to remove tone detect spike but keep constant load;bRResetEnergyAndExitldpk_commonOverridgeCountlacl_commonOverrideCountadd#1sacl_commonOverrideCountsub#40bcndExitToneDetect,leg; we come here every 5 ms to look at the accumulated energyldpk_commonShortOverrideTimeOutlacc_commonShortOverrideTimeOutbcndAlre adyTimedOut, eqsub#1; subtract until we get to zero, then stopsacl_commonShortOverrideTimeOutAlreadyTimedOut:ldpk_commonOverrideThresholdit_commonOverridgeThresholdmpy_commonOverridgeThreshold; square the thresholdpacsacbldpk1+_fbq0nrglacc1+_fbq0nrg,16; get high word in accldpk_fbq0nrgadds_fbq0nrg; add in low wordsbb; compare nrg with threshodlbcndResetAndExit,It; branch if commonOverrideThreshold>fbq0nrgldpk1+_fbqnrglacc1+_fbq1nrg,16; get high word in accldpk_fbq1nrgadds_fbq1nrg; add in low wordsbb; compare nrg with thresholdbcndResetAndExit,It; branch if commonOverridgeThreshold>fbq1nrg; we only get to here if both filters have accumulated energy; greater than the overrideThresholdPoundDetected:ldpk_commonShortOverridgeTimeOut; see if it's only been a short time since last overridelacc_commonShortOverrideTimeOutbcndUseShortDuration, eqldpk_commonOverrideTime; use the standard override timelasl_commonOverrideTimesacbbCompareDurationUseShortDuration:lack#ShortOverrideDuration; use the shorter duration if it's only been a short time since last settingsacbCompareDuration:ldpk_commonOverrideDuration; increment the current durationlacl_commonOverrideDurationadd#1sacl_commonOverrideDurationsbb; see if the duration (in acc) exceeds the required time (in accb) bcndResetEnergyAndExit, it; set the filter's accumulated energy back to zero and keep on goingOverrideDetected;; both bands have exceeded the threshold for the requisite timeldpk_commonDtmfAtWarmBootsplk #1,_commonDtmfAtWarmBoot; set flag to Trueldpk 1+_fbq0nrg; pointto filter 0 accumulated energylacc 1+_fbq0nrg, 16; get high word in accldpk_fbq0nrg; point to filter 0 accumulated energyadds_fbq0nrg; add in low wordldpk1+_commonLastFbq0Nrgsach1+_commonLastFbq0Nrg; store high wordldpk_commonLastFbq0Nrgsacl_commonLastFbq0Nrg; store low wordldpk1+_fbq1nrg; pointto filter 0 accumulated energylacc1+_fbq1nrg, 16; get high word in accldpk_fbq1nrg; point to filter 0 accumulated energyadds_fbq1nrg; add in low wordldpk1+_commonLastFbq1Nrgsach1+_commonLastFbq1Nr; store high wordldpk_commonLastFbq1Nrgsacl_commonLastFbq1Nrg; store low wordbResetEnergyAndExit; now we wait until silence to rebootResetAndExit;ldpk_commonDtmfAtWarmBoot; see if override was triggered duringlacc_commonDtmfAtWarmBoot; previous tonebcndContinueReset,eqldpk_commonOperatingModelacc_commonOperatingModesub#_ModeNC2bcndDynamicsReset,neqNC2Reset:apl#TRM_OFF,PMST; make sure TRM bit is offb_c_int0; warm boot if we're in NC2DynamicsReset:ldpk_overrideDetected; no rebootlacc#1sacl_overrideDetectedContinueReset:sacldpk_commonOverrideDurationsacl_commonOverrideDuration; reset duration, in units of 5 millisecondsResetEnergyAndExit;zacldpk_commonOverrideCountsacl_commonOverrideCount; reset counterldpk_fbq0nrgsacl_fbq0nrgldpk_fbq0nrg+1sacl_fbq0nrg+1; reset accumulated energyldpk_fbq1nrgsacl_fbq1nrgldpk_fbq1nrg+1sacl_fbq1nrg+1; reset accumulated energyExitToneDetect:1mmrAR3,_commonTempAR3lmmrAR4,_commonTempAR4BailOut:ldpk0; put DP back like NC2 likes itret; ----------------------------------;;-------------------------------;
ManOverrideDetect;;smmarAR3,_commonTempAR3;larpAR3;lrlkAR3,_commonManOverride Time;lacc*;add#1;sacl*; increment timesub#0ffffh; if weare at ffff ie appro 8s then resetbondTEST_SWITCH,NEQ;;RESET_OVER;;zac; zero over ride timeandsal*; over ride countlrlkAR3,_commonManOverrideCount;sacl*;;TEST_SWITCH;;bitPA4,SW1ON; Test SW1ON status in Gate Array (bit 2).

bcndSWITCH_IN,TC; Switch down then branchSWITCH_OUT;;lrlkAR3,_commonSwitching;lacc*;bcndNO_CHANGE, EQ;azc;sacl*; resetswitchinbNO_CHANGE; exit the switch is offSWITCH_IN;;lrlkAR3,_commonSwitchin;lacc*;bcndNO_CHANGE,NEQ;lacc#1; sacl*; resetswitching; increment counterslrlkAR3,_commonManOverrideCount;lacc*;add*1;sacl*;sub#1;bcnd NO_SYNC,GT; Don't restart the clockirikAR3,_commonManOverrideTime; if counter bigger than onezac;sacl*;NO_SYNC;;lklkAR3,_commonManOverrideCount;lacc*;.ifLab;sub#3;.else;sub #6;.endif;bcndNO_CHANGE.LT;lacc#1lrlkAR3,_commonDtmfAtWarmBoot; sacl*;apl#TRM_OFF,PMST; make sure trim bit is OFFb_c_int0; warm boot if we're in NC2NO_CHANGE;;1mmrAB3,_commonTempAR3;ret;;------------------------------ -----; end of manual override detect;; DTMF tone generation;.global_Dtmf0Start.global_Dtmf0End.global_Dtmf1Start.global_Dtmf1End.global_Dtmf2Start.global_Dtmf2End.global_Dtmf3Start.global_Dtmf3End.global_Dtmf4Start global_Dtmf4End.global_Dtmf5Start.global_Dtmf5End.global_Dtmf6Start.global_Dtmf6E nd.global_Dtmf7Start.global_Dtmf7End.global_Dtmf8Start.global_Dtmf8Endglobal_Dtmf 9Start.global_Dtmf9End.global_DtmfStarStart.global_DtmfStarEnd.global_DtmfPoundStar t.global_DtmfPoundEndSaveRomSpace.set1; leave out star and pound tones to save space_Dtmf1Start.word00000h, 00000h, 00000h, 00000h, 00020h, 0fe1ah, 0f809h, 0fleah; 7.word00430h, 0389ch, 04f9ch, 01222h, 0bd1ah, 09064h, 09c07h, 0df5eh;4 15.word01ce8h, 02efch, 023330h, 012e3h, 02490h, 04aafh, 05d94h 03ba0h;12 23.word0e7d3h, 097ebh, 08002h, 0aea0h, 0fa34h, 038e8h 04965h, 029d7h; 31.word005b3h, 0fbedh, 00a90h, 01292h, 0f73fh, 0c203h, 09e2ch, 0af7eh;28 39.word0f12dh, 03d54h, 06cc5h, 05df5h, 019c6h, 0db81h, 0c4c6h, 0d8f9h; 47.word0f70ch, 0f9c5h, 0e711h 0d9bfh, 0f36dh, 03213h, 06d7fh, 07629h; 55.word03796h, 0dab8h, 09713h, 0928eh, 0c74eh, 004c8h, 02257h, 019bhf; 63.word0087dh, 00dach, 02c4ch, 04407h, 02fdbh, 0ee1ch, 0a4a6h, 0878ah; 71.word0ad41h, 0f8ffh, 03d72h, 05803h, 03b89h, 00bdbh, 0f58dh, 0fe24h; 79.word00d10h, 00154h, 0d73eh, 0b10eh, 0b823h, 0f359h, 0401ch, 073c6h; 87.word0698fh, 0223fh, 0d606h, 0b29ch, 0c171h, 0e9a5h, 0fc08h, 0f29fh; 95.words0e35eh, 0f028h, 02441h, 05c90h, 06ba9h, 03818h, 0dd97h, 0946eh; 103.word08851h, 0bcc1h, 003beh, 02e97h, 02d5ch, 015e1h, 00d85h, 2024h; 111.word03744h, 02e03h, 0f648h, 0af42h, 08c9bh, 0ab70h, 0f77dh, 04094h; 119.word0628ah, 04a10h, 01119h, 0eccah, 0ec03h, 0fe06h, 000d6h, 0e312h; 127.word0c00fh, 0bec8h, 0f06ch, 03a84h, 072a4h, 07069h, 029e6h, 0d4d9h; 135.word0a573h, 0ae45h, 0dc68h, 0fe83h, 000ceh, 0f26ch, 0f4aah, 01a85h; 143.word04dfhd, 06293h, 0395bh, 0e4f6h, 0994fh, 08675h, 0b55ch, 0fe7ah; 151.word03353h, 03br7h, 02159h, 00b97h, 012dfh, 02783h, 02826h, 0fde6h; 159.word0bd7ah, 097e2h, 0adc9h, 0f2cbh, 03dcch, 068ceh, 0535fh, 0159eh; 167.word0e4b2h, 0d77eh, 0ebe8h, 0fbedh, 0ed1fh, 0cf2dh, 0c590h, 0ec67h, 175.word0340fh, 06f00h, 071edh, 0327eh, 0d9ffh, 09e8dh, 0a0d9h, 0d0d9h; 183.word00117h, 010f4h, 0045dh, 0fc53h, 01365h, 03ebeh, 056bdh, 03930h; 191.word0ebb7h, 09ed1h, 084b6h, 0f9d2h, 03830h, 04a2dh, 02d72h; 199.word00c1eh, 005deh, 015b3h, 01dfch, 0020eh, 0cad2h, 0a21ch, 0af9bh; 207.word0f1d2h, 03eb0h, 06cd2h, 05ed9h, 01c2bh, 0de49h, 0c781h, 0d7f8h; 215.word0f3f4h, 0f548h, 0df47h, 0d131h, 0eb47h, 02bach, 0683ah, 072cdh; 223.word038c6h, 0dcd7h, 09983h, 0923fh, 0c459h, 00212h, 01daah, 01648h; 231.word006ech, 00e5fh, 03049h, 0498eh, 036feh, 0f378h, 0a69bh, 08760h; 239.word0ac23h, 0f676h, 039e1h, 055dfh, 03b69h, 00e4eh, 0fa44h, 0027dh; 247.word01132h, 0046fh, 0d7abh, 0af92h, 0b411h, 0ee4ah, 03bdbh, 07121h; 255.word06964h, 024f0h, 0daa2h, 0b828h, 0c518h, 03921h, 0f9ech, 0ee29h; 263.word0de81h, 0ec90h, 021efh, 05c9fh, 06e0bh, 03cb0h, 0e32fh, 098bch; 271.word089aah, 0baeeh, 0fecah, 02albh, 029bbh, 01275h, 00cach, 0217fh; 279.word03aa3h, 0321dh, 0f9b8h, 0b07ch, 08ae0h, 0a796h, 0f18ah, 03b88h, 287.word05f7ch, 048d7h, 01318h, 0f041h, 0ef59h, 00158h, 00266h, 0e239h; 295.word0bdc1h, 0baabh, 0ecach, 037d3h, 0711fh, 07131h, 02d3fh, 0d9feh; 303.word0a9d4h, 0b153h, 0 dc48h, 0fcf7h, 0fe11h, 0ede1h, 0f146h, 018e2h; 311.word04eeh, 0662eh, 03dfdh, 0e9cch, 09ae5h, 083f5h, 0b1c0h, 0fbfeh; 319.word030e1h, 0392fh, 0203eh, 00c7bh, 01595h, 02b25h, 02b86h, 0006ah; 327.word0bd44h, 0940eh, 0a85ah, 0eeeeh, 03b72 h, 066e2h, 05571h, 0183eh; 335.word0e879h, 0ddaeh, 0ee4ah, 0fdbfh, 0ec26h, 0cbdch, 0c2cfh, 0e81bh; 343.word0308bh, 06d43h, 073b1h, 03597h, 0deb7h, 0a30dh, 0a2d7h, 0d206h; 351.word0fde8h, 00c77h, 0fff5h, 0f898h, 012cfh, 040c0h, 05b9ch, 03eb1h; 359.word0f121h, 0a11dh, 08233h, 0a9e6h, 0f5d0h, 034a9h, 047b7h, 02d4ah; 367.word00caeh, 0088ah, 0193eh, 021cch, 004aeh, 0caf2h, 09f8fh, 0aaf2h; 375.word0ec66h, 039fah, 06b20h, 06043h, 020a2h, 0e2ebh, 0cb12h, 0dc1ch; 383.word0f576h, 0f3dah, 0dc74h, 0cc7ah, 0e6deh, 0293ah, 06902h, 075d7h; 391.word03cc5h, 0e1f0h, 09cfah, 09429h, 0c3e0h, 0fdadh, 01964h, 012c9h; 399.word003a5h, 00de9h, 0326ch, 04e12h, 03c92h, 0f6e7h, 0a82ah, 084f3h; 407.word0a5d1h, 0f19eh, 03681h, 0525dh, 03aa4h, 01065h, 0fe0eh, 006ffh; 415.word014edh, 0067dh, 0d610h, 0ab96h, 0aef8h, 0e92dh, 03762h, 06efdh; 423.word06a87h, 0286ch, 0e016h, 0bc65h, 0c845h, 0eaffh, 0f8f9h, 0eb6dh; 431.word0da4dh, 0e8aah, 01ffch, 05d1dh, 07140h, 04112h, 0e7d9h, 09c25h; 439.word088b9h, 0b795h, 0fc09h, 024f6h, 02535h, 0101ch, 00b8dh, 0234eh; 447.word03da9h, 03536h, 0fd68h, 0b314h, 08a32h, 0a52eh, 0eda9h, 0361fh; 455.word05c95h, 047b6h, 014fdh, 0f4e2h, 0f4dbh, 005c6h, 00560h, 0e36dh; 463.word0bbb0h, 0b6d8h, 0e67fh, 03380h, 06e87h, 07104h, 03351h, 0e008h; 471.word0afa5h, 0b674h, 0dcf5h, 0fb52h, 0fa8eh, 0ea10h, 0edbeh, 0171ah; 479.word05091h, 06987h, 04347h, 0ee7ah, 09d73h, 08463h, 0aeffh, 0f77dh; 487.word02c06h, 0357fh, 01d73h, 00b98h, 0169fh, 02dc3h, 02fd3h, 004e1h; 495.word0bee6h, 0921ch, 0a420h, 0e8cah, 03638h, 06345h, 05576h, 01ba2h; 503.word0ec6eh, 0e22bh, 0f384h, 0038h, 0ec2fh, 0c9cbh, 0bd9fh, 0e51ch; 511.word02f43h, 06c9eh, 075f2h, 039ceh, 0e331h, 0a7a2h, 0a53eh, 0d253h; 519.word0fc40h, 0084ch, 0fc2eh, 0f560h, 0104ah, 04019h, 05d22h, 04357h; 527.word0f646h, 0a43dh, 08342h, 0a881h, 0f1eeh, 02ff1h, 042d5h, 02ad5h; 535.word00d71h, 00ae1h, 01d6fh, 02538h, 00732h, 0caa3h, 09c78h, 0a697h; 543.word0e74dh, 0363dh, 06981h, 06186h, 022d7h, 0e5beh, 0cff3h, 0de79h; 551.word0f626h, 0f2c1h, 0d83bh, 0c88fh, 0e300h, 026c7h, 0689fh, 07837h; 559.word041b9h, 0e718h, 0a1e3h, 096deh, 0c3f2h, 0fab5h, 01731h, 018d7h; 567.word01173h, 01000h, 00bfbh, 00422h, 00231h, 00291h, 004a6h, 004adh; 564 575__Dtmf2Start:.word0003dh; 572__Dtmf1End;.word0009ah, 00165h, 0ff36h, 0f2b3h, 0e39ah, 0f367h, 02c98h; 573 583.word05a63h, 04523h, 0f3e7h, 09e3fh, 086a8h, 0bc33h, 00651h, 02b18h; 591.word02216h, 0110fh, 0218dh, 04b1ch, 0581bh, 023b3h, 0c719h, 08776h; 599.word096b0h 0dec7h, 0207fh, 030a6h, 017a2h, 0099ch, 02371h, 0472dh; 607.word0408dh, 0fba1h, 0a4b1n, 0831eh, 0b266h, 003fbh, 037a8h, 0374dh; 615.word0168ah, 00a20h, 0251ah, 03aech, 02107h, 0d56eh, 0915dh, 0966eh; 623.word0dd3h, 02bffh, 04ee6h, 03804h, 00f04h, 00700h, 01e2bh, 027b8h; 631.word0ff32h, 0b75ah, 090bch, 0b5e6h, 008deh, 04c9ch, 571fh, 02b3ch; 639.word0fce0h, 0f9ddh, 00ffeh, 00eb0h, 0e14dh, 0a769h, 0a18dh, 0de5ch; 647.word03064h, 0636eh, 0523ah, 0127bh, 0e87bh, 0ee37h, 0028fh, 0fb8fh; 655.word0cc6bh, 0a739h, 0be8eh, 0099dh, 05848h, 07008h, 03f3dh, 0f7dbh; 663.word0d5bch, 0e38ch, 0fa47h, 0ed45h, 0c382h, 0b3f1h, 0e1feh, 0363ch; 671.word072f8h, 0682ah, 01ec4h, 0d6f6h, 0c432h, 0dd07h, 0f46dh, 0e647h; 679.word0c5c4h, 0cbdbh, 008ddh, 058f0h, 07b69h, 04daah, 0f55ch, 0b865h; 687.word0b81bh, 0df0bh, 0f697h, 0e568h, 0d00bh, 0e66eh, 02e3dh, 071a7h; 695.word07245h, 02908h, 0cbabh, 0a08ch, 0ba65h, 0eb90h, 0fe3bh, 0eda7h; 703.word0e21fh, 00551h, 04a52h, 073e7h, 0526dh, 0f7b6h, 0a89eh, 0998ch; 711.word0c9b8h, 000bdh, 00dbeh, 0faf7h, 0faf7h, 0f71ah, 02122h, 05a4eh, 06690h; 719.word02974h, 0c8d7h, 08bf1h, 09e57h, 0e3c2h, 01868h, 01cd8h, 0065ch; 727.word00866h, 031d0h, 058cdh, 0485dh, 0f926h, 0a30ah, 086f4h, 0b87fh; 735.word00437h, 02e20h, 0259dh, 00bc5h, 0129eh, 038cch, 04ce8h, 02444h; 743.word0cce5h, 08c12h, 0962ch, 0ddc9h, 02603h, 03eech, 02731h, 00a82h; 751.word01479h, 0336eh, 03428h, 0feb5h, 0ade7h, 08b41h, 0b61ch, 005bdh; 759.word0426ah, 04703h, 01faah, 003c0h, 010a9h, 02748h, 018ebh, 0da68h; 767.word96b3fh, 09b47h, 0dd80h, 02e5dh, 058c1h, 044c3h, 01062h, 0f714h; 775.word00681h, 01665h, 0fd9ch, 0c0b3h, 09b94h, 0bb0bh, 00a19h, 051ffh; 783.word0649dh, 035e7h, 0f7a8h, 0e6cbh, 0f9b1h, 00454h, 0e666h, 0b2f3h; 791.word0a948h, 0e157h, 03649h, 06d02h, 05f98h, 01a67h, 0de5eh, 0d856h; 799.word0f050h, 0f805h, 0d7a2h, 0b36ah, 0c2e5h, 00b45h, 05b0bh, 076a7h; 807.word047e9h, 0f65eh, 0c679h, 0cd90h, 0cd90h, 0ece8h, 0f2c3h, 0d395h, 0c13eh; 815.word0e4bfh, 033abh, 07490h, 06e9bh, 02308h, 0cef2h, 0af99h, 0c975h; 823.word0efc6h, 0f1bfh, 0d7ehd, 0d447h, 00623h, 0550eh, 7d87h, 0542eh; 831.word0f6adh, 0ad86h, 0a6f8h, 0d2ech, 0fa9ah, 0f953h, 0e34ah, 0edc8h; 839.word02855h, 06736h, 06d94h, 02854h, 0c99bn, 0964ch, 0aca1h, 0e8e7h; 847.word00cc0h, 00550h, 0f47fh, 00704h, 03f9eh, 0698fh, 04f7ch, 0f75eh; 855.word0a077h, 08c00h, 0c06dh, 00383h, 01fc8h, 01104h, 00214h, 01adah; 863.word04aadh, 059e6h, 024c8h, 0c9b1h, 08b1fh, 09888h, 0e019h, 01fe4h; 871.word02ec7h, 0167fh, 0092ch, 024e3h, 048aeh, 04021h, 0fb16h, 0a6b2h; 879.word0879bh, 0b67eh, 005a5h, 037d8h, 0364bh, 014dah, 00a39h, 024f2h; 887.word03a35h, 01f37h, 0d42fh, 092eeh, 097ffh, 0 de21h, 02a9dh, 04d0eh; 895.word036c4h, 00bdeh, 005fdh, 01e3ah, 0261bh, 0fdf3h, 0b628h, 091bdh; 903.word0b665h, 007a7h, 04c81h, 056e5h, 02976h, 0fd3ah, 0fbffh, 011dfh; 911.word01051h, 0dfe6h, 0a56fh, 0a0cch, 0df69h, 03342h, 064ebh, 0532ah; 919.word01463h, 0e98ah, 0eech3h, 033e9h, 0fb71h, 0cc47h, 0a739h, 0be56h; 927.word00b60h, 05876h, 06e7eh, 03d8bh, 0f568h, 0d56fh, 0e3adh, 0f9b9h; 935.word0ed44h, 0c23dh, 0b4f1h, 0e417h, 0361ch, 071fbh, 06745h, 01bd0h; 943.word0d4f6h, 0c418h, 0dc31h, 0f5d8h, 0e502h, 0c44bh, 0cba1h, 00906h; 951.word05b9fh, 07ca3h, 04f11h, 0f51eh, 0b66bh, 0b928h, 0dffbh, 0f603h; 959.word0e531h, 0cfd7h, 0e755h, 02f71h, 0721ah, 0715ch, 0272eh, 0cb25h; 967.word0a0c3h, 0ba9ch, 0ec36h, 0ff41h, 0ed99h, 0e298h, 00600h, 04b43h; 975.word074c3h, 052d4h, 0f778h, 0a56dh, 097f1h, 0cae1h, 000a5h, 00d07h; 983.word0fa72h, 0f77fh, 021f3h, 05a76h, 06582h, 026dbh, 0c6eeh, 08dadh; 991.word90fe4h, 0e42dh, 019f3h, 01bbch, 005ach, 008d7h, 0329ch, 059f0h; 999.word047a2h, 0f855h, 0a22ch, 0875bh, 0b9c5h, 00471h, 02de7h, 0243bh; 1007.word00af8h, 012f9h, 03901h, 04cfdh, 023deh, 0ccc8h, 08ae5h, 094d3h; 1015.word0de14h, 02661h, 03eb5h, 0269dh, 00b4ah, 015e0h, 0355eh, 03583h; 1023.word01fd01h, 0aadah, 087f8h, 0b559h, 007d5h, 0440bh, 047a7h, 01f95h; 1031.word00423h, 01194h, 0278ah, 01889h, 0d973h, 09b7dh, 09cb3h, 0de70h; 1039.word02eb8h, 05925h, 04427h, 00ee6h, 0f799h, 007b8h, 0172ah, 0fd5fh; 1047.word0bfe3h, 09b87h, 0baa2h, 009d2h, 05263h, 06324h, 03301h, 0f666h; 1055.word0e773h, 0faefh, 004e1h, 0e686h, 0b289h, 0a9e6h, 0e266h, 0373eh; 1063.word06e71h, 05e4ch, 017e0h, 0dddfh, 0d93eh, 0f155h, 0fBch, 0d80ch; 1071.word0b53dh, 0c5e6h, 00b79h, 05a74h, 07671h, 04712h, 0f4b6h, 0c37Sh; 1079.word0cddah, 0eda7h, 0f096h, 0d299h, 0c0abh, 0e55fh, 034ech, 07492h; 1087.word06e0eh, 0213bh, 0cdf5h, 0b15fh, 0cb0bh, 0f05dh, 0f209h, 0d6eah; 1095.word0d4beh, 00805h, 05618h, 07bebh, 05288h, 0f7f9h, 0aeaah, 0a8a0h; 1103.word0d5beh, 0fab5h, 0f792h, 0e26bh, 0ed1dh, 02926h, 06973h, 06e42h; 1111.word02602h, 0c6e6h, 094bah, 0acc6h, 0e9fah, 00bf4h, 00439h, 0f32ah; 1119.word00703h, 04128h, 068b0h, 04dbah, 0f6b9h, 0a284h, 08f93h, 0c1afh; 1127.word00437h, 01febh, 00f70h, 000d9h, 01b51h, 0b8dh, 05a37h, 0243eh; 1135.word0c73dh, 088e0h, 0981ch, 0e09fh, 02030h, 03131h, 01f38h, 010f3h; 1132.word01249h, 00f19h, 007f3h, 00247h; 1140_ Dtmf3Start;.word0fffeh; 1144_Dtmf2End;.word0ff6bh, 0fcdch, 0f8f2h;1145.word00030h, 01be1h, 025a1h, 0fb94h, 0e016h, 0ff76h, 00f6fh, 0ebbdh; 1159.word0b277h, 0a14ch, 0e25ah, 033d8h, 05ac2h, 04705h, 01c49h, 01d28h; 1167.word03172h, 02318h, 0df24h, 096a9h, 967eh, 0dbe7h, 024edh, 03786h; 1175.word01a73h, 00c38h, 02b53h, 45a0h, 01f33h, 0c662h, 00845h, 09c33h; 1183.word0e8a6h, 01d80h, 01892h, 005dch, 198dh, 04dbdh, 05c82h, 01ae4h; 1191.word0bb83h, 0918dh, 0ba0fh, 0b1ch, 012b8h, 007dh, 0fea5h, 031cch; 1199.word06a68h, 05f64h, 00a1ch, 0b394h, 0a1f0h, 0d04bh, 0f9eeh, 0f2fch; 1207.word0df92h, 0f67h, 0458bh, 07640h, 0529eh, 0f620h, 0b4adh, 0bba7h; 1215.word0e442h, 0ed8fh, 0d101h, 0cc21h, 00562h, 57f8h, 07472h, 03d87h; 1223.word0eab3h, 0c702h, 0dd56h, 0f274h, 0dc05h, 0b860h, 0cb74h, 01910h; 1231.word0609ah, 066c3h, 025cfh, 0e65bh, 0e34bh, 0fa6dh, 0f37fh, 0c3dah; 1239.word0a623h, 0d218h, 025deh, 05eddh, 05079h, 01396h, 0f3cdh, 004d4h; 1247.word010d4h, 0e8beh, 0aa91h, 09e53h, 0de5eh, 02ff9h, 052ebh, 0363ch; 1255.word00a0bh, 00caah, 0272ch, 0193bh, 0d58eh, 09654h, 0a228h, 0ecffh; 1263.word030e9h, 03e5ah, 01d48h, 00e0dh, 02d20h, 04128h, 0164ah, 0bf20h; 1271.word08b5fh, 0add2h, 0fac5h, 02a1fh, 02260h, 00b71h, 01df1h, 04c31h; 1279.word04e52h, 0073ah, 0ac2fh, 08d78h, 0bfc6h, 0046eh, 018aeh, 00544h; 1287.word00506h, 0353eh, 064f2h, 04ec4h, 0f666h, 0a43bh, 09e45h, 0d651h; 1295.word0004dh, 0faadh, 0e956h, 00815h, 04e48h, 07255h, 044a4h, 0e662h; 1303.word0abeeh, 0bb31h, 0e85ch, 0f24ah, 0d930h, 0d994h, 01649h, 0636ah; 1311.word073c9h, 03052h, 03052h, 0dafch, 0bdb7h, 0d7feh, 0f02bh, 0db91h, 0be52h; 1391.word0d898h, 02696h, 069d9h, 063f1h, 01ae2h, 0dbceh, 0da8dh, 0f4d1h; 1327.word0ece2h, 0c172h, 0aea0h, 0e1e2h, 035bah, 065fah, 04ca5h, 00966h; 1335.word0ebcah, 0fe21h, 0069ah, 0e07dh, 0a92dh, 0a9cah, 0eedah, 03cbch; 1343.word0586fh, 0325dh, 00397h, 006cfh, 01e5dh, 00d3ch, 0cae5h, 09527h; 1351.word0ada1h, 0fcdch, 03cbfh, 041e0h, 01b23h, 00b29h, 0272ah, 03513h; 1359.word0064fh, 0b571h, 08ddah, 0ba59h, 0088bh, 03349h, 02682h, 00cd5h; 1367.word01ee2h, 0479bh, 04080h, 0f691h, 0a1e1h, 08ee3h, 0cb3fh, 01070h; 1375.word020b3h, 00b4dh, 00c47h, 039f8h, 06089h, 03f75h, 0e443h, 09b11h; 1383.word0a09bh, 0def4h. 0916h, 00187h, 0f22eh, 011c5h, 05457h, 06d64h; 1391.word033b2h, 0d51bh, 0d51bh, 0a17bh, 0b9cch, 0ec16h, 0f6bdh, 0df30h, 0e499h; 1399.word023eeh, 06b45h, 06ef4h, 02227h, 0ccb1h, 0b6a1h, 0d682h, 0effeh; 1407.word0dcddh, 0c490h, 0e5d1h, 035e3h, 07246h, 05e71h, 00c13h, 0d0f1h; 1415.word0d4a8h, 0f054h, 0e9afh, 0c141h, 0b80ah, 0f160h, 04407h, 06c69h; 1423.word04694h, 0fe84h, 0e2c9h, 0f6d4h, 0fee0h, 0d9a9h, 0a91dh, 0b429h; 1431.word0ff71h, 04a2ch, 05c17h, 02cadh, 0fd5fh, 0013dh, 015d5h, 00352h; 1439.word0c3b5h, 097b1h, 0b985h, 00befh, 0485dh, 044bfh, 018b3h, 00845h; 1447.word021b9h, 02ba6h, 0f922h, 0aafah, 090ech, 0c82dh, 0166dh, 03c22h; 1455.wod029cfh, 00d10h, 01ed8h, 041fah, 03265h, 0e63fh, 098b4h, 0949dh; 1463.word0d794h, 01a55h, 027a8h, 00fc6h, 0104fh, 03cc5h, 05acfh, 030c5h; 1471.word0d2b8h, 0906eh, 0a24ch, 0e7dbh, 0138fh, 009b5h, 0faeah, 01c24h; 1479.word05743h, 065a5h, 022e7h, 0c48bh, 09b01h, 0bcaah, 0f26ch, 0fbc8h; 1487.word0e67fh, 0ef0bh, 02dfdh, 06db1h, 0635fh, 0111fh, 0c015h, 0b13fh; 1495.word0d9c7h, 0f2d6h, 0dfbah, 0ce46h, 0f3b1h, 043bah, 0764dh, 054d4h; 1503.word0fe3eh, 0c605h, 0cf13h, 0ecbbh, 0e7cah, 0c36eh, 0c1f7h, 000f4h; 1511.word047f7dh, 06db7h, 03d0dh, 0f3c7h, 0db76h, 0f03dh, 0f95ah, 0d422h; 1519.word0aba3h, 0c23ah, 00f3eh, 05552h, 05de2h, 025b6h, 0f410h, 0f9b3h; 1527.word00d3fh, 0f887h, 0bd43h, 09d46h, 0c8feh, 01af0h, 05053h, 04479h; 1535.word012fah, 00397h, 01c3fh, 020a2h, 0ec77h, 0a46fh, 09739h, 0d646h; 1543.word023a7h, 04429h, 02a7ch, 00cb6h, 01d75h, 03a98h, 02675h, 0d96ah; 1151.word0944bh, 09d07h, 0e5cbh, 024ddh, 02d79h, 01256h, 0125ah, 03d13h; 1559.word0525fh, 01fdbh, 0c25h, 08cffh, 0abddh, 0f3f8h, 01bdfh, 00fe2h; 1567.word001d5h, 0228dh, 058ffh, 05aech, 01126h, 0b46fh, 0948dh, 0c22fh; 1575.word0fb2fh, 00432h, 0ef21h, 0fb67h, 0393eh, 06f58h, 05818h, 0ff15h; 1583.word0b301h, 0acc9h, 0dbbah, 0f71eh, 0e475h, 0d6e5h, 0003fh, 04f70h; 1591.word07817h, 04a6fh, 0ef7dh, 0bae7h, 0ca47h, 0ec37h, 0e709h, 0c6e8h; 1599.word0cc5dh, 00e22h, 05c76h, 06b3h, 03207h, 0e587h, 0d0fch, 0ea15h; 1607.word0f312h, 0d038h, 0aee4h, 0cd78h, 02047h, 06130h, 05c89h, 01ca3h; 1615.word0ebb9h, 0f2bah, 00609h, 0f007h, 0b810h, 0a2c2h, 0d89bh, 02b6fh; 1623.word05adeh, 043e1h, 00cb1h, 0fd5eh, 014b9h, 015a1h, 0dfedh, 09f7ch; 1631.word09ec2h, 0e4fdh, 031e3h, 04b43h, 02978h, 00947h, 01a19h, 032b1h; 1639.word018f8h, 0cc38h, 090b1h, 0a79bh, 0f480h, 02fc9h, 03303h, 013a7h; 1647.word01417h, 03ae0h, 04751h, 00f65h, 0b4ceh, 08a32h, 0b4b8h, 000c4h; 1655.word024b2h, 01599h, 00809h, 02805h, 057c0h, 04ecdh, 0fed3h, 0a804h; 1663.word09468h, 0cb72h, 0055eh, 00c5ch, 0f844h, 004c2h, 040a9h, 0d6dfh; 1671.word04bcfh, 0ed22h, 0a2f5h, 0a8d7h, 0d7eh, 0fbc3h, 0eabch, 0df4ch; 1679.word00d37h, 05947h, 075deh, 03b65h, 0e038h, 0b38dh, 0c838h, 0ee37h; 1687.word0e96dh, 0cbfch, 0d7d3h, 01d6ah, 067a6h, 06d8ch, 02701h, 0da39h; 1695.word0c9a3h, 0e6e0h, 0f02dh, 0cf4ch, 0b5d1h, 0dbe0h, 02fe5h, 06ab5h; 1703.word05a23h, 01163h, 0e026h, 0ea48h, 0fd5bh, 0e92fh, 0bbf0h, 0bc56h; 1700.word0fa3ch, 0fffdh; 1708_Dtmf4Start;.word0fffh; 1710_Dtmf3End;.word00004h, 00800h, 01232h, 00942h, 0e0cfh; 1711.word0bcb1h, 0c9a8h, 0093dh, 05613h, 07935h, 05073h, 0f2cah, 09ccfh; 1727.word08597h, 0b715h, 0036dh, 03630h, 03853h, 01b25h, 0076bh, 00f1bh; 1735.word1f37h, 017b3h, 0eafdh, 0b40eh, 0a2eh, 0ce19h, 01ca9h, 05f44h; 1743.word06c95h, 03583h, 0e1d9h, 0ae31h, 0b377h, 0e1eeh, 00e77h, 019b5h; 1751.word00bc9h, 00357h, 016e6h, 038ebh, 0439bh, 01d03h, 0d463h, 099c5h; 1759.word09ba4h, 0da39h, 02813h, 05b7bh, 05449h, 01530h, 0d962h, 0c516h; 1767.word0d8c0h, 0f8beh, 0ff09h, 0ef82h, 0e56bh, 0fd01h, 0342dh, 05fe4h; 1775.word0f0583fh, 01356h, 0ba5ch, 08a4ah, 0a400h, 0eeb5h, 034dfh, 05169h; 1783.word0389bh, 0069ah, 0ea48h, 0ef19h, 0ff21h, 0fceeh, 0de5ch, 0c241h; 1791.word0cd14h, 006b4h, 04f02h, 07203h, 05091h, 0fbfeh, 0aaefh, 0904eh; 1799.word0bbfdh, 002f0h, 0338fh, 03760h, 01978h, 00533h, 00ac9h, 01b9eh; 1807.word0bbfdh, 0ee77h, 0b8dch, 0a3f5h, 0ca51h, 015a7h, 05938h, 06c5fh; 1815.word038c3h, 0e3abh, 0ab9dh, 0ae2fh, 0deb9h, 00d58h, 01c70h, 0107dh; 1823.word004d1h, 01542h, 03581h, 042d3h, 0217ch, 0ds34h, 09e15h, 09b0ah; 1831.word0d5e0h, 0248ah, 05b88h, 0574ch, 01ad6h, 0dc8ah, 0c425h, 0d5e5h; 1839.word0f66fh, 000f9h, 0f2e8h, 0e811h, 0fbd7h, 02e58h, 05af5h, 056b2h; 1847.word01701h, 0c070h, 08d88h, 0a24ch, 0e947h, 02fc2h, 0517bh, 03b26h; 1855.word00836h, 0e8e0h, 0each7h, 0fd12h, 0fdd2h, 0e2e0h, 0c6a7h, 0cd17h; 1863.word00392h, 04af6h, 071aeh, 054aeh, 00179h, 0aebeh, 0910fh, 0b8b6h; 1871.word0fedch, 03143h, 038e3h, 01cd4h, 004f2h, 00770h, 0186eh, 01788h; 1879.word0f1d3h, 0bd65h, 0a64ah, 0c843h, 01285h, 058b5h, 06e2ch, 03b26h; 1887.word0e711h, 0adcdh, 0ab31h, 0da2fh, 00c1ah, 01e47h, 01425h, 00613h; 1895.word0133ch, 0320fh, 04103h, 023a5h, 0ddf4h, 09f38h, 0987eh, 0d2bah; 1903.word021c6h, 05a13h, 059f5h, 01ee0h, 0df3dh, 0c236h, 0d1c0h, 0f52ah; 1911.word00115h, 0f64fh, 0e926h, 0f895h, 02b1bh, 0582dh, 05918h, 01bb4h; 1919.word0c36dh, 08d95h, 09da2h, 0e2aeh, 02d6ah, 052ebh, 03dd2h, 0b26h; 1927.word0e92dh, 0e83ch, 0fa50h 0fee5h, 0e670h, 0c96ah, 0cc99h, 0ff52h; 1935.word0474bh, 07005h, 0576eh, 00612h, 0b0b2h, 08f44h, 0b37eh, 0fad0h; 1943.word031dbh, 03bd6h, 020dfh, 005a6h, 0050eh, 0154eh, 01722h, 0f5e7h; 1951.word0c1a9h, 0a6d4h, 0c4b5h, 00e52h, 0557ch, 06e27h, 0407eh, 0ec95h; 1959.word0af2bh, 0a888h, 0d629h, 00b96h, 020a4h, 0175ch, 007adh, 01082h; 1967.word02df4h, 03ed9h, 025e6h, 0e276h, 0a20bh, 0982dh, 0cdc8h, 01b33h; 1975.word05797h, 05cb8h, 0224eh, 0dff9h, 0c171h, 0ce69h, 0f224h, 00336h; 1983.word0f9feh, 0ec44h, 0f902h, 027b4h, 055e7h, 05a23h, 02706h, 0c85ch; 1991.word08ea1h, 09ae3h, 0df4bh, 028ffh, 052d6h, 042a3h, 00e41h, 0e9a2h; 1999.word0e4feh, 0f7aah, 0ff6fh, 0e989h, 0cdd8h, 0cd3bh, 0fc61h, 04325h; 2007.word0702fh, 05bc0h, 00ad6h, 0b494h, 08e03h, 0ae2bh, 0f70fh, 030d5h; 2015.word03dc0h, 023e6h, 00680h, 002b0h, 011dbh, 01676h, 0f86fh, 0c59bh; 2023.word0a923h, 0c2a9h, 009b4h, 052e4h, 06fb3h, 0459bh, 0f165h, 0afdeh; 2031.word0a5b7h, 0d160h, 007cch, 02151h, 019b0h, 008d6h, 00e2ch, 02997h; 2039.word03bdch, 02653h, 0e6a4h, 0a568h, 09789h, 0c8c2h, 01843h, 05870h; 2047.word05f28h, 02844h, 0e372h, 0bf52h, 0ca28h, 0ef28h, 004f4h, 0fd95h; 2055.word0efbh, 0f84ch, 02343h, 05213h, 05892h, 02289h, 0ccb2h, 0908bh; 2063.wod097c9h, 0db69h, 02700h, 05263h, 04661h, 011c3h, 0e8d4h, 0e27dh; 2071.word0f463h, 0ff84h, 0ecb1h, 0d04ah, 0cd07h, 0f877h, 03f18h, 06e19h; 2079.word05d6ah, 01058h, 0b95ch, 08d95h, 0a98fh, 0f1c5h, 02f5dh, 04129h; 2087.word0271bh, 006d3h, 0fffbh, 00df7h, 014c8h, 0faech, 0ca9ch, 0ab93h; 2095.word0c103h, 00536h, 04ea8h, 06f3bh, 049cfh, 0f61ah, 0b0a6h, 0a1b2h; 2103.word0ccdah, 00741h, 02335fh, 01dadh, 00bc9h, 00cdah, 02704h, 03ad1h; 2111.word0290eh, 0eb81h, 0a8e0h, 096d2h, 0c670h, 014c6h, 05431h, 06141h; 2119.word02e2bh, 0e6a7h, 0bf86h, 0c6b8h, 0ec0fh, 0044eh, 0ffd1h, 0f1ceh; 2127.word0f6dah, 01f97h, 04e1ah, 05843h, 02602h, 0d250h, 093b4h, 095d5h; 2135.word0d6e0h, 0240h, 052e1h, 04ab2h, 0161ch, 0e9cdh, 0e053h, 0f13ah; 2143.word0ff52h, 0f043h, 0d48ah, 0ce88h, 0f571h, 03a47h, 06b9eh, 05fcdh; 2151.word0161bh, 0bcd2h, 08cbch, 0a60eh, 0ed22h, 02b58h, 04173h, 02951h; 2159.word00791h, 0fe5ch, 00af2h, 014ach, 0fe51h, 0cdf9h, 0acdfh, 0be4bh; 2167.word001cf, 04d1ch, 070f2h, 04ffeh, 0faddh, 0b119h, 09e89h, 0c5d7h; 2175.word00319h, 024d5h, 020d8h, 00dc1h, 00ba5h, 023b0h, 0377eh, 02916h; 2183.word0f009h, 0ae64h, 097e7h, 0c169h, 00f38h, 05354h, 06381h, 031d1h; 2191.word0e9a1h, 0bdf3h, 0c2e3h, 0e7c7h, 0037eh, 00353h, 0f451h, 0f69fh; 2199.word01b76h, 049b6h, 05712h, 02a4eh, 0d918h, 0971eh, 0957ah, 0d38ch; 2207.word02047h 051c9h, 04d57h, 018eeh, 0e91ah, 0dca3h, 0ed06h, 0fe37h; 2215.word0f299h, 0d7f7h, 0cf74h, 0f2c0h, 036d9h, 069fah, 06379h, 01bfeh; 2223.word0bffeh, 08cb0h, 0a24ch, 0e890h, 02a3eh, 04315h, 02e0bh, 00932h; 2231.word0fb56h, 0075ch, 0114eh, 0ffa4h, 0d249h, 0b011h, 0becah, 0fdb0h; 2239.word04733h, 06f9bh, 0532fh, 00120h, 0b788h, 09ee9h, 0c3bch, 0005bh; 2247.word0246bh, 023c0h, 00f5ch, 00ab2h, 01ebeh, 03473h, 029a2h, 0f367h; 2255.word0b1bfh, 09831h, 0bfach, 00b07h, 0507fh, 065ech, 03633h, 0ecaeh; 2263.word0be7h, 0e587h, 004ffh, 006cbh, 0f914h, 0f821h, 018edh; 2271.word04646h, 056f7h, 0301ah, 0e7bbh, 0b702h, 0bd78h, 0d52dh, 0dbcbh; 2268.word0each6h, 0fc39h, 00011h, 0000fh, 2276__Dtmf5Start;.word00001h;2280__Dtmf4End;.word00008h, 0ff9bh, 00028h;2281.word0080ah,019f8h, 01debh, 0f31ch, 0b477h, 0a562h, 0de8h, 02fabh; 2295.word06b00h, 05eaeh, 01771h, 0d7b3h, 0cb6fh, 0e4a2h, 0f599h, 0e46eh; 2303.word0cf62h, 0e4d9h, 02a0bh, 06c0bh, 06be3h, 01f93h, 0941ah; 2311.word0b57eh, 0f73ch, 01bc8h, 00fcbh, 0fd08h, 00be3h, 036e2h, 0bf26h, 04b59h; 2319.word01f17h, 0ca79h, 08f35h, 0a06bh, 0efa9h, 03873h, 04c7ah, 02815h, 2327.word0fd59h, 0fb27h, 01006h, 013a1h, 0eaa1h, 0b593h, 0b2edh, 0f041h; 2335.word043f2h, 07174h, 051f7h, 0ff64h, 0c3efh, 0c4ebh, 0e8deh, 0fe8bh, 2343.word0ed55h, 0d8a0h, 0f03ah, 032f0h,, 06c33h, 05e07h, 00950h, 0ace3h; 2351.word08c38h, 0bb7eh, 003c0h, 026aeh, 01a87h, 00415h, 00da3h, 0319bh; 2359.word03d0ah, 00e47h, 0bcf9h, 08f06h, 0b0aeh, 00139h, 045a3h, 0526eh; 2367.word02508h, 0f3ffh, 0eech8h, 0056bh, 009f6h, 0e5f8h, 0ba83h, 0bfech; 2375.word00295h, 0545eh, 07582h, 046efh, 0ef47h, 0b663h, 0bda0h, 0e8b5h; 2383.word0037ch, 0f6c1h, 0e58dh, 0fc6ah, 037bbh, 064cdh, 04ce6h, 0f54dh; 2391.word09d32h, 08ad9h, 0c5c5h, 0114ch, 0337dh, 0218bh, 0069eh, 00bffh; 2399.word028f7h, 02fe9h, 00092h, 0b6a7h, 09455h, 0c0cah, 014each, 05564h; 2407.word05711h, 01ce2h, 0e81eh, 0e300h, 0fa57h, 0032ah, 0e545h, 0c12bh; 2415.word0cf15h, 0149bh, 061e0h, 074fch, 038e3h, 0dd7ah, 0a68eh, 0b787h; 2423.word9ec88h, 009e7h, 000aeh, 0f10ch, 004e0h, 03abbh, 05c7eh, 03ae5h; 2431.word0e0a9h, 09399h, 091d4h, 0d410h, 01f42h, 03c31h, 025dfh, 005b9h; 2439.word00685h, 020e3h, 022fdh, 0f4ffh, 0b384h, 09ef8h, 0d354h, 028f2h; 2447.word062fch, 0576bh, 01457h, 0db9eh, 0d6f8h, 0f26ah, 0ff8ch, 0e71ch; 2455.word0cac4h, 0dd70h, 022bah, 06883h, 06e8dh, 02873h, 0c8cch, 09a24h; 2463.word0b598h, 0f1fbn, 014b2h, 00a42h, 0f944h, 00a6ch, 03926h, 0516ah, 2471.word026dah, 0cf23h, 08ef2h, 09ba8h, 0e562h, 02f54h, 046fdh, 027fch; 2479.word00077h, 0ff25h, 015e2h, 01821h, 0ece9h, 0b3ech, 0ad08h, 0e820h; 2487.word03bafh, 06be9h, 05384h, 00732h, 0cd34h, 0cc73h, 0ebe5h, 0fec5h; 2495.word00eaefh, 0d41ch, 0ea23h, 02cech, 06a50h, 0629ch, 013cah, 0b7f7h; 2503.word091h, 0b878h, 0fc1eh, 0203ch, 01584h, 000dbh, 00d77h, 03448h; 2511.word043c8h, 01595h, 0c09dh, 08d7dh, 0a7f8h, 0f8each, 03fcah, 04ee6h; 2519.word0274ch 0f7fbh, 0f33bh, 00d16h, 0e797h, 0b7d6h, 0ba90h; 2527.word0fb47h, 04d44h, 0739fh, 04bc8h, 0f5a9h, 0bc6fh, 0e8b0h; 2535.word00179h, 0f231h, 0e04eh, 0f7c3h, 03629h, 06959h, 05516h, 0fe1ch; 2543.word0a431h, 08cb9h, 0c05eh, 00a64h, 02cc4h, 01d97h, 005e8h, 00cc8h; 2551.word02e06h, 0363fh, 00678h, 0b979h, 0926fh, 0b803h, 00ac5h, 04e1eh; 2559.word053cbh, 02173h, 0ee2eh, 0e8d7h, 00009h, 005dbh, 0e610h, 0bed1h; 2567.word0ca0bh, 00e09h, 05b9ch, 00715h, 03fach, 0e301h, 0ad95h, 0b9b5h; 2575.word0e8ach, 0063bh, 0faafh, 0e1bh, 000d4h, 039c4h, 0614ah, 04296h; 2583.word0e992h, 0988bh, 08eeah, 0ce88h, 01a6bh, 038fbh, 02505h, 006f2h; 2591.word00907h, 0251fh, 02879h, 0fa4bh, 0b5cfh, 09b84h, 0cb83h, 01ef5h; 2599.word05b97h, 056dbh, 0173bh, 0e0ach, 0dc4fh, 0dc4fh, 0f51dh, 0001ah, 0e53dh; 2607.word601h, 0d70fh, 01b9eh, 06476h, 07153h, 02fe6h, 0d3bah, 0a158h; 2615.word0b5f8h, 0ef55h, 00f69h, 005d0h, 0f67eh, 0082ah, 039b2h, 055d1h; 2623.word03022h, 0d850h 0925ch, 09778h, 0dcb9h, 02702h, 04288h, 0276ah; 2631.word00236h, 00213h, 019afh, 01bb0h, 0ef82h, 0b2b6h, 0a5a6h, 0df06h; 2639.word033d4h, 06765h, 055b3h, 00d80h, 0d3b6h, 0d0a9h, 0ede5h, 0ff36h; 2647.word0e8c1h, 0cfbdh, 0e418h, 0288bh, 06b19h, 06834h, 01cc0h, 0bffeh; 2655.word09459h, 0b652h, 0f8c9h, 01b21h, 01087h, 0fe32h, 00c35h, 03726h; 2663.word04a64h, 01db9h, 0c828h, 08e0fh, 0a1e6h, 0eed0h, 03643h, 04ae3h; 2671.word0274bh, 0fb5eh, 0f871h, 00ec9h, 01260h, 0ea44h, 0b68dh, 0b4e2h; 2679.word0f23fh, 04472h, 07051h, 04f5fh, 0feb8h, 0c441h, 0c4d1h, 0ea2ch; 2687.word00039h, 0ef40h, 0db88h, 0f1cbh, 032beh, 06abah, 05bd7h, 008bfh, 2695.word0ae19h 08e94h, 0bbcch, 0038bh, 027d9h, 01aeeh, 0046dh, 00deah; 2703.word03152h, 03d14h, 00ddeh, 0bcf5h, 08eedh, 0af97h, 0457dh; 2711.word05175h, 023afh, 0f2dfh, 0ed60h, 004b3h, 009fch, 0e6a0h, 0bc66h; 2719.word0c346h, 00507h, 05492h, 0747bh, 0452fh, 0ecf6h, 0b5b2h, 0bc70h; 2727.word0e897h, 0052ch, 0f777h, 0e721h, 0fd85h, 03887h, 0660fh, 04d05h; 2735.word0f4a7h, 09db4h, 08d09h, 0c5f9h, 00f4h, 03248h, 020fah, 0058eh; 2743.word00ac6h, 027ffh, 02efch, 0ff80h, 0b5d2h, 09582h, 0c22eh, 016afh; 2751.word0562fh, 0573ch, 01da0h, 0e7c9h, 0e26h, 0f9b3h, 002d9h, 0e50bh; 2759.word0c251h, 0d03fh, 01487h, 06166h, 0745fh, 03893h, 0dc16h, 0a56eh; 2767.word6a6h, 0eb38h, 00a3eh, 0012eh, 0f11eh, 0056dh, 03a57h, 05af0h; 2775.word03838h, 0dfdbh, 09407h, 09190h, 0d72fh, 02153h, 03d70h, 0277dh; 2783.word00376h, 00450h, 01ed4h, 020dch, 0f4beh, 0b38ch, 0a0f6h, 0d5f3h; 2791.word02950h, 06278h, 056afh, 0126dh, 0daa7h, 0d584h, 0f0bdh, 0000dh; 2799.word0e778h, 0cb99h, 0ddffh, 02365h, 06a73h, 06ed9h, 0267fh, 0c78dh; 2807.word09a17h, 0b567h, 0f215h, 01570h, 00b19h, 0fa55h, 00a8bh, 03796h; 2815.word04ec5h, 02504h, 0d00bh, 08f2bh, 09c5bh, 0e8b0h, 03116h, 04810h; 2823.word0293eh, 00054h, 0fe27h, 014c2h, 0171dh, 0ecc9h, 0b451h, 0ae40h; 2831.word0e9d8h, 03bf7h, 06b8bh, 0521dh, 0439h, 0cae9h, 0ca2bh, 0eaf7h; 2839.word0fee9h, 0eb66h, 0d603h, 0eb15h, 02e80h, 06beah, 06188h, 011dah; 2847.word0c3f3h, 0b7b6h, 0d2adh, 0de0fh, 00044h, 0ffc3h; 2845_Dtmf6Start;.word0fff1h;2850_Dtmf5End;.word00026h;2851.word0002bh, 0006dh, 00082h, 00073h, 00086h, 0ff26h, 0faf6h, 0f251h; 2863.word0f33bh, 013d1h, 032afh, 014d9h, 0edaeh, 0022bh, 01434h, 0f61ah, 0bb6bh; 2871.word0bb9ch, 983ech, 0cc21h, 022a7h, 058d8h, 04efbh, 015bah, 0fd9ch; 2879.word00b1ah, 00c5dh, 0e34ch, 0b4bfh, 0fcc4h, 04b48h, 05f34h; 2887.word02b08h, 0edc3h, 0e722h, 0fd1dh, 0f86ah, 0cc7eh, 0af92h, 0d94Sh; 2895.word02c45h, 062c3h, 04aeah, 0ff85h, 0d27dh, 0dee4h, 0f708h, 0e978h; 2903.word0c44bh, 0c8f8h, 00d6bh, 05a6dh, 06d0bh, 028e9h, 0d883h, 0c442h; 2911.word0e12ch, 0f653h, 0e20dh, 0cba0h, 0ee20h, 03df3h, 0724dh, 05124h; 2919.word0f656h, 0b7f9h, 0c1b3h, 0ebc2h, 0f7aeh, 0e014h, 0dde7h, 0169ch; 2927.word05f60h, 069beh, 01ee8h, 0c3c5h, 0a695h, 0cf12h, 0fc93h, 0fd07h; 2935.word0e88bh, 0fa6bh, 03b72h, 06914h, 04410h, 0e3ffh, 09e5ch, 0ac14h; 2943.word0e9dh, 01132h, 00566h, 0f8f5h, 01aa4h, 05263h, 057eeh, 00dcch; 2951.word0b06bh, 092dbh, 0c859h, 00e1ah, 020cfh, 00b29h, 007c0h, 0300eh, 2959.word05245h, 02f48h, 0d520h, 09426h, 0a77eh, 0f2f2h, 0297dh, 0253dh; 2967.word00b18h, 01225h, 03867h, 03c88h, 0fd49h, 0aae6h, 09498h, 0d1f3h; 2975.word01f06h, 03bb0h, 02253h, 00675h, 01868h, 032f2h, 019bdh, 0cfd8h; 0cfd8h; 2983.word09797h, 0b1c1h, 003f2h, 041f8h, 0403ch, 01413h, 000a0h, 017fch; 2991.word0205dh, 0f29fh, 0f70h, 0a14fh, 03271h, 033d4h, 0537ch, 031b4h; 2999.word0fdd2h, 0f895h, 00fe7h, 00603h, 0cfech, 0a50ch, 0c2d7h, 01625h; 3007.woord05697h, 05142h, 01398h, 0e865h, 0f329h, 0057dh, 0eebdh, 0bde9h; 3015.word0b68ch, 0f46ch, 04522h, 066a3h, 03751h, 0ec11h, 0d641h, 0ed04h; 3023.word0f917h, 0dbbdh, 0bb72h, 0d7deh, 026ceh, 0679bh, 05bb9h, 00b99h, 3031.word0cc26h, 0cdefh, 0edb0h, 0f1e3h, 0d34ch, 0cc70h, 0047ah, 052cfh; 3039.word06f15h, 035a7h, 0dbceh, 0b67dh, 0d1f6h, 0f4b1h, 0ef29h, 0d653h; 3047.words0e8a5h, 030f7h, 06d90h, 05989h, 0ff0ch, 0b3f0h, 0b222h, 0e286h; 3055.word0fffbh, 0f16ah, 0e532h, 00ca9h, 052fah, 06933h, 0297eh, 0c946h; 3063.word09d41h, 0c190h, 0fb74h, 00b95h, 0f8d2h, 0fb6dh, 02dfbh, 05f14h; 3071.word0481eh, 0ede6h, 0a002h, 0a063h, 0e16bh, 01756h, 016f5h, 0025dh; 3079.word01239h, 04255h, 05242h, 01670h, 01670h, 0b9bch, 09016h, 0bbf0h, 009c0h; 3087.word02c6ah, 019e5h, 00819h, 0221fh, 045b3h, 031fch, 0e135h, 09845h; 3095.word0a024h, 0eb2ah, 02cbbh, 03372h, 013ddh, 0091ch, 027afh, 0361dh; 3103.word005a1h, 0b591h, 0942bh, 0c96h, 01c27h, 04538h, 03057h, 007b0h; 3111.word008abh, 0235ch, 019a5h, 0db73h, 09ee8h, 0ac8bh, 0fc56h, 0434ch; 3119.word046c69h, 01d82h, 0f8fah, 00594h, 01651h, 0f934h, 0bcd9h, 0a5c1h; 3127.word0db26h, 02each, 05b74h, 03ed6h, 0ff0fh, 0eac1ch, 0ff84h, 0040ah; 3135.word0dce5h, 0b03dh, 0c263h, 00eb2h, 05484h, 05bdfh, 01c8eh, 0e162h; 3143.word0e0cfh, 0f91bh, 0f4efh, 0cb5dh, 0b999h, 0ecb5h, 03ffeh, 06ba9h; 3151.word044c0h, 0f411h, 0cb32h, 0dd9dh, 0f67ah, 0e7a0h, 0c7e8h, 0d5e0h; 3159.word01e5dh, 06452h, 0632fh, 016fah, 0c999h, 0bdb3h, 0e282h, 0f7d8h; 3167.word0e250h, 0d274h, 0fbc6h, 0498eh, 07099h, 040cfh, 0e3d2h, 0acf4h; 3175.word0c14h, 0f125h, 0fb4fh, 0e5e6h, 0e951h, 02430h, 064a3h, 05ddah; 3183.word00971h, 0b324h, 0a421h, 0d653h, 005c4h, 00308h, 0f097h, 0071ch; 3191.word043f5h, 0641dh, 03058h, 0d00bh, 09797h, 0b362h, 0f8c5h, 0197bn; 3199.word00b35h, 0ffd7h, 02279h, 053d6h, 04a37h, 0f890h, 0a1e8h, 096dch; 3207.word0d7b1h, 0192eh, 0258ch, 00d55h, 00b4bh, 03279h, 04a25h, 01d56h; 3215.word0c49bh, 09030h, 0b3c1h, 003b4h, 0321bh, 0273bh, 00b1ah, 0135eh; 3223.word03632h, 030c0h, 0ed1ch, 0a168h, 09c8ch, 0e314h, 02c92h, 04199h; 3231.word0201bh, 00494h, 01681h, 02h7dh, 00c24h, 0c2c0h, 099e1h, 0c328h;
3239.word014ffh, 04a59h, 03e65h, 00b64h, 0f11h, 0127dh,
014d9h, 0e590h; 3247.word0aad9h, 0ad67h, 0f468h, 03ffeh,
559bh, 02840h, 0f4f4h, 0f3cdh; 3255.word009a3h, 0fdd1h,
0c949h, 0aa73h, 0d537h, 02949h, 05fffh, 04b6bh;
3263.word00668h, 0df7fh, 0ee44h, 0ff72h, 0bce0h, 0c187h,
006e0h; 3271.word0540bh, 06575h, 02956h, 0e08ah,
0d0dfh, 0eb03h, 0f668h, 0d9d2h; 3279.word0c205h,
0e823h, 03787h, 06b42h, 04eech, 0fafbh, 0c1a6h, 0cb30h;
3287.word0ee8fh, 0f0d4h, 0d47ah, 0d62ch, 01401h,
05ec0h, 06a2ch, 02356h; 3295.word0cc0fh, 0b0d7h,
0d52bh, 0f9c6h, 0f18fh, 0dd60h, 0f6d0h, 03df4h;
3303.word06ef5h, 04a51h, 0ea5bh, 0a5deh, 0b176h,
0e9efh, 00650h, 0f6a7h; 3311.word0eed6h, 01949h,
0580dh, 05f26h, 01406h, 0b7b2h, 09a7eh, 0ca89h;
3319.word0006a2h, 01291h, 0ff3bh, 00497h, 036b0h,
05d54h, 037deh, 0d966h; 3327.word093f9h, 0a6a0h,
0f111h, 02170h, 01b2ah, 00653h, 01742h, 0436dh;
3335.word046cah 0021fh, 0ab93h, 09119h, 0cbdfh, 01955h,
031f2h, 01b37h; 3343.word00955h, 02260h, 400fh, 02338h,
0d115h, 09385h, 0aca6h, 0fd4bh; 3351.word037feh,
036f6h, 010bfh, 007eah, 007each, 02551h, 02af1h, 0f5f3h,
0ac6ch; 3359.word09cc7h, 0db44h, 02959h, 0497ch,
02b87h, 00138h, 00573h, 01e4ch; 3367.word00e3dh,
0cf92h, 09f00h, 0bbd8h, 00f04h, 04efeh, 04b73h, 013cbh;
3375.word0f1b0h, 00141h, 00efch, 0eecfh, 0b684h, 0ad3dh,
0ecfbh, 03e74h; 3383.word05fe1h, 0354bh, 0f474h, 0e45eh,
0fa2bh, 0fe19h, 0d6e3h, 0b2f4h; 3391.word0d030h,
02119h, 06183h, 0581bh, 00fd1h, 0d75ah, 0db9dh, 0f594h;
3399.word0ef4ch, 0c97fh, 0c2b1h, 0fe9fh, 04fdah, 06de5h,
03814h, 0e386h; 3407.word0c11ah, 0db12h, 0f4fdh,
0e581h, 0cb4dh, 0e2a7h, 02ebh7h, 06bc7h;
3415.word05a01h, 00558h, 0bdd9h, 0bbb6h, 0e552h,
0f984h, 0e42dh, 0da5eh; 3423.word00928h, 05020h,
05e82h, 01d36h, 0dfa2h, 0e07bh, 0ec84h, 0ea8dh;
3420.word0f5d5h, 0f799h, 0f125h, 0f880h, 0fb39h_
Dtmf7Start;.word00038h; 3433_Dtmf6End;.word001ddh,
004aeh;3428.word00423h, 0f983h, 0eea2h, 0fb3dh, 01a77h
026f0h, 009b3h, 0d053h; 3436.word0a805h, 0bcb3h,
0079ch, 05b2ch, 07e80h, 04e29h, 0ec0eh, 09c3bh;
3455.word09325h, 0cf4ch, 01dc0h, 049fdh, 049fdh, 03ff7h,
0156bh, 0f274h, 0ee03h; 3463.word0f918h, 0f91ch,
0e467h, 0cde9h, 0d806h, 00ac7h, 04939h, 0613fh;
3741.word035eah, 0dea3h, 097bdh, 094bah, 0d37dh,
02674h, 05b99h, 0517dh; 3479.word01223h, 0d457h,
0bfafh, 0d768h, 0febfh, 00fb5h, 009aeh, 002e9h;
3487.word01165h, 031ech, 04245h, 0278eh, 0e458h,
0a679h, 0a1d8h, 0dd26h; 3495.word02e15h, 065cbh,
05b85h, 00d47h, 0ba70h, 09a2bh, 0b98eh, 0fc5eh;
3503.word02e4dh, 034f6h, 01cf4h, 00679h, 00660h,
010e0h, 00b46h, 0e930h; 3511.word0c0dfh, 0b9e8h,
0e82fh, 033c8h, 06889h, 05b37h, 00e19h,, 0b527h;
3519.word08d38h, 0b09bh, 00071h, 04366h, 05492h,
02e2eh, 0f69eh, 0dac8h; 3527.word0e1d9h, 0f689h, 0fc4bh,
0eea3h, 0e61eh, 0fadch, 02b63h, 053a3h;
3535.word04a5ah, 007c5h, 0b50eh, 08f7bh, 0b320h,
0053fh, 04ef3h, 0656bh; 3543.word035e6h, 0e56dh,
0b3c1h, 0b715h, 0e53dh, 01322h, 01ec4h, 01475h;
3551.word00a92h, 01609h, 02a7ch, 02828h, 00088h,
0c423h, 0a43ah, 0c24ah; 3559.word00cb6h, 05393h,
06a06h, 036b3h, 0da79h, 098e8h, 09b27h, 0dc0eh;
3567.word02510h, 04765h, 039ach, 01062h, 0f6deh,
0f800h, 001cah, 0fbbch; 3575.word0deb1h, 0c8a7h,
0d7bch, 0117ch, 0526h, 6055ch, 033e7h, 0da2eh;
3583.word0945bh, 0958ah, 0d946h, 02b16h, 05b91h,
04bcdh, 00c03h, 0d5c2h; 3591.word0c6dbh, 0df11h,
0fef2h, 006aeh, 0fdc8h, 0fb3ch, 012cfh, 038c8h;

3599.word04707h, 0243dh, 0db9dh, 09f7dh, 0a181h,
0e360h, 03448h, 06701h; 3607.word056fch, 0070fh,
0b95ah, 09fd6h, 0c2ceh, 001b3h, 02a49h, 02cd2h;
3615.word016f4h, 00834h, 0101eh, 01a46h, 00d6dh,
0e35bh, 0b81ah, 0b676h; 3623.word0ed81h, 03a73h,
06a59h, 057bfh, 00644h, 0afc1h, 08e42h, 0b5a2h;
3631.word00682h, 044afh, 04f41h, 02829h, 0f713h,
0e205h, 0eaf7h, 0fb59h; 3639.word0f765h, 0e3e7h, 0dd8ch,
0fb35h, 032c5h, 05935h, 04926h, 001ffh;
3647.word0b08bh, 08f0bh, 0b727h, 00b58h, 05258h,
061e7h, 02df3h, 0e287h; 3655.word0b84fh, 0c081h,
0ec72h, 01078h, 01649h, 00bd9h, 0086fh, 01cc7h;
3663.word032d5h, 02c73h, 0fc01h, 0bb47h, 0a018h,
0ce3fh, 012d0h, 05b26h; 3671.word06a36h, 0301dh,
0d43ch, 0981eh, 0a265h, 0e121h, 02547h, 0413ah,
3679.word02fdah, 00de7h, 0fcd2h, 0fcd2h, 001f7h, 008eah,
0f9beh, 0d676h, 0c06fh; 3687.word0d675h, 01731h,
058a1h, 06794h, 02fa0h, 0d366h, 091f1h, 099dch;
3695.word0dfa4h, 02ea9h, 0598dh, 044f9h, 007a5h,
0d8d6h, 0d06ah, 0e7c9h; 3703.word0fec2h, 0fe87h, 0f3ach,
0f64ah, 01715h, 0419fh, 04d5bh, 02231h;
3711.word0d2c5h, 09911h, 0a143h, 0e652h, 037f6h,
066efh, 0505ah, 00003h; 3719.word0b92ch, 0a728h,
0cc57h, 005ebh, 02647h, 0244eh, 0118dh, 00b1eh;
3727.word01955h, 022d5h, 00f88h, 0dcc6h, 0afe5h,
0b418h, 0f09dh, 04057h; 3735.word06d22h, 0533ah,
0fd7fh, 0aa54h, 09107h, 0bda9h, 00b7ah, 04305h;
3743.word0489eh, 02167h, 0f6f7h, 0e9cfh, 0f3deh, 0fe7bh,
0f172h, 0d979h; 3751.word0d728h, 0fcb5h, 03a22h,
05fa3h, 04948h, 0fbd4h, 0fbd4h, 0aa5dh, 08f55h;
3759.word0be01h, 0118bh, 0532eh, 05d30h, 02673h,
0e0d6h, 0be61h, 0c950h; 3767.word0f1aeh, 00db9h,
00d4ch, 00390h, 0083ah, 0246dh, 03c00h, 02f5ch;
3775.word0f6f8h, 0b40eh, 09c50h, 0c722h, 01852h,
05bedh, 06779h, 02922h; 3783.word0cfa4h, 09ba8h,
0a92eh, 0e938h, 025e8h, 03a51h, 02843h, 00b69h;
3791.word00287h, 00b97h, 00ed1h, 0f5ebh, 0cdf4h,
0b9edh, 0d79ch, 01db8h; 3799.word05d7fh, 065fh,
027c5h, 0902ch, 09dfah, 0e820h, 0349ch;
3807.word056feh, 03ed8h, 004ach, 0dd1ch, 0da65h,
0eee0h, 0fe1ah, 0f619h; 3815.word0e942h, 0f28fh, 01b5eh,
048a4h, 04f6dh, 01dc4h, 0ccdfh, 09705h;
3823.word0a550h, 0ec2eh, 03b66h, 06566h, 047f9h,
0fa46h, 0bb65h, 0adb0h; 3831.word0d49dh, 008a6h,
020b5h, 01b75h, 00c90h, 00f3fh, 02269h, 029abh;
3839.word00e26h, 0d520h, 0a8cah, 0b2f8h, 0f541h,
04487h, 06d82h, 04ec2h; 3847.word0f5b7h, 0a586h,
09381h, 0c2deh, 010b4h, 0434dh, 0412ch, 01d76h;
3855.word0fa3ch, 0f2ech, 0fde5h, 0ff7ah, 0eb54h, 0cfedh,
0d157h, 0fed8h; 3863.word0418dh, 0668ah, 04870h,
0f4d8h, 0a1fch, 08d96h, 0c2fah, 0168dh; 3871.word054fah,
058d6h, 01f81h, 0df99h, 0c497h, 0d22eh, 0f5d3h, 0086ah;
3879.word002e8h, 0fch5ch, 099aeh, 02d34h, 04585h,
032c6h, 0f182h, 0ac73h; 3887.word09a70h, 0ca2ch,
01cb9h, 05e29h, 062e4h, 02135h, 0cc02h, 09f7eh;
3895.word0b1b8h, 0ef58h, 02549h, 03381h, 02078h,
00addh, 00a76h, 015c4h; 3903.word013d9h, 0f1f5h,
0c443h, 0b3a4h, 0d925h, 02494h, 06397h, 066cbh;
3911.word0221ah, 0c344h, 08dch, 0a37ch, 0ed97h,
035e7h, 05312h, 037dch; 3919.word0022dh, 0e161h,
0e302h, 0f577h, 0fb85h, 0ecfch, 0e032h, 0f0afh;
3927.word0218bh, 05141h, 053ech, 019b0h, 0c4f7h,
09259h, 0a6e7h, 0f24dh; 3935.word04078h, 06488h,
0423ch, 0f685h, 0bdd1h, 0b5f4h, 0ddb9h, 00a15h;
3943.word019dbh, 0126dh, 00849h, 013f9h, 02b68h,
300ch, 00d46h, 0ce46h; 3951.word0a277h, 0b413h, 0faf8h,
04827h, 06dadh, 046c7h, 0ece8h, 0a3e9h;

3959.word0959fh, 0ca2bh, 0154dh, 0403eh, 03b31h, 01790h, 0fd16h, 0fc18h; 3967.word005c8h, 000afh, 0e2dbh, 0c5f3h, 0cc17h, 001ddh, 04877h, 06a7ch; 3975.word04592h, 0ed27h, 09d4ah, 0c907h, 01d0fh, 054adh, 05248h; 3983.word01b18h, 0e116h, 0cc8ch, 0dbdeh, 0f949h, 0032dh, 0f00ch, 0f5aah; 3991.word00b5fh, 034f5h, 04b4ch, 03212h, 0ec27h, 0ab52h, 0a8d7h, 0a8d7h, 0e647h; 3999.word01ad9h, 01532h, 00973h, 011d7h, 00c3eh, 0087ch, 009bah, 000ach; 4007.word0014ch, 0ffd2h, 0fe6bh, 0feffh, 0f722h, 0f4e9h, 0f2ach, 0f82ah; 4004_Dtmf8Start:.word0ffd6h; 4012_Dtmf7End:.word00218h, 008b2h, 009d9h, 0f8e9h, 0edceh, 00641h, 01d9bh; 4013.word005ebh, 0ce7fh, 0a805h, 0c6c9h, 01dc9h; 06860h, 0722eh, 02c1dh; 4031.word0d298h, 0abach, 0c816h, 0ff1ch, 01617h, 00b8eh, 00227h, 019bch; 4039.word03e03h, 03aa4h, 0fdc3h, 0ac0fh, 08e19h, 0c585h, 0208eh, 05bcbh; 4047.word04ea0h, 004deh, 0c808h, 0c42eh, 0e459h, 0ff8fh, 0f723h, 0e775h; 4055.word0fd33h, 0365ah, 063fah, 04c91h, 0f5b0h, 0a16eh, 09301h, 0d577h; 4063.word02ad2h, 052fbh, 03b18h, 0031fh, 0e55ch, 0f262h, 000d9h, 0f1f0h; 4071.word0ce21h, 0c695h, 0fbb8h, 04a4ch, 071f3h, 046b4h, 0e435h, 09692h; 4079.word09abeh, 0e627h, 02845h, 03bb0h, 01f43h, 0037dh, 00816h, 0198ch; 4087.word00dfdh, 0d97fh, 0aa68h, 0b6bfh, 0023ah, 05506h, 06fb0h, 03583h; 4095.word0d576h, 0a11ah, 0b6dch, 0f444h, 01d72h, 01ae6h, 008d6h, 01100h; 4103.word031c8h, 03e11h, 01415h, 0c54ch, 0955ah, 0b61bh, 00d80h, 056d2h; 4111.word05eceh, 01ffffh, 0d586h, 0bd9ah, 0d910h, 0fd7bh, 000c3h, 0ef47h; 4119.word0f470h, 020fch, 055f5h, 05473h, 00cbah, 0b177h, 08c24h, 0bc18h; 4127.word13c1h, 04f0ah, 047c2h, 00fefh, 0e38ah, 0e49ch, 0f99dh, 0f9d1h; 4135.word0dcc5h, 0c8bch, 0aea0h, 035d0h, 06e72h, 059abh, 00038h, 0a76fh; 4143.word0916bh, 0cc72h, 01b6fh, 04028h, 02d7eh, 007dfh, 0fe2ch, 00ed3h; 4151.word01147h, 0e72h, 0b86fh, 0b10dh, 0ec55h, 042b5h, 07071h, 04abdh; 4159.word0ec34h, 0a530h, 0a780h, 0e1a7h, 01997h, 0244ah, 01114h, 00a86h; 4167.word02315h, 03998h, 0217eh, 0db89h, 09d78h, 0a776h, 0f495h, 04754h; 4175.word066edh, 037d4h, 0e3d5h, 0b7c5h, 0c964h, 0f36eh, 007dfh, 0fa79h; 4183.word0f36bh, 001d0h, 045d2h, 058f8h, 02419h, 0c820h, 08defh, 0a85dh; 4191.word0fce9h, 046b3h, 054dch, 021c2h, 0e816h, 0da5dh, 0eeedh, 0fd56h; 4199.word0eb4eh, 0d165h, 0e014h, 01f69h, 062e0h, 06615h, 019bdh, 0b9bah; 4207.word08d1eh, 0b483h, 007dbh, 03eddh, 03aedh, 01299h, 0fa1ch, 0043bh; 4215.word01005h, 0f9f7h, 0c8aeh, 0b015h, 0d92bh, 02db7h, 06d79h, 0658h; 4223.word008e3h, 0b188h, 09c4dh, 0103ah, 02ab4h, 01b45h, 009d8h; 4231.word014c3h, 02f79h, 02893h, 0f00fh, 0abb1h, 09e54h, 0dd37h, 034dah; 4239.word067e2h, 04af1h, 0f7b3h, 0bab9h, 0baeeh, 0e64eh, 009ech, 00779h; 4247.word0f935h, 0073ah, 034beh, 05485h, 035cdh, 0e241h, 099deh, 09c26h; 4255.word0e625h, 037f7h, 05a6bh, 035c4h, 0f145h, 0d264h, 0e14ah, 0f8fdh; 4263.word0f6a8h, 0dbech, 0da9eh, 00bc4h, 05211h, 06d3ah, 034b0h, 0d11ch; 4271.word08ff7h, 0a216h, 0f0e5h, 036a4h, 04452h, 01f2dh, 0f9d4h, 0f829h; 4279.word008ech, 002c2h, 0da9ah, 0b75ah, 0cb10h, 015b1h, 060e5h, 06caah; 4287.word025b4h, 0c44ah, 0963bh, 0b789h, 0ff28h, 02c76h, 02760h, 00e40h, 04295.word00ba5h, 022c6h, 02a22h, 00118h, 0bd73h, 09c7ch, 0c745h, 01fdbh; 4303.word062f5h, 05eb7h, 01236h, 0c276h, 0af11h, 0d447h, 00420h, 010d0h; 4311.word0015ch, 0012bh, 023ceh, 04b01h, 040d7h, 0fab1h, 0a9f5h, 093a6h; 4319.word0cfbdh, 027abh, 05aaah, 048e0h, 0028fh, 0d041h, 0d38bh, 0ef4ch; 4327.word0cfbh, 0e8e8h, 0dbe4h, 0fbe3h, 03c99h, 067eah, 047a6h, 0ec7ah; 4335.word09ad9h, 093eah, 0da45h, 02ad2h, 04be2h, 030d0h, 0ffc0h, 0ef0ch; 4343.word0each, 0056eh, 0e9c9h, 0c0c1h, 0c137h, 00079h, 05270h, 0735ah; 4351.word0409fh, 0dd75h, 09813h, 0a526h, 0ec50h, 028d4h, 0320ch, 0179bh; 4359.word006f3h, 015d4h, 02602h, 00e52h, 0d080h, 0a08fh, 0b5f4h, 007e5h; 4367.word05854h, 06b3dh, 02c50h, 0d20bh, 0a8b7h, 0c35ah, 0f966h, 015a9h; 4375.word00bf1h, 0014ah, 0165eh, 03e22h, 0469dh, 010ach, 0bce6h, 091d7h; 4383.word0ba21h, 0111fh, 055f8h, 05733h, 015e7h, 0d6b5h, 0c92bh, 0e36ch; 4391.word0fd86h, 0f582h, 0e26bh, 0f17ch, 02924h, 060bfh, 057d7h, 0076ah; 4399.word0aad2h, 08c8fh, 0c307h, 0180dh, 04af3h, 03e43h, 00aaeh, 0ea52h; 4407.word0f1c6h, 0024eh, 0f62ch, 0cf8eh, 0c009h, 0ec54h, 03d67h, 0728ah; 4415.word055fbh, 0f74bh, 0a146h, 096e4h, 0d4dah, 01dbah, 038f6h, 0238bh; 4423.word007d5h, 009f4h, 01d75h, 016a2h, 0e4fch, 0abeeh, 0ab65h, 0f13fh; 4431.word04786h, 06ec0h, 043c3h, 0e792h, 0a84dh, 0b128h, 0e9d5h, 01735h; 4439.word01834h, 00787h, 00d6ch, 02f71h, 044dbh, 0218bh, 0d2c1h, 096c8h; 4447.word0a821h, 0f9b8h, 048b6h, 060a9h, 02f5ch, 0e2e6h, 0c127h, 0d5fdh; 4455.word0f76bh, 0fe9dh, 0ed53h, 0ec9eh, 016e3h, 05054h, 05d88h, 0203eh; 4463.word0c013h, 08c41h, 0ae65h, 00272h, 04498h, 04b91h, 01abfh, 0eb71h; 4471.word0e697h, 0f9cdh, 0fd47h, 0dfedh, 0c59fh, 0ddf8h, 026e4h, 06a9bh; 4479.word06731h, 013fah, 0b35bh, 08ff4h, 0bd7eh, 00ce4h, 03b20h, 03083h; 4487.word00d3ch, 00183h, 011cah, 01824h, 0f614h, 0bd14h, 0a8afh, 0dc99h; 4495.word032adh, 06bdeh, 0594eh, 000b1h, 0b0c2h, 0a56eh, 0d664h, 01087h; 4503.word020eh, 01044h, 00886h, 02035h, 03d14h, 02db0h, 0ea5fh, 0a30fh; 4511.word09cdh, 0e2deh, 03910h, 0650ch, 043f4h, 0f36bh, 0bf8ch, 0c767h; 4519.word0ed84h, 00421h, 0f8eah, 0ee0bh, 007eeh, 03e90h, 05d2dh, 03452h; 4527.word0da2fh, 09451h, 09each, 0ec3ah, 0394fh, 0538dh, 02c02h, 0f19eh; 4535.word0dd99h, 0eeb0h, 0fdcdh, 0ecd9h, 0ce65h, 0d49ah, 0109bh, 05ac7h; 4543.word06f6dh, 02f54h, 0c984h, 08f16h, 0a962h, 0f7fch, 03635h, 03c0ah; 4551.word018f0h, 0fdceh, 00527h, 01491h, 001e7h, 0cf59h, 0aca2h, 0c9aeh; 4559.word01b55h, 06480h, 067dch, 01ab8h, 0bf89h, 09c05h, 0c218h, 00519h; 4567.word025fch, 01c35h, 00a23h, 013ffh, 03194h, 032b3h, 0fef0h, 0b659h; 4575.word0a2fbh, 0dde6h, 01f1bh, 02394h, 00dfeh, 00e40h, 009b5h, 00520h; 4572.word00ba8h, 00480h; 4580_Dtmf9Start:.word0feb6h; 4582_Dtmf8End:.word0f855h, 0eb84h, 0ed67h, 01d9eh, 05161h; 4580.word02f6ch, 0e3a9h, 0d160h, 0e1c0h, 0eb5ch, 0d883h, 0bf55h, 0e811h; 4599.word03a7dh, 072c3h, 05796h, 0f688h, 0b08ch, 0b5feh, 0ee21h, 01159h; 4607.word00894h, 000ddh, 01f28h, 04cc3h, 0413fh, 0f0fbh, 09d7bh, 09728h; 4615.word0e407h, 03284h, 04297h, 01cfdh, 0fca0h, 006a2h, 01398h, 0f328h; 4623.word0b925h, 0a985h, 0e8c2h, 04162h, 0681ch, 039dch, 0e70dh, 0c602h; 4631.word0de11h, 0f786h, 0ed44h, 0d8c4h, 0f539h, 03f49h, 0703dh, 0498ah; 4639.word0e471h, 09d18h, 0abd2h, 0f1c6h, 01ec0h, 01617h, 0067eh, 01974h; 4647.word03c6ch, 0e56bh, 09b66h, 09e60h, 0ee23h, 03b6ch, 04a16h; 4655.word01c7bh, 0f26eh, 0f9f7h, 00958h, 0f30bh, 0c3eah, 0ba56h, 0fa2fh; 4663.word04ea8h, 06e97h, 036f6h, 0dc8fh, 0b917h, 0d5d6h, 0f9f0h, 0f8c3h; 4671.word0e6b2h, 0fecah, 0401ch, 067cah, 03b32h, 0d5cbh, 0936dh, 0aa9ah; 4679.word0f805h, 02a3fh, 02186h, 009a5h, 012e0h, 02e80h, 022c5h, 0dd7fh; 4687.word09b8eh, 0a7a4h, 0fae9h, 0475fh, 0519ah, 01abch, 0e748h, 0ead6h; 4695.word0fedch, 0f231h, 0cc7eh, 0c704h, 00644h, 057cfh, 070ach, 030c9h; 4703.word0d1bbh, 0ae24h, 0d105h, 0fe3ah, 003e8h, 0f424h, 0043dh, 03bc3h; 4711.word05c48h, 02d92h, 0cc33h, 09073h, 0b060h, 0023fh, 0342bh, 02a02h; 4719.word008d4h, 0071eh, 0209fh, 01651h, 0d9bfh, 0a17bh, 0b2efh, 00820h; 4727.word052ddh, 058ffh, 0175bh, 0dbc7h, 0dd69h, 0f64ch, 0f48dh, 0d644h; 4735.word0d33ah, 0103bh, 05d26h, 06eb5h, 026d3h, 0c4dah, 0a297h, 0cb22h; 4743.word0047ah, 010a7h, 0ff16h, 00886h, 035beh, 04b4h, 01fddh, 0c1cah; 4751.word08e04h, 0b4a7h, 00adch, 03f88h, 031c3h, 006fch, 0fd4fh, 012b7h; 4759.word00c33h, 0d8d9h, 0aa02h, 0c235h, 017e8h, 05dedh, 05b59h, 0125bh; 4767.word0d0eeh, 0d0ddh, 0efedh, 0f80dh, 0e0cfh, 0dec9h, 017ceh, 0603fh; 4775.word06a64h, 01ad1h, 0b94bh, 09ac9h, 0cb20h, 00b70h, 01be2h, 00912h; 4783.word00886h, 02b8eh, 0409dh, 01242h, 0baceh, 08f7eh, 0bea3h, 01622h; 4791.word049a8h, 03789h, 0037eh, 0f1c9h, 00435h, 00517h, 0db9eh, 0b5d1h; 4799.word0d13ch, 024eeh, 069a3h, 05e57h, 00b15h, 0c415h, 0c4a9h, 0ebd5h; 4807.word0fdf8h, 0ee06h, 0eaceh, 01c1dh, 05c21h, 05e7ch, 00cf5h, 0ac95h; 4815.word0935eh, 0cd59h, 01679h, 02a20h, 01225h, 007b2h, 0215eh, 0315ch; 4823.word00564h, 0b71ah, 095b4h, 0cbddh, 024c3h, 0555ah, 03ceeh, 0fc89h; 4831.word0e2f2h, 0f771h, 0fe5dh, 0e08ch, 0c1bdh, 0dddeh, 02efah, 06d66h; 4839.word05b01h, 0008bh, 0b87fh, 0bad7h, 0e9d1h, 006cbh, 0fa89h, 0f537h; 4847.word01dc7h, 054a6h, 05208h, 0fff8h, 0a3f0h, 091ffh, 0d3f7h, 020a7h; 4855.word033bdh, 0189eh, 00474h, 014f2h, 024d7h, 0fe69h, 0b9dch, 09f20h; 4863.word0d7e6h, 03107h, 05d63h, 03ca9h, 0f51ah, 0d70ch, 0eb26h, 0fa9dh; 4871.word0e623h, 0cc42h, 0e9ebh, 0387bh, 0707dh, 054f1h, 0f609h, 0ab11h; 4879.word0b0efh, 0ea76h, 00f87h, 00724h, 0fd33h, 01c87h, 04ab7h, 04305h; 4887.word0f34ah, 09e64h, 0957ch, 0dd15h, 02ae3h, 03df3h, 01b48h, 0fcadh; 4895.word00820h, 016dah, 0f83bh, 0bd50h, 0aa43h, 0e6f5h, 03f6bh, 0685ah; 4903.word03d32h, 0eb8ch, 0c964h, 0df17h, 0f91fh, 0ef06h, 0d839h, 0f3f1h; 4911.word03d76h, 0718ah, 04e9ch, 0e877h, 09d5ch, 0a98ah, 0eea3h, 01a88h; 4919.word01312h, 00430h, 01709h, 03cc1h, 03397h, 0e8edh, 09c2ah, 09acbh; 4927.word0e8c2h, 03751h, 048e3h, 01e4bh, 0f519h, 0fa7dh, 00b25h, 0f535h; 4935.word0c3f4h, 0b868h, 0f638h, 04bb6h, 06e4eh, 03a6ah, 0e194h, 0bcbah; 4943.word0d74fh, 0f986h, 0f775h, 0e4c2h, 0fbfeh, 03d5ah, 067d1h, 04011h; 4951.word0dc8fh, 0952ah, 0a852h, 0f573h, 02717h, 01fb9h, 008d5h, 011adh; 4959.word02f7fh, 025c2h, 0e086h, 09b0bh, 0a28ch, 0f54eh, 04349h, 0513bh; 4967.word01d4h, 0eaf2h, 0ed36h, 00120h, 0f443h, 0ccadh, 0c4efh, 002d1h; 4975.word055c1h, 0717fh, 033efh, 0d4d8h, 0af48h, 0cedeh, 0fc83h, 00346h; 4983.word0f240h, 00407h, 03c19h, 05f43h, 03231h, 0ce3fh, 08fadh, 0aaf5h; 4991.word0fc71h, 03155h, 027f6h, 00a21h, 0091eh, 0211fh, 0193eh, 0dbabh; 4999.word0a200h, 0aff8h, 00342h, 050e4h, 057f1h, 019e2h, 0dfaah, 0dec8h; 5007.word0f7aeh, 0f521h, 0d487h, 0d000h, 00cc4h, 05b64h, 06f2ch, 02b80h; 5015.word0caafh, 0a4c6h, 0cbech, 002e0h, 00fd1h, 0fe6dh, 0070eh, 034a6h; 5023.word0502ah, 0236ch, 0c54eh, 08e2ah, 0b0cch, 006d3h, 03d7bh, 0311fh;

5031.word0081dh, 0fe56h, 013ach, 0e7bh, 0db45h, 0aa52h, 0be2ah, 0125eh; 5039.word05b71h, 05c16h, 013fah, 0d3e3h, 0d244h, 0eebfh, 0f82eh, 0e013h; 5047.word0db85h, 013bdh, 05e06h, 06c9ah, 02026h, 0bdf5h, 09aceh, 0c998h; 5055.word009f4h, 01a39h, 008dah, 0085eh, 02ccah, 043cch, 01599h, 0bd57h; 5063.word08deah, 0ba03h, 01407h, 048aah, 037cah, 005b2h, 0f354h, 0071dh; 5071.word0076fh, 0dce2h, 0b3d6h, 0cc42h, 020cfh, 0651fh, 05e6dh, 00f87h; 5079.word0c7e5h, 0c5a6h, 0ebddh, 0fda3h, 0ebfbh, 0e868h, 0194fh, 05bf2h; 5087.word06244h, 012ceh, 0b102h, 09329h, 0ca81h, 012c0h, 02743h, 0110ch; 5095.word007f4h, 0214dh, 03377h, 009c4h, 0b9dbh, 094cdh, 0c689h, 01ef0h; 5103.word05217h, 03c18h, 0feaeh, 0e653h, 0f925h, 00073h, 0e160h, 0c071h; 5111.word0db62h, 02b72h, 06b47h, 05d99h, 0066ah, 0bb10h, 0baebh, 0e8f9h; 5119.word00490h, 0f8a7h, 0f335h, 01c10h, 05503h, 05511h, 004a1h, 0a755h; 5127.word092b8h, 0d1aah, 01c91h, 0329ah, 018aah, 00361h, 0151fh, 0251ah; 5135.word0ff45h, 0b9f4h, 09cb3h, 0d314h, 02dddh, 05e09h, 0406ah, 0f8e4h; 5143.word0d829h, 0ec18h, 0fc90h, 0ee4ah, 0e1a8h, 00262h, 0084fh, 01492h;5140.word0182dh, 0fc70h, 0d299h, 0ccdfh, 0eadfh_Dtmf0Start:.word0fef9h; 5153_Dtmf9End:.word0f7d1h, 0e98fh;5154.word0fad1h, 033e9h, 06438h, 05688h, 005e7h, 0b10eh, 0a030h, 0dd55h;5156.word031b4h, 05a8ch, 035d0h, 0e3f6h, 0b2f9h, 0c124h, 0eff2h, 00f9ah; 5175.word00b6ah, 002d2h, 011a4h, 02e53h, 02f42h, 0fbfeh, 0b490h, 09af7h; 5183.word0d31ah, 0313eh, 06cdbh, 052a9h, 0f32bh, 0a265h, 09fd9h, 0e4a9h; 5191.word02cbfh, 04347h, 02963h, 0086eh, 00341h, 00ca9h, 00152h, 0dadch; 5199.word0be53h, 0d9aah, 0276eh, 06867h, 05d07h, 003efh, 0a4f0h, 08d96h; 5207.word0cc34h, 02686h, 055b1h, 03d32h, 0fa4bh, 0cf70h, 0d64eh, 0f089h; 5215.word0fbd6h, 0f0abh, 0f1d0h, 01709h, 04712h, 04d70h, 00f1eh, 0b903h; 5223.word093b7h, 0c311h, 0223bh, 06549h, 057b3h, 0035ch, 0b423h, 0a9c2h; 5231.word0db28h, 014f5h, 026b3h, 01715h, 00e35h, 01aa3h, 0275ah, 00ddah; 5239.word0d27fh, 0a862h, 0c1f4h, 01724h, 06371h, 06728h, 0152dh, 0b253h; 5247.word09010h, 0c2f2h, 01853h, 048abh, 03b5ah, 00b68h, 0ed54h, 0f34dh; 5255.word0fc95h, 0ef0ch, 0d475h, 0d746h, 00da0h, 05139h, 0629bh, 02472h; 5263.word0c14dh, 08cb7h, 0b3feh, 00f83h, 0572ch, 057a3h, 011f0h, 0cb91h; 5271.word0bed9h, 0df46h, 0031eh, 00958h, 00029h, 00b49h, 02d33h, 043b6h; 5279.word0235ah, 0d68ch, 09c1ch, 0af2ch, 00474h, 05893h, 06ae1h, 02368h; 5287.word0c1ebh, 09831h, 0bc5dh, 0065dh, 03525h, 02e2bh, 01144h, 00775h; 5295.word01165h, 00f71h, 0ea97h, 0bc06h, 0ba31h, 0fa9dh, 050fbh, 071b1h; 5303.word0386fh, 0cf9bh, 08db5h, 0a6e4h, 0fcbfh, 04577h, 04f59h, 01d57h; 5311.word0e60eh, 0da2fh, 0ed3ah, 0f9b0h, 0ee06h, 0e302h, 0fe40h, 03787h; 5319.word05b3eh, 03a17h, 0e1edh, 09877h, 09eaah, 0f029h, 04878h, 0655ch; 5327.word02ff8h, 0d8c4h, 0aeb4h, 0c623h, 0fba5h, 01b1eh, 015a6h, 00bf5h; 5335.word0176bh, 02eafh, 02813h, 0f0e2h, 0afb7h, 0a4d7h, 0e761h, 042b8h; 5343.word070a7h, 04460h, 0dd00h, 09591h, 0a26ch, 0edfah, 0349ch, 041efh; 5351.word02035h, 0fd19h, 0f8d0h, 00353h, 0f917h, 0d839h, 0c4f6h, 0e7a2h; 5359.word03383h, 069b6h, 05043h, 0f211h, 09b19h, 0944bh, 0df9bh, 037b6h; 5367.word05d74h, 03720h, 0ee69h, 0c95dh, 0d5adh, 0f5eeh, 0030fh, 0f8bah; 5375.word0fc0eh, 01e44h, 04634h, 04224h, 00027h, 0aef7h, 09731h, 0d563h; 5383.word03367h, 06a06h, 04e7bh, 0ef81h, 0a648h, 0a8efh, 0e3edh, 01fb9h;
5391.word02c27h, 0185ah, 00bdah, 015afh, 01ea4h,
002c3h, 0cbc2h, 0ac55h; 5399.word0d0dah, 02771h,
06adbh, 05d53h, 001e8h, 0a39dh, 09010h, 0d0d3h;
5407.word02704h, 04fcfh, 0377fh, 0017ch, 0e58ah, 0ee03h,
0fa01h, 0ef3ah; 5415.word0d9cbh, 0e2edh, 01a0fh, 056e1h,
05b52h, 01258h, 0b258h, 08c6bh; 5423.word0c256h,
02137h, 05f6fh, 05163h, 0017eh, 0bf2bh, 0bb9eh, 0e2cdh;
5431.word00b1dh, 01040h, 005e6h, 01049h, 02e6bh,
03ccah, 0153fh, 0c97ah; 5439.word09c3eh, 0bce8h,
016c6h, 06439h, 065cch, 011beh, 0b170h, 092edh;
5447.word0c61dh, 014d6h, 03cd0h, 02dcch, 00d49h,
001a4h, 00a74h, 0071ah; 5455.word0e400h, 0bedbh,
0c7cfh, 00c13h, 059e0h, 06b82h, 025cfh, 0bdd5h;
5463.word08bd6h, 0b2fh, 00c0ah, 04e81h, 04bfeh,
0106eh, 0db29h, 0d4b6h; 5471.word0ec17h, 0fd24h,
0f366h, 0ec44h, 008b4h, 03c62h, 05675h, 02affh;
5479.word0d331h, 094bah, 0aa3ah, 00419h, 057b6h,
06702h, 020e5h, 0c6e2h; 5487.word0a5a3h, 0c847h,
004b4h, 0225bh, 01973h, 00d3fh, 015e8h, 02817h;
5495.word01b91h, 0e51eh, 0aebdh, 0b0ech, 0f9edh,
051d5h, 07178h, 03481h; 5503.word0cb64h, 08f1bh,
0aaabh, 0fcech, 03df2h, 04401h, 01988h, 0f458h;
5511.word0f342h, 0fdf3h, 0f64fh, 0d910h, 0cd89h, 0f713h,
03fach, 06807h; 5519.word04024h, 0df26h, 09489h,
09ef6h, 0f252h, 04598h, 05e07h, 02b26h;
5527.word0dfabh, 0c0aah, 0d556h, 0fab6h, 0087dh, 0fe83h,
00308h, 02313h; 5535.word04401h, 035c1h, 0efa9h,
0a6b0h, 09eabh, 0e6d4h, 04338h, 06e19h;
5543.word04061h, 0ddadh, 09d6ah, 0ac99h, 0f020h,
02a15h, 03141h, 017d9h; 5551.word0086ah, 0109bh,
01588h, 0f8f5h, 0c71ch, 0b2c0h, 0e1dah, 037dbh;
5559.word07031h, 05308h, 0efa2h, 099b5h, 09639h,
0dfadh, 032cdh, 05254h; 5567.word02f03h, 0f382h,
0db42h, 0e834h, 0f839h, 0f17fh, 0e0d5h, 0efcfh;
5575.word024d8h, 057c8h, 04each, 0ff39h, 0a84dh,
092b0h, 0d41ah, 031e6h; 5583.word06404h, 04878h,
0f382h, 0b535h, 0bb5bh, 0ea9eh, 01323h, 0169ah;
5591.word00a68h, 01204h, 02b8eh, 03216h, 0063dh,
0bfd9h, 09e27h, 0cb55h; 5599.word0278fh, 06a80h,
05b12h, 00035h, 0a616h, 0968ah, 0d4f0h, 0221fh;
5607.word0421fh, 02bbch, 0069bh, 0fac6h, 003deh,
0007ah, 0e0c2h, 0c322h; 5615.word0d4a2h, 01aa3h,
060a5h, 061f1h, 01197h, 0afb9h, 08bb9h, 0c246h;
5623.word0203ch, 05819h, 04766h, 00442h, 0d05ah,
0d0e9h, 0ed79h, 00088h; 5631.word0f8c5h, 0f48ah,
01147h, 03f20h, 04de4h, 019f7h, 0c3b1h, 09423h;
5639.word0ba2dh, 015b0h, 05f72h, 06006h, 00f68h,
0b9f2h, 0a43ch, 0d0cdh; 5647.word00fffh, 029cfh, 01d1eh,
00d0ah, 013c4h, 02213h, 0110fh, 0dbcbh;
5655.word0acd6h, 0bbb4h, 00a1eh, 05d4dh, 06c80h,
0241ah, 0be07h, 08ca2h; 5663.word0b668h, 00cbch,
046eeh, 0423ch, 010edh, 0ec68h, 0ec00h, 0f996h;
5671.word0f442h, 0db84h, 0d83bh, 00511h, 04894h,
063e1h, 03030h, 0ce46h; 5679.word08f40h, 0aa1ch,
002e1h, 05269h, 05e8ah, 01dbah, 0d0aeh, 0b9dfh;
5687.word0d711h, 00102h, 00f07h, 0054bh, 008a6h,
0253ch, 03e69h, 027d1h; 5695.word0e192h, 0a2b3h,
0a887h, 0f778h, 051e4h, 06fa2h, 03072h, 0cb28h;
5703.word095ach, 0b282h, 0fe4fh, 03364h, 0335ch,
0151eh, 0ff1fh, 0ff4bh; 5711.word0fed8h, 0f786h, 0f5f6h,
0fbd2h, 00f77h, 02373h, 013d4h, 0dfb1h;
5719.word0b542h, 0bb92h, 0fb68h, 04cb5h, 06f37h,
04600h, 06e8h, 09844h; 5727.word0966fh, 0de84h,
037d7h, 06924h, 04e8ah, 0f8a9h, 0b246h, 0a54dh;
5735.word0d3f7h, 01923h, 03d90h, 0363ch, 01425h,
0f9d2h, 0f666h, 0fa90h; 5743.word0f5e5h, 0e3fah, 0dacdh,
0f090h, 020a0h, 04815h, 04016h, 001a9h;
5751.word0b4fch, 09539h, 0c044h, 01874h, 06165h,
069feh, 02278h, 0c043h; 5759.word08dddh, 0a9afh,
0fbd1h, 047c0h, 05d78h, 034deh, 0f405h, 0cc9dh;
5767.word0d169h, 0f39ah, 00fbeh, 013f9h, 00c3bh,
00c92h, 01ab2h, 02306h; 5775.word00fceh, 0e126h,
0b6bch, 0baf1h, 0f523h, 04160h, 0672eh, 0429ah;
5783.word0e86eh, 099fbh, 090c1h, 0d25ch, 02b1eh,
06445h, 0547eh, 0033bh;5780.word0b57ah, 09f24h,
0ca9bh, 0133ah, 0400eh, 03e9bh, 01d33h__
DtmfStarStart:.word0fe38h;5795__
Dtmf0End:.ifSaveRomSpace.word0.else.word0f6a4h,
0faf8h, 0facdh, 0eb93h, 0df4bh, 0ee96h, 01a1eh,
04351h;5796.word04168h, 00bc0h, 0c053h, 097ddh,
0b844h, 00ac9h, 058b7h, 06c34h;5804.word02eafh,
0cbbdh, 08dc4h, 0a0a9h, 0efc5h, 03ed8h, 05f16h, 03cfbh;
5823.word0f904h, 0ccdch, 0cc2dh, 0ed4dh, 00df8h,
01650h, 00f98h, 00c04h; 5831.word0179eh, 021b3h,
012fbh, 0e894h, 0bc8dh, 0b84eh, 0ead0h, 038c7h;
5839.word06702h, 04d48h, 0f774h, 0a165h, 08ce9h,
0c6b2h, 01fcdh, 060b2h; 5847.word05b85h, 01026h,
0bdf7h, 09da7h, 0c1ffh, 00953h, 03d36h, 042c2h;
5855.word0232ch, 00125h, 0f38bh, 0f8c9h, 0fba2h, 0ef6bh,
0e2e0h, 0ebc3h; 5863.word012b7h, 03da2h, 044edh,
0158ah, 0c9d8h, 09a4fh, 0af36h, 0fe21h; 5871.word0512ah,
06e54h, 039f9h, 0d77dh, 09221h, 0990ch, 0e21eh, 0379ah;
5879.word05f04h, 04511h, 00217h, 0ce60h, 0c89ch,
0e72eh, 00c16h, 018bah; 5887.word01277h, 00c6fh, 0140h,
01f8ch, 015bbh, 0f021h, 0c344h, 0b7feh;
5895.word0e265h, 02ca2h, 0612fh, 05251h, 00318h,
0ab33h, 08ae1h, 0bad4h; 5903.word01549h, 05bd3h,
06154h, 01db9h, 0c738h, 09db5h, 0b7a2h, 0ff10h;
5911.word03acdh, 04758h, 0294fh, 00244h, 0f161h,
0f52ch, 0fb16h, 0f31dh; 5919.word0e5d1h, 0ea60h, 00bffh,
037a0h, 044f9h, 01d50h, 0d48ah, 09ea6h;
5927.word0aa21h, 0f290h, 045c5h, 06e4eh, 04435h,
0e3ach, 097ach, 0936fh; 5935.word0d7b4h, 02c74h,
05d21h, 04d7fh, 00912h, 0d141h, 0c483h, 0e08ah;
5943.word00a23h, 01afch, 016f8h, 00d88h, 0115eh,
01caeh, 016cdh, 0f753h; 5951.word0caa2h, 0b8e2h,
0db16h, 02322h, 05d9ch, 05769h, 00e65h, 0b5aah;
5959.word08c0fh, 0b1f1h, 00987h, 055f0h, 06783h,
0294fh, 0cecfh, 09e08h; 5967.word0afa9h, 0f447h, 0352fh,
04939h, 02f01h, 00641h, 0f044h, 0f165h;
5975.word0fa7dh, 0f67eh, 0ea1fh, 0ea5eh, 0068bh, 0311dh,
0442fh, 02576h; 5983.word0df37h, 0a39fh, 0a598h,
0e820h, 03bf0h, 06bfch, 04de6h, 0f14dh; 5991.word09f63h,
090f6h, 0cc89h, 02253h, 05c38h, 05517h, 012bbh, 0d43ah;
5999.word0bfeeh, 0d901h, 0043eh, 01b88h, 01aa1h,
00f10h, 00e9ah, 0199fh; 6007.word0176ch, 0fc5eh,
0d0d4h, 0b960h, 0d4c4h, 0197dh, 0582fh, 05cffh;
6015.word01bf1h, 0c07dh, 08d1eh, 0a7d0h, 0fcc0h,
04f75h, 06bd3h, 03538h; 6023.word0d952h, 09e54h,
0a686h, 0ea56h, 030fbh, 04bcfh, 0361eh, 00aa0h;
6031.word0eebbh, 0ee18h, 0f803h, 0f848h, 0ecceh, 0e9edh,
001bbh, 02a57h; 6039.word04219h, 02a9ah, 0e921h,
0a90eh, 0a156h, 0ddd9h, 032b5h, 06aa6h;
6047.word05866h, 0ff9fh, 0a553h, 08ac0h, 0beaah, 01858h,
05737h, 059a2h; 6055.word01d86h, 0d9aah, 0bf34h,
0d140h, 0006ch, 01d7ch, 01e0ch, 0126ah;
6063.word00d07h, 016c3h, 0178bh, 00195h, 0d839h,
0bc92h, 0cfc9h, 00e33h; 6071.word04ff2h, 05e57h, 026e6h,
0cbd0h, 08e93h, 0a0a4h, 0f16ah, 044bdh;
6079.word06b97h, 041d9h, 0e550h, 0a155h, 09fd4h,
0dfd2h, 02a21h, 04d09h; 6087.word03d21h, 01050h,
0efd6h, 0eaf3h, 0f5fah, 0fa3dh, 0f128h, 0ebb4h;
6095.word0fe0bh, 02499h, 03fc7h, 02fe9h, 0f354h, 0b188h, 09f9ch, 0d18fh; 6103.word026a1h, 0666eh, 05f64h, 00e5eh, 0af15h, 08a88h, 0b58fh, 00af7h; 6111.word052c6h, 05e98h, 02811h, 0e0b7h, 0bd1ah, 0cbb8h, 0f935h, 01cbdh; 6119.word021c0h, 01505h, 00cd7h, 0134bh, 016e4h, 00521h, 0deceh, 0bf88h; 6127.word0caf7h, 004fbh, 04905h, 060aeh, 03143h, 0d6aah, 092cdh, 0990dh; 6135.word0e422h, 03c29h, 06bb9h, 04d3fh, 0f217h, 0a69bh, 09c5eh, 0d34ch; 6143.word02088h, 04c07h, 0423ch, 01692h, 0f143h, 0e814h, 0f31bh, 0fb69h; 6151.word0f4a3h, 0edbdh, 0fb01h, 01e6eh, 03ca5h, 03396h, 0fc1ah, 0b7c0h; 6159.word09d50h, 0c7c5h, 01cedh, 063ach, 0673bh, 01b7bh, 0b8c9h, 089dfh; 6167.word0a9c6h, 0ff55h, 04b49h, 0608ch, 03255h, 0e811h, 0bdf7h, 0c56ah; 6175.word0f324h, 01acbh, 0243eh, 0194fh, 00c4ah, 00fedh, 01472h, 007a5h; 6183.word0e58bh, 0c48eh, 0c921h, 0fabfh, 03f5fh, 06026h, 039bah, 0e2e4h; 6191.word099a9h, 09443h, 0d721h, 0307bh, 0678ch, 0532dh, 0fe35h, 0adc0h; 6199.word0989ah, 0cabah, 01a8fh, 04befh, 04913h, 01eaeh, 0f435h, 0e61ch; 6207.word0efebh, 0fb6eh, 0f826h, 0efebh, 0f848h, 01809h, 037d2h, 0360fh; 6215.word005b5h, 0c0adh, 09de9h, 0bfb4h, 010aah, 05abfh, 068e8h, 0296ah; 6223.word0c612h, 08aa3h, 0a183h, 0f291h, 0452eh, 063b5h, 03b48h, 0f1c1h; 6231.word0bec1h, 0c007h, 0eb38h, 01845h, 0276dh, 01cbdh, 00e06h, 00d45h; 6239.word01348h, 00a6dh, 0ebd4h, 0c92fh, 0c6d3h, 0f319h, 03673h, 05df2h; 6247.word0437bh, 0f09eh, 0a06fh, 0914fh, 0cca3h, 025d9h, 065c4h, 05d68h; 6255.word00aebh, 0b312h, 09415h, 0bd5dh, 00ea4h, 047c6h, 04c11h, 024ebh; 6263.word0f654h, 0e3efh, 0ec33h, 0facch, 0fc4fh, 0f456h, 0f887h, 0133ah; 6271.word032d6h, 03556h, 00bd8h, 0d751h, 0cd66h, 0e4fbh, 0ef15h, 0f372h; 6279.word0fc01h, 00365h, 00a0bh, 011d9h, 008b0h, 0ebc3h, 0e302h, 0fc03h;6276.endif; SaveRomSpace__DtmfPoundStart:.word00147h; 6284__ DtmfStarEnd:.ifSaveRomSpace.word0.else.word0dc49h, 0c066h, 0e181h, 0374bh, 074fah, 059cbh, 0fab1h;6284.word0b014h, 0b9a7h, 0f82dh, 023dbh, 01dcdh, 00989h, 012e4h, 027bfh;6292.word015a5h, 0d2cch, 09db6h, 0ba59h, 01538h, 05c50h, 0505fh, 0f9b4h; 6311.word0b1f0h, 0b80eh, 0e82dh, 0059fh, 000ddh, 0028bh, 02a97h, 050c3h; 6319.word0382ch, 0e1e7h, 09be4h, 0af41h, 008c3h, 052f3h, 051a1h, 01089h; 6327.word0d8f7h, 0dc66h, 0f377h, 0f1c5h, 0dee2h, 0ec62h, 02e65h, 066b0h; 6335.word05143h, 0ee61h, 09834h, 09e6bh, 0ee63h, 03707h, 03d4eh, 0123ch; 6343.word0f39ah, 0fbc5h, 0005eh, 0dfc9h, 0bb07h, 0ce2eh, 02042h, 068b3h; 6351.word05d11h, 0fef0h, 0a50eh, 0a224h, 0e60bh, 02279h, 02a0dh, 0136ah; 6359.word012ceh, 0269ah, 01cedh, 0e173h, 0a67ah, 0b53bh, 00c1bh, 05d76h; 6367.word05f1fh, 00db2h, 0bb95h, 0b3ffh, 0e2a3h, 0086fh, 008a1h, 002e5h; 6375.word02151h, 04929h, 03d98h, 0ee89h, 09ee5h, 0a3c5h, 0f79ah, 048e2h; 6383.word0546ch, 01860h, 0d828h, 0d281h, 0ebc4h, 0f376h, 0e330h, 0e6fbh; 6391.word020e9h, 05ee5h, 05922h, 0ff0fh, 0a184h, 0981dh, 0e25ch, 03349h; 6399.word043ebh, 01bdeh, 0f5c2h, 0f768h, 00178h, 0e936h, 0c2a1h, 0c98bh; 6407.word012a9h, 0624ah, 06764h, 0100bh, 0ad25h, 09a32h, 0d8c8h, 01e20h; 6415.word02e8bh, 017e1h, 00ed0h, 02005h, 01fd5h, 0ece6h, 0ae91h, 0ae1ch; 6423.word0fc92h, 05463h, 06640h, 01e0eh, 0c2b7h, 0ad84h, 0d9cfh, 0070ah; 6431.word00debh, 004ffh, 01a49h, 042aeh, 041cfh, 0fba2h, 0a88fh, 09dcbh; 6439.word0e71fh, 040c6h, 05baeh, 02472h, 0dc54h, 0cb64h, 0e55eh, 0f4a7h; 6447.word0e8abh, 0e55fh, 014edh, 056dfh, 05de3h, 01033h, 0acb1h, 09329h; 6455.word0d570h, 02ad4h, 04881h, 0251fh, 0f6d3h, 0f1a7h, 0fee9h, 0ef2dh; 6463.word0c9e3h, 0c5b5h, 00619h, 058bfh, 06c43h, 0221eh, 0ba31h, 0964ah; 6471.word0cb9fh, 01845h, 0335ah, 01dc3h, 00ddch, 019a8h, 0205ch, 0f710h; 6479.word0b6f1h, 0aa7ch, 0ed7eh, 04885h, 06904h, 02b6dh, 0cc82h, 0a8c9h; 6487.word0cec2h, 002adh, 01178h, 00789h, 01442h, 03a5dh, 04417h, 008e6h; 6495.word0b2cch, 09967h, 0d9b2h, 03699h, 05dfch, 030dah, 0e273h, 0c62ch; 6503.word0df43h, 0f569h, 0ee88h, 0e629h, 00ba2h, 04d1fh, 06040h, 01ee5h; 6511.word0b9dch, 091a4h, 0c7ffh, 0205dh, 04a3fh, 02e4ch, 0fa5ch, 0ec6bh; 6519.word0fad8h, 0f3ceh, 0d160h, 0c358h, 0fa1bh, 0505ah, 07101h, 03147h; 6527.word0c62bh, 094c8h, 0c076h, 0ec9h, 033f8h, 0237bh, 00bdbh, 011bdh; 6535.word01dddh, 0fe20h, 0c067h, 0a890h, 0e120h, 03f72h, 06ba6h, 039e9h; 6543.word0d856h, 0a691h, 0c47dh, 0fe36h, 0174bh, 00c58h, 01089h, 03237h; 6551.word042edh, 014c8h, 0befch, 09741h, 0cc0ah, 02bbeh, 05fbdh, 03e96h; 6559.word0ee70h, 0c389h, 0d786h, 0f50eh, 0f42eh, 0e912h, 00328h, 04168h; 6567.word060b1h, 02b3dh, 0c66eh, 08f55h, 0ba1eh, 016cdh, 04b42h, 0387bh; 6575.word000ffh, 0e7f0h, 0f5eeh, 0f688h, 0d8f4h, 0c417h, 0ee08h, 04385h; 6583.word07114h, 0409fh, 0d644h, 09414h, 0b276h, 004eah, 03576h, 02a48h; 6591.word00e4ah, 00cf4h, 01adah, 0057ch, 0ca89h, 0a916h, 0d5ceh, 031f5h; 6599.word06b66h, 048e0h, 0e695h, 0a667h, 0bac9h, 0f619h, 017a2h, 01123h; 6607.word00d25h, 02997h, 04113h, 01ee3h, 0cc15h, 096bah, 0beech, 01eaeh; 6615.word05e7ch, 0496dh, 0f7c6h, 0c28bh, 0cf00h, 0f08eh, 0f8d4h, 0ec2eh; 6623.word0fd2fh, 03787h, 05f00h, 0386fh, 0d622h, 09309h, 0af12h, 00917h; 6631.word049d5h, 0413dh, 0088ch, 0e543h, 0ef57h, 0f7fch, 0e0bdh, 0c7e4h; 6639.word0e4f6h, 0363bh, 06fe5h, 04dadh, 0e4edh, 097fbh, 0a951h, 0f76bh; 6647.word03150h, 02f14h, 00f55h, 006a6h, 0158eh, 009c3h, 0d4dfh, 0ab5ah; 6655.word0cb15h, 0261eh, 06ae4h, 05598h, 0f4d2h, 0a7c0h, 0b0a2h, 0ee01h; 6663.word019a9h, 016fbh, 00d7fh, 022feh, 03da7h, 0272ch, 0d89ah, 09b9bh; 6671.word0b587h, 010bah, 05b15h, 053d7h, 004b7h, 0c228h, 0c6b8h, 0eb57h; 6679.word0fca4h, 0f295h, 0f9b2h, 02d98h, 059bch, 0418bh, 0e536h, 0988bh; 6687.word0a64ah, 0fad6h, 04418h, 04654h, 01069h, 0e4beh, 0e905h, 0f79ah; 6695.word0e82eh, 0cd24h, 0ddb3h, 02879h, 06b58h, 05a91h, 0f7ceh, 09e14h; 6703.word09effh, 0ea92h, 02ef0h, 03695h, 0152eh, 00368h, 00f8bh, 00c2ah; 6711.word0dee5h, 0b040h, 0c337h, 01864h, 064bah, 05e8ah, 0053eh, 0ae09h; 6719.word0a7dfh, 0e352h, 01864h, 01d2fh, 00efah, 01c5bh, 037b7h, 02bfdh; 6727.word0e5e4h, 0a197h, 0ab71h, 001a4h, 05457h, 05ae9h, 01305h, 0c893h; 6735.word0c079h, 0e5a8h, 0fe1fh, 0f6afh, 0f77dh, 02315h, 0557eh, 04a8eh; 6743.word0f3fah, 09e0fh, 09c3ah, 0ec7ah, 03dbeh, 04d0fh, 0199dh, 0e413h; 6751.word0e1c2h, 0f3edh, 0ed14h, 0d30fh, 0d995h, 01cbah, 063ddh, 06141h; 6759.word007eeh, 0a81bh, 09933h, 0dd11h, 02a67h, 03bb6h, 01ad1h, 001f0h; 6767.word00964h, 00d8fh, 0e844h, 0b735h, 0bd2dh, 0097fh, 05bb9h, 065d3h; 6775.word01667h, 0b5fbh, 0a012h, 0d7dah, 0149eh, 021a6h, 0122ah, 016c6h; 6783.word03146h, 02f01h, 0f22fh, 0a961h, 0a5ech, 0f4c3h, 04d1eh, 061bch; 6791.word01ff4h, 0cd69h, 0b9e2h, 0dc4ah, 0fe83h, 0fe46h, 0f7b2h, 01a68h; 6799.word04cdah, 04e8ah, 00385h, 0a7c4h, 0969ch, 0dea3h, 0372fh, 05218h; 6807.word02552h, 0e9bbh, 0db91h, 0f071h, 0f15ah, 0d96eh, 0d6dbh, 00f88h; 6815.word05c84h, 068bfh, 01979h, 0b223h, 09330h, 0cfcfh, 02056h, 03e28h;

6823.word021abh, 0ff75h, 00244h, 0ba6h, 0efd6h, 0bee1h, 0b77eh, 0fc1fh; 6831.word05451h, 06c73h, 0273bh, 0c259h, 09e80h, 0ce55h, 00fa8h, 01467h; 6839.word00000h; 6841.endif; SaveRomSpace_ DtmfPoundEnd:.word00000h/*DTMF.h*/#ifndef___ DTMF___#define___DTMF___/***DTMF detector stuff**************************/ #defineLightenUpFalse#defineUsingAllFiltersFalse#define ENERGY_SCALER_SHIFT6#defineSAMPLE_ BITS16#defineENERGY_LIMIT_ HIGH83886080#defineENERGY_LIMIT_ LOW10485760#defineGAIN_REDUCTION_ STEP31838#defineGAIN_INCREASE_ STEP4#defineLPFCOEF8483#defineINPUTTHRESHOLD 200000/* 32 bit num representing energy */#defineMinStateDuration10/* how consecutive chunks for statemachine recognition */#defineSilenceTimeout50/* how many consec chunks of silence to trigger and 'explicit msg */#defineDIAL_TONE 'd'#defineRING 'r'#defineBUSY 'b'#defineSILENCE 's'#defineUNDETERMINED '?'#if LightenUp#defineFILTERTHRESHOLD 19000#defineFILTERDIFFERENCE 29000/*lower=fewer false +, more false */#else#defineFILTERTHRESHOLD 28400#defineFILTERDIFFERENCE 16000/*lower=fewer false +, more false */#endif /* LightenUp */typedefvoid(*CallBackRoutinePtr) (DtmfState state, ushort prevDuration );typedef struct {DtmfStatestate;DtmfStateprevious_ state;DtmfStateprevious_previous_ state;ushortstateDuration;ushortprevDuration;SpeechPtrinputPtr;shortinputGain; shortinput DiffState;shortinputIntState;#if UsingAllFiltersBiQuadPtrfilterPtr[12] ;longfilterEnergyLPFstates[12];#elseBiQuadPtrfilterPtr[7] ;longfilterEnergyLPFstates[7] ;#endifshortLPFcoef;longinputThreshold;longinputEnergy LPFstate;dBprevInputLevel;shortfilterThresholdCoef;short filterDifferenceCoef;DtmfStatedtmfArray[4][4] ;MeterdtmfMeter;CallBackRoutinePtr callBackRoutine;}DtmfParams, * DtmfParamsPtr;/* prototypes from dtmf.c */voidProcessDtmf( DtmfParamsPtr x);voidProcessChunk( DtmfParamsPtr dtmfPtr, short numSamples);voidProcessChunkState( DtmfParamsPtr dtmfPtr);voidInitDtmf( DtmfParamsPtr dtmfPtr) ;externDtmfParamsdtmfData;#endif/*___DTMF___*/ This file contains DTMF detection state machine & init code.
*/#include 'globals.h'#include 'dtmf.h'/***************************** ******************processChunkState (DtmfParamsPtr dtmfPtr)*If the state changes and remains constant for MinStateDuration number*of chunks, processChunkState() will usually call dtmfPtr->call BackRoutine()*passing the state to the callBackRoutine. However, it looks for patterns of*pulsing ringing or busy tones and will not repeat calls the CallBackRoutine*in the case of ringing or busy. (It DOES call the callBackRoutine ONCE in*the cases of ringing or busy.
*Note! Does not call UNDETERMINED (although detects it). ***************************** *******************/Pragma_Sect_ text2void ProcessChunkState( register DtmfParamsPtr dtmfPtr){if (dtmfPtr->stateDuration==MinStateDuration && dtmfPtr->state !=Unknown){#if UsingAllFiltersif ( (!(dtmfPtr->state==Busy &&dtmfPtr->previous_state== Silence &&dtmfPtr->previous_previous_state==Busy) &&!(dtmfPtr->state==Silence &&dtmfPtr->previous_ state==Busy &&dtmfPtr->previous_previous_state== Silence)&&!(dtmfPtr->state==Ring &&dtmfPtr->previous_state==Silence &&dtmfPtr->previous_ previous_state==Ring)&&!(dtmfPtr->state==Silence &&dtmfPtr->previous_state==Ring &&dtmfPtr->previous_previous_state==Silence) )||(dtmfPtr->state== Silence &&dtmfPtr->stateDuration==SilenceTimeout) ){/* The state has officially changed *//* take action */if(dtmfPtr->callBackRoutine!=0){(*(dtmfPtr->callBackRoutine)) (dtmfPtr->state,dtmfPtr->prevDuration);}}#else/* not UsingAllFilters */if(dtmfPtr->callBackRoutine!=0){(*dtmfPtr->callBackRoutine))(dtmfPtr->state,dtmfPtr->prevDuration) ;}#endifdtmfPtr->previous_previous_state=dtmfPtr->previous_state;dtmfPtr->previous_state=dtmfPtr->state;}}Pragma_Sect_text2voidInitDtmf( register DtmfParamsPtr dtmf ){short i;if (0==dtmf) {return;}dtmf->state=Unknown;dtmf->stateDuration=0;dtmf->prevDuration=0;dtmf->previous_state=Unknown;dtmf->previous_previous_state=Unknown;dtmf->inputPtr= 0;dtmf->callBackRoutine=RemoteControl;dtmf->inutGain=32767;dtmf->inputDiffState=0;dtmf->inputIntState=0;InitMeter(&dtmf->dtmfMeter,(Rate) FetchHexdBInRom(&DtmfMeterRiseTime),(Rate) FetchHexdBInRom(&DtmfMeterFallTime));/* dtmf recognition is always at 7812.5 hz sample rate */#if (False== Sim)/* simulator uses pre-calculated coeffs to save time */InitDtmfFilter(dtmf->filterPtr[0]=&filter0, (FilterParmsPtr)&DtmfFilterParms0, kHz8);InitDtmfFilter (dtmf->filterPtr[1]=&filter1,(FilterParmsPtr) &DtmfFilterParms1, kHz8);InitDtmfFilter(dtmf->filterPtr [2]=&filter2,(FilterParmsPtr)&DtmfFilterParms2, kHz8) ;InitDtmfFilter(dtmf->filterPtr[3]=&filter3,(FilterParmsPtr) &DtmfFilterParms3, kHz8);InitDtmfFilter(dtmf->filterPtr [4]=&filter4,(FilterParmsPtr)&DtmfFilterParms4, kHz8) ;InitDtmfFilter(dtmf->filterPtr[5]=&filter5,(FilterParmsPtr) &DtmfFilterParms5, kHz8);InitDtmfFilter(dtmf->filterPtr [6]=&filter6,(FilterParmsPtr)&DtmfFilterParms6, kHz8) ;#if UsingAllFiltersInitDtmfFilter(dtmf->filterPtr[7]= &filter7,(FilterParmsPtr)&DtmfFilterParms7, kHz8) ;InitDtmfFilter(dtmf->filterPtr[8]=&filter8,(FilterParmsPtr) &DtmfFilterParms8, kHz8);InitDtmfFilter(dtmf->filterPtr [9]=&filter9,(FilterParmsPtr)&DtmfFilterParms9, kHz8) ;InitDtmfFilter(dtmf->filterPtr[10]=&filter10, (FilterParmsPtr)&DtmfFilterParms10, kHz8);InitDtmfFilter (dtmf->filterPtr[11]=&filter11,(FilterParmsPtr) &DtmfFilterParms11, kHz8);#endif /* UsingAllFilters */#else/* sample rate=7812.5, freq 697 Hz, gain=40, bandwidth=0.18 octaves, feedforward paramters have extra 6 dB */dtmf->filterPtr[0]=&filter0;dtmf->filterPtr[0]->b2= 212;dtmf->filterPtr[0]->b1=-553;dtmf->filterPtr[0]->b0= 441;dtmf->filterPtr[0]->a2=16270;dtmf->filterPtr[0]->a1=- 27656;dtmf->filterPtr[0]->x2=0;dtmf->filterPtr[0]->x1= 0;dtmf->filterPtr[0]->y2=0;dtmf->filterPtr[0]->y1=0;dtmf->filterPtr[0]->nrg=0L;/* sample rate=7812.5, freq 770 Hz, gain=40, bandwidth=0.18 octaves, feedforward parameters have extra 6 dB */dtmf->filterPtr[1]=&filter1;dtmf->filterPtr[1]->b2=200;dtmf->filterPtr[1]->b1=-532;dtmf->filterPtr[1]->b0=453;dtmf->filterPtr[1]->a2=16258;dtmf->filterPtr[1]->a1=-26580;dtmf->filterPtr[1]->x2=0;dtmf->filterPtr[1]->x1=0;dtmf->filterPtr[1]->y2=0;dtmf->filterPtr[1]->y1=0;dtmf->filterPtr[1]->nrg=0L;/* sample rate=7812.5, freq 852 Hz, gain=40, bandwidth=0.144 octaves, feedforward paramters have extra 6 dB*/dtmf->filterPtr[2]=&filter2;dtmf->filterPtr[2]->b2=215;dtmf->filterPtr[2]->b1=-506;dtmf->filterPtr[2]->b0=438;dtmf->filterPtr[2]->a2=16272;dtmf->filterPtr[2]->a1=-25285;dtmf->filterPtr[2]->x2=0;dtmf->filterPtr[2]->x1= 0;dtmf->filterPtr[2]->y2=0;dtmf->filterPtr[2]->y1=0;dtmf- >filterPtr[2]->nrg=0L;/* sample rate=7812.5, freq 941 Hz, gain=40, bandwidth=0.144 octaves, feedforward paramters have extra 6 dB */dtmf->filterPtr[3]=&filter3;dtmf->filterPtr[3]->b2=203;dtmf->filterPtr[3]->b1=−475;dtmf->filterPtr[3]->b0=450;dtmf->filterPtr[3]->a2=16261;dtmf->filterPtr[3]->a1=−23734;dtmf->filterPtr[3]->x2=0;dtmf->filterPtr[3]->x1=0;dtmf->filterPtr[3]->y2=0;dtmf->filterPtr[3]->y1=0;dtmf->filterPtr[3]->nrg=0L;/* sample rate=7812.5, freq 1209 Hz, gain=40, bandwidth=0.144 octaves, feedforward paramters have extra 6 dB */dtmf->filterPtr[4]=&filter4;dtmf->filterPtr[4]->b2=168;dtmf->filterPtr[4]->b1=−367;dtmf->filterPtr[4]->b0=484;dtmf->filterPtr[4]->a2=16226;dtmf->filterPtr[4]->a1=−18371;dtmf->filterPtr[4]->x2=0;dtmf->filterPtr[4]->x1=0;dtmf->filterPtr[4]->y2=0;dtmf->filterPtr[4]->y1=0;dtmf->filterPtr[4]->nrg=0L;/* sample rate=7812.5, freq 1336 Hz, gain=40, bandwidth=0.18 octaves, feedforward paramters have extra 6 dB */dtmf->filterPtr[5]=&filter5;dtmf->filterPtr[5]->b2=107;dtmf->filterPtr[5]->b1=−310;dtmf->filterPtr[5]->b0=544;dtmf->filterPtr[5]->a2=16166;dtmf->filterPtr[5]->a1=−15500;dtmf->filterPtr[5]->x2=0;dtmf->filterPtr[5]->x1=0;dtmf->filterPtr[5]->y2=0;dtmf->filterPtr[5]->y1=0;dtmf->filterPtr[5]->nrg=0L;/* sample rate=7812.5, freq 1477 Hz, gain=40, bandwidth=0.144 octaves, feedforward paramters have extra 6 dB */dtmf->filterPtr[6]=&filter6;dtmf->filterPtr[6]->b2=133;dtmf->filterPtr[6]->b1=−243;dtmf->filterPtr[6]->b0=519;dtmf->filterPtr[6]->a2=16191;dtmf->filterPtr[6]->a1=−12171;dtmf->filterPtr[6]->x2=0;dtmf->filterPtr[6]->x1=0;dtmf->filterPtr[6]->y2=0;dtmf->filterPtr[6]->y1=0;dtmf->filterPtr[6]->nrg=0L;/* sample rate=7812.5, freq 1633 Hz, gain=40, bandwidth=0.144 octaves, feedforward paramters have extra 6 dB */#if UsingAllFiltersdtmf->filterPtr[7]=&filter7;dtmf->filterPtr[7]->b2=112;dtmf->filterPtr[7]->b1=−166;dtmf->filterPtr[7]->b0=539;dtmf->filterPtr[7]->a2=16170;dtmf->filterPtr[7]->a1=−8289;dtmf->filterPtr[7]->x2=0;dtmf->filterPtr[7]->x1=0;dtmf->filterPtr[7]->y2=0;dtmf->filterPtr[7]->y1=0;dtmf->filterPtr[7]->nrg=0L;/* sample rate=7812.5, freq 350 Hz, gain=40, bandwidth=0.2 octaves, feedforward paramters have extra 6 dB */dtmf->filterPtr[8]=(BiQuadPtr)&f8b2;dtmf->filterPtr[8]->b2=263;dtmf->filterPtr[8]->b1=−628;dtmf->filterPtr[8]->b0=391;dtmf->filterPtr[8]->a2=16320;dtmf->filterPtr[8]->a1=−31417;dtmf->filterPtr[8]->x2=0;dtmf->filterPtr[8]->x1=0;dtmf->filterPtr[8]->y2=0;dtmf->filterPtr[8]->y1=0;dtmf->filterPtr[8]->nrg=0L;/* sample rate=7812.5, freq 440 Hz, gain=40, bandwidth=0.125 octaves, feedforward paramters have extra 6 dB */dtmf->filterPtr[9]=(BiQuadPtr)&f9b2;dtmf->filterPtr[9]->b2=277;dtmf->filterPtr[9]->b1=−614;dtmf->filterPtr[9]->b0=377;dtmf->filterPtr[9]->a2=16334;dtmf->filterPtr[9]->a1=−30691;dtmf->filterPtr[9]->x2=0;dtmf->filterPtr[9]->x1=0;dtmf->filterPtr[9]->y2=0;dtmf->filterPtr[9]->y1=0;dtmf->filterPtr[9]->nrg=0L;/* sample rate=7812.5, freq 480 Hz, gain=40, bandwidth=0.125 octaves, feedforward paramters have extra 6 dB */dtmf->filterPtr[10]=(BiQuadPtr)&f10b2;dtmf->filterPtr[10]->b2=272;dtmf->filterPtr[10]->b1=−606;dtmf->filterPtr[10]->b0=382;dtmf->filterPtr[10]->a2=16329;dtmf->filterPtr[10]->a1=−30306;dtmf->filterPtr[10]->x2=0;dtmf->filterPtr[10]->x1=0;dtmf->filterPtr[10]->y2=0;dtmf->filterPtr[10]->y1=0;dtmf->filterPtr[10]->nrg=0L;/* sample rate=7812.5, freq 620 Hz, gain=40, bandwidth=0.2 octaves, feedforward paramters have extra 6 dB */dtmf->filterPtr[11]=(BiQuadPtr)&f11b2;dtmf->filterPtr[11]->b2=214;dtmf->filterPtr[11]->b1=574;dtmf->filterPtr[11]->b0=440;dtmf->filterPtr[11]->a2=16271;dtmf->filterPtr[11]->a1=−28679;dtmf->filterPtr[11]->x2=0;dtmf->filterPtr[11]->x1=0;dtmf->filterPtr[11]->y2=0;dtmf->filterPtr[11]->y1=0;dtmf->filterPtr[11]->nrg=0L;#endif /* UsingAllFilters */#endif /* False==Sim */dtmf->LPFcoef=LPFCOEF;dtmf->inputEnergyLPFstate=0;dtmf->prevInputLevel=99; /* minus 90, no power */dtmf->inputThreshold=FetchULongWordInRom(&dtmfInputThreshold);dtmf->filterThresholdCoef=FetchWordInRom(&dtmfFilterThreshold);dtmf->filterDifferenceCoef=FetchWordInRom(&dtmfFilterDifference);dtmf->filterEnergyLPFstates[0]=0;dtmf->filterEnergyLPFstates[1]=0;dtmf->filterEnergyLPFstates[2]=0;dtmf->filterEnergyLPFstates[3]=0;dtmf->filterEnergyLPFstates[4]=0;dtmf->filterEnergyLPFstates[5]=0;dtmf->filterEnergyLPFstates[6]=0;#if UsingAllFiltersdtmf->filterEnergyLPFstates[7]=0;dtmf->filterEnergyLPFstates[8]=0;dtmf->filterEnergyLPFstates[9]=0;dtmf->filterEnergyLPFstates[10]=0;dtmf->filterEnergyLPFstates[11]=0;#endifdtmf->dtmfArray[0][0]=One;dtmf->>dtmfArray[0][1]=Two;dtmf->dtmfArray[0][2]=Three;dtmf->dtmfArray[0][3]=Akey;dtmf->dtmfArray[1][0]=Four;dtmf->dtmfArray[1][1]=Five;dtmf->dtmfArray[1][2]=Six;dtmf->dtmfArray[1][3]=Bkey;dtmf->dtmfArray[2][0]=Seven;dtmf->dtmfArray[2][1]=Eight;dtmf->dtmfArray[2][2]=Nine;dtmf->dtmfArray[2][3]=Ckey;dtmf->dtmfArray[3][0]=Star;dtmf->dtmfArray[3][1]=Zero;dtmf->dtmfArray[3][2]=Pound;dtmf->dtmfArray[3][3]=Dkey;}/*File:DTMF.cContains:Routine for detecting DTMF tonesCopyright:(c) 1994, 1995 JABRA Corporation, all rights reserved worldwide.

This file contains DTMF detection filter bank.

*/#include 'globals.h '#include 'dtmf.h '/*************************************************/#define DtmfChunkSize40/* 5 millisecond chunks */DtmfParamsdtmfData;Pragma__Sect__ramcodevoidProcessDtmf(register DtmfParamsPtr dtmfParams){short i;register SpeechPtrs;Speechspch[DtmfChunkSize];s=spch; if (GetSpkInCnt()>=DtmfChunkSize){/*is there enough to dequeue??*/if (GetSpkInCnt()>=GetSpkInSize()) {/* start over w/ resynced fifo if overflow has occurred*/InitSpkInFifo(SpkInDelay,SpkInPreQ);}else {for (i=0;i<DtmfChunkSize;i++){/* get peak meter reading for absolute DTMF level detection *//* while dequeing the audio data to be analyzed */ProcessMeter(&dtmfParams->dtmfMeter,(*s++=DeqSpkIn()));/* see if we need to count down */if (overrideCountdown &&(NeedCode==remoteControlMode)) }overrideCountdown--;}}dtmfParms->inputPtr=spch;ProcessChunk( dtmfParams, DtmfChunkSize);ProcessChunkState( dtmfParams );}}}Pragma__Sect__text/*************************************/void ProcessChunk( register DtmfParamsPtr dtmfPtr, short numSamples){short x1, x2, y1, y2;long A;short *input;long energy;short i, filterIndex;DtmfState newState;shortlowGroupMax, highGroupMax;long filter__pair_sum[4], filter_pair_diff[4];/**Compute energy for this chunk and store into*dtmfPtr->inputEnergyLPFstate.

*/y2=dtmfPtr->inputGain;x1=dtmfPtr->inputDiffState;y1=dtmfPtr->inputIntState;energy=0;input=dtmfPtr->inputPtr;for (i=numSamples; i>0; i--) {A=y1;A*=31130;A+=16384;A>>=(SAMPLE_BITS-1);x2=*(input);A+=x2-x1;y1=A;A*=y2;A+=16383;A>>=(SAMPLE_BITS-1);*(input++)=A;A*=A;A>>=ENERGY_SCALER_SHIFT;energy+=A;x1=x2;}dtmfPtr->inputDiffState=x1;dtmfPtr->inputInState=y1;A=energy;A-=dtmfPtr->inputEnergyLPFstate;A+=

```
16384;A>>=(SAMPLE_BITS-1);dtmfPtr-
>inputEnergyLPFstate+=dtmfPtr->LPFcoef * A;/**Adjust
gain to limit input level if necessary.
*/if (dtmfPtr->inputEnergyLPFstate>ENERGY_
LIMIT_HIGH) {A=y2;A*=GAIN_REDUCTION_
STEP;/* drop gain by 1/4 dB */A>>=(SAMPLE_BITS-1)
;dtmfPtr->inputGain=A;}else if ( (dtmfPtr-
>inputEnergyLPFstate<ENERGY_LIMIT_LOW)&&
(dtmfPtr->inputGain<(32767-GAIN_INCREASE_
STEP))) {/* raise gain very slowly */dtmfPtr->inputGain=
y2+GAIN_INCREASE_STEP;}/**Then compute energy
for each DTMF filter and store into*dtmfPtr-
>filterEnergyLPFstates.
*/#if UsingAllFiltersfor (filterIndex=0; filterIndex<12;
filterIndex++) {if (7==filterIndex)continue;/* ignore A,B,C
& D for now */#elsefor (filterIndex=0; filterIndex<7;
filterIndex++){/* just 0–9, plus * & # */#endif/* UsingAll-
Filters */dtmfPtr->filterPtr[filterIndex]->nrg=0L;input=
dtmfPtr->inputPtr;for (i=numSamples; i>0; i--) {DoBq
(dtmfPtr->filterPtr[filterIndex], *(input++));}A=dtmfPtr-
>filterPtr[filterIndex]->nrg;A-=dtmfPtr-
>filterEnergyLPFstates[filterIndex];A>>=(SAMPLE_
BITS-1);dtmfPtr->filterEnergyLPFstates[filterIndex]+=
dtmfPtr->LPFcoef * A;}/**Now determine which in the low
group has highest energy.
*697, 770, 852, 941 Hz*/A=-1;i=0;for (filterIndex=0;
filterIndex<4; filterIndex++) {if (A<dtmfPtr-
>filterEnergyLPFstates[filterIndex]){A=dtmfPtr-
>filterEnergyLPFstates[filterIndex];i=filterIndex;}}filter_
pair_sum[0]=A;filter_pair_diff[0]=A;lowGroupMax=i;#if
(DtmfLoGroupLeds)if (kDtmfLoGroup==
commonLedMode) {if (0==lowGroupMax)leds=xooo;else
if (1==lowGroupMax)leds=oxoo;else if (2==
lowGroupMax)leds=ooxo;else if (3==lowGroupMax)leds=
ooox;}#endif /* DtmfLoGroupLeds *//**Now determine
which in the high group has highest energy.
*1209, 1336, 1477, 1633 Hz*/A=-1;i=4;#if UsingAllFil-
tersfor (filterIndex=4; filterIndex<8; filterIndex++){#elsefor
(filterIndex=4; filterIndex<7; filterIndex++) {#endifif
(A<dtmfPtr->filterEnergyLPFstates[filterIndex]}{A=
dtmfPtr->filterEnergyLPFstates[filterIndex];i=
filterIndex;}}filter_pair_sum[0]+=A;filter_pair_diff
[0]-=A;highGroupMax=i-4;#if (DtmfHiGroupLeds)if
(kDtmfHiGroup==commonLedMode) {if (0==
highGroupMax)leds=xooo;else if (1==highGroupMax)
leds=oxoo;else if (2==highGroupMax)leds=ooxo;else if
(3==highGroupMax)leds=ooox;}#endif /* DtmfHiGrou-
pLeds *//**Now compute dial tone, busy, and ring energy
and compare to touch tones.
*/#if UsingAllFiltersfilter_pair_sum[1]=dtmfPtr-
>filterEnergyLPFstates[8]+dtmfPtr->filterEnergyLPFstates
[9];filter_pair_sum[2]=dtmfPtr->filterEnergyLPFstates
[9]+dtmfPtr->filterEnergyLPFstates[10];filter_pair_sum
[3]=dtmfPtr->filterEnergyLPFstates[10]+dtmfPtr-
>filterEnergyLPFstates[11];filter_pair_diff[1]=dtmfPtr-
>filterEnergyLPFstates[8]-dtmfPtr->filterEnergyLPFstates
[9];filter_pair_diff[2]=dtmfPtr->filterEnergyLPFstates
[9]-dtmfPtr->filterEnergyLPFstates[10];filter_pair_diff
[3]=dtmfPtr->filterEnergyLPFstates[10]-dtmfPtr-
>filterEnergyLPFstates[11];A=-1;i=0;for (filterIndex=0;
filterIndex<4; filterIndex++) {if (A<filter_pair_sum
[filterIndex]) {A=filter_pair_sum[filterIndex];i=
filterIndex;}}if (filter_pair_diff[i]<0) {filter_pair_diff
[i]=-filter_pair_diff[i];}#else /* UsingAllFilters */i=
0;#endif /* UsingAllFilters *//**Finally determine the dtmf
state.
*/energy=dtmfPtr->inputEnergyLPFstate;if
(energy>dtmfPtr->inputThreshold) {/* is the energy in the
filter pair a significant portion of the overall energy? */if (
filter_pair_sum[i]>(energy>>(SAMPLE_BITS-1)) *
dtmfPtr->filterThresholdCoef ) {/* are the two different
tones roughly the same amount of energy? */if ((filter_
pair_diff[i]<<2)<(filter_pair_sum[i]>>(SAMPLE_
BITS-3)) * dtmfPtr->filterDifferenceCoef) {if (i<=0)
{newState=dtmfPtr->dtmfArray[lowGroupMax]
[highGroupMax];}#if UsingAllFilterselse if (i<=1)
{newState=DIAL_TONE;}else if (i<=2) {newState=
RING;}else {newState=BUSY;}#endif /* UsingAllFilters
*/}}else {newState=Silence;}}else {newState=Silence;}if
(dtmfPtr->state==newState) {/* we stop counting if we're
longer than 2½ minutes or so */if (dtmfPtr-
>stateDuration<32767) {dtmfPtr->stateDuration++;}}else
{#define CorrectionFactor0/* aHexdBp2dB expects energy
to be accumulated over 32 samples *//* while DTMF
accumulates 40 samples */dtmfPtr->state=
newState;dtmfPtr->prevDuration=dtmfPtr-
>stateDuration;/* max level is determined in negative db.–0
is the highest, 99 is lowest */dtmfPtr->prevInputLevel=
dtmfPtr->dtmfMeter.maxLevel;dtmfPtr-
>dtmfMeter.maxLevel=99;dtmfPtr->stateDuration=
0;}return;}Pragma_Sect_
ramcodeBiQuadPtrtempPtr;SpeechtempIn;short DoBq
(BiQuadPtr bq, Speech in){tempPtr=bq;tempIn=in;asm
('.global_bq ');asm ('ldpk_tempPtr ');asm ('lacl_tempPtr
');asm('sacb ');asm('ldpk_tempIn ');asm('lacl_tempIn
');asm('call_bq ');};//;// Meter routines;//;//95-04-26DTR
Initial revision;//;//;#ifdef Copyrights;static char
copyrightNotice='Copyright (c)1995, JABRA Corporation
';#endif // Copyrights.include
aglobals.i.sect'.text'.ifRamRun.sect'.ramcode'.endif;
RamRun********************PCJáàāÁàÄäêÁover
after .fifo2 is allocated_dBTableSize.set91_
dummy.usect'.dummy',1.ifRamRun.sect'.ramcode '.label_
ram_load; isr.a is the first file to be linked in; therefore this
location will be the first location; in
.ramcode.else.sect'.ramcode '.label_ram_
loadNOPNOP.text.en-
dif*******************************************
**********************************************
**********************************************
SerialRcvIsr*******************Microphone
Processing*****************GetIsrTime:lammTIM;
get the current timing countsacb; and put it into
accbCheckIsrTiming;ldpk_xcommonLastTimelacl_
xcommonLastTime; get the time when we were last hereIt_
xcommonLastTime; and get that value in T alsoexarsacl_
xcommonLastTime; store current TIM valueexarsbb;
subtract new value (accb) from previous value (acc)
bendStoreRegs,lt; don't store a value if rollover
occurredNoRollover:ldpk_xcommonPeriodsacl_
xcommonPeriodStoreRegs:smmrAR3,_
tempAR3smmrAR4,_
tempAR4MicrophoneInput:lammDRRand#0fff8h; get the
input data from codec 1call_MixMic0SndOut; mix in next
sound out valueCheckMicMode:ldpk_micMode; point to
the mic channel mode switchcpl#0,_micMode; set tc bit if
muting is engagedbendCheckMicThruMode,ntc; continue
processing if muting not; engagedMicMuteMode:zac; oth-
erwise zero the accumulatorbMicrophoneOutputMixing;
and go mix in the output sound, if
anyCheckMicThruMode:cpl#1,_micMode; pass signal thru
with no alterationbendMicrophoneOutputMixing,tc; con-
tinue processing if remote; control not
engagedMicrophoneOutputMixing:call_MixMicSndOut;
mix in next sound out valueMicDone:and#0fff8hldpk_
commonMicAttnor_commonMicAttnsammDXR; output
``` new speech value******************Speaker Processing******************SpeakerInput:Idpk0lacTTRCV,16and#0fff8h, 16Idpk__commonLastSpkInsach__commonLastSpkIn; store away for toneDetectsacbSpeakerInputGainStage:Idpk__commonSpkGainPrecpl#0,__commonSpkGainPrebcndScaleSpkInTo16,tc; 6 dB boostaddb; add accumulator to itselfsacb; and hide it back in accbcpl#1,__commonSpkGainPrebcndScaleSpkInTo16,tc; 6 dB boostaddb; add accumulator to itselfsacb; and hide it back in accbcpl#2,__commonSpkGainPrebcndScaleSpkInTo16,tc; 6 dB boostaddb; add accumulator to itselfsacb; and hide it back in accbcpl#3,__commonSpkGainPrebcndScaleSpkInTo16,tc; 6 dB boostaddb; add accumulator to itselfScaleSpkInTo16;bsar16; scale word down to 16 bits for fifoCheckSpeakerMode;Idpk__spkMode; see if spkMode is Mutecpl#0,__spkMode; set tc bit if muting is engagedbcndCheckSpkThruMode,ntc; continue procesing if muting not engagedSpkMuteMode;zac; otherwise zero the accumulatorbSpeakerOutputGainStage; and go mix in the output sound, if anyCheckSpkThruMode;cpl#1,__spkMode; pass signal thru with no alterationbcndSpeakerOutputGainStage,tc; continue processing if remote control not engagedSpeakerOutputGainStage;*shift signal from lo to hi word of accsammTREG0; move speech data to T regIdpk0laccTREG0,16; get 16 bit data into high word of accsacb; hide auido word in accbIdpk__commonSpkGainPostcpl#0,__commonSpkGainPostbcndScaleSpkOutTo16,tc; 6 db boostaddb; add accumulator to itselfsacb; and hide it back in accbcpl#1,__commonSpkGainPostbcndScaleSpkOutTo16, tc; 6 db boostaddb; add accumulator to itselfsacb; and hide it back in accbcpl#2,__commonSpkGainPostbcndScaleSpkOutTo16,tc; 6 db boostaddb; add accumulator to iteflsacb; and hide it back in accbcpl#3,__commonSpkGainPostbcndScaleSpkOutTo16, tc; 6 db boostaddb; add accumulator to itselfsacb; and hide it back in accbScaleSpkOutTo16;bsar16; scale word down to 16 bits for fifoSpeakerOutputMixing;call__MixSpkSndOut; mix in next sound out valueSpeakerControl;and#0fff8hIdpk__commonSpkAttnor__commonSpkAttnsammTDXR; output new speech value*****************Dtmf Stuff***************Idpk__commonLastSpkInIacc__commonLastSpkIn, 16; tone detect likes to see a 32-bit argumentDtmfGainStage;sacbIdpk__commonDtmfGainPrecpl#0,__commonDtmfGainPrebcndHandleDtmf,tc; 6 dB boostaddb; add accumulator to itselfsacb; and hide it back in accbcpl#1,__commonDtmfGainPrebcndHandleDtmf,tc; 6 dB boostaddb; add accumulator to itselfsacb; and hide it back in accbcpl#2,__commonDtmfGainPrebcndHandleDtmf,tcaddb; add accumulator to itselfsacb; and hide it back in accbcpl#3,__commonDtmfGainPrebcndHandleDtmf,tc; 6 dB boostaddb; add accumulator to itselfsacb; and hide it back in accbHandleDtmf;Idpk__remoteControlcpl#1,__remoteControl; are we in full dtmf detection?bcndHandleToneDetect, ntcHandleRemoteControl;bsar16;scale word down to 16 bits for fifocall__EnqSpkIn; and set it off to the upper levelblncNumIrqsHandleToneDetect;callToneDetect; otherwise process it right here***************System Stuff***************IncNumIrqs;Iack#1Idpk__numIrqsadd__numIrqssacl__numIrqsRestoreRegs;lmmrAR3,__tempAR3lmmrAR4,__tempAR4TimeInterrupt;lammTIM; get the current timing countsacb; and put it into accbIdpk__xcommonLastTimeIacl__xcommonLastTime; get the time when we were the head of the interruptIt__xcommonLastTime; and get that value in T alsosbb; subtract new value (accb) from previous value (acc)bcndIsrDone,It; don't store a value if rollover occurredNoTimeRollover;sacb.if SimIdpk__xcommonThisIsrsacl__xcommonThisIsr.endifCheckLongestsr;Idpk__xcommonLongestIsrsub__xommonLongestIsrbcndCheckShortestIsr, leqNewLongestIsr;Iacbsacl__xcommonLongestIsrbIsrDoneCheckShortestIsr;Iacb Idpk__xcommonShortestIsrsub__xcommonShortestIsrbcndIsrDone, geqNewShortestIsr;Iacbsacl__xcommonShortestIsrIsrDone;Iarp1; set back to system standardrete****************************************************************************

****The Sound Mixing Routines*****************************************************************************

.text__MixMicSndOut; receives a data word to mix sound with in acc; returns a new data word with the sound mixed in if on,; or with the same data word passed in, if sound off; sound playback is setup to play back 8 k sounds; so set the sample rate to 8 k before playing soundssacb; store acc in accb for a whileIdpk__micSndPtrIacl__micSndPtrbcndReturnMicZero,eq; is there a sound to play?Idpk0tblrTREG0; copy the word from program memory at__sndStart to__sndTempadd#1; point to next snd wordIdpk__micSndPtrsacl__micSndPtrChkMicSndEnd;Idpk__micSndEndacc__micSndEndIdpk__micSndPtrsub__micSndPtrbcndReturnMicMixed,neq; is the sound finished playing?ChkMicSndLoops;Idpk__micSndNumLoops; now we're at the end of the soundIacc__micSndNumLoops; see if we need to loopbcndStopMicSnd,eqsub#1sacl__micSndNumLoops; decrement the loop countResetMicSndLoop;Idpk__micSndStart; loop points are the start and end of soundIacl__micSndStartIdpk__micSndPtr; reset pointer to start of soundsacl__micSndPtrbReturnMicMixedStopMicSnd; zacIdpk__micSndStartsacl__micSndStart; zero out sound parametersIdpk__micSndPtr; so sound won't play next timesacl__micSndPtrIdpk__micSndEnd; looped sounds will never get to this pointsacl__micSndEndReturnMicZero;Iacb; put accb back into acc, no mixingretReturnMicMixed;Idpk__micSndLevel; multiply speech data (already in TREG0)mpy__micSndLevel; by playback levelpac; move product into accumulatorbsar15; scale result back into lower wordaddb; add back the speech to mix withret__MixMic0SndOut; receives a data word to mix sound with in acc; returns a new data word with the sound mixed in if on,; or with the same data word pased in, if sound off; sound playback is setup to play back 8 k sounds; so set the sample rate to 8 k before playing soundssacb; store acc in accb for a whileIdpk__mic0SndPtrIacl__mic0SndPtrbcndReturnMic0Zero,eq; is there a sound to play?Idpk0tblrTREG0; copy the word from program memory at__sndStart to__sndTempadd#1; point to next snd wordIdpk__mic0SndPtrsacl__mic0SndPtrChkMic0SndEnd;Idpk__mic0SndEndacc__mic0SndEndIdpk__mic0SndPtrsub__mic0SndPtrbcndReturnMic0Mixed,neq; is the sound finished playing?ChkMic0SndLoops;Idpk__mic0SndNumLoops; now we're at the end of the soundIacc__mic0SndNumLoops; see if we need to loopbcndStopMic0Snd,eqsub#1sacl__mic0SndNumLoops;

decrement the loop countResetMic0SndLoop;ldpk_ mic0SndStart; loop points are the start and end of soundlacl_mic0SndStartIdpk_mic0SndPtr; reset pointer to start of soundsacl_ mic0SndPtrbReturnMic0MixedStopMic0Snd;zacIdpk_ mic0SndStartsacl_mic0SndStart; zero out sound parametersIdpk_mic0SndPtr; so sound won't play next timsacl_mic0SndPtrIdpk_mic0SndEnd; looped sounds will never get to this pointsacl_ mic0SndEndReturnMic0Zero;lacb; put accb back into acc, no mixingretReturnMic0Mixed;Idpk_mic0SndLevel; multiply speech data (already in TREG0)mpy_mic0SndLevel; by playback levelpac; move product into accumulatorb-sar15; scale result back into lower wordret_ MixSpkSndOut; receives a data word to mix sound with in acc; returns a new data word with the sound mixed in if on,; or with the same data word passed in, if sound off; sound playback is setup to play back 8 k sounds; so set the sample rate to 8 k before playing soundssacb; store acc in accb for a whileldpk_spkSndPtrlacl_spkSndPtr; get pointer to next word to playbcndReturnSpkZero,eq; return if null pointerIdpk0tblrTREG0; copy the word from program memory at_sndStart to TREG0add#1; point to next snd wordIdpk_spkSndPtrsacl_ spkSndPtrChkSpkSndEnd;Idpk_spkSndEndlacc_ spkSndEndIdpk_spkSndPtrsub_ spkSndPtrbcndReturnSpkMixed,neq; are we at the end of the soundChkSpkSndLoops;Idpk_spkSndNumLoopslacc_ spkSndNumLoopsbcndStopSpkSnd,eq; should we loop?sub#1sacl_spkSndNumLoops; decrement the loop countResetSpkSndLoop;Idpk_spkSndStart; loop points are the start and end of soundlacl_spkSndStartIdpk_ spkSndPtr; reset pointer to start of soundsacl_ spkSndPtrReturnSpkMixedStopSpkSnd:; stop playing the soundlack#0Idpk_spkSndStartsacl_spkSndStart; zero out sound parametersIdpk_spkSndPtr; so sound won't play next timesacl_spkSndPtrIdpk_spkSndEnd; looped sounds will never get to this pointsacl_ spkSndEndReturnSpkZero;lacb; put accb back into acc, no mixingretReturnSpkMixed;Idpk_spkSndLevel; multiply speech data (already in TREG0)mpy_spkSndLevel; by playback levelpac; move product into accumulatorbsar15; scale result back into lower wordret*******************End of ISR***********;// Module: ProgWrit.a;//;// Interrupt vectors in lowest 30h words of C5x program memory. ;//;// Rev 1.011 Nov 1994DTR;//Initial revision. ;//;//;#ifdef Copyrights;static char copyrightNotice= 'Copyright (c)1994, JABRA Corporation';#endif // Copyrights;.tab4.width120.length32767.version 50.mmregs*************************** *****************RAM based code***************************** **************.sect'.ramcode'; /******************************************* ************;/*Copy a page from DATA RAM to PROG ram or flash rom */;/ ********************************************* ************/;Boolean WritePageToAtmel(short * src, short * dst);;/* destination is always on 128 byte boundary, since lower 7 bits of dst are ignored */;/* src can be anywhere, even on the C run-time stack */.global_ WritePageToAtmel_WritePageToAtmel:.global_ previousReading:.global_currentReading;.global_ xorResult;PageSize.set128;PollTimeOut.set15000;RAM_ ON.set0010h;RAM_MASK.set(0ffh-RAM_ON) ;;popd*+; generate stack frame and pointers to parameterssarAR0,*+;sarAR1,*;larkAR0,1;larAR0,*0+ ;;WritePrep:;;;ldp#0;sarAR1,AR4; copy the stack pointer into AR4nop;nop;mar*,AR4; make AR4 the active address registersbrk4; point to src on stack;larAR3,*-; get ptr to src in AR3lacc*; get ptr to dest in accumand#0FF80h; mask out low seven bitssacb;dint; can only write to ROM from RAM;;; Biquad filtercode; Tonedetect and Manualoverride for moving; outofcurrentoperating mode into remote calibration.include aglobals.i.include qmacros.i.sect'.text'.ifRamRun.sect'.ramcom'.endif; RamRunShortOverrideDuration.set(700/5); in milliseconds, SW1ON.set0dh; Bit test (2) for SW1ON in Gate Array.

TRM_OFF.set0fffdh;FbqBiQuadFilter0; coeffcents & states allocated in common sectionFbqBiQuadFilter1; coefficients & states allocated in common section************************************** *****The Biquad Filter Routine************************************ **SAMPLE_BITS.set16ENERGY_SCALER_ SHIFT.set6_bq:; entry:;acccontains the incoming speech in lower 16 bits, and returns the;outgoing accb contains a pointer to the biquad struture;; returns:;acc contains result (filtered sample in low 16 bits);accb contains accumulated energy;the biquad structure is updated with the most recent state variables;and energy;; in use:;ar3 handles the coefficients in order: b2,b1,b0,a2,and a1;ar4 handles the state variables in order: x2,x1,y2,y1, and energy;This biquad filter takes advantage of the fact that the coefficients;and state variables are accessed in or nearly in order. One index register;is usedto walk through the coefficients, and a second one is used to walk;through the state variables. The coefficients and state variables must be;contained in a BiQuad struct declared in C. The structure must not vary;; Trashes;acc,accb,ar3,ar4,treg0,arp, spm;;structBiQuad {shortb2;;shortb1;;shortb0;;shorta2;;shorta1;;Speechx 2;;Speechx1;;Speechy2;;Speechy1;;longnrg;;};;typedef structBiQuad BiQuad, * BiQuadPtr;state_ar4.setar4coef_ ar3.setar3exar; put input speech word into accbsammcoef_ ar3; this generates a pipeline warning, ignore itlarpcoef_ ar3nopcpl#0,*bcndSetUpStatePtr,ntc; filter is on, because b2 (1st coeff) isn't zerozac; return w/ input speech word in accexar; and zero energy in accbbBqDoneSetUpStatePtr;sammstate_ar4; this generates a pipeline warning, ignore itlarpstate_ar4nopadrk5; the states are after coeffs, which are 5 words long;A=b2 * x2;A___eq_b2_X_x2;lt*+,coef_ar3; x2 afterwards state_ar4->x1, ARP=coef_ar3mpy*+,state_ar4; *b2 afterwards coef_ar3->b1, ARP=state_ar4pac;A+=b1 * x1;A___ pl_eq_b1_X_x1:lt*,coef_ar3; x1 afterwards state_ar4->x1, ARP=coef_ar3mpy*+,state_ar4; *b1 afterwards coef_ar3->b0, ARP state_ar4apac;x2=x1;;x1=*(input++) ;x1___eq_speech:exar; stashA in accb, get speech input in accsacl*-; x1=inputafterwards state_ar4->x2, ARP=state_ ar4x2_eq_x1;lammTREG0; we still havethe old x1 in the T reg, so we use itsacl*+; x2=x1 afterwards state_ar4->x1, ARP=state_ar4lacb; get Aback into acc;A+=b0 * x1;A___ pl_eq_b0_X_x1;lt*+,coef_ar3; x1 afterwards state_ar4->y2, ARP=coef_ar3mpy*+,state_ar4; * b0 afterwards coef_ar3->a2, ARP=state_ar4apac;A-=a2 * y2;A___mi_ eq_a2_X_y2:lt*+,coef_ar3; y2 afterwards state_ar4->y1, ARP=coef_ar3mpy*+,state_ar4; *a2 afterwards coef_ar3- >a1, ARP=state_ar4spac;A-=a1 * y1;A___mi_eq_a1_ X_y1:lt*,coef_ar3; y1 afterwards state_ar4->y1, ARP= coef_ar3mpy*,state_ar4; *a1 afterwards coef_ar3->a1, ARP=state_ar4spac;A+=8192;addk#8192;A>>= (SAMPLE_BITS-2);bsarSAMPLE_BITS-2;y2=y1;;y1= A;y1_eq_A_:sacl*-; first store accum A in y1 afterwards state_ar4->y2, ARP=coef_ar3sacb; and store A in accb as welly2_eq_old_y1:lammTREG0 ; then store old y1 (from treg0) in y2sacl*+ ; then point to y1 again, which is equal to Amar*+; now pointto low word of nrgmar*+; now pointto high word of nrglacc*-,16; get high word in acc, point to low wordadds*-; add in low word, point back to y1 (A);A*= A;spm3; shift PREG>>6 when adding to ACCzpr; zero the product register so nothing is accumulatedsqra*+; get y1 again (A) and load into TREG0, sqr, result in preg;A>>= ENERGY_SCALER_SHIFT;;energy+=A;apacsacl*+; store the low word of nrgsach*; store the high word of nrgexar; return w/ result in acc; and energy in accbBq-Done:spm0; set PREG auto-shift back to noneret;****************************************
*************************;_fbq:;acc contains the incoming speech, and returns the outgoing;accb contains a pointer to the biquad structure in use,;ar3 handles the coefficients in order: b2,b1,b0,a2,and a1;ar4 handles the state variables in order: x2,x1,y2,y1, and energy;This biquad filter takes advantage of the fact that the coefficients;and state variables are accessed in or nearly in order. One index register;is usedto walk through the coefficients, and a second one is used to walk;through the state variables. The coefficients and state variables must be;contained in a BiQuad struct declared in C. The structure must not vary;;structBi-Quad {;shortb2;;shortb1;;shortb0;;shorta2;;shorta1;;Speechx2;;Speechx1;;Speechy2;;Speechy1;;longnrg;;}‌;;typedef struct-BiQuad BiQuad, * BiQuadPtr:SAMPLE_BITS.set16ENERGY_SCALER_SHIFT.set6state_ ar4.setar4coef_ar3.setar3exarsammstate_ar4; this generates a pipeline warning, ignore itsammcoef_ar3; this generates a pipeline warning, ignore itmar*,state_ar4adrk5; the states are after coeffs, which are 5 words long;A=b2 * x2;;A___eq_b2_X_x2:lt*+,coef_ar3; x2 afterwards state_ar4->x1, ARP=coef_ar3mpy*+,state_ar4; *b2 afterwards coef_ar3->b1, ARP=state_ar4pac;A+=b1 * x1;;A___pl_eq_b1_X_x1:lt*,coef_ar3; x1 afterwards state_ar4->x1, ARP=coef_ar3mpy*+,state_ar4; *b1 afterwards coef_ar3->b0, ARP=state_ar4apac;x2=x1;;x1=* (input++);;x1___eq_speech:exar; stachA in accb. get speech input in accsach*-; x1=inputafterwards state_ar4->x2, ARP=state_ar4;x2_eq_x1;lammTREG0; we still havethe old x1 in the T reg, so we use itsacl*+; x2=x1 afterwards state_ar4->x1, ARP=state_ar4lacb; get Aback into acc;A+=b0 * x1;;A___pl_eq_b0_X_x1:lt*+,coef_ ar3; x1 afterwards state_ar4->y2, ARP=coef_ar3mpy*+, state_ar4; *b0 afterwards coef_ar3->a2, ARP=state_ ar4apac;A-=a2 * y2;;A___mi_eq_a2_X_y2:lt*+,coef_ ar3 ; y2 afterwards state_ar4->y1, ARP=coef_ar3mpy*+, state_ar4; *a2 afterwards coef_ar3->a1, ARP=state_ ar4spac;A-=a1 * y1;;A___mi_eq_a1_X_y1:lt*,coef_ ar3; y1 afterwards state_ar4->y1, ARP=coef_ar3mpy*, state_ar4; *a1 afterwards coef_ar3->a1, ARP=state_ ar4spac;A+=8192;addk#8192;A>>=(SAMPLE_BITS-2) ;bsarSAMPLE_BITS-2;y2=y1;;y1=A;;y1_eq_A_:sacl *-; first store accum A in y1 afterwards state_ar4->y2, ARP coef_ar3sacb; and store A in accb as well;y2_eq_old_ y1:lammTREG0; then store old y1 (from treg0) in y2sacl*+; then point toy1 again, which is equal to Amar*+; now point to low word of nrgmar*-; now point to high word of nrglacc*-,16; get high word in acc, point to low wordadds*-; add in low word, point back to y1 (A);A *=A;spm3; shift PREG>>6 when adding to ACCzpr; zero the product register so nothing is accumulatedsqra*+; get y1 again (A) and load into TREG0, sqr, result in preg;A>>=ENERGY_ SCALER_SHIFT;;energy+=A;apacsacl *+; store the low word of nrgsach *-; store the high word of nrg and point back to low wordmar *-; pointback to y1 (A)lacc *,16; get result from y1, shifted into high word of accspm0ret*****************************************
***************************************
*;-------------------------------
;*****************************************
***************************_ModeInOutB.set0;_ ModeNC2.set1;_ModeDynamics.set2;ToneDetect:sacb; speech word is in high word of acc, store itIdpk_ commonOverrideEnablelacl_ commonOverrideEnablebcndBailOut,eqlacbIdpk_ commonLastSpkInsach_commonLastSpkIn; store the high wordsmmrAR3,_commonTempAR3smmrAR4,_ commonTempAR4; store incoming mic sample in acc (already shifted into hi word)lacc#_fbqfilter0; pointto filter data w/ accbexar; get signal word back in acall_fbq; call the filter routineIdpk_commonLastSpkInlacc_ commonLastSpkIn, 16sacb; store incoming mic samplein acc (already shifted into hiword)lacc#_fbqfilter1; pointto filter data w/ accbexar; get signal word back in acccall_fbq; call the filter routineIdpk_commonDummyLoadrpt_ commonDummyLoadnop;uncomment this line to remove tone detect spike but keep constant load;bRResetEnergyAndExitIdpk_ commonOverrideCountlacl_ commonOverrideCountadd#1sacl_ commonOverrideCountsub#40bcndExitToneDetect,leq; we come here every 5 ms to look at the accumulated energyIdpk_commonShortOverrideTimeOutlacc_ commonShortOverrideTimeOutbcndAlreadyTimedOut, eqsub#1; subtract until we get to zero, then stopsacl_ commonShortOverrideTimeOutAlreadyTimedOut:Idpk_ commonOverrideThresholdlt_ commonOverrideThresholdmpy_ commonOverrideThreshold; square the thresholdpacsacbIdpk1+_fbq0nrglacc1+_fbq0nrg, 16; get high word in accIdpk_fbq0nrgadds_fbq0nrg; add in low wordsbb; compare nrg with thresholdbcndResetAndExit,lt; branch if commonOverrideThreshold>fbq0nrgIdpk1+_ fbq1nrglacc1+_fbq1nrg,16; get high word in accIdpk_ fbq1nrgadds_fbq1nrg; add in low wordsbb; compare nrg with thresholdbcndResetAndExit,lt; branch if commonOverrideThreshold>fbq1nrg; we only get to here if both filters have accumulated energy; greater than the overrideThresholdPoundDetected;Idpk_ commonShortOverrideTimeOut; see if it's only been a short time since last overridelacc_ commonShortOverrideTimeOutbcndUseShortDuration, eqIdpk_commonOverrideTime; use the standard override timelacl_ commonOverrideTimesacbbCompareDurationUseShort Duration:lack#ShortOverrideDuration; use the shorter duration if it's only been a short time since last settingsacbCompareDuration;Idpk_ commonOverrideDuration ; increment the current durationlacl_commonOverrideDurationadd#1sacl_ commonOverrideDurationsbb; see if the duration (in acc) exceeds the required time (in accb) bcndResetEnergyAndExit,lt; set the filter's accumulated energy back to zero and keep on goingOverrideDetected:; both bands have exceeded the threshold for the requisite timeIdpk_commonDtmfAtWarmBootsplk #1,_ commonDtmfAtWarmBoot ; set flag to TrueIdpk1+_ fbq0nrg; pointto filter 0 accumulated energylacc 1+_fbq0nrg,16; get high word in accIdpk_fbq0nrg ; point to filter 0 accumulated energyadds_fbq0nrg ; add in low wordIdpk1+_commonLastFbq0Nrgsach1+_ commonLastFbq0Nrg ; store high wordIdpk_ commonLastFbq0Nrgsacl_commonLastFbq0Nrg; store low wordIdpk1+_fbq1nrg; pointto filter 0 accumulated energylacc1+_fbq1nrg,16; get high word in accIdpk_ fbq1nrg ; point to filter 0 accumulated energyadds_fbq1nrg ; add in low wordIdpk1+_commonLastFbq1Nrgsach1+_ commonLastFbq1Nrg ; store high wordIdpk_ commonLastFbq1Nrgsacl_commonLastFbq1Nrg; store low wordbResetEnergyAndExit; now we wait until silence to rebootResetAndExit:Idpk_commonDtmfAtWarmBoot ; see if override was triggered duringlacc_ commonDtmfAtWarmBoot ; previous tonebcndContinueReset,eqIdpk_ commonOperatingModelacc_ commonOperatingModesub#_ ModeNC2bcndDynamicsReset,neqNC2Reset:apl#TRM_ OFF,PMST; make sure TRM bit is offb_c_int0 ; warm boot if we're in NC2DynamicsReset:Idpk_overrideDetected ; no rebootlacc#1sacl_ overrideDetectedContinueReset:zacIdpk_ commonOverrideDurationsacl_commonOverrideDuration ; reset duration, in units of 5 millisecondsResetEnergyAndExit:zacIdpk_ commonOverrideCountsacl_commonOverrideCount ; reset counterIdpk_fbq0nrgsacl_fbq0nrgIdpk_fbq0nrg+1sacl_ fbq0nrg+1 ; reset accumulated energyIdpk_fbq1nrgsacl_ fbq1nrgIdpk_fbq1nrg+1sacl_fbq1nrg+1 ; reset accumulated energyExitToneDetect:1mmrAR3,_ commonTempAR3lmmrAR4,_ commonTempAR4BailOut:Idpk0 ; put DP back like NC2 likes itret;---------------------------------- ;;----------------------------------
;ManOverrideDetect:;smmrAR3,_ commonTempAR3;larpAR3;lrlkAR3,_ commonManOverrideTime;lacc*;add#1;sacl*; increment timesub#0ffffh ; if weare at ffff ie approx 8s then resetbcndTEST_SWITCH,NEQ;;RESET_OVER:;zac; zero over ride timeandsacl*; over ride countlrlkAR3,_ commonManOverrideCount;sacl*;;TEST_ SWITCH:;bitPA4,SW1ON; Test SW1ON status in Gate Array (bit 2).

bcndSWITCH_IN,TC; Switch down then branchSWITCH_OUT:;lrlkAR3,_ commonSwitchln;lacc*;bcndNO_CHANGE,EQ;zac;sacl*; resetswitchinbNO_CHANGE; exit the switch is offSWITCH_IN;;lrlkAR3,_ commonSwitchln;lacc*;bcndNO_CHANGE, NEQ;lacc#1;sacl*; resetswitchin; increment counterslrlkAR3,_ commonManOverrideCount;lacc*;add#1;sacl*;sub#1;bcnd NO_SYNC,GT; Don't restart the clocklrlkAR3,_ commonManOverrideTime ; if counter bigger than onezac;sacl*;NO_SYNC:;lrlkAR3,_ commonManOverrideCount;lacc*;.ifLab;sub#3;.else;sub #6;.endif;bcndNO_CHANGE,LT;lacc#1lrlkAR3,_ commonDtmfAtWarmBoot;sacl*;apl#TRM_OFF,PMST; make sure trm bit is OFFb_c_int0 ; warm boot if we're in NC2NO_CHANGE:;1mmrAR3,_ commonTempAR3;ret;;---------------------------------; end of manual override detect;; DTMF tone generation;.global_ Dtmf0Start.global_Dtmf0End.global_Dtmf1Start.global_ Dtmf1End.global_Dtmf2Start.global_Dtmf2End.global_ Dtmf3Start.global_Dtmf3End.global_Dtmf4Start.global_ Dtmf4End.global_Dtmf5Start.global_Dtmf5End.global_ Dtmf6Start.global_Dtmf6End.global_Dtmf7Start.global_ Dtmf7End.global_Dtmf8Start.global_Dtmf8End.global_ Dtmf9Start.global_Dtmf9End.global_ DtmfStarStart.global_DtmfStarEnd.global_ DtmfPoundStart.global_ DtmfPoundEndSaveRomSpace.set1; leave out star and pound tones to save space_Dtmf1Start.word00000h, 00000h, 00000h, 00000h, 00020h, 0fe1ah, 0f809h, 0fleah ; 7.word00430h, 0389ch, 04f9ch, 01222h, 0bd1ah, 09064h, 09c07h, 0df5eh; 415.word01ce8h, 02efch, 02330h, 012e3h, 02490h, 04aafh, 05d94h, 03ba0h; 1223.word0e7d3h, 097ebh, 08002h, 0aea0h, 0fa34h, 038e8h, 04965h, 029d7h; 31.word005b3h, 0fbedh, 00a90h, 01292h, 0f73fh, 0c203h, 09e2ch, 0af7eh; 2839.word0f12dh, 03d54h, 06cc5h, 05df5h, 019c6h, 0db81h, 0c4c6h, 0d8f9h; 47.word0f70ch, 0f9c5h, 0e711h, 0d9bfh, 0f36dh, 03213h, 06d7fh, 07629h; 55.word03796h, 0dab8h, 09713h, 0928eh, 0c74eh, 004c8h, 02257h, 019bfh; 63.word0087dh, 00dach, 02c4ch, 04407h, 02fdbh, 0ee1ch, 0a4a6h, 0878ah; 71.word0ad41h, 0f8ffh, 03d72h, 05803h, 03b89h, 00bdbh, 0f58dh, 0fe24h; 79.word00d10h, 00154h, 0d73eh, 0b10eh, 0b823h, 0f359h, 0401ch, 073c6h; 87.word0698fh, 0223fh, 0d606h, 0b29ch, 0c171h, 0e9a5h, 0fc08h, 0f29fh; 95.word0e35eh, 0f028h, 02441h, 05c90h, 06ba9h, 03818h, 0dd97h, 0946eh; 103.word08851h, 0bcc1h, 003beh, 02e97h, 02d5ch, 015e1h, 00d85h, 02024h; 111.word03744h, 02e03h, 0f648h, 0af42h, 08c9bh, 0ab70h, 0f77dh, 04094h; 119.word0628ah, 04a10h, 01119h, 0eccah, 0ec03h, 0fe06h, 000d6h, 0e312h; 127.word0c00fh, 0bec8h, 0f06ch, 03a84h, 072a4h, 07069h, 029e6h, 0d4d9h; 135.word0a573h, 0ae45h, 0dc68h, 0fe83h, 000ceh, 0f26ch, 0f4aah, 01a85h; 143.word04dfdh, 06293h, 0395bh, 0e4f6h, 0994fh, 08675h, 0b55ch, 0fe7ah; 151.word03353h, 03bf7h, 02159h, 00b97h, 012dfh, 02783h, 02826h, 0fde6h; 159.word0bd7ah, 097e2h, 0adc9h, 0f2cbh, 03dcch, 068ceh, 0535fh, 0159eh; 167.word0e4b2h, 0d77eh, 0ebe8h, 0fbedh, 0ed1fh, 0cf2dh, 0c590h, 0ec67h; 175.word0340fh, 06f00h, 071edh, 0327eh, 0d9ffh, 09e8dh, 0a0d9h, 0d0d9h; 183.word00117h, 010f4h, 0045dh, 0fc53h, 01365h, 03ebeh, 056bdh, 03930h; 191.word0ebb7h, 09ed1h, 084b6h, 0aea6h, 0f9d2h, 03830h, 04a2dh, 02d72h; 199.word00c1eh, 005deh, 015b3h, 01dfch, 0020eh, 0cad2h, 0a21ch, 0af9bh; 207.word0f1d2h, 03eb0h, 06cd2h, 05ed9h, 01c2bh, 0de49h, 0c781h, 0d7f8h; 215.word0f3f4h, 0f548h, 0df47h, 0d131h, 0eb47h, 02bach, 0683ah, 072cdh; 223.word038c6h, 0dcd7h, 09983h, 0923fh, 0c459h, 00212h, 01daah, 01648h; 231.word006ech, 00e5fh, 03049h, 0498eh, 036feh, 0f378h, 0a69bh, 08760h; 239.word0ac23h, 0f676h, 039e1h, 055dfh, 03b69h, 00e4eh, 0fa44h, 0027dh; 247.word01132h, 0046fh, 0d7abh, 0af92h, 0b411h, 0ee4ah, 03bdbh, 07121h; 255.word06964h, 024f0h, 0daa2h, 0b828h, 0c518h, 0e921h, 0f9ech, 0ee29h; 263.word0de81h, 0ec90h, 021efh, 05c9fh, 06e0bh, 03cb0h, 0e32fh, 098bch; 271.word089aah, 0baeeh, 0fecah, 02a1bh, 029bbh, 01275h, 00cach, 0217fh; 279.word03aa3h, 0321dh, 0f9b8h, 0b07ch, 08ae0h, 0a796h, 0f18ah, 03b88h; 287.word05f7ch, 048d7h, 01318h, 0f041h, 0ef59h, 00158h, 00266h, 0e239h; 295.word0bdc1h, 0baabh, 0ecach, 037d3h, 0711fh, 07131h, 02d3fh, 0d9feh; 303.word0a9d4h, 0b153h, 0dc48h, 0fcf7h, 0fe11h, 0ede1h, 0f146h, 018e2h; 311.word04eeeh, 0662eh, 03dfdh, 0e9cch, 09ae5h, 083f5h, 0b1c0h, 0fbfeh; 319.word030e1h, 0392fh, 0203eh, 00c7bh, 01595h, 02b25h, 02b86h, 0006ah; 327.word0bd44h, 0940eh, 0a85ah, 0eeeeh, 03b72h, 066e2h, 05571h, 0183eh; 335.word0e879h, 0ddaeh, 0ee4ah, 0fdbfh, 0ec26h, 0cbdch, 0c2cfh, 0e81bh; 343.word0308bh, 06d43h, 073b1h, 03597h, 0deb7h, 0a30dh, 0a2d7h, 0d206h; 351.word0fde8h, 00c77h, 0fff5h, 0f898h, 012cfh, 040c0h, 05b9ch, 03eb1h; 359.word0f121h, 0a11dh, 08223h, 0a9e6h, 0f5d0h, 034a9h, 047b7h, 02d4ah; 367.word00caeh, 0088ah, 0193eh, 021cch, 004aeh, 0caf2h, 09f8fh, 0aaf2h; 375.word0ec66h, 039fah, 06b20h, 06043h, 020a2h, 0e2ebh, 0cb12h, 0dc1ch; 383.word0f576h, 0f3dah, 0dc74h, 0cc7ah, 0e6deh, 0293ah, 06902h, 075d7h; 391.word03cc5h, 0e1f0h, 09cfah, 09429h, 0c3e0h, 0fdadh, 01964h, 012c9h; 399.word003a5h, 00de9h, 0326ch, 04e12h, 03c92h, 0f6e7h, 0a82ah, 084f3h; 407.word0a5d1h, 0f19eh, 03681h, 0525dh, 03aa4h, 01065h, 0fe0eh, 006ffh; 415.word014edh, 0067dh, 0d610h, 0ab96h, 0aef8h, 0e92dh, 03762h, 06efdh; 423.word06a87h, 0286ch, 0e016h, 0bc65h, 0c845h, 0eaffh, 0f8f9h, 0eb6dh; 431word0da4dh, 0e8aah, 01ffch, 05d1dh, 07140h, 04112h, 0e7d9h, 09c25h; 439.word088b9h, 0b795h, 0fc09h, 024f6h, 02535h, 0101ch, 00b8dh, 0234eh; 447.word03da9h, 03536h, 0fd68h, 0b314h, 08a32h, 0a52eh, 0eda9h, 0361fh; 455.word05c95h, 047b6h, 014fdh, 0f4e2h, 0f4dbh, 005c6h, 00560h, 0e36dh; 463.word0bbb0h, 0b6d8h, 0e67fh, 03380h, 06e87h, 07104h, 03351h, 0e008h; 471.word0afa5h, 0b674h, 0dcf5h, 0fb52h, 0fa8eh, 0ea10h, 0edbeh, 0171ah; 479.word05091h, 06987h, 04347h, 0ee7ah, 09d73h, 08463h, 0aeffh, 0f77dh; 487.word02c06h, 0357fh, 01d73h, 00b98h, 0169fh, 02dc3h, 02fd3h, 004e1h; 495.word0bee6h, 0921ch, 0a420h, 0e8cah, 03638h, 06345h, 05576h, 01ba2h; 503.word0ec6eh, 0e22bh, 0f384h, 00038h, 0ec2fh, 0c9cbh, 0bd9fh, 0e51ch; 511.word02f43h, 06c9eh, 075f2h, 039ceh, 0e331h, 0a7a2h, 0a53eh, 0d253h; 519.word0fc40h, 0084ch, 0fc2eh, 0f560h, 0104ah, 04019h, 05d22h, 04357h; 527.word0f646h, 0a43dh, 08342h, 0a881h, 0f1eeh, 02ff1h, 042d5h, 02ad5h; 535.word00d71h, 00ae1h, 01d6fh, 02538h, 00732h, 0caa3h, 09c78h, 0a697h; 543.word0e74dh, 0363dh, 06981h, 06186h, 022d7h, 0e5beh, 0cff3h, 0de79h; 551.word0f626h, 0f2c1h, 0d83bh, 0c88fh, 0e300h, 026c7h, 0689fh, 07837h; 559.word041b9h, 0e718h, 0a1e3h, 096deh, 0c3f2h, 0fab5h, 01731h, 018d7h; 567.word01173h, 01000h, 00bfbh, 00422h, 00231h, 00291h, 004a6h, 004adh; 564 575_ Dtmf2Start:.word0003dh; 572_Dtmf1End:.word0009ah, 00165h, 0ff36h, 0f2b3h, 0e39ah, 0f367h, 02c98h; 573 583.word05a63h, 04523h, 0f3e7h, 09e3fh, 086a8h, 0bc33h, 00651h, 02b18h; 591.word02216h, 0110fh, 0218dh, 04b1ch, 0581bh, 023b3h, 0c719h, 08776h; 599.word096b0h, 0dec7h, 0207fh, 030a6h, 017a2h, 0099ch, 02371h, 0472dh; 607.word0408dh, 0fba1h, 0a4b1h, 0831eh, 0b266h, 003fbh, 037a8h, 0374dh; 615.word0168ah, 00a20h, 0251ah, 03aech, 02107h, 0d56eh, 0915dh, 0966eh; 623.word0dd3h, 02bffh, 04ee6h, 03804h, 00f04h, 00700h, 01e2bh, 027b8h; 631.word0ff32h, 0b75ah, 090bch, 0b5e6h, 008deh, 04c9ch, 0571fh, 02b3ch; 639.word0fce0h, 0f9ddh, 00ffeh, 00eb0h, 0e14dh, 0a769h, 0a18dh, 0de5ch; 647.word03064h, 0636ch, 0523ah, 0127bh, 0e87bh, 0ee37h, 0028fh, 0fb8fh; 655.word0cc6bh, 0a739h, 0be8eh, 0099dh, 05848h, 07008h, 03f3dh, 0f7dbh; 663.word0d5bch, 0e38dh, 0fa47h, 0ed45h, 0c382h, 0b3f1h, 0e1feh, 0363ch; 671.word072f8h, 0682ah, 01ec4h, 0d6f6h, 0c432h, 0dd07h, 0f46dh, 0e647h; 679.word0c5c4h, 0cbdbh, 008ddh, 058f0h, 07b69h, 04daah, 0f55ch, 0b865h; 687.word0b81bh, 0df0bh, 0f697h, 0e568h, 0d00bh, 0e66eh, 02e3dh, 071a7h; 695.word07245h, 02908h, 0cbabh, 0a08ch, 0ba65h, 0eb90h, 0fe3bh, 0eda7h; 703.word0e21fh, 00551h, 04a52h, 073e7h, 0526dh, 0f7b6h, 0a89eh, 0998ch; 711.word0c9b8h, 000bdh, 00dbeh, 0faf7h, 0f71ah, 02122h, 05a4eh, 06690h; 719.word02974h, 0c8d7h, 08bf1h, 09e57h, 0e3c2h, 01868h, 01cd8h, 0065ch; 727.word00866h, 031d0h, 058cdh, 0485dh, 0f926h, 0a30ah, 086f4h, 0b87fh; 735.word00437h, 02e20h, 0259dh, 00bc5h, 0129eh, 038cch, 04ce8h, 02444h; 743.word0cce5h, 08c12h, 0962ch, 0ddc9h, 02603h, 03eech, 02731h, 00a82h; 751.word01479h, 0336eh, 03428h, 0feb5h, 0ade7h, 08b41h, 0b61ch, 005bdh; 759.word0426ah, 04703h, 01faah, 003c0h, 010a9h, 02748h, 018ebh, 0da68h; 767.word09b3fh, 09b47h, 0dd80h, 02e5dh, 058c1h, 044c3h, 01062h, 0f714h; 775.word00681h, 01665h, 0fd9ch, 0c0b3h, 09b94h, 0bb0bh, 00a19h, 051ffh; 783.word0649dh, 035e7h, 0f7a8h, 0e6cbh, 0f9b1h, 00454h, 0e666h, 0b2f3h;

791.word0a948h, 0e157h, 03649h, 06d02h, 05f98h, 01a67h, 0de5eh, 0d856h; 799.word0f050h, 0f805h, 0d7a2h, 0b36ah, 0c2e5h, 00b45h, 05b0bh, 076a7h; 807.word047e9h, 0f65eh, 0c679h, 0cd90h, 0ece8h, 0f2c3h, 0d395h, 0c13eh; 815.word0e4bfh, 033abh, 07490h, 06e9bh, 02308h, 0cef2h, 0af99h, 0c975h; 823.word0efc6h, 0f1bfh, 0d7edh, 0d447h, 00623h, 0550eh, 07d87h, 0542eh; 831.word0f6adh, 0ad86h, 0a6f8h, 0d2ech, 0fa9ah, 0f953h, 0e34ah, 0edc8h; 839.word02855h, 06736h, 06d94h, 02854h, 0c99bh, 0964ch, 0aca1h, 0e8e7h; 847.word00cc0h, 00550h, 0f47fh, 00704h, 03f9eh, 0698fh, 04f7ch, 0f75eh; 855.word0a077h, 08c00h, 0c06dh, 00383h, 01fc8h, 01104h, 00214h, 01adah; 863.word04aadh, 059e6h, 024c8h, 0c9b1h, 08b1fh, 09888h, 0e019h, 01fe4h; 871.word02ec7h, 0167fh, 0092ch, 024e3h, 048aeh, 04021h, 0fb16h, 0a6b2h; 879.word0879bh, 0b67eh, 005a5h, 037d8h, 0364bh, 014dah, 00a39h, 024f2h; 887.word03a35h, 01f37h, 0d42fh, 092eeh, 097ffh, 0de21h, 02a9dh, 04d0eh; 895.word036c4h, 00bdeh, 005fdh, 01e3ah, 0261bh, 0fdf3h, 0b628h, 091bdh; 903.word0b665h, 007a7h, 04c81h, 056e5h, 02976h, 0fd3ah, 0fbffh, 011dfh; 911.word01051h, 0dfe6h, 0a56fh, 0a0cch, 0df69h, 03342h, 064ebh, 0532ah; 919.word01463h, 0e98ah, 0eec3h, 003e9h, 0fb71h, 0cc47h, 0a739h, 0be56h; 927.word00b60h, 05876h, 06e7eh, 03d8bh, 0f568h, 0d56fh, 0e3adh, 0f9b9h; 935.word0ed44h, 0c23dh, 0b4f1h, 0e417h, 0361ch, 071fbh, 06745h, 01bd0h; 943.word0d4f6h, 0c418h, 0dc31h, 0f5d8h, 0e502h, 0c44bh, 0cba1h, 00906h; 951.word05b9fh, 07ca3h, 04f11h, 0f51eh, 0b66bh, 0b928h, 0dffbh, 0f603h; 959.word0e531h, 0cfd7h, 0e755h, 02f71h, 0721ah, 0715ch, 0272eh, 0cb25h; 967.word0a0c3h, 0ba9ch, 0ec36h, 0ff41h, 0ed99h, 0e298h, 00600h, 04b43h; 975.word074c3h, 052d4h, 0f778h, 0a56dh, 097f1h, 0cae1h, 000a5h, 00d07h; 983.word0fa72h, 0f77fh, 021f3h, 05a76h, 06582h, 026dbh, 0c6eeh, 08dadh; 991.word09fe4h, 0e42dh, 019f3h, 01bbch, 005ach, 008d7h, 0329ch, 059f0h; 999.word047a2h, 0f855h, 0a22ch, 0875bh, 0b9c5h, 00471h, 02de7h, 0243bh; 1007.word00af8h, 012f9h, 03901h, 04cfdh, 023deh, 0ccc8h, 08ae5h, 094d3h; 1015.word0de14h, 02661h, 03eb5h, 0269dh, 00b4ah, 015e0h, 0355eh, 03583h; 1023.word0fd01h, 0aadah, 087f8h, 0b559h, 007d5h, 0440bh, 047a7h, 01f95h; 1031.word00423h, 01194h, 0278ah, 01889h, 0d973h, 09b7dh, 09cb3h, 0de70h; 1039.word02eb8h, 05925h, 04427h, 00ee6h, 0f799h, 007b8h, 0172ah, 0fd5fh; 1047.word0bfe3h, 09b87h, 0baa2h, 009d2h, 05263h, 06324h, 03301h, 0f686h; 1055.word0e773h, 0faefh, 004e1h, 0e686h, 0b289h, 0a9e6h, 0e266h, 0373eh; 1063.word06e71h, 05e4ch, 017e0h, 0dddfh, 0d93eh, 0f155h, 0f8cah, 0d80ch; 1071.word0b53dh, 0c5e6h, 00b79h, 05a74h, 07671h, 04712h, 0f4b6h, 0c375h; 1079.word0cddah, 0eda7h, 0f096h, 0d299h, 0c0abh, 0e55fh, 034ech, 07492h; 1087.word06e0eh, 0213bh, 0cdf5h, 0b15fh, 0cb0bh, 0f05dh, 0f209h, 0d6eah; 1095.word0d4beh, 00805h, 05618h, 07bebh, 05288h, 0f7f9h, 0aeaah, 0a8a0h; 1103.word0d5beh, 0fab5h, 0f792h, 0e26bh, 0ed1dh, 02926h, 06973h, 06e42h; 1111.word02602h, 0c6e6h, 094bah, 0acc6h, 0e9fah, 0bf4h, 00439h, 0f32ah; 1119.word00703h, 04128h, 068b0h, 04dbah, 0f6b9h, 0a284h, 08f93h, 0c1afh; 1127.word00437h, 01febh, 00f70h, 000d9h, 01b51h, 04b8dh, 05a37h, 0243eh; 1135.word0c73dh, 088e0h, 0981ch, 0e09fh, 02030h, 03131h, 01f38h, 010f3h; 1132.word01249h, 00f19h, 007f3h, 00247h; 1140_Dtmf3Start:.word0fffeh; 1144_ Dtmf2End:.word8f2h; 1145.word00030h, 01be1h, 025a1h, 0fb94h, 0e016h, 0ff76h, 00f6fh, 0ebbdh; 1159.word0b277h, 0a14ch, 0e25ah, 033d8h, 05ac2h, 04705h, 01c49h, 01d28h; 1167.word03172h, 02318h, 0df24h, 096a9h, 0967eh, 0dbe7h, 024edh, 03786h; 1175.word01a73h, 00c38h, 02b53h, 045a0h, 01f33h, 0c662h, 08845h, 09c33h; 1183.word0e8a6h, 01d80h, 01892h, 005dch, 0198dh, 04dbdh, 05c82h, 01ae4h; 1191.word0bb83h, 0918dh, 0ba0fh, 0fb1ch, 012b8h, 0007dh, 0fea5h, 031cch; 1199.word06a68h, 05f64h, 00a1ch, 0b394h, 0a1f0h, 0d04bh, 0f9eeh, 0f2fch; 1207.word0df92h, 0fb67h, 0458bh, 07640h, 0529eh, 0f620h, 0b4adh, 0bba7h; 1215.word0e442h, 0ed8fh, 0d101h, 0cc21h, 00562h, 057f8h, 07472h, 03d87h; 1223.word0eab3h, 0c702h, 0dd56h, 0f274h, 0dc05h, 0b860h, 0cb74h, 01910h; 1231.word0609ah, 066c3h, 025cfh, 0e65bh, 0e34bh, 0fa6dh, 0f37fh, 0c3dah; 1239.word0a623h, 0d218h, 025deh, 05eddh, 05079h, 01396h, 0f3cdh, 004d4h; 1247.word010d4h, 0e8beh, 0aa91h, 09e53h, 0de5eh, 02ff9h, 052ebh, 0363ch; 1255.word00a0bh, 00caah, 0272ch, 0193bh, 0d58eh, 09654h, 0a228h, 0ecffh; 1263.word030e9h, 03e5ah, 01d48h, 00e0dh, 02d20h, 04128h, 0164ah, 0bf20h; 1271.word08b5fh, 0add2h, 0fac5h, 02a1fh, 02260h, 00b71h, 01df1h, 04c31h; 1279.word04e52h, 0073ah, 0ac2fh, 08d78h, 0bfc6h, 0046eh, 018aeh, 00544h; 1287.word00506h, 0353eh, 064f2h, 04ec4h, 0f666h, 0a43bh, 09e45h, 0d651h; 1295.word0004dh, 0faadh, 0e956h, 00815h, 04e48h, 07255h, 044a4h, 0e662h; 1303.word0abeeh, 0bb31h, 0e85ch, 0f24ah, 0d930h, 0d994h, 01649h, 0636ah; 1311.word073c9h, 03052h, 0dafch, 0bdb7h, 0d7feh, 0f02bh, 0db91h, 0be52h; 1319.word0d898h, 02696h, 069d9h, 063f1h, 01ae2h, 0dbceh, 0da8dh, 0f4d1h; 1327.word0ece2h, 0c172h, 0aea0h, 0e1e2h, 035bah, 065fah, 04ca5h, 00966h; 1335.word0ebcah, 0fe21h, 0069ah, 0e07dh, 0a92dh, 0a9cah, 0eedah, 03cbch; 1343.word0586fh, 0325dh, 00397h, 006cfh, 01e5dh, 00d3ch, 0cae5h, 09527h; 1351.word0ada1h, 0fcdch, 03cbfh, 041e0h, 01b23h, 00b29h, 0272ah, 03513h; 1359.word0064fh, 0b571h, 08ddah, 0ba59h, 0088bh, 03349h, 02682h, 00cd5h; 1367.word01ee2h, 0479bh, 04080h, 0f691h, 0a1e1h, 08ee3h, 0cb3fh, 01070h; 1375.word020b3h, 00b4dh, 00c47h, 039f8h, 06089h, 03f75h, 0e443h, 09b11h; 1383.word0a09bh, 0def4h, 00916h, 00187h, 0f22eh, 011c5h, 05457h, 06d64h; 1391.word033b2h, 0d51bh, 0a17bh, 0b9cch, 0ec16h, 0f6bdh, 0df30h, 0e499h; 1399.word023eeh, 06b45h, 06ef4h, 02227h, 0ccb1h, 0b6a1h, 0d682h, 0effeh; 1407.word0dcddh, 0c490h, 0e5d1h, 035e3h, 07246h, 05e71h, 00c13h, 0d0f1h; 1415.word0d4a8h, 0f054h, 0e9afh, 0c141h, 0b80ah, 0f160h, 04407h, 06c69h; 1423.word04694h, 0fe84h, 0e2c9h, 0f6d4h, 0fee0h, 0d9a9h, 0a91dh, 0b429h; 1431.word0ff71h, 04a2ch, 05c17h, 02cadh, 0fd5fh, 0013dh, 015dh, 00352h; 1439.word0c3b5h, 097b1h, 0b985h, 00befh, 0485dh, 044bfh, 018b3h, 00845h; 1447.word021b9h, 02ba6h, 0f922h, 0aafah, 090ech, 0c82dh, 0166dh, 03c22h; 1455.word029cfh, 00d10h, 01ed8h, 041fah, 03265h, 0e63fh, 098b4h, 0949dh; 1463.word0d794h, 01a55h, 027a8h, 00fc6h, 0104fh, 03cc5h, 05acfh, 030c5h; 1471.word0d2b8h, 0906eh, 0a24ch, 0e7dbh, 0138fh, 009b5h, 0faeah, 01c24h; 1479.word05743h, 065a5h, 022e7h, 0c48bh, 09b01h, 0bcaah, 0f26ch, 0fbc8h; 1487.word0e67fh, 0ef0bh, 02dfdh, 06db1h, 0635fh, 0111fh, 0c015h, 0b13fh; 1495.word0d9c7h, 0f2d6h, 0dfbah, 0ce46h, 0f3b1h, 043bah, 0764dh, 054d4h; 1503.word0fe3eh, 0c605h, 0cf13h, 0ecbbh, 0e7cah, 0c36h, 0c1f7h, 000f4h; 1511.word04f7dh, 06db7h, 03d0dh, 0f3c7h, 0db76h, 0f03dh, 0f95ah, 0d422h; 1519.word0aba3h, 0c23nh, 00f3eh, 05552h, 05de2h, 025b6h, 0f410h, 0f9b3h;

1527.word00d3fh, 0f887h, 0bd43h, 09d46h, 0c8feh, 01af0h, 05053h, 04479h; 1535.word012fah, 00397h, 01c3fh, 020a2h, 0ec77h, 0a46fh, 09739h, 0d646h; 1543.word023a7h, 04429h, 02a7ch, 00cb6h, 01d75h, 03a98h, 02675h, 0d96ah; 1551.word0944bh, 09d07h, 0e5cbh, 024ddh, 02d79h, 01256h, 0125ah, 03d13h; 1559.word0525fh, 01fdbh, 0c252h, 08cffh, 0abddh, 0f3f8h, 01bdfh, 00fe2h; 1567.word001d5h, 0228dh, 058ffh, 05aech, 01126h, 0b46fh, 0948dh, 0c22fh; 1575.word0fb2fh, 00432h, 0ef21h, 0fb67h, 0393eh, 06f58h, 05818h, 0ff15h; 1583.word0b301h, 0acc9h, 0dbbah, 0f71eh, 0e475h, 0d6e5h, 0003fh, 04f70h; 1591.word07817h, 04a6fh, 0ef7dh, 0bae7h, 0ca47h, 0ec37h, 0e709h, 0c6e8h; 1599.word0cc5dh, 00e22h, 05c76h, 06fb3h, 03207h, 0e587h, 0d0fch, 0ea15h; 1607.word0f312h, 0d038h, 0aee4h, 0cd78h, 02047h, 06130h, 05c89h, 01ca3h; 1615.word0ebb9h, 0f2bah, 00609h, 0f007h, 0b810h, 0a2c2h, 0d89bh, 02b6fh; 1623.word05adeh, 043e1h, 00cb1h, 0fd5eh, 014b9h, 015a1h, 0dfedh, 09f7ch; 1631.word09ec2h, 0e4fdh, 031e1h, 04b43h, 29878h, 00947h, 01a19h, 032b1h; 1639.word018f8h, 0cc38h, 090b1h, 0a79bh, 0f480h, 02fc9h, 03303h, 013a7h; 1647.word01417h, 03ae0h, 04751h, 00f65h, 0b4ceh, 08a32h, 0b4b8h, 000c4h; 1655.word024b2h , 01599h, 00809h, 02805h, 057c0h, 04ecdh, 0fed3h, 0a804h; 1663.word09468h, 0cb72h, 0055eh, 00c5ch, 0f844h, 004c2h, 040a9h, 06d6fh; 1671.word04bcfh, 0ed22h, 0a2f5h, 0a8d7h, 0df7eh, 0fbc3h, 0eabch, 0df4ch; 1679.word00d37h, 0547h, 075deh, 03b65h, 0e038h, 0b38dh, 0c838h, 0ee37h; 1687.word0e96dh, 0cbfch, 0d7d3h, 01d6ah, 067a6h, 06d8ch, 02701h, 0da39h; 1695.word0c9a3h, 0e6e0h, 0f02dh, 0cf4ch, 0b5d1h, 0dbe0h, 02fe5h, 06ab5h; 1703.word05a23h, 01163h, 0e026h, 0ea48h, 0fd5bh, 0e92fh, 0bbf0h, 0bc56h; 1700.word0fa3ch, 0fffdh; 1708__Dtmf4Start:.word0ffffh; 1710__Dtmf3End:.word00004h, 00800h, 01232h, 00942h, 0e0cfh; 1711.word0bcb1h, 0c9a8h, 0093dh, 05613h, 07935h, 05073h, 0f2cah, 09ccfh; 1727word08597h, 0b715h, 0036dh, 03630h, 03853h, 01b25h, 0076bh, 00f1bh; 1735.word01f37h, 017b3h , 0eafdh, 0b40eh, 0a2efh, 0ce19h, 01ca9h, 05f44h; 1743.word06c95h, 03583h, 0e1d9h, 0ae31h, 0b377h, 0e1eeh, 0e77h, 019b5h; 1751.work00bc9h, 0357h, 016e6h, 038ebh, 0439bh, 01d03h, 0d463h, 099c5h; 1759.word09b4h, 0da39h, 02813h, 05b7bh, 05449h, 01530h, 0d962h, 0c516h; 1767.word0d8c0h, 0f8beh, 0ff09h, 0ef82h, 0e56bh, 0fd01h, 0342dh, 05fe4h; 1775.word0583fh, 01356h, 0ba5ch, 08a4ah, 0a400h, 0eeb5h, 034dfh, 05169h; 1783.word0389bh, 0069ah, 0ea48h, 0ef19h, 0ff21h, 0fceeh, 0de5ch, 0c241h; 1791.word 0cd14h, 006b4h, 04f02h, 07203h, 05901h, 0fbfeh, 0aaefh, 0904eh; 1799.word0bbfdh, 002f0h, 0338fh, 03760h, 01978h, 00533h, 00ac9h, 01b9eh; 1807.word0187fh, 0ee77h, 0b8dch, 0a3f5h, 0ca51h, 015a7h, 05938h, 06c5fh; 1815.word038c3h, 0e3abh, 0ab9dh, 0ae2fh, 0deb9h, 00d58h, 01c70h, 0107dh; 1823.word004d1h, 01542h, 03581h, 042d3h, 0217ch, 0da34h, 09e15h, 09b0ah; 1831.word0d5e0h, 0248ah, 05b88h, 0574ch, 01ad6h, 0dc8ah, 0c425h, 0d5e5h; 1839.word0f66fh, 000f9h, 0f2e8h, 0e811h, 0fbd7h, 02e58h, 05af5h, 056b2h; 1847.word01701h, 0c070h, 08d88h, 0a24ch, 0e947h, 2fc2h, 0517bh, 03b26h; 1855.word00836h, 0e8e0h, 0eac7h, 0fd12h, 0fdd2h, 0e2e0h, 0c6a7h, 0cd17h; 1863.word00392h, 04af6h, 071aeh, 054aeh, 00179h, 0aebeh, 0910fh, 0b86h; 1871.word0fedch, 03143h, 038e3h, 01cd4h, 004f2h, 00770h, 0186eh, 01788h; 1879.word0f1d3h, 0bd65h, 0a64ah, 0c843h, 01285h, 058b5h, 06e2ch, 03b26h; 1887.word0e711h, 0adcdh, 0ab31h, 0da2fh, 00c1ah, 01e47h, 01425h, 00613h; 1895.word0133ch, 0320fh, 04103h, 023a5h, 0ddf4h, 09f38h, 0987eh, 0d2bah; 1903.word021c6h, 05a13h, 059f5h , 01ee0h, 0df3dh, 0c236h, 0d1c0h, 0f52ah; 1991.word00115h, 0f64fh, 0e926h, 0f895h, 02b1h, 582dh, 05918h, 01bb4h; 191.word0c36dh, 08d95h, 09da2h, 0e2aeh, 02d6ah, 052ebh, 03dd2h, 00b26h; 1927.word0e92dh, 0e83ch, 0fa50h, 0fee5h, 0e670h, 0c96ah, 0cc99h, 0ff52h; 1935.word0474bh, 07005h, 0576eh, 00612h, 0b0b2h, 08f44h, 0b37eh, 0fad0h; 1943.word031dbh, 03bd6h, 020dfh, 005a6h, 0050eh, 0154eh, 01722h, 0f5e7h; 1951.word0c1a9h, 0a6d4h, 0c4b5h, 00e52h, 0557ch, 06e27h, 0407eh, 0ec95h; 1959.word0af2bh, 0a888h, 0d629h, 00b96h, 020a4h, 0175ch, 007adh, 01082h; 1967.word02df4h, 03ed9h, 025e6h , 0e276h, 0a20bh, 0982dh, 0cdc8h, 01b33h; 1975.word0797h, 05cb8h, 0224eh, 0dff9h, 0c171h, 0ce69h, 0f224h, 00336h; 1983.word0f9feh, 0ec44h, 0f902h, 027b4h, 055e7h, 05a23h, 02076h, 0c85eh; 1991.word08ea1h, 09ae3h , 0df4bh, 028ffh, 052d6h, 042a3h, 00e41h, 0e9a2h; 1999.word0e4feh, 0f7aah, 0ff6fh, 0e989h, 0cdd8h, 0cd3bh, 0fc61h, 04325h; 2007.word0702fh, 05bc0h, 00ad6h, 0b494h, 08e03h, 0ae 2bh, 0f70fh, 030d5h; 2015.word03dc0h, 023e6h, 00680h, 002b0h, 002b0h , 011dbh, 01676h, 0f86fh, 0c59bh; 2023.word0a923h, 0c2a9h, 009b4h , 052e4h, 06fb3h, 0459bh, 0f165h, 0afdeh; 2031.word0a5b7h, 0d160h, 007cch, 02151h, 019b0h, 008d6h, 00e2ch, 02997h; 2039.word03bdch, 02653h, 0e6a4h, 0a568h, 09789h, 0c8c2h, 01843h, 05870h; 2047.word05f28h, 02844h, 0e372h, 0bf52h, 0ca28h, 0ef28h, 004f4h, 0fd95h; 2055.word0efcbh, 0f84ch, 02343h, 05213h, 05892h, 02289h, 0ccb2h, 0908bh; 2063.word097c9h, 0db69h, 02700h, 05263h, 04661h, 011c3h, 0e8d4h, 0e27dh; 2071.word0f463h, 0ff84h, 0ecb1h, 0d04ah, 0cd07h, 0f877h, 03f18h, 06e19h; 2079.word05d6ah, 01058h, 0b95ch, 08d95h, 0a98fh, 0f1c5h, 02f5dh, 04129h; 2087.word0271bh, 006d3h, 0ffbh, 00df7h, 014c8h, 0faech, 0ca9ch, 0ab93h; 2095.word0c103h, 00536h, 04ea8h, 06f3bh, 049cfh, 0f61ah, 0b0a6h, 0a1b2h; 2103.word0ccdah, 00741h, 235fh, 01dadh, 00bc9h, 00cdah, 02704h, 03ad1h; 2111.word0290eh, 0eb81h, 0a8e0h, 096d2h, 0c670h, 014c6h, 05431h, 06141h; 2119.word02e2bh, 0e6a7h 0bf86h, 0c6b8h, 0ec0fh, 0044eh, 0ffd1h, 0f1ceh; 2127.word0f6dah, 01f97h, 04e1ah, 05843h, 02602h, 0d250h, 093b4h, 095d5h; 2135.word0d6e0h, 0240dh, 052e1h, 04ab2h, 0161ch, 0e9cdh, 0e053h, 0f13ah; 2143.word0ff52h, 0f043h, 0d48ah, 0ce88h, 0f571h, 03a47h, 06b9eh, 05fcdh; 2151.word0161bh, 0bcd2h, 08cbch, 0a60eh, 0ed22h, 02b58h, 04173h, 02951h; 2159.word00791h, 0fe5ch, 00af2h, 014ach, 0fe51h, 0cdf9h , 0acdfh, 0be4bh; 2167.word001cfh, 04d1ch, 070f2h, 04ffeh, 0faddh, 0b119h, 09e89h, 0c5d7h; 2175.word00319h, 024d5h, 020d8h, 00dc1h, 00ba5h, 023b0h, 0377eh, 02916h; 2183.word0f009h, 0ae64h, 097e7h, 0c169h, 00f38h, 05354h, 06381h, 031d1h; 2191.word0e9a1h, 0bdf3h, 0c2e3h, 0e7c7h, 0037eh, 00353h, 0f451h, 0f69fh; 2199.word01b76h, 049b6h, 05712h, 02a4eh, 0d918h, 0971eh, 0957ah, 0d38ch; 2207.word2047h, 051c9h, 04d57h, 018eeh, 0e91ah, 0dca3h, 0ed06h, 0fe37h; 2115.word0f299h, 0d7f7h, 0cf74h, 0f2c0h, 036d9h, 069fah, 06379h, 01bfeh; 2223.word0bffeh, 08cb0h, 0a24ch, 8e890h, 02a3eh, 04315h, 02e0bh, 00932h; 2231.word0fb56h, 0075ch, 0114eh, 0ffa4h, 0d249h, 0b011h, 0becah, 0fdb0h; 2239.word04733h, 06f9bh, 0532fh, 00120h, 0b788h, 09ee9h, 0c3ch, 0005bh; 2247.word0246bh, 023c0h, 00f5h, 00ab2h, 01ebeh, 03473h, 029a2h, 0f367h; 2255.word0b1bfh, 09831h, 0bfach, 00b07h, 0507fh, 065ech, 03633h, 0ecaeh; 2263.word0bdc6h, 0be7eh, 0e587h, 004ffh, 006cbh, 0f914h, 0f821h, 018edh; 2271.word04646h, 056f7h , 0301ah, 0e7bbh, 0b702h, 0bd78h, 0d52dh, 0dbcbh; 2268.word0eac6h, 0fc39h, 00011h, 0000fh; 2276__Dtmf5Start:.word00001h;2280__Dtmf4end:.word00008h, 0ff9bh, 00028h;2281.word0080ah, 019f8h, 01debh, 0f31ch, 0b477h, 0a562h, 0dea8h, 02fabh; 2295.word06b00h, 05eaeh, 01771h, 0d7b3h, 0cb6fh, 0e4a2h, 0f599h, 0e46eh; 2303.word0cf62h, 0e4d9h, 02a0bh, 06c0bh, 06be3h, 01f93h, 0bf26h, 0941ah; 2311.word0b57eh, 0f73ch, 01bc8h, 00fcbh, 0fd08h, 00be3h, 036e2h, 04b59h; 2319.word01f17h, 0a79h, 08f35h, 0a06bh, 0efa9h, 03873h, 04c7ah, 02815h; 2327.word0fd59h, 0fb27h, 01006h, 013a1h, 0eaa1h, 0b593h, 0b2edh, 0f041h; 2335.word043f2h, 07174h, 0ff64h, 0c3efh, 0c4ebh, 0e8deh, 0fe8bh; 2343.word0ed55h, 0d8a0h, 0f03ah, 032f0h, 06c33h, 05e07h, 00950h, 0ace3h; 2351.word08c38h, 0bb7eh, 003c0h, 026aeh, 01a87h, 00415h, 00da3h, 0319bh; 2359.word03d0ah, 00e47h, 0bcf9h, 08f06h, 0b0aeh, 00139h, 045a3h, 0526eh; 2367.word02508h, 0f3ffh, 0eec8h, 0056bh, 009f6h, 0e5f8h, 0ba83h, 0bfech; 2375.word00295h, 0545eh, 07582h, 046efh, 0ef47h, 0b663h, 0bda0h, 0e8b5h; 2383.word0037ch, 0f6c1h, 0e58dh, 0fc6ah, 037bbh, 064cdh, 04ce6h, 0f54dh; 2391.word09d32h, 08ad9h, 0c5c5h, 0114ch, 0337dh, 0218bh, 0069eh, 0bffh; 2399.word028f7h, 02fe9h, 00092h, 0b6a7h, 09455h, 0c0cah, 014eah, 05564h; 2407.word05711h, 01ce2h, 0e81eh, 0e300h, 0fa57h, 0032ah, 0e545h, 0c12bh; 2415.word0cf15h, 0149bh, 061e0h, 074fch, 038e3h, 0dd7ah, 0a68eh, 0b787h; 2423.word0ec88h, 009e7h, 000aeh, 0f10ch, 004e0h, 03abbh, 05c7eh, 03ae5h; 2431.word0e0a9h, 09399h, 091d4h, 0d410h, 01f42h, 03c31h, 025dfh, 005b9h; 2439.word00685h, 020e3h, 022fdh, 0f4ffh, 0b384h, 09ef8h, 0d354h, 028f2h; 2447.word062fch, 0576bh, 01457h, 0db9eh, 0d6f8h, 0f26ah, 0ff8ch, 0e71ch; 2455.word0cac4h, 0dd70h, 022bah, 06883h, 06e8dh, 02873h, 0c8cch, 09a24h; 2463.word0b598h, 0f1fbh, 014b2h, 00a42h, 0f944h, 00a6ch, 03926h, 0516ah; 2471.word026dah, 0cf23h, 08ef2h, 09ba8h, 0e562h, 02f54h, 046fdh, 027fch; 2479.word00077h, 0ff25h, 015e2h, 01821h, 0ece9h , 0b3ech, 0ad08h, 0e820h; 2487.word03bafh, 06be9h, 05384h, 00732h, 0cd34h, 0cc73h, 0ebe5h, 0fec5h; 2495.word0eaefh, 0d41ch, 0ea23h, 02cech, 06a50h, 0629ch, 013cah, 013cah, 0b7f7h; 2503.word091d9h, 0b878h, 0fc1eh, 0203ch, 01584h, 000dbh, 00d77h, 03448h; 2511.word043c8h, 01595h, 0c09dh, 08d7dh, 0a7f8h, 0f8ech, 03fcah, 04ee6h; 2519.word0274ch, 0f7fbh, 0f33bh, 00a23h, 00d16h, 0e797h, 0b7d 6h, 0ba90h; 2527.word0fb47h, 04d44h, 0379fh, 04bc8h, 0f5a9h, 0bc6fh, 0c1bbh, 0e8b0h; 2535.word00179h, 0f231h, 0e04eh, 0f7c3h, 03629h, 06959h, 05516h, 0fe1ch; 2543.word0a431h, 08cb9h, 0c05eh, 00a64h, 02cc4h, 01d97h, 005e8h, 00cc8h; 2551.word02e06h, 0363fh, 00678h, 0b979h, 0926fh, 0b803h, 0ac5h, 04e1eh; 2559.word053cbh, 02173h, 0ee2eh, 0e8d7h, 00009h, 005bdh, 0e610h, 0bed1h; 2567.word0ca0bh, 00e09h, 05b9ch, 07715h, 03fach, 0e301h, 0ad95h, 0b9b5h; 2575.word0e8ach, 0063bh, 0faafh, 0eb1bh, 000d4h, 039c4h, 0614ah, 04296h; 2583.word0e992h, 0988bh, 08eeah, 0ce88h, 01a6bh, 038fbh, 02505h, 006f2h; 2591.word00907h, 0251fh, 02879h, 0fa4bh, 0b5cfh, 0b5cfh, 09b84h, 0cb83h, 01ef5h; 2599.word05b97h, 056dbh, 0173bh, 0e0ach, 0dc4fh, 0f51dh, 0001ah, 0e53dh; 2607.word0c601h, 0d70fh, 01b9eh, 06476h, 07153h, 02fe6h, 0d3bah, 0a158h; 2615.word0b5f8h, 0ef55h, 00f69h, 005d0h, 0f67eh, 0082ah, 039b2h, 055d1h; 2623.word03022h, 0d850h, 0925ch, 09778h, 0dcb9h, 02702h, 04288h, 0276ah; 2631.word00236h, 00213h, 019afh, 01bb0h, 0ef82h, 0b2b6h, 0a5a6h, 0df06h; 2639.word033d4h, 06765h, 055b3h, 00d80h , 0d3b6h , 0d0a9h, 0ede5h, 0ff36h; 2647.word0e8c1h , 0cfbdh, 0e418h, 0288bh, 06b19h, 06834h, 01cc0h, 0bffeh; 2655.word09459h, 0b652h, 0f8c9h, 01b21h, 01087h, 0fe32h, 00c35h, 03726h; 2663.word04a64hm, 01db9h, 0c828h, 08e0fh, 0a1e6h, 0eed0h, 03643h, 04ae 3h; 2671.word0274bh, 0fb5eh, 0f871h, 00ec9h, 01260h, 0ea44h, 0b68dh, 0b4e2h; 2679.word0f23fh, 04472h, 07051h, 04f5fh, 0feb8h, 0c441h, 0c4d1h, 0ea2ch; 2687.word00039h, 0ef40h, 0db88h, 0f1cbh, 032beh, 06abah, 05bd7h, 008bfh; 2695.word0ae19h, 08e94h, 0bbcch, 0038bh, 027d9h, 01aeeh,m 0046dh, 00deah; 2703.word03152h, 03d14h, 00ddeh, 0bcf5h, 08eedh, 0af97h, 00090h, 0457dh; 2711.word05175h, 023afh, 0f2dfh, 0ed60h, 004b3h, 009fch, 0e6a0h, 0bc66h; 2719.word0c346h, 00507h, 05492h, 0747bh, 0452fh, 0ecf6h, 0b5b2h, 0bc70h; 2727.word0e897h, 0052ch, 0f777h, 0e721h, 0fd85h, 03887h, 0660fh, 04d05h; 2735.word0f4a7h, 09db4h, 08d09h, 0c5f9h, 00fb4h, 03248h, 020fah, 0058eh; 2743.word00ac6h, 027ffh, 02efch, 0ff80h, 0b5d2h, 09582h, 0c22eh, 016afh; 2751.word0562fh, 0573ch, 01da0h, 0e7c9h, 0e26eh, 0f9b3h, 0022d9h, 0e50bh; 2759.word0c251h, 0d03fh, 01487h, 06166h, 0745fh, 03893h, 0dc16h, 0a56eh; 2767.word0b6a6h, 0eb38h, 00a3eh, 0012eh, 0f11eh, 0056dh, 03a57h, 05af0h; 2775.word03838h, 0dfdbh, 09407h, 09190h, 0d72fh, 02153h, 03d0h, 0277dh; 2783.word00376h, 00450h, 01ed4h , 020dch, 0f4beh, 0b38ch, 0a0f6h, 0d5f3h; 2791.word02950h, 06278h, 056afh, 0126dh, 0daa7h, 0d584h, 0f0bdh, 0000dh; 2799.word0e778h, 0cb99h, 0ddffh, 02365h, 06a73h, 06ed9h, 0267fh, 0c78dh; 2807.word09a17h, 0b567h, 0f215h, 01570h, 00b19h, 0fa55h, 00a8bh, 03796h; 2815.word04ec5h, 02504h, 0d00bh, 08f2bh, 09c5bh, 0e8b0h, 03116h, 04810h; 2823.word0293eh, 00054h, 0fe27h, 014c2h, 0171dh, 0ecc9h, 0b451h, 0ae40h; 2831.word0e9d8h, 03bf7h, 06b8bh, 0521dh, 00439h, 0cae9h, 0ca2bh, 0eaf7h; 2839.word0fee9h, 0eb66h, 0d603h, 0eb15h, 02e80h, 06beah, 06188h, 011dah; 2847.word0c3f3h, 0b7b6h, 0d2adh, 0de0fh, 00044h, 0ffc3h :2845_Dtmf6Start:.word0fff1h;2850_Dtmf5End:.word00026h;2851.word0002bh, 0006dh, 00082h, 00073h, 00086h, 0ff26h, 0faf6h, 0f251h; 2863.word0f33bh, 013d1h, 032afh, 014d9h, 0edaeh, 0022bh, 01434h, 0f61ah; 2871.word0bb9ch, 098ech, 0cc21h, 022a7h, 058d8h, 04efbh, 015bah, 0fd9ch; 2879.word00b1ah, 00c5dh, 0e34ch, 0af3eh, 0b4bfh, 0fcc4h, 04b48h, 05f34h; 2887.word02b08h, 0edc3h, 0e722h, 0fd1dh, 0f86ah, 0cc7eh, 0af92h, 0d945h; 2895.word02c45h, 062c3h, 04aeah, 0ff85h, 0d27dh, 0dee4h, 0f708h, 0e978h; 2903.word0c44bh, 0c8f8h, 00d6bh, 05a6dh, 06d0bh, 028e9h, 0d883h, 0c442h; 2911.word0e12ch, 0f653h, 0e20dh, 0cba0h, 0ee20h, 03df3h, 0724dh, 05124h; 2919.word0f656h, 0b7f9h, 0c1b3h, 0ebc2h, 0f7aeh, 0e014h, 0dde7h, 0169ch; 2927.word05f60h, 069beh, 01ee8h, 0c3c5h, 0a695h, 0cf12h, 0fc93h, 0fd07h; 935.word0e88bh, 0fa6bh, 03b72h, 06914h, 04410h, 0e3ffh, 09e5ch, 0ac14h; 2943.word0eb9dh, 01132h, 00566h, 0f8f5h, 01aa4h, 05263h, 057eeh, 00cch; 2951.word0b06bh, 092dbh, 0c859h, 00e1ah, 00b29h, 007c0h, 0300eh; 2959.word05245h, 02f48h, 0d520h, 09426h, 0a77eh, 0f2f2h, 0297dh, 0253dh; 2967.word00b18h, 01225h, 03867h, 03c88h, 0fd49h, 0aae6h, 09498h, 0d1f3h;

2975.word01f06h, 03bb0h, 02253h, 00675h, 01868h, 032f2h, 019bdh, 0cfd8h; 2983.word09797h, 0b1c1h, 003f2h, 041f8h, 0403ch, 01413h, 000a0h, 017fch; 2991.word0205dh, 0f29fh, 0af70h, 0a14fh, 0e271h, 033d4h, 0537ch, 031b4h; 2999.word0fdd2h , 0f895h, 00fe7h, 00603h, 0cfech, 0a50ch, 0c2d7h, 01625h; 3007.word05697h, 05142h, 01398h, 0e865h, 0f329h, 0057dh, 0eebdh, 0bde9h; 3015.word0b68ch, 0f46ch, 04522h, 066a3h, 03751h, 0ec11h, 0d641h, 0ed04h; 3023.word0f917h, 0dbbdh, 0bb72h, 0d7deh, 026ceh, 0679bh, 05bb9h, 00b99h; 3031.word0cc26h, 0cdefh, 0edb0h, 0f1e3h, 0d34ch, 0cc70h, 0047ah, 052cfh; 3039.word06f15h, 035a7h, 0dbceh, 0b67dh, 0d1f6h, 0f4b1h, 0ef29h, 0d653h; 3047.word0e8a5h, 030f7h, 06d90h, 05989h, 0ff0ch, 0b3f0h, 0b222h, 0e286h; 3055.word0fffbh, 0f16ah, 0e532h, 00ca9h, 052fah, 06933h, 0297eh, 0c946h; 3063.word09d41h, 0c190h, 0fb74h, 00b95h, 0f8d2h, 0fb6dh, 02dfbh, 05f14h; 3071.word0481eh, 0ede6h, 0a002h, 0a063h, 0e16bh, 01756h, 016f5h, 0025dh; 3079.word01239h, 04255h, 05242h, 01670h, 0b9bch, 90916h, 0bbf0h, 009c0h; 3087.word02c6ah, 019e5h, 00819h, 0221fh, 045b3h, 031fch, 0e135h, 09845h; 3095.word0a024h, 0eb2ah, 02cbbh, 03372h, 013ddh, 0091ch, 027afh, 0361dh; 3103.word005a1h, 0b591h, 0942h, 0c9deh, 01c27h, 04538h, 03057h, 007b0h; 3111.word008abh, 0235ch, 019a5h, 0db73h, 09ee8h, 0ac8bh, 0fc56h, 0434ch; 3119.word04c69h, 01d82h, 0f8fah, 00594h, 01651h, 0f934h, 0bcd9h, 0a5c1h ; 3127.word0db26h, 02each, 05b74h, 03ed6h, 0ff0fh, 0ea1ch, 0ff84h, 0040ah; 3135.word0dce5h, 0b03dh, 0c263h, 00eb2h, 05484h, 05bdfh, 01c8eh, 0e162h; 3143.word0e0cfh, 0f91bh, 0f4efh, 0cb5dh, 0b999h, 0ecb5h, 03ffeh, 06ba9h; 3151.word044c0h, 0f411h, 0cb32h, 0dd9dh, 0f67ah, 0e7a0h, 0c7e8h, 0d5e0h; 3159.word01e5dh, 06452h, 0632fh, 016fah, 0c999h, 0bdb3h , 0e282h, 0f7d8h; 3167.word0e250h, 0d274h, 0fbc6h, 0498eh, 07099h, 040cfh, 0e3d2h, 0acf4h; 3175.word0c141h, 0f125h, 0fb4fh, 0e5e6h, 0e951h, 02430h, 064a3h, 05ddah; 3183.word00971h, 0b324h, 0a421h, 0d653h , 005c4h, 00308h, 0f097h, 0071ch; 3191.word043f5h, 0641dh, 03058h, 0d00bh, 09797h, 0b362h, 0f8c5h, 0197bh; 3199.word00b35h, 0ffd7h, 02279h, 053d6h, 04a37h, 0f890h, 0a1e8h, 096dch; 3207.word00d7b1h, 0192eh, 0258ch, 00d55h, 00b4bh, 03279h, 04a25h, 01d56h; 3215.word0c49bh, 09030h, 0b3c1h , 003b4h, 0321bh, 0273bh, 00b1ah, 0135eh; 3223.word03632h, 030c0h, 0ed1ch, 0a168h, 09c8ch, 0e314h, 02c92h, 04199h; 3231.word0201bh, 00494h, 01681h, 02b7bh, 00c24h, 0c2c0h, 099e1h, 0c328h; 3239.word014ffh, 04a59h, 03e65h, 00b64h, 0fb11h, 0127dh, 014d9h, 0e590h; 3247.word0aad9h, 0ad67h, 0f468h, 03ffeh, 0559bh, 02840h, 0f4f4h, 0f3cdh; 3255.word009a3h, 0fdd1h, 0c949h, 0aa73h, 0d537h, 02949h, 05fffh, 04b6bh; 3263.word00668h, 0df7fh, 0ee44h, 0ff72h, 0e7abh, 0bce0h, 0c187h, 006e0h; 3271.word0540bh, 06575h, 02956h, 0e08ah, 0d0dfh, 0eb03h, 0f668h, 0d9d2h; 3279.word0c205h, 0e823h, 03787h, 06b42h, 04eech, 0fafbh, 0c1a6h, 0cb30h; 3287.word0ee8fh, 0f0d4h, 0d47ah, 0d62ch, 01401h, 05ec0h, 06a2ch, 02356h; 3295.word0ccfh, 0b0d7h, 0d52bh, 0f9c6h, 0f18fh, 0dd60h, 0f6d0h, 03df4h; 3303.word06ef5h, 0ea5bh, 0a5deh, 0b176h, 0e9efh, 00650h, 0f6a7h; 3311.word0eed6h, 01949h, 0580dh, 05f26h, 01406h, 0b7b2h, 09a7eh, 0ca89h; 3319.word006a2h, 01291h, 0ff3bh, 00497h, 036b0h, 05d54h, 307deh, 0d966h; 3327.word093f9h, 0a6a0h, 0f111h, 02170h, 01b2ah, 00653h, 01742h, 0436dh;

3335.word046cah, 0021fh, 0ab93h, 09119h, 0cbdfh, 01955h, 031f2h, 01b37h; 3343.word00955h, 02260h, 0400fh, 02338h, 0d115h, 09385h, 0aca6h , 0fd4bh; 3351.word037feh, 036f6h, 010bfh, 007eah, 02551h, 02af1h, 0f5f3h, 0ac6ch; 3359.word09cc7h, 0db44h, 02959h, 0497ch, 02b87h, 00138h, 00573h, 01e4ch; 3367.word00e3dh, 0cf92h, 09f00h, 0bbd8h, 00f04h, 04efeh, 04b73h, 013cbh; 3375.word0f1b0h, 00141h, 00efch, 0ecfh, 0f684h, 0ad3dh, 0ecfbh, 03e74h; 3381.word05fe1h, 0354bh, 0f474h, 0e45eh, 0fa2bh, 0fe19h, 0d6e3h, 0b2f4h; 3391.word0d030h, 02119h, 06183h, 0581bh, 00fd1h, 0d75ah, 0db9dh, 0f594h; 3399.word0ef4ch, 0c97fh, 0c2b1h, 0fe9fh, 04fdah, 06de5h, 03814h, 0e386h; 3407.word0c11ah, 0db12h, 0f4fdh, 0e581h, 0cb4dh, 0e2a7h, 02eb7h, 06bc7h; 3415.word05a01h, 00558h, 0bdd9h, 0bbb6h, 0e552h, 0f984h, 0e42dh, 0da5eh; 3423.word00928h, 05020h, 05e82h, 01d36h, 0dfa2h, 0e7bh, 0ec84h, 0ea8dh; 3420.word0f5d5h, 0f799h, 0f125h, 0f880h, 0fb39h__Dtmf75Start:.word00038h;3433__ Dtmf6End:.word001ddh, 004aeh;3428.word00423h, 0f983h, 0eea2h, 0fb3dh, 01a77h, 026f0h, 009b3h, 0d053h; 3436.word0a805h, 0bcb3h, 0079ch, 05b2ch, 07e80h, 04e29h, 0ec0eh, 09c3bh; 3455.word09325h, 0cf4ch, 01dc0h, 049fdh, 03ff7h, 0156bh, 0f274h, 0ee03h; 3463.word0f918h, 0f91ch, 0e467h, 0cde9h, 0d806h, 00ac7h, 04939h, 0613fh; 3471.word035eah 0dea3h, 097bdh, 094bah, 0d37dh, 02674h, 05b99h, 0517dh; 3479.word01223h, 0d457h, 0bfafh, 0d768h, 0febfh, 00bf5h, 009aeh, 002e9h; 3487.word01165h, 031ech, 04245h, 0278eh, 0e458h, 0a679h, 0a678h, 0a1d8h, 0dd26h; 3495.word02e15h, 065cbh, 05b85h, 00d47h, 0ba70h, 09a2bh, 0b98eh, 0fc5eh; 3503.word02e4dh, 034f6h, 01cf4h, 00679h, 00660h, 010e0h, 00b46h, 0e930h; 3511.word0c0dfh, 0b9e8h, 0e82fh, 033c8h, 06889h, 05b37h, 00e19h, 0b527h; 3519.word08d38h, 0b09bh, 0071h, 04366h, 05492h, 02e2eh, 0f69eh, 0dac8h; 3527.word0e1d9h, 0f689h, 0fc4bh, 0eea3h, 0e61eh, 0fadch, 02b63h, 053a3h; 3535.word04a5ah, 007c5h, 0b50eh, 08f71 bh, 0b320h, 0053fh, 04ef3h, 0656bh; 3543.word035e6h, 0e56dh, 0b3c1h, 0b715h, 0e53dh, 01322h, 01ec4h, 01475h; 3551.word00a92h, 01609h, 02a7ch, 02828h, 00088h, 0c423h, 0a43ah, 0c24ah; 3559.word00cb6h, 05393h, 06a60h, 036b3h, 0da79h, 098e8h, 09b27h, 0dc0eh; 3567.word02510h, 04765h, 039ach, 01062h, 0f6deh, 0f800h, 001cah, 0fbbch; 3575.word0deb1h, 0c8a7h, 0d7bch, 0117ch, 0526ch, 0655ch, 033e7h , 0da2eh; 3583.word0945bh, 0958ah, 0d946h, 02b16h, 05b91h, 04bcdh, 00c03h, 0d5c2h; 3591.word0c6dbh, 0df11h, 0fef2h, 006aeh, 0fdc8h, 0fb3ch, 012cfh, 038c8h; 3599.word04707h, 0243dh, 0db9dh, 09f7dh, 0a181h, 0e360h, 03448h, 06701h; 3607.word056fch, 0070fh, 0b95ah, 09fd6h, 0c2ceh, 001b3h, 02a49h, 02cd2h; 3615.word016f4h, 00834h, 0101eh, 01a46h, 00d6dh, 0e35bh, 0b81ah, 0b676h; 3623.word0ed81h , 03a73h, 06a59h, 057bfh, 00644h, 0afc1h, 08e42h, 0b5a2h; 3631.word00682h, 044afh, 04f41h, 02829h, 0f713h, 0e205h, 0eaf7h, 0fb59h; 3639.word0f765h, 0e3e7h, 0dd8ch, 0fb35h, 032c5h, 05935h, 04926h, 001ffh; 3647.word0b08bh, 08f0bh, 0b727h, 00b58h, 05258h, 061e7h, 02df3h, 0e287h; 3655.word0b84fh, 0c081h, 0ec72h, 01078h, 01649h, 00bd9h, 0086fh, 01cc7h; 3663.word032d5h, 02c73h, 0fc01h, 0bb47h, 0a018h, 0c3bfh, 012d0h, 05b26h; 3671.word06a36h, 0301dh, 0d43ch, 0981eh, 0a265h, 0e121h, 02547h, 0413ah; 3679.word02fdah, 00de7h, 0fcd2h, 001f7h, 008eah, 0f9beh, 0d676h, 0c06fh; 3687.word0d675h, 01731h, 058a1h, 06794h, 02fa0h, 0d366h, 091f1h, 099dch;

3695.word0dfa4h, 02ea9h, 0598dh, 044f9h, 007a5h, 0d8d6h, 0d06ah, 0e7c9h; 3703.word0fec2h, 0fe87h, 0f3ach, 0f64ah, 01715h, 0419fh, 04d5bh, 02231h; 3711.word0d2c5h, 09911h, 0a143h, 0e652h, 037f6h, 066efh, 0505ah, 00003h; 3719.word0b92ch, 0a728h, 0cc17h, 005ebh, 02647h, 0244eh, 0118dh, 00b1eh; 3727.word01955h, 022d5h, 00f88h, 0dcc6h, 0afe5h, 0b418h, 0f09h, 04057h; 3735.word06d22h, 0533ah, 0fd7fh, 0aa54h, 09107h, 0bda9h, 00b7ah, 04305h; 3743.word0489eh, 02167h, 0f6f7h, 0e9cfh, 0f3deh, 0fe7bh, 0f172h, 0d979h; 3571.word0d728h, 0fcb5h, 03a22h, 05fa3h, 04948h, 0fbd4h, 0aa5dh, 08f55h; 3759.word0be01h, 0118bh, 0532eh, 05d30h, 02673h, 0e0d6h, 0be61h, 0c950h; 3767.word0f1aeh, 00db9h, 00d4ch, 00390h, 0083ah, 0246dh, 03c00h, 02f5ch; 3775.word0f6f8h, 0b40eh, 09c50h, 0c722h, 01852h, 05bedh, 06779h, 02922h; 3783.word0cfa4h, 09ba8h, 0a92eh, 0e938h, 025e8h, 03a51h, 02843h, 00b69h; 3791.word00287h, 00b97h, 00ed1h, 0f5ebh, 0cdf4h, 0b9edh, 0d79ch, 01db8h; 3799.word05d7fh, 065f1h, 027c5h, 0cc17h, 0902ch, 09dfah, 0e820h, 0349ch; 3807.word056feh, 03ed8h, 004ach, 0dd1ch, 0da65h, 0eee0h, 0fe1ah, 0f619h; 3815.word0e942h, 0f28h, 01b5eh, 048a4h, 04f6dh, 01dc4h, 0ccdfh, 09705h; 3823.word0a550h, 0ec2eh, 03b66h, 06566h, 047f9h, 0fa46h, 6bb65h, 0adb b0h; 3831.word0d49dh, 008a6h, 020b6h, 01b75h, 00c90h, 00f3fh, 02269h, 029abh; 3839.word00e26h, 0d520h, 0a8cah, 0b2f8h, 0f541h, 04487h, 06d82h, 04ec2h; 3847.word0f5b7h, 0a586h, 09381h, 0c2deh, 010b4h, 0434dh, 0412ch, 01d76h; 3855.word0fa3ch, 0f2ech, 0fde5h, 0ff7ah, 0eb54h, 0cfedh, 0d157h, 0fed8h; 3863.word0418dh, 0668ah, 04870h, 0f4d8h, 0a1fch, 08d96h, 0c2fah, 0168dh; 3871.word054fah, 058d6h, 01f81h, 0df99h, 0c497h, 0d22eh, 0f5d3h, 0086ah; 3879.word002e8h, 0fc5ch, 009aeh, 02d34h, 04585h, 032c6h, 0f182h, 0ac73h; 3887.word09a70h, 0ca2ch, 01cb9h, 05e29h, 062e4h, 02135h, 0cc02h, 09f7eh; 3995.word0b1b8h, 0ef58h, 02549h, 03381h, 02078h, 00addh, 00a76h, 015c4h; 3903.word013d9h, 0f1f5h, 0c443h, 0b3a4h, 0d925h, 02494h, 06397h, 066cbh; 3911.word0221ah, 0c344h, 08dcch, 0a37ch, 0ed97h, 035e7h, 05312h, 037dch; 3919.word0022dh, 0e161h, 0e302h, 0f577h, 0fb85h, 0ecfch, 0e032h, 0f0afh; 3927.word0218bh, 05141h, 053ech, 019b0h, 0c4f7h, 09259h, 0a6e7h, 0f24dh; 3935.word04078h, 06488h, 0423ch, 0f685h, 0bdd1h, 0b5f4h, 0ddb9h, 00a15h; 3943.word019dbh, 0126dh, 00849h, 013f9h, 02b68h, 0300ch, 00d46h, 0ce46h; 3951.word0a277h, 0b413h, 0fa8h, 04827h, 06dadh, 046c7h, 0ece8h, 0a3e9h ; 3959.word0959fh, 0ca2bh, 0154dh, 0403eh, 03b31h, 01790h, 0fd16h, 0fc18h; 3967.word005c8h, 000afh, 0e2dbh, 0c5f3h, 0cc17h, 001ddh, 04877h, 06a7ch; 3975.word04592h, 0ed27h, 09d4ah, 08ecbh, 0c907h, 01d0fh, 054adh, 05248h; 3983.word01b18h, 0e116h, 0cc8ch, 0dbdeh, 0f949h, 0032dh, 0f99ch, 0f5aah; 3991.word00b5fh, 034f5h, 04b4ch, 03212h, 0ec27h, 0ab52h, 0a8d7h, 0e647h; 3999.word01ad9h, 01532h, 00973h, 011d7h, 00c3eh, 0087ch, 009bah, 000ach; 4007.word0014ch, 0ffd2h, 0fe6bh, 0feffh, 0f722h, 0f4e9h, 0f2ach, 0f82ah; 4004__Dtmf8Start:.word0ffd6h; 4012__ Dtmf7End:.word00218h, 008b2h, 009d9h, 0f8e9h, 0edceh, 00641h, 01d9bh; 4013.word005ebh, 0ce7fh, 0a805h, 0c6c9h, 01dc9h, 06860h, 0722eh, 02c1dh; 4031.word0d298h ; 0abach, 0c816h, 0ff1ch, 01617h, 00b8eh, 00227h, 019bch; 4039.word03e03h, 03aa4h, 0fdc3h, 0ac0fh, 08e19h, 0c585h, 0208eh, 05bcbh; 4047.word04ea0h, 004deh, 0c808h, 0c42eh, 0e459h, 0ff8fh, 0f723h, 0e775h; 4055.word0f33h, 0365ah, 063fah, 04c91h, 0f5b0h, 0a16eh, 09301h, 0d577h; 4063.word02ad2h, 052fbh, 03b18h, 0031fh, 0e55ch, 0f262h, 000d9h, 0f1f0h; 4071.word0ce21h, 0c695h, 0fbb8h, 04a4ch, 071f3h, 046b4h, 0e435h, 09692h; 4079.word09abeh, 0e267h, 02845h, 03bb0h, 01f43h, 0037dh, 00816h, 0198ch; 4087.word00dfdh, 0d97fh, 0aa68h, 0b6bfh, 0023ah, 05506h, 06fb0h, 03583h; 4095.word0d576h, 0a11ah, 0b6dch, 0f444h, 01d72h, 01ae6h, 008d6h, 01100h; 4103.word031c8h, 03e11h, 01415h, 0c54ch, 0955ah, 0b61bh, 00d80h, 056d2h; 4111.word05eceh, 01fffh, 0d586h, 0bd9ah, 0d910h, 0fd7bh, 000c3h, 0ef47h; 4119.word0f470h, 020fch, 055f5h, 05473h, 00cbah, 0b177h, 08c24h, 0bc18h; 4127.word03c1h, 04f0ah, 047c2h, 00fefh, 0e38ah, 0e49ch, 0f99dh, 0f9d1h; 4135.word0dcc5h, 0c8bch, 0eae0h, 035d0h, 06e72h, 059abh, 00038h, 0a76fh; 4143.word0916bh, 0cc72h, 01b6fh, 04028h, 02d7eh, 007dfh, 0fe2ch, 00ed3h; 4151.word01147h, 0eb72h, 0b86fh, 0b10dh, 0ec55h, 042b5h, 07071h, 04abdh; 4159.word0ec34h , 0a530h, 0a780h, 0e1a7h, 01997h, 0244ah, 01114h, 00a86h; 4167.word02315h, 03998h, 0217eh, 0db89h, 09d78h, 0a776h, 0f495h, 04754h; 4175.word066edh, 037d4h, 0e3d5h, 0b7c5h, 0c964h, 0f36eh, 007dfh, 0fa99h; 4183.word0f36bh, 011d0h, 045d2h, 058f8h, 02419h, 0c820h, 08defh, 0a85dh; 4191.word0fe9h, 046b3h, 054dch, 021c2h, 0e816h, 0da5dh, 0eeedh, 0fd56h; 4199.word0eb4eh, 0d165h, 0e014h, 01f69h, 062e0h, 06615h, 019bdh, 0b9ah; 4207.word08d1eh, 0b483h, 007dbh, 03eddh, 03aedh, 01299h, 0fa1ch, 0043bh; 4215.word01005h, 0f9f7h, 0c8aeh, 0b015h, 0d92bh, 02db7h, 06d79h, 06058h; 4223.word008e3h, 0b188h, 09c4dh, 0cc19h, 0103ah, 02ab4h, 01b45h, 009d8h; 4231.word014c3h, 02f79h, 02893h, 0f00fh, 0abb1h, 09e54h, 0dd37h, 034dah; 4239.word067e2h, 04af1h, 0f7b3h, 0bab9h, 0baeeh, 0e64eh, 009ech, 00779h; 4247.word0f935h, 0073ah, 034beh, 05485h, 035cdh, 0e241h, 099deh, 09c26h; 4255.word0e625h, 037f7h, 05a6bh, 035c4h, 0f145h, 0d264h, 0e14ah, 0f8fdh; 4263.word0f6a8h, 0dbech, 0da9eh, 00bc4h, 05211h, 06d3ah, 034b0h, 0d11ch; 4271.word08ff7h, 0a216h, 0f0e5h, 036a4h, 04452h, 01f2dh, 0f9d4h, 0f829h; 4279.word008ech, 002c2h, 0da9ah, 0b75ah, 0cb10h, 015b1h, 060e5h, 06caah; 4287.word025b4h, 0c44ah, 0963bh, 0b789h, 0ff28h, 02c76h, 02760h, 00e40h; 4295.word00ba5h, 022c6h, 02a22h, 00118h, 0bd73h, 09c7ch, 0c745h, 01fdbh; 4303.word062f5h, 05eb7h, 01236h, 0c276h, 0af11h, 0d447h, 00420h, 010d0h; 4311.word0015ch, 0012bh, 023eeh, 04b01h, 040d7h, 0fab1h, 0a9f5h, 093a6h; 4319.word0cfbdh, 027abh, 05aaah, 048e0h, 0028fh, 0d041h, 0d38bh, 0ef4ch; 4327.word0cfbh, 0e8e8h, 0dbe4h, 0fbe3h, 03c99h, 067eah, 047a6h, 0ec7ah; 4335.word09ad9h, 093eah, 0da45h, 02ad2h, 04be2h, 030d0h, 0ffc0h, 0ef0ch; 4343.word0feach, 0056eh, 0e9c9h, 0c0c1h, 0c137h, 00079h, 05270h, 0735ah; 4351.word0409fh, 0dd75h, 09813h, 0a526h, 0ec50h, 028d4h, 0320ch, 0179bh; 4359.word006f3h, 015d4h, 02602h, 00e52h, 0d080h, 0a08fh, 0b5f4h, 007e5h; 4367.word05854h, 06b3dh, 02c50h, 0d20bh, 0a8b7h, 0c35ah, 0f966h, 015a9h; 4375.word00bf1h, 0014ah, 0165eh, 03e22h, 0469dh, 010ach, 0bce6h, 091d7h; 4383.word0ba21h, 0111fh, 055f8h, 05733h, 015e7h, 0d6b5h, 0c92bh, 0e36ch; 4391.word0fd86h, 0f582h, 0e26bh, 0f17ch, 02924h, 060bfh, 057d7h, 0076ah; 4399.word0aad2h, 08c8fh, 0c307h, 0180dh, 04af3h, 03e43h, 00aaeh, 0ea2h; 4407.word0f1c6h, 0024eh, 0f62ch, 0cf8eh, 0c009h, 0ec54h, 03d67h, 0728ah; 4415.word055fbh, 0f74bh, 0a146h, 096e4h, 0d4dah, 01dbah, 038f6h, 0238bh; 4423.word007d5h, 009f4h, 01d75h, 016a2h, 0e4fch, 0abeeh,m 0ab65h, 0f13fh; 4431.word04786h, 06ec0h, 043c3h, 0e792h, 0a84dh, 0b128h, 0e9d5h, 01735h; 4439.word01834h, 00787h, 00d6ch, 02f71h, 044dbh, 0218bh, 0d2c1h, 096c8h; 4447.word0a821h, 0f9b8h, 048b6h, 060a9h, 02f5ch, 0e2e6h, 0c127h, 0d5fdh; 4455.word0f76bh, 0fe9dh, 0ed53h, 0ec 9eh, 016e3h, 05054h, 05d88h, 0203eh; 4463.word0c013h, 08c41h, 0ae65h, 00272h, 04498h, 04b91h, 01abfh, 0eb71h; 4471.word0e697h, 0f9cdh, 0fd47h, 0dfedh, 0c59fh, 0ddf8h, 026e4h, 06a9bh; 4479.word06731h, 013fah, 0b35bh, 08ff4h, 0bd7eh, 00ce4h, 03b20h, 03083h; 4487.word00d3ch, 00183h, 011cah, 01824h, 0f614h, 0bd14h, 0a8afh, 0dc99h; 4495.word032adh, 06bdeh, 0594eh, 00b1h, 0b0c2h, 0a56eh, 0d664h, 01087h; 4503.word020eh, 01044h, 00886h, 02035h, 03d14h , 02db0h, 0ea5fh, 0a30fh; 4511.word09cdh, 0e2deh, 03910h, 0650ch, 043f4h, 0f36bh, 0bf8ch, 0c767h; 4519.word0ed84h, 00421h, 0f8aeh, 0ee0bh, 007eeh, 03e90h, 05d2dh, 03452h; 4527.word0da2fh, 09451h, 09each, 0ec3ah, 0394fh, 0538dh, 02c02h, 0f19eh; 4535.word0dd99h, 0eeb0h, 0fdcdh, 0ecd9h, 0ce65h, 0d49ah, 0109bh, 05ac7h; 4543.word06f6dh, 02f54h, 0c984h, 08f16h, 0a962h, 0f7fch, 03635h, 03c0ah; 4551.word018f0h, 0fdceh, 00527h, 01491h, 001e7h, 0cf59h, 0aca2h, 0c9aeh; 4559.word01b55h, 06480h, 067dch, 01ab8h, 0bf89h, 09c05h, 0c218h, 00519h; 4567.word025fch, 01c35h, 00a23h, 013ffh, 03194h, 032b3h, 0fef0h, 0b659h; 4575.word0a2fbh, 0dde6hm 01f1bh, 02394h, 00dfeh, 00e40h, 009b5h, 00520h;4572.word00ba8h, 00480h;4580__Dtmf9Start:.word0feb6h; 4582__Dtmf8End:.word0f855h, 0eb84h, 0ed67h, 01d9eh, 05161h;4580.word02f6ch, 0e3a9h, 0d160h, 0e1c0h, 0eb5ch, 0d883h, 0bf55h, 0e811h; 4599.word03a7dh, 072c3h, 05796h, 0f688h, 0b08ch, 0b5feh, 0ee21h, 01159h; 4607.word00894h, 000ddh, 01f28h, 04cc3h, 0413fh, 0f0fbh, 09d7bh, 09728h; 4615.word0e407h, 03284h, 04297h, 01cfdh, 0fca0h, 006a2h, 01398h, 0f328h; 4623.word0b925h, 0a985h, 0e8c2h, 04162h, 0681ch, 039dch, 0e70dh, 0c602h; 4631.word0de11h, 0f786h, 0ed44h, 0d8c4h, 0f539h , 03f49h, 0703dh, 0498ah; 4639.word0e471h, 09d18h, 0abd2h, 0f1e1h, 01ec0h, 01617h, 0067eh, 01974h; 4647.word03c6h, 03063h, 0e56bh, 09b66h, 09e60h, 0ee23h, 03b6ch, 04a16h; 4655.word01c7bh, 0f26eh, 0f9f7h, 00958h, 0f30bh, 0c3eah, 0ba56h, 0fa2fh; 4663.word04ea8h, 06e97h, 036f6h, 0dc8fh, 0b917h, 0d5d6h, 0f9f0h, 0f8c3h; 4671.word0e6b2h, 0fecah, 0401ch, 067cah 03b32h, 0d5cbh, 0936dh, 0aa9ah; 4679.word0f805h, 02a3fh, 02186h , 009a5h, 012e0h, 02e80h, 022c5h, 0dd7fh; 4687.word09b8eh, 0a7a4h, 0fae9h, 475fh, 0519ah, 01abch, 0e748h, 0ead6h; 4695.word0fedch, 0f231h, 0cc7eh, 0c704h, 00644h, 057cfh, 070ach, 030c9h; 4703.word0d1bbh, 0ae24h, 0d105h, 0fe3ah, 003e8h, 0f424h , 0043dh, 03bc3h; 4711.word05c48h, 02d92h, 0cc33h, 09073h, 0b060h, 023fh, 0342bh, 02a02h; 4179.word008d4h, 0071eh, 0209fh, 01651h, 0d9bfh, 0a17bh, 0b2feh, 00820h; 4727.word052ddh, 058ffh, 0175bh, 0dbc7h, 0dd69h, 0f64ch, 0f48dh, 0d64eh; 4735.word0d33ah, 0103bh, 05d26h, 06eb5h, 026d3h, 0c4dah, 0a297h, 0b22h; 4743.word0047ah, 0ff16h, 00886h, 035beh, 04fb4h , 01fddh, 0c1cah; 4751.word08e04h, 0b4a7h, 00adch, 03f88h, 031c3h, 006fch, 0fd4fh, 012b7h; 4759word00c33h, 0d8d9h, 0aa02h, 0c235h, 017e8h, 05dedh, 05b59h, 0125bh; 4767.word0d0eeh, 0d0ddh, 0efedh,m 0f80dh, 0e0cfh, 0dec9h, 017ceh, 0603fh; 4775.word06a64h, 01ad1h, 0b94bh, 09ac9h, 0cb20h, 00b70h, 01be2h, 00912h;

4783.word00886h, 02b8eh, 0409dh, 01242h, 0baceh, 08f7eh, 0bea3h, 01622h; 4791.word049a8h, 03789h, 0037eh, 0f1c9h , 00435h, 00517h, 0db9eh, 0b5d1h; 4799.word0d13ch, 024eeh, 069a3h, 05e57h, 00b15h, 0c415h, 0c4a9h, 0ebd5h; 4807.word0fdf8h, 0ee06h, 0eaceh, 01c1dh, 05c21h, 05e7ch, 00cf5h, 0ac95h; 4815.word0935eh, 0cd59h, 01679h, 02a20h, 01225h, 007b2h, 0215eh, 0315ch; 4823.word00564h, 0b71ah, 095b4h, 0cbddh, 024c3h, 0555ah, 03ceeh, 0fc89h; 4831.word0e2f2h, 0f771h, 0fe5dh, 0e08ch, 0c1dh, 0dddeh, 02efah, 06d66h; 4839.word05b01h, 0008bh, 0b87fh, 0bad7h, 0e9d1h , 006cbh, 0fa89h, 0f537h; 4847.word01dc7h, 054a6h, 05208h, 0fff8h, 0a3f0h, 091ffh, 0d3f7h, 020a7h; 4855.word033bdh, 0189eh, 00474h, 014f2h, 024d7h, 0fe69h, 0b9dch, 09f20h; 4863.word0d7e6h, 03107h, 05d63h, 03ca9h, 0f51ah, 0d70ch, 0eb26h, 0fa9dh; 4871.word0e623h, 0cc42h, 0e9ebh, 0387bh, 0707dh, 054f1h, 0f609h, 0ab11h; 4879.word0b0efh, 0ea76h, 00f87h, 00724h, 0fd33h , 01c87h, 04ab7h, 04305h; 4887.word0f34ah, 09e64h, 0957ch, 0dd15h, 02ae3h, 03df3h , 01b48h, 0fcadh; 4895.word00820h, 016dah, 0f83bh, 0bd50h, 0aa43h, 0e6f5h, 03f6bh, 0685ah; 4903.word03d32h, 0eb8ch, 0c964h, 0df17h, 0f91fh, 0ef06h, 0d839h, 0f3f1h; 4911.word03d76h, 0718ah, 04e9ch, 0e877h, 09d5ch, 0a98ah, 0eea3h, 01a88h; 4919.word01312h, 00430h, 01709h, 03cc1h, 03397h, 0e8edh, 09c2ah, 09acbh; 4927.word0e8c2h, 03751h, 048e3h, 01e4bh, 0f519h, 0fa7dh, 00b25h, 0f535h; 4935.word0c3f4h, 0b868h, 0f638h, 04bb6h, 06e4eh, 03a6ah, 0e194h, 0bcbah; 4943word0d74fh, 0f986h, 0f775h, 0e4c2h, 0bfbeh, 03d5ah, 067d1h , 04011h; 4951.word0dc8fh, 0952ah, 0a852h, 0f573h, 02717h, 01fb9h, 008d5h, 011adh; 4959.word02f7fh, 025c2h, 0e086h, 09b0bh, 0a28ch, 0f54eh, 04349h, 0513bh; 4967.word01df4h, 0eaf2h, 0ed36h, 00120h, 0f443h, 0ccadh, 0c4efh, 002d1h; 4975.word055c1h, 0717fh, 033efh, 0d4d8h, 0af48h , 0cedeh, 0fc83h, 00346h; 4983.word0f240h, 00407h, 03c19h, 05f43h, 03231h, 0ce3fh, 08fadh, 0aaf5h; 4991.word0fc71h, 03155h, 027f6h, 00a21h, 0091eh, 0211fh, 0193eh, 0dbabh; 4999.word0a200h, 0aff8h, 00342h, 050e4h, 057f1h, 019e2h, 0dfaah, 0dec8h; 5007.word0f7aeh, 0f521h, 0d487h, 0d000h, 00cc4h, 05b64h, 06f2ch, 02b80h; 5015.word0caafh, 0a4c6h, 0cbech, 002e0h, 00fd1h, 0fe6dh, 0070eh, 034a6h; 5023.word0502ah, 0236ch, 0c54eh, 08e2ah, 0b0cch, 006d3h, 03d7bh, 0311fh; 5031.word0081dh, 0fe56h, 013ach, 00e7bh, 0db45h, 0aa52h, 0be2ah, 0125eh; 5039.word05b71h, 05c16h, 013fah, 0d3e3h, 0d244h, 0eebfh, 0f82eh, 0e013h; 5047.word0db85h, 013bdh, 05e06h, 06c9ah, 02026h, 0bdf5h, 09aceh, 0c998h; 5055.word009f4h, 01a39h, 008dah, 0085eh, 02ccah, 043cch, 01599h, 0bd57h; 5063.word08deah, 0ba03h, 01407h, 048aah, 037cah, 005b2h, 0f354h, 0071dh; 5071.word0076fh, 0dce2h, 0b3d6h, 0cc42h, 020cfh, 0651fh, 05e6dh, 00f87h; 5079.word0c7e5h, 0c5a6h, 0ebddh, 0fda3h , 0ebfbh, 0e868h, 0194fh, 05bf2h; 5087.word06244h, 012ceh, 0b102h, 09329h, 0ca81h, 012c0h, 02743h, 0110ch; 5095.word007f4h, 0214dh, 03377h, 009c4h, 0b9dbh, 094cdh, 0c689h, 01ef0h ; 5103.word05217h, 03c18h, 0feaeh, 0e653h, 0f925h, 00073h, 0e160h, 0c071h; 5111.word0db62h, 02b72h, 06b47h, 05d99h, 0066ah, 0bb10h, 0baebh, 0e8f9h; 5119.word00490h, 0f8a7h, 0f335h, 01c10h, 05503h, 05511h, 004a1h, 0a755h; 5127.word092b8h, 0d1aah, 01c91h, 0329ah, 018aah, 00361h, 0151fh, 0251ah; 5135.word0ff45h, 0b9f4h, 09cb3h, 0d314h, 02dddh, 05e09h, 0406ah, 0f8e4h; 5143.word0d829h, 0ec18h, 0fc90h, 0ee4ah, 0e1a8h, 00262h, 0084fh, 01492h;5140.word0182dh, 0fc70h, 0d299h, 0eadfh_Dtmf0Start:.word0fef9h; 5153__Dtmf9End:.word0f7d1h, 0e98h;5154.word0fad1h, 033e9h, 06438h, 05688h, 005e7h, 0b10eh, 0a030h, 0dd55h;5156.word031b4h, 05a8ch, 035d0h, 0e3f6h, 0b2f9h, 0c124h, 0eff2h, 00f9ah; 5175.word00b6ah, 002d2h, 011a4h, 02e53h, 02f42h, 0bfbeh, 0b490h, 09af7h; 5183.word0d31ah, 0313eh, 06cdbh, 052a9h, 0f32bh, 0a265h, 09fd9h, 0e4a9h; 5191.word02cbfh, 04347h, 02963h, 0086eh, 00341h, 00ca9h, 00152h, 0dadch; 5199.word0be53h, 0d9aah, 0276eh, 06867h, 05d07h, 003efh, 0a4f0h, 08d96h; 5207.word0cc34h, 02686h, 055b1h, 03d32h, 0fa4bh, 0cf70h, 0d64eh, 0f089h; 5215.word0fbd6h, 0f0abh, 0f1d0h, 01709h, 04712h, 04d70h, 00f1eh, 0b903h; 5223.word093b7h, 0c311h, 0223bh, 06549h, 057b3h, 0035ch, 0b423h, 0a9c2h; 5231.word0db28h, 014f5h, 026b3h, 01715h, 00e35h, 01aa3h, 0275ah, 00ddah; 5239.word0d27fh, 0a862h, 0c1f4h, 01724h, 06371h, 06728h, 0152dh, 0b253h; 5247.word09010h, 0c2f2h, 01853h, 048abh, 03b5ah, 00b68h, 0ed54h, 0f34dh; 5255.word0fc95h, 0ef0ch, 0d475h, 0d746h, 00d0h, 5139h, 0629bh, 02472h; 5263.word0c14dh, 08cb7h, 0b3feh, 00f83h, 0572eh, 057a3h, 011f0h, 0cb91h; 5271.word0bed9h, 0df46h, 0031eh, 00958h, 00029h, 00b49h, 02d33h, 043b6h; 5279.word0235ah, 0d68ch, 09c1ch, 0af2ch, 00474h, 05893h, 06ae1h, 02368h; 5287.word0c1ebh, 09831h, 0bc5dh, 0065dh, 03525h, 02e2bh, 01144h, 00775h; 5295.word01165h, 00f71h, 0ea97h, 0bc06h, 0ba31h, 0fa9dh, 050fbh, 071b1h; 5303.word0386fh, 0cf9bh, 08db5h, 0a6e4h, 0fcbfh, 04577h, 04f59h, 01d57h; 5311.word0e60eh, 0da2fh, 0ed3ah, 0f9b0h, 0ee06h, 0e302h, 0fe40h, 03787h; 5319.word05b3eh, 03a17h, 0e1edh, 09877h, 09eaah, 0f029h, 04878h, 0655ch; 5327.word02ff8h, 0d8c4h, 0aeb4h, 0c623h, 0fba5h, 01b1eh, 015a6h, 00bf5h; 5335.word0176bh, 02eafh, 02813h, 0f0e2h, 0afb7h, 0a4d7h, 0e761h, 042b8h; 5343.word070a7h, 04460h, 0dd00h, 09591h, 0a26ch, 0edfah, 0349ch, 041efh; 5351.word02035h, 0fd19h, 0f8d0h, 00353h, 0f917h, 0d839h, 0c4f6h, 0e7a2h; 5359.word03383h, 069b6h, 05043h, 0f211h, 09b19h, 0944bh, 0df9bh, 037b6h; 5367.word05d74h, 03720h, 0ee69h, 0c95dh, 0d5adh, 0f5eeh, 0030fh, 0f8bah; 5375.word0fc0eh, 01e44h, 04634h, 04224h, 00027h, 0aef7h, 09731h, 0d563h; 5383.word03367h, 06a06h, 04e7bh, 0ef81h, 0a648h, 0a8efh, 0e3edh, 01fb9h; 5391.word02c27h, 0185ah, 00bdah, 015afh, 01ea4h, 002c3h, 0cbc2h, 0ac55h; 5399.word0d0dah, 02771h, 06adbh, 05d53h, 001e8h, 0a39dh, 09010h, 0d0d3h; 5407.word02704h, 04fcfh, 0377fh, 0017ch, 0e58ah, 0ee03h, 0fa01h, 0ef3ah; 5415.word0d9cbh, 0e2edh, 01a0fh, 056e1h, 05b52h, 01258h, 0b258h, 08c6bh; 5423.word0c256h, 02137h, 05f6fh, 05163h, 0017eh, 0bf2bh, 0bb9eh, 0e2cdh; 5431.word00b1dh, 01040h, 005e6h, 01049h, 02e6bh, 03ccah, 0153fh, 0c97ah; 5439.word09c3eh, 0bce8h, 016c6h, 06439h, 065cch, 011beh, 0b170h, 092edh; 5447.word0c61dh, 014d6h, 03cd0h, 02dcch, 00d49h, 001a4h, 00a74h, 0071ah; 5455.word0e400h, 0bedbh, 0c7cfh, 00c13h, 059e0h, 06b82h, 025cfh, 0bdd5h; 5463.word08bd6h, 0b2cfh, 00c0ah, 04e81h, 04bfeh, 0106eh, 0db29h, 0d4b6h; 5471.word0ec17h, 0fd27h, 0f366h, 0ec44h, 008b4h, 03c62h, 05676h, 02affh; 5479.word0d331h, 094bah, 0aa3ah, 00419h, 057b6h, 06702h, 020e5h, 0c6e2h; 5487.word0a5a3h, 0c847h, 004b4h, 0225bh, 01973h, 00d3fh, 015e8h, 02817h;

5495.word01b91h, 0e51eh, 0aebdh, 0b0ech, 0f9edh, 051d5h, 07178h, 03481h; 5503.word0cb64h, 08f1bh, 0aaabh, 0fcech, 03df2h, 04401h, 01988h, 0f458h; 5511.word0f342h, 0fdf3h, 0f64fh, 0d910h, 0cd89h, 0f713h, 03fach, 06807h; 5519.word04024h, 0df26h, 09489h, 09ef6h, 0f252h, 04598h, 05e07h, 02b26h; 5527.word0dfabh, 0c0aah, 0d556h, 0fab6h, 0087dh, 0fe83h, 00308h, 02313h; 5535.word04401h, 035c1h, 0efa0h, 0a6b0h, 09eabh, 0e6d4h, 04338h, 06e19h; 5543.word04061h, 0ddadh, 09d6ah, 0ac99h, 0f020h, 02a15h, 03141h, 017d9h; 5551.word0086ah, 0109bh, 01588h, 0f8f5h, 0c71ch, 0b2c0h, 0e1dah, 037dbh; 5559.word07031h, 05308h, 0efa2h, 099b5h, 09639h, 0dfadh, 032cdh, 05254h; 5567.word02f03h, 0f382h, 0db42h, 0e834h, 0f839h, 0f17fh, 0e0d5h, 0efcfh; 5575.word024d8h, 057c8h, 057c8h, 04each, 0ff39h, 0a84dh, 092b0h, 0d41ah, 031e6h; 5583.word06404h, 04878h, 0f382h, 0b535h, 0bb5bh, 0ea9eh, 01323h, 0169ah; 5591.word00a68h, 01204h, 02b8eh, 03216h, 0063dh, 0bfd9h, 09e27h, 0cb55h; 5599.word0278fh, 06a80h, 05b12h, 00035h, 0a616h, 0968ah, 0d4f0h, 0221fh; 5607.word0421fh, 02bbch, 0069bh, 0fac6h, 003deh, 0007ah, 0e0c2h, 0c322h; 5615.word0d4a2h, 01aa3h, 060a5h, 061f1h, 01197h, 0afb9h, 08bb9h, 0c246h; 5623.word0203ch, 05819h, 04766h, 00442h, 0d05ah, 0d0e9h, 0ed79h, 00088h; 5631.word0f8c5h, 0f48ah, 01147h, 03f20h, 04de4h, 019f7h, 0c3b1h, 09423h; 5639.word0ba2dh, 015b0h, 05f72h, 06006h, 00f68h, 0b9f2h, 0a43ch, 0d0cdh; 5647.word00fffh, 029cfh, 01d1eh, 00d0ah, 013c4h, 02213h, 0110fh, 0dbcbh; 5655.word0acd6h, 0bbb4h, 00a1eh, 05d4dh, 06c80h, 0241ah, 0be07h, 08ca2h; 5663.word0b668h, 00cbch, 046eeh, 0423ch, 010edh, 0ec68h, 0ec00h, 0f996h; 5671.word0f442h, 0db84h, 0d83h, 00511h, 04894h, 063e1h, 03030h, 0ce46h; 5679.word08f40h, 0aa1ch, 002e1h, 05269h, 05e8ah, 01dbah, 0d0aeh, 0b9dfh; 5687.word0d711h, 00102h, 00f07h, 0054bh, 008a6h, 0253ch, 03e69h, 027d1h; 5695.word0e192h, 0a2b3h, 0a887h, 0f778h, 051e4h, 06fa2h, 03072h, 0cb28h; 5703.word095ach, 0b282h, 0fe4fh, 03364h, 0335ch, 0151eh, 0ff1fh, 0ff4bh; 5711.word0fed8h, 0f786h, 0f5f6h, 0fbd2h, 00f77h, 02373h, 013d4h, 0dfb1h; 5719.word0b542h, 0bb92h, 0fb68h, 04cb5h, 06f37h, 04600h, 0e6e8h, 09844h; 5727.word0966fh, 0de84h, 037d7h, 06924h, 04e8ah, 0f8a9h, 0b246h, 0a54dh; 5735.word0d3f7h, 01923h, 03d90h, 0363ch, 01425h, 0f9d2h, 0f666h, 0fa90h; 5743.word0f5e5h, 0e3fah, 0dacdh, 0f090h, 020a0h, 04815h, 04016h, 001a9h; 5751.word0b4fch, 09539h, 0c044h, 01874h, 06165h, 069feh, 02278h, 0c043h; 5759.word08dddh, 0a9afh, 0fbd1h, 047c0h, 05d78h, 034deh, 0f405h, 0cc9dh; 5767.word0d169h, 0f39ah, 00fbeh, 013f9h, 00c3bh, 00c92h, 01ab2h, 02306h; 5575.word00fceh, 0e126h, 0b6bch, 0baf1h, 0f523h, 04160h, 0672eh, 0429ah; 5783.word8e86eh, 099fbh, 090c1h, 0d25ch, 02b1eh, 06445h, 0547eh, 0033bh;5780.word0b57ah, 09f24h, 0ca9bh, 0133ah, 0400eh, 03e9bh, 01d33h_DtmfStarStart:.word0fe38h;5795_Dtmf0End:.ifSaveRomSpace.word0.else.word0 f6a4h, 0faf8h, 0facdh, 0eb93h, 0df4bh, 0ee96h, 01a1eh, 04351h;5796.word04168h, 00bc0h, 0c053h, 097ddh, 0b844h, 00ac9h, 058b7h, 06c34h;5804.word02eafh, 0cbbdh, 08dc4h, 0a0a9h, 0efc5h, 0efc5h, 03ed8h, 05f16h, 03cfbh; 5823.word0f904h, 0ccdch, 0cc2dh, 0ed4dh, 00df8h, 01650h, 00f98h, 00c04h; 5831.word0179eh, 021b3h, 012fbh, 0e894h, 0bc8dh, 0b84eh, 0ead0h, 038c7h; 5839.word06702h, 04d48h, 0f774h, 0a165h, 08ce9h, 0c6b2h, 01fcdh, 060b2h; 5847.word05b85h, 01026h, 0bdf7h, 09da7h, 0c1ffh, 00953h, 03d36h, 042c2h; 5855.word0232ch, 00125h, 0f38bh, 0f8c9h, 0fba2h, 0ef6bh, 0e2e0h, 0ebc3h; 5863.word012b7h, 03da2h, 044edh, 0158ah, 0c9d8h, 09a4fh, 0af36h, 0fe21h; 5871.word0512ah, 06e54h, 039f9h, 0d77dh, 09221h, 0990ch, 0e21eh, 0379ah; 5879.word05f04h, 04511h, 00217h, 0ce60h, 0c89ch, 0e72eh, 00c16h, 018bah; 5887.word01277h, 00c6fh, 01401h, 01f8ch, 015bbh, 0f021h, 0c344h, 0b7feh; 5895.word0e265h, 02ca2h, 0612fh, 05251h, 00318h, 0ab33h, 08ae1h, 0bad4h; 5903.word01549h, 05bd3h, 06154h, 01db9h, 0c738h, 09db5h, 0b7a2h, 0ff10h; 5911.word03acdh, 04758h, 0294fh, 00244h, 0f161h, 0f52ch, 0fb16h, 0f31dh; 5919.word0e5d1h, 0ea60h, 00bffh, 037a0h, 044f9h , 01d50h, 0d48ah, 09ea6h; 5927.word0aa21h, 0f290h, 045c5h, 06e4eh, 04435h, 0e3ach, 097ah, 0936fh; 5935.word0d7b4h, 02c74h, 05d21h, 04d7fh, 00912h, 0d141h, 0c483h, 0e08ah; 5943.word00a23h, 01afch, 016f8h, 00d88h, 0115eh, 01caeh, 016cdh, 0f753h; 5951.word0caa2h, 0b8e2h, 0db16h, 02322h, 05d9ch, 05769h, 00e65h, 0b5aah; 5959.word08c0fh, 0b1f1h, 00987h, 055f0h, 06783h, 0294fh, 0cecfh, 09e08h; 5967.word0afa9h, 0f447h, 0352fh, 04939h, 02f01h, 00641h, 0f044h, 0f165h; 5975.word0fa7dh, 0f67eh, 0ea1fh, 0ea5eh, 0068dh, 0311dh, 0442fh, 02576h; 5983.word0df37h, 0a39fh, 0a598h, 0e820h, 03bf0h, 06bfch, 04de6h, 0f14dh; 5991.word09f63h, 090f6h, 0cc89h, 02253h, 05c38h, 05517h, 012bbh, 0d43ah; 5999.word0bfeeh, 0d901h, 0043eh, 01b88h, 01aa1h, 00f10h, 00e9ah, 0199fh; 6007.word0176ch, 0fc5eh, 0d0d4h, 0b960h, 0d4c4h, 0197dh, 0582fh, 05cffh; 6015.word01bf1h, 0c07dh, 08d1eh, 0a7d0h, 0fcc0h, 04f75h, 06bd3h, 03538h; 6023.word0d952h, 09e54h, 0a686h, 0ea56h, 030fbh, 04bcfh, 0361eh, 00aa0h; 6031.word0eebbh, 0ee18h, 0f803h, 0f848h, 0ecceh, 0e9edh, 001bbh, 02a57h; 6039.word04219h, 02a9ah, 0e921h, 0a90eh, 0a156h, 0ddd9h, 032b5h, 06aa6h; 6047.word05866h, 0ff9fh, 0a553h, 08ac0h, 0beaah, 01858h, 05737h, 059a2h; 6055.word01d86h, 0d9aah, 0bf34h, 0d140h, 0006ch, 01d7ch, 01e0ch, 0126ah; 6063.word00d07h, 016c3h, 0178bh, 00195h, 0d839h, 0bc92h, 0bc92h, 0cfc9h, 00e33h; 6071.word04ff2h, 05e57h, 026e6h, 0cbd0h, 08e93h, 0a0a4h, 0f16ah, 044bdh; 6079.word06b97h, 041d9h, 0e550h, 0a155h, 09fd4h, 0dfd2h, 02a21h, 04d09h; 6087.word03d21h, 01050h, 0efd6h, 0eaf3h, 0f5fah, 0fa3dh, 0f128h, 0ebb4h; 6095.word0fe0bh, 02499h, 03fc7h, 02fe9h, 0f354h, 0b188h, 09f9ch, 0d18fh; 6103.word026a1h, 0666eh, 05f64h, 00e5eh, 0af15h, 08a88h, 0b58fh, 00af7h; 6111.word052c6h, 05e98h, 02811h, 0e0b7h, 0bd1ah, 0cbb8h, 0f935h, 01cbdh; 6119.word021c0h, 01505h, 00cd7h, 0134bh, 016e4h, 00521h, 0deceh, 0bf88h; 6127.word0caf7h, 004fbh, 04905h, 060aeh, 03143h, 0d6aah, 092cdh, 0990dh; 6135.word0e422h, 03c29h, 06bb9h, 04d3fh, 0f217h, 0a69bh, 09c5eh, 0d34ch; 6143.word02088h, 04c07h, 0423ch, 01692h, 0f143h, 0e814h, 0f31bh, 0fb69h; 6151.word0f4a3h, 0edbdh, 0fb01h, 01e6eh, 03ca5h, 03396h, 0f1ah, 0b7c0h; 6159.word09d50h, 0c7c5h, 01cedh, 063ach, 0673bh, 01b7bh, 0b8c9h, 089dfh; 6167.word0a9c6h, 0ff55h, 04b49h, 0608ch, 03255h, 0e811h, 0bdf7h, 0c56ah; 6175.word0f324h, 01acbh, 0243eh, 0194fh, 00c4ah, 00fedh, 01472h, 007a5h; 6183.word0e58bh, 0c48eh, 0c921h, 0fabfh, 03f5fh, 06026h, 039bah, 0e2e4h; 6191.word099a9h, 09443h, 0d721h, 0307bh, 0678eh, 0532dh, 0fe35h, 0adc0h; 6199.word0989ah, 0cabah, 01a8fh, 04befh, 04913h, 01eaeh, 0f435h, 0e61ch; 6207.word0efebh, 0fb6eh, 0f826h, 0efebh, 0f848h, 01809h, 037d2h, 0360fh; 6215.word005b5h, 0c0adh, 09de9h, 0bfb4h, 010aah, 05abfh, 068e8h, 0296ah; 6223.word0c612h, 08aa3h, 0a183h, 0f291h, 0452eh; 6231.word0becih, 0c007h, 063b5h, 03b48h, 0f1c1h; 6231.word0becih, 0c007h, 0eb38h, 01845h, 0276dh, 01cbdh, 00e06h, 00d45h; 6239.word01348h, 00a6dh, 0ebd4h, 0c92fh, 0c6d3h, 0f319h, 03673h, 05df2h; 6247.word0437bh, 0f09eh, 0a06fh, 0914fh, 0cca3h, 025d9h, 065c4h, 05d68h; 6255.word00aebh, 0b312h, 09145h, 0bd5dh, 00ea4h, 047c6h, 04c11h, 024ebh; 6263.word0f654h, 0e3efh, 0ec33h, 0facch, 0fc4fh, 0f456h, 0f887h, 0133ah; 6271.word032d6h, 03556h, 00bd8h, 0d751h, 0cd66h, 0e4fbh, 0ef15h, 0f372h; 6279.word0fc01h, 00365h, 00a0bh, 011d9h, 008b0h, 0ebc3h, 0e302h, 0fc03h;6276.endif:SaveRomSpace_ DtmfPoundStart:.word00147h; 6284_ DtmfStarEnd:.ifSaveRomSpace.word0.else.word0dc49h, 0c066h, 0e181h, 0374bh, 074fah, 059cbh, 0fab1h;6284.word0b014h, 0b9a7h, 0f82dh, 023dbh, 01dcdh, 00989h, 012e4h, 027bfh;6292.word015a5h, 0d2cch, 09db6h, 0ba59h, 01538h, 05c50h, 0505fh, 0f9b4h; 6311.word0b1f0h, 0b80eh, 0e82dh, 0059fh, 000ddh, 0028bh, 02a97h, 050c3h; 6319.word0382ch, 0e1e7h, 09be4h, 0af41h, 008c3h, 052f3h, 051a1h, 01089h; 6327.word0d8f7h, 0dc66h, 0f377h, 0f1c5h, 0dee2h, 0ec62h, 02e65h, 066b0h; 6335.word05143h, 0ee61h, 09834h, 09e6bh, 0ee63h, 03707h, 03d4eh, 0123ch; 6343word0f39ah, 0fbc5h, 0005eh, 0dfc9h, 0bb07h, 0ce2eh, 02042h, 068b3h; 6351.word05d11h, 0fef0h, 0a50eh, 0a224h, 0e60bh, 02279h, 02a0dh, 0136ah; 6359.word012ceh, 0269ah, 01cedh, 0e173h, 0a67ah, 0b53bh, 00c1bh, 05d76h; 6367.word05f1fh, 00db2h, 0bb95h, 0b3ffh, 0e2a3h, 0086fh, 008a1h, 002e5h; 6375.word02151h, 04929h, 03d98h, 0ee89h, 09ee5h, 0a3c5h, 0f79ah, 048e2h; 6383.word0546ch, 01860h, 0d828h, 0d281h, 0ebc4h, 0f376h, 0e330h, 0e6fbh; 6391.word020e9h, 05ee5h, 05922h, 0ff0fh, 0a184h, 0981dh, 0e25ch, 03349h; 6399.word043ebh, 01bdeh, 0f5c2h, 0f768h, 00178h, 0e936h, 0c2a1h, 0c98bh; 6407.word012a9h, 0624ah, 06764h, 0100bh, 0ad25h, 09a32h, 0d8c8h, 01e20h; 6415.word02e8bh, 017e1h, 00ed0h, 02005h, 01fd5h, 0ece6h, 0ae91h, 0ae1ch; 6423.word0fc92h, 05463h, 06640h, 01e0eh, 0c2b7h, 0ad84h, 0d9cfh, 0070ah; 6431.word00debh, 004ffh, 01a49h, 042aeh, 041cfh, 0fba2h, 0a88fh, 09dcbh; 6439.word0e71fh, 040c6h, 05baeh, 02472h, 0dc54h, 0cb64h, 0e55bh, 0f4a7h; 6447.word0e8abh, 0e55fh, 014edh, 056dfh, 05de3h, 01033h, 0acb1h, 09329h; 6455.word0d570h, 02ad4h, 04881h, 0251fh, 0f6d3h, 0f1a7h, 0fee9h, 0ef2dh; 6463.word0c9e3h, 0c5b5h, 00619h, 058bfh, 06c43h, 0221eh, 0ba31h, 0694ah; 6471.word0cb9fh, 01845h, 0335ah, 01dc3h, 00ddch, 019a8h, 0205ch, 0f710h; 6479.word0b6f1h, 0aa7ch, 0ed7eh, 04885h, 06904h, 02b6dh, 0cc82h, 0a8c9h; 6487.word0cec2h, 002adh, 01178h, 00789h, 01442h, 03a5dh, 04417h, 008e6h; 6495.word0b2cch, 09967h, 0d9b2h, 03699h, 05dfch, 030dah, 0e273h, 0c62ch; 6503.word0df43h, 0f569h, 0ee88h, 0e629h, 00ba2h, 04d1fh, 06040h, 01ee5h; 6511.word0b9ch, 091a4h, 0c7ffh, 0205dh, 04a3fh, 02e4ch, 0fa5ch, 0ec6bh; 6519.word0fad8h, 0f3ceh, 0d160h, 0c358h, 0fa1bh, 050ah, 07101h, 03147h; 6527.word0c62bh, 094c8h, 0c076h, 00ec9h, 033f8h, 0237bh, 00bdbh, 011bdh; 6535.word01dddh, 0fe20h, 0c067h, 0a890h, 0e120h, 03f72h, 06ba6h, 039e9h; 6543.word0d856h, 0a691h, 0c47dh, 0fe36h, 0174bh, 00c58h, 01089h, 03237h; 6551.word042edh, 014c8h, 0befch, 09741h, 0cc0ah, 02bbeh, 05fbdh, 03e96h; 6559.word0ee70h, 0c389h, 0d786h, 0f50eh, 0f42eh, 0e912h, 00328h, 04168h; 6567.word060b1h, 02b3dh, 0c66eh, 08f55h, 0ba1fh, 016cdh, 04b42h, 04b42h, 0387bh; 6575.word000ffh, 0e7f0h, 0f5eeh, 0f688h, 0d8f4h, 0c417h, 0ee08h, 04385h; 6583.word07114h, 0409fh, 0d644h, 09414h, 0b276h, 004eah, 03576h, 02a48h; 6591.word00e4ah, 00cf4h, 01adah, 0057ch, 0ca89h, 0a916h, 0d5ceh, 031f5h; 6599.word06b66h, 048e0h, 0e695h, 0a667h, 0bac9h, 0f619h, 017a2h, 01123h; 6607.word00d25h, 02997h, 04113h, 01ee3h, 0cc15h, 096bah, 0beech, 01eaeh; 6615.word05e7ch, 0496dh, 0f7c6h, 0c28bh, 0cf00h, 0f08eh, 0f8d4h, 0ec2eh; 6623.word0fd2fh, 03787h, 05f00h, 0386fh, 0d622h, 09309h, 0af12h, 00917h; 6631.word049d5h, 0413dh, 0088ch, 0e543h, 0ef57h, 0f7fch, 0e0dh, 0c7e4h; 6639.word0e4f6h, 0363bh, 06fe5h, 04dadh, 0e4edh, 097fh, 0a951h, 0f76bh; 6647.word03150h, 02f14h, 00f55h, 006a6h, 0158eh, 009c3h, 0d4dfh, 0ab5ah; 6655.word0cb15h, 0261eh, 06ae4h, 05598h, 0f4d2h, 0a7c0h, 0b0a2h, 0ee01h; 6663.word019a9h, 016fbh, 00d7fh, 022feh, 03da7h, 0272ch, 0d89ah, 09b9bh; 6671.word0b587h, 010bah, 05b15h, 053d7h, 004b7h, 0c228h, 0c6b8h, 0eb57h; 6679.word0fca4h, 0f295h, 0f9b2h, 02d98h, 059bch, 0418bh, 0e536h, 0988bh; 6687.word0a64ah, 0fad6h, 04418h, 04654h, 01069h, 0e4beh, 0e905h, 0f79ah; 6695.word0e82eh, 0cd24h, 0ddb3h, 02879h, 06b58h, 05a91h, 0f7ceh, 09e14h; 6703.word09effh, 0ea92h, 02ef0h, 03695h, 0153eh, 00368h, 00f8bh, 00c2ah; 6711.word0dee5h, 0b040h, 0c337h, 01864h, 064bah, 05e8ah, 0053eh, 0ae09h; 6719.word0a7dfh, 0e352h, 01864h, 01d2fh, 00efah, 01c5bh, 037b7h, 02bfdh; 6727.word0e5e4h, 0a197h, 0ab71h, 001a4h, 05457h, 05ae9h, 01305h, 0c893h; 6735.word0c079h, 0e5a8h, 0fe1fh, 0f6afh, 0f77dh, 02315h, 0557eh, 04a8eh; 6743.word0f3fah, 09e0fh, 09c3ah, 0ec7ah, 03dbeh, 04d0fh, 0199dh, 0e413h ; 6751.word0e1c2h, 0f3edh, 0ed14h , 0d30fh, 0d995h, 01cbah, 063ddh, 06141h; 6759.word007eeh, 0a81bh, 09933h, 0dd11h, 02a67h, 03bb6h, 01ad1h, 001f0h; 6767.word00964h, 00d8fh, 0e844h, 0b735h, 0bd2dh, 0097fh, 05bb9h, 065d3h; 6775.word01667h, 0b5fbh, 0a12h, 0d7dah, 0149eh, 021a6h, 0122ah, 016c6h; 6783.word03146h, 02f01h, 0f22fh, 0a961h, 0a5ech, 0f4c3h, 04d1eh, 061bch; 6791.word01ff4hm, 0cd69h, 0b9e2h, 0dc4ah, 0fe83h, 0fe46h, 0f7b2h, 01a68h; 6799.word04cdah, 04e8ah, 00385h, 0a7c4h, 0969ch, 0dea3h, 0372fh, 05218h; 6807.word02552h, 0e9bbh, 0db91h, 0f071h, 0f15ah, 0d96eh, 0d6dbh, 00f88h; 6815.word05c84h, 068bfh, 01979h, 0b223h, 09330h, 0cfcfh, 02056h, 03e28h; 6823.word021abh, 0ff75h, 00244h, 00ba6h, 0efd6h, 0bee1h , 0b77eh, 0fc1fh; 6831.word05451h, 06c73h, 0273bh, 0c259h, 09e80h, 0ce55h, 00fa8h, 01467h; 6839.word00000h; 6841.endif; SaveRomSpace_ DtmfPoundEnd:.word00000h/*DTMF.h*/#ifndef_ DTMF_#define_DTMF_/*****DTMF detector stuff * * * * * * * * * * * * * * * * * * * * * * * * * * */ #defineLightenUpFalse#defineUsingAllFiltersFalse#define ENE RBY_SCALER_SHIFT6#defineSAMPLE_ BITS16#defineENERGY_$_{LIMIT}$_HIGH83886080#defin eENERGY_LIMIT_LOW10485760#defineGAIN_ REDUCTION_STEP1838#defineGAIN_INCRE ASE_ STEP4#defineLPFCOEF8483#defineINPUTTHRESHOLD 200000/*32 bit num representing energy*/ #defineMiniStateDuration10/*how consecutive chunks for statemachine recognition*/#defineSilenceTimeout50/*how many consec chunks of silence to trigger add '1 explicit msg*/#definDIAL_TONE'd'#defineRING'r' '#defineBUSY 'b' '#defineSILENCE's

```
'#defineUNDETERMINED               '?'#if
LightenUp#defineFILTRTHRESHOLD 19000#defineFIL-
TERDIRRERENCE 29000/*lower=fewer false+, more false
*/#else#defineFILTERTHRESHOLD 28400#defineFIL-
TERDIFFERENCE 16000/*lower=fewer false+, more false
*/#endif/* LightenUp */typedefvoid(*CallBackRoutineRtr)
(DtmfState state, ushort prevDuration);typedef struct
{DtmfStatestate;DtmfStateprevious_
state;DtmfStateprevious_previous_state;ushortDuration;
ushortprevDuration;SpeechP-
trinputPtr;shortinputGain;shortinputDiffState;shortin
putIntstate;#if UsingAllFiltersBiQuadPtrfilterPtr[12]
;longfilterEngeryLPFstates[12];#elseBiQuadPtrfilterPtr
[7];longfilterEnergyPPFstates[7]
;#endifshort:LPFcoef;longinputThreshold;longinputEnergy
LPFstate;dBprevInputLev-
el;shortfilterThresholdCoef-
;shortfilterDifferenceCoef;DtmfStated tmfArray[4][4]
;MeterdtmfMeter;CallBackRoutinePtr callBackRoutine;}
DtmfParams, * DtmfParamsPtr;/*prototypes from dtmf.c*/
voidProcessDtmf(DtmfParamsPtr x);voidProcessChunk
(DtmfParamsPtr dtmfPtr, short numSamples)
;voidProcessChunkState(DtmfParamsPtr dtmfPtr)
;voidInitDtmf( DtmfParamsPtrs dtmfPtr)
;externDtmfParamsdtmfData;#endif/*_DTMF_*/While
``` this source code and this description of the hardware requirements of the best mode of this invention are provided to give a complete description of the function and use of the invention, it is, of course, contemplated that the inventive concept may be implemented through other techniques in other embodiments and the detail steps of this invention as described in its current best mode of operation may also change without changing the essential inventive concept of the method, which is the remote calibration of telephone headphone, to provide improved audio quality, in a reliable process, easy to employ by both the customer-user and the customer service representative. Also, while the current best mode use of this invention is in the calibration of a telephone headset, specifically a Jabra 1000, alternative uses of this invention can also be applied to calibrate other telephone communications equipment. All such other uses of the method of this invention should be considered covered by the scope of the claims

What is claimed is:

1. A method for calibrating telephone equipment to a telephone communication channel, comprising the steps of:
    (A)initializing the telephone equipment for receipt of program command, said telephone equipment having the capability of receiving audio signal;
    (B)adjusting the quality of the received audio signal; and
    (C)storing said received audio signal adjustment.

2. A method for calibrating telephone equipment to a telephone communication channel, as recited in claim 1, further comprising the step of
    detecting the quality of the received audio signal.

3. A method for calibrating a telephone equipment to a telephone communication channel, as recited in claim 1 wherein said initializing the telephone equipment step comprises the steps of:
    (A)insuring the telephone equipment is properly connected to a telephone base unit;
    (B)entering remote program control of the telephone equipment;
    (C)receiving a security access code; and
    (D)checking said security access code for remote program access privileges.

4. A method for calibrating telephone equipment to a telephone communication channel, as recited in claim 1 wherein said adjusting the quality of the received audio signal step further comprises the step of:
    providing an adjustment of the received audio transmission level of the communication channel.

5. A method for calibrating telephone equipment to a telephone communication channel, as recited in claim 1 wherein said adjusting the quality of the received audio signal step further comprises the step of:
    providing an adjustment of the noise level of the communication channel.

6. A method for calibrating telephone equipment to a telephone communication channel, as recited in claim 1, wherein said adjusting the quality of the received audio signal step further comprises the step of:
    providing an adjustment of the audio parametric characteristics of the communication channel.

7. A method for calibrating telephone equipment to a telephone communication channel, as recited in claim 1, further comprising the step of:
    providing an adjustment of the program parameters, said program parameters controlling the function of the telephone equipment.

8. A method for calibrating telephone equipment to a telephone communication channel, as recited in claim 1 wherein said storing said received audio signal adjustment step comprises the steps of:
    (A)sending an instruction to the telephone equipment to store said signal adjustment; and
    (B)loading said signal adjustment into a semiconductor memory component, said semiconductor memory component being contained within the telephone equipment.

9. A method for calibration of telephone equipment to a telephone communication channel, comprising the steps of:
    (A)initializing the telephone equipment for receipt of program commands, said telephone equipment having the capability of receiving an electrical signal and transmitting an audio signal;
    (B)adjusting the quality of said transmitted audio signal; and
    (C)storing said transmitted audio signal adjustment.

10. A method for calibrating telephone equipment to a telephone communication channel, as recited in claim 9, further comprising the step of:
    detecting the quality of said transmitted audio signal.

11. A method for calibrating telephone equipment to a telephone communication channel, as recited in claim 9 wherein said initializing the telephone equipment step comprises the steps of:
    (A)insuring the telephone equipment is properly connected to a telephone base unit;
    (B)entering remote program control of the telephone equipment;
    (C)receiving a security access code; and
    (D)checking said security access code for remote program access privilege.

12. A method for calibrating telephone equipment to a telephone communication channel, as recited in claim 9 wherein said adjusting the quality of the generated audio signal step further comprises the step of:
    providing an adjustment of the transmission level of the communication channel.

13. A method for calibrating telephone equipment to a telephone communication channel, as recited in claim 9 wherein said adjusting the quality of the generated audio signal step further comprises the step of:

provided an adjustment of the noise level of the communication channel.

14. A method for calibrating telephone equipment to a telephone communication channel, as recited in claim 9 wherein said adjusting the quality of the generated audio signal step further comprises the step of:

providing an adjustment of the audio parametric characteristics of the communications channel.

15. A method for calibrating telephone equipment to a telephone communication channel, as recited in claim 9 wherein said adjusting the quality of the generated audio signal step comprises the step of:

providing an adjustment of the program parameters, said program parameters controlling the operation of said telephone equipment.

16. A method for calibrating telephone equipment to a telephone communications channel, as recited in claim 9 wherein said storing said received audio signal adjustment step comprises the steps of:

(A) sending an instruction to the telephone equipment store said signal adjustment; and (B) loading said signal adjustment into a semiconductor memory component, said semiconductor memory component being contained within the telephone equipment.

17. A method for calibrating telephone equipment to a telephone base unit and to the noise environment in which they exist, the invented method comprising the steps of:

(A) receiving a calibration request;

(B) initializing the telephone equipment, said telephone equipment being configured for use by a user in telephone communications and said telephone equipment having audio transmission level circuitry, noise reduction circuitry and a capacity for storing and modifying audio parameters;

(C) taking control of the telephone equipment;

(D) providing an adjustment for the telephone equipment transmission level;

(E) storing said adjustment for the telephone equipment transmission level;

(F) providing an adjustment to compensate for the environment noise level;

(G) storing said environment noise level compensation adjustment;

(H) providing an adjustment for the tuning of the telephone equipment audio parameters;

(I) storing said telephone equipment audio parameter adjustments; and (J) returning control of the telephone equipment to the user.

18. A method for calibrating telephone equipment to a telephone base unit and to the noise environment in which they exist, the invented method comprising the steps of:

(A) transmitting a calibration command;

(B) initializing the telephone equipment, said telephone equipment being configured for use by a user in telephone communications and said telephone equipment having audio transmission level circuitry, noise reduction circuitry and a capacity for storing and modifying audio parameters;

(C) taking control of the telephone equipment;

(D) providing an adjustment for the telephone equipment transmission level;

(E) storing said adjustment for the telephone equipment transmission level;

(F) providing an adjustment to compensate for the environment noise level;

(G) storing said environment noise level compensation adjustment;

(H) providing an adjustment for the tuning of the telephone equipment audio parameters;

(I) storing said telephone equipment audio parameter adjustments; and (J) returning control of the telephone equipment to the user.

19. A method for calibrating telephone equipment to a telephone base unit and to the noise environment in which they exist, as recited in claim 17, wherein said receiving calibration request step further comprises the step of receiving a calibration request from the telephone equipment user; said calibration request being placed remotely through the use of a telephone unit.

20. A method for calibrating telephone equipment to a telephone base unit and to the noise environment in which they exist, as recited in claim 17, wherein said initializing the telephone equipment step further comprises the step of activating the telephone equipment.

21. A method for calibrating telephone equipment to a telephone base unit and to the noise environment in which they exist, as recited in claim 17, wherein said taking control of the telephone equipment step comprises the steps of:

(A) entering a programming mode command;

(B) generating a first response signal to acknowledge the receipt of said programming mode command;

(C) entering a security code;

(D) verifying said security code; and (E) generating a second response signal to acknowledge the acceptance of said security code.

22. A method for calibrating telephone equipment to a telephone base unit and to the noise environment in which they exist, as recited in claim 17, wherein said providing an adjustment for the telephone equipment transmission level step comprises the steps of:

(A) measuring to determine if the transmission level is correct;

(B) entering a command to decrease the transmission level if the transmission level is high;

(C) entering a command to increase the transmission level if the transmission level is low;

(D) determining if all calibrations have been completed;

(E) storing all calibration adjustments if all calibrations have been completed; and (F) returning telephone equipment control to the user if all calibrations have been completed and all adjustments have been stored.

23. A method for calibrating telephone equipment to a telephone base unit and to the noise environment in which they exist, as recited in claim 17, wherein said providing an adjustment to compensate for the environment noise level step comprises the steps of:

(A) testing if the noise level is correct;

(B) entering a command to set the noise cancellation function to a high degree of noise cancellation, if the noise level is high;

(C)entering a command to set the noise cancellation function to a low degree of noise cancellation, if the noise level is low;

(D)entering a command to set the noise cancellation function to a medium degree of noise cancellation, if the noise level is neither high nor low;

(E)determining whether all noise level calibrations have been completed;

(F)storing all calibration adjustments if all calibrations have been completed; and (G)returning telephone equipment control to the user if all calibrations have been completed and all adjustments have been stored.

24. A method for calibrating telephone equipment to a telephone base unit and to the noise environment in which they exist, as recited in claim 17, wherein said providing an adjustment for the tuning of telephone equipment audio parameters step comprises the steps of:

(A)entering expert mode;

(B)generating audio signal verifying entering of expert mode;

(C)entering desired parametric codes; and (D)checking that all desired parametric codes have been entered.

25. A method for calibrating telephone equipment to a telephone base unit and to the noise environment in which they exist, as recited in claim 17, wherein said storing said telephone equipment audio parameter adjustments step comprises the steps of:

(A)entering the store parameter adjustments command; and (B)activating a storage cycle for semiconductor memory resident within said telephone equipment unit.

26. A method for calibrating telephone equipment to a telephone base unit and to the noise environment in which they exist, as recited in claim 17, wherein said returning control of the telephone equipment to the user step comprises the step of entering a user mode command.

27. A method for calibrating telephone equipment to a telephone base unit and to the noise environment in which they exist, the invented method comprising the steps of:

(A)receiving an electrical signal, said electrical signal indicating a request for calibration of remote telephone equipment, said remote telephone equipment having circuitry for the remote calibration of the audio quality of said telephone equipment;

(B)exerting program mode control over the telephone equipment;

(C)providing adjustment for said remote telephone equipment calibration circuitry;

(D)storing said adjustment of said remote telephone equipment calibration circuitry; and (E)exiting program control over the telephone equipment.

28. A method for calibrating telephone equipment to a telephone base unit and to the noise environment in which they exist, the invented method comprising the steps of:

(A)transmitting an electrical signal, said electrical signal indicating a command for calibration of remote telephone equipment, said remote telephone equipment having circuitry for the remote calibration of the audio quality of said telephone equipment;

(B)exerting program mode control over the telephone equipment;

(C)providing adjustment for said remote telephone equipment calibration circuitry;

(D)storing said adjustment of said remote telephone equipment calibration circuitry; and (E)exiting program control over the telephone equipment.

29. A process for calibrating telephone equipment to a telephone base unit and to the noise environment in which they exist, the invented process comprising:

(A)a process for permitting user control;

(B)a process for providing remote program control;

(C)a process for ensuring program control is only available if authorized;

(D)a process for programming the telephone equipment, said programming to adjust audio characteristics of the telephone equipment; and (E)a process for storing said adjustments for further use.

30. A system for calibrating telephone equipment, comprising:

(A)a communication channel;

(B)a telephone receiver;

(C)a telephone transmitter; and (D)a control console.

31. A system for calibrating telephone equipment, as recited in claim 30, wherein said telephone receiver further comprises:

(A)a speaker;

(B)a programmable unit, for receipt of program commands from said control console; and (C)a connector, said connector electrically connecting said telephone receiver to said communication channel.

32. A system for calibrating telephone equipment, as recited in claim 30, wherein said telephone transmitter further comprises:

(A)a microphone;

(B)a progammable unit, for receipt of program commands from said control console; and (C)a connector, said connector electrically connecting said telephone receiver to said communication channel.

33. A system for calibrating telephone equipment, as recited in claim 30, wherein said control console further comprises:

(A)one or more switches capable of activating signals for transmission to said transmitter programmable unit and to said receiver programmable unit;

(B)a process for determining audio characteristics of the telephone equipment;

(C)a process for modifying the audio characteristics of the telephone equipment; and (D)a means for storing the program control parameters sent to said transmitter and to said receiver.

* * * * *